US005569899A

United States Patent [19]

Tedesco

[11] Patent Number: 5,569,899

[45] Date of Patent: Oct. 29, 1996

[54] ON-LINE BAR CODE VERIFICATION SYSTEM

[75] Inventor: Jack Tedesco, Manhattan Beach, Calif.

[73] Assignee: RJS, Inc., Monrovia, Calif.

[21] Appl. No.: 569,522

[22] Filed: Dec. 8, 1995

Related U.S. Application Data

[63] Continuation of Ser. No. 195,736, Feb. 14, 1994, abandoned.

[51] Int. Cl.$^6$ .................................................. G06K 7/10

[52] U.S. Cl. ........................................... 235/462; 235/432

[58] Field of Search .................................. 235/462, 432, 235/454, 456, 466; 400/102, 103

[56] References Cited

U.S. PATENT DOCUMENTS

| | | | |
|---|---|---|---|
| 4,570,057 | 2/1986 | Chadima, Jr. et al. | 235/472 |
| 4,705,939 | 11/1987 | Ulinski, Sr. | 235/466 |
| 4,721,860 | 1/1988 | Troendle | 250/568 |
| 4,795,281 | 1/1989 | Ulinski et al. | 400/103 |
| 5,115,122 | 5/1992 | Jwo et al. | 235/467 |
| 5,194,720 | 3/1993 | Reinnagel et al. | 235/437 |
| 5,196,679 | 3/1993 | Oshino | 235/437 |
| 5,218,190 | 6/1993 | Hardesty et al. | 235/462 |
| 5,229,587 | 7/1993 | Kimura et al. | 235/432 |
| 5,272,322 | 12/1993 | Nishida et al. | 235/462 |

OTHER PUBLICATIONS

Brochure, *Inspector V Series 100% Real Time Bar Code Verifier*, Jun. 1993.
Brochure, *The Inspector V Bar Code Verifier, Model 100*, Aug. 1993.
Brochure, *The Inspector V Bar Code Verifier, Model 200*, Aug. 1993.

*Primary Examiner*—Donald T. Hajec
*Assistant Examiner*—Thien Minh Le
*Attorney, Agent, or Firm*—Christie, Parker & Hale, LLP

[57] ABSTRACT

A noncontact scanner operating under microcomputer control provides on-line bar code verification. Synchronized or free-scanning operation of the scanner is controlled by the microcomputer responsive to user inputs provided through an input keyboard. Manual functions selection using the keyboard and output display using multi-function LEDs and LCD display for communication to the user, provides direct input and output from the microcomputer and a bidirectional communications interface allows data and instruction exchange between the microcomputer and a host processor for data designation, analysis and record keeping activities. A plurality of control outputs from the controller allows real time control of the process or system being monitored.

12 Claims, 9 Drawing Sheets

FREESCAN MODE FLOW DIAGRAM

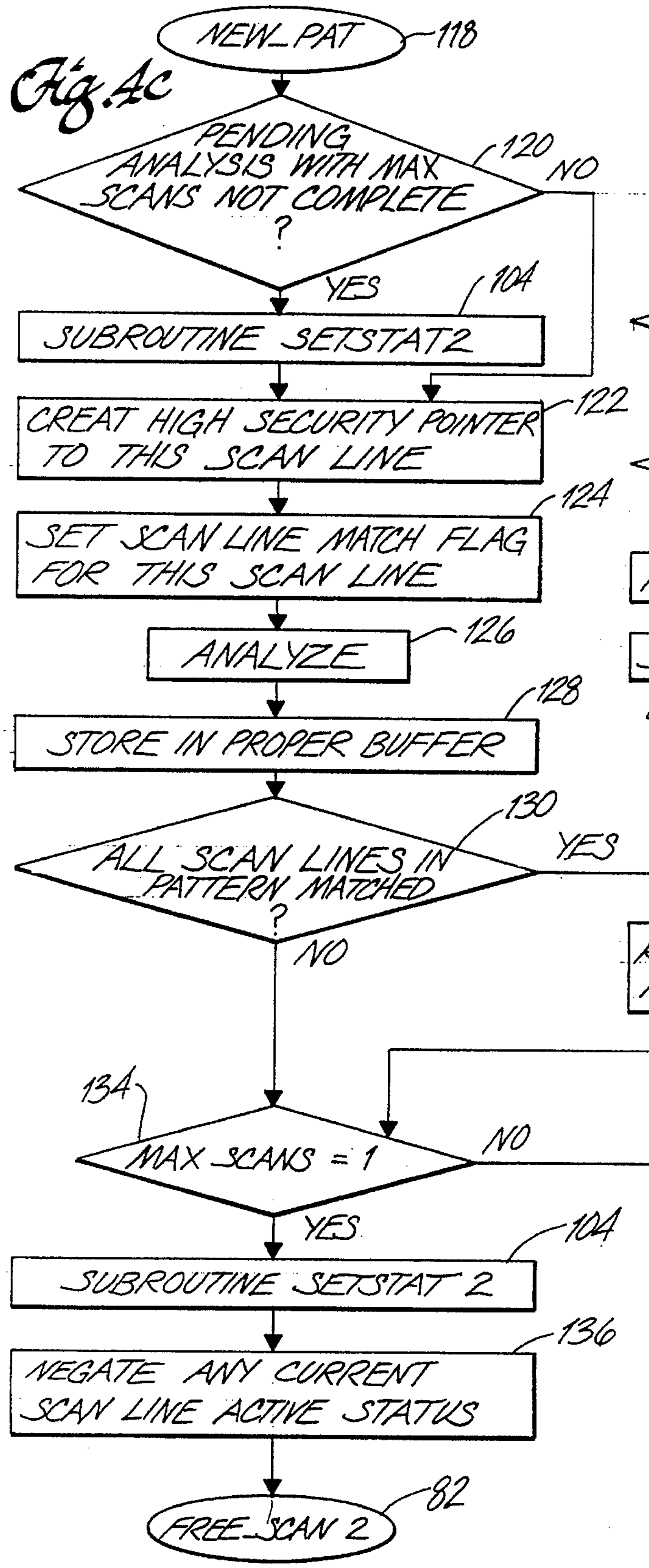
Fig. 4c
NEW_PAT
118
PENDING ANALYSIS WITH MAX SCANS NOT COMPLETE ?
120
NO
YES
SUBROUTINE SETSTAT2
104
CREAT HIGH SECURITY POINTER TO THIS SCAN LINE
122
SET SCAN LINE MATCH FLAG FOR THIS SCAN LINE
124
ANALYZE
126
STORE IN PROPER BUFFER
128
ALL SCAN LINES IN PATTERN MATCHED ?
130
YES
NO
RE-INIT SYSTEM FOR NEXT PATTERN
132
MAX SCANS = 1
134
NO
FREE_SCAN 2
82
YES
SUBROUTINE SETSTAT 2
104
NEGATE ANY CURRENT SCAN LINE ACTIVE STATUS
136
FREE_SCAN 2
82

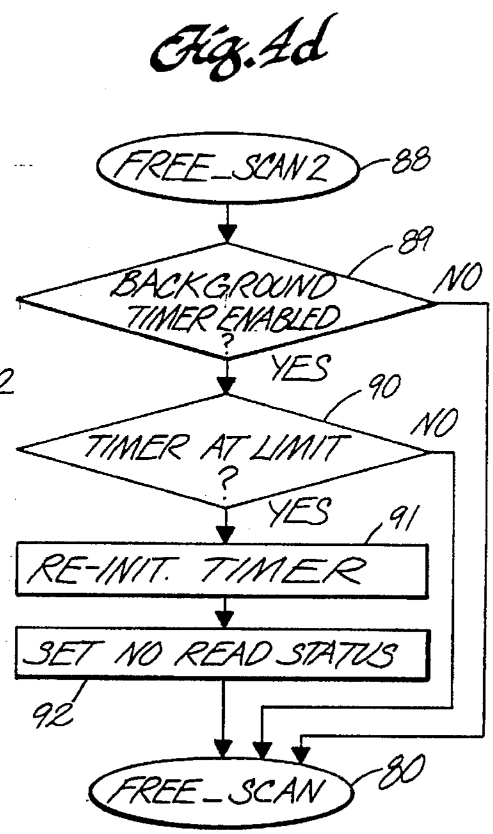
Fig. 4d
FREE_SCAN 2
88
BACKGROUND TIMER ENABLED ?
89
NO
YES
TIMER AT LIMIT ?
90
NO
YES
RE-INIT. TIMER
91
SET NO READ STATUS
92
FREE_SCAN
80

ON-LINE BAR CODE VERIFICATION SYSTEM

CROSS-REFERENCE TO RELATED APPLICATION

This is a continuation of application Ser. No. 08/195,736, filed Feb. 14, 1994 now abandoned.

BACKGROUND OF THE INVENTION

1. Field of the Invention

The present invention relates to the verification and validation of bar code labels printed for identification of products. More particularly, a system is provided for scanning bar codes in real time as printed or passed by a scanner in a production environment allowing verification of the quality of the bar code to a plurality of standards, readability of the bar code and proper encoding of desired data. Scanning is accomplished in a synchronized or free-scan format, with the system providing control outputs for use by a printer or process based on the bar code verification or validation results.

2. Prior Art

Bar codes are extensively used for identification of products sold in the commercial market, process procedures and routings, materials and data indexing, cataloguing and storage, and other data administrative and control activities. The development of low cost systems for printing bar codes, including thermal and laser printer systems, has allowed the use of bar codes to proliferate throughout industry. Numerous standards have been developed for bar code encoding schemes and quality, including UPC/EAN/JAN, CODABAR and IATA, with evaluation criteria, including bar width deviation, ratio calculation, percent decode calculation, encodation check, modcheck calculation, quiet zone check and intercharacter gap (ICG), print contrast (PCS), and decodability grade and reference decode calculations by ANSI. The printing of bar code symbols with assured quality and decodability requires on-line verification and/or validation of the bar codes as printed in real time. Similarly, for bar codes applied to products, verification that labels have not been damaged or degraded or that incorrect labels have not been applied to the goods also requires real time on-line evaluation. Various prior art systems have provided differing levels of verification or decoding of bar codes of different symbologies, however, such systems typically do not provide sufficient flexibility in verification or decoding techniques, require significant calibration inputs or lack sufficient communication and control output capability to provide useful service in real time applications.

It is therefore desirable to provide an on-line verification and validation system which has sufficient flexibility to verify bar code symbols to industry specifications and validate data to ensure actual encoded information is accurate without extensive or repeated calibration of the system. Further, it is desirable to provide a system having flexible control and data outputs for accumulation of historical data and response to inaccurate or unreadable bar code information.

SUMMARY OF THE INVENTION

The present invention provides a system employing a non-contact scanner operating under microcomputer control. Synchronized or free-scanning operation of the scanner is controlled by the microcomputer responsive to user inputs based on requirements of the system for which label or bar code analysis is required. Manual function selection and output display for communication to the user provide direct input and output from the microcomputer and a bi-directional communications interface allows data and instruction exchange between the microcomputer and a host for data designation, analysis and record keeping activities. A plurality of programmable field outputs from the microcomputer allows real time control of the process or system being monitored by the invention. Pattern matching is accomplished in a synchronized or free-scan mode selectable by the user. Free-scanning allows detection and analysis of bar codes on an unconstrained basis. Synchronized scanning allows confirmation of fixed process parameters, including presence of bar code labels at designated times in the process to allow a "no read" designation for missing bar codes or labels. Timer capability is provided for "no read" evaluations in the free-scanning mode.

BRIEF DESCRIPTION OF THE DRAWINGS

FIGS. 4*a* through 4*d* are flow diagrams for software implementing the free-scan mode.

DETAILED DESCRIPTION

Figure 1A:
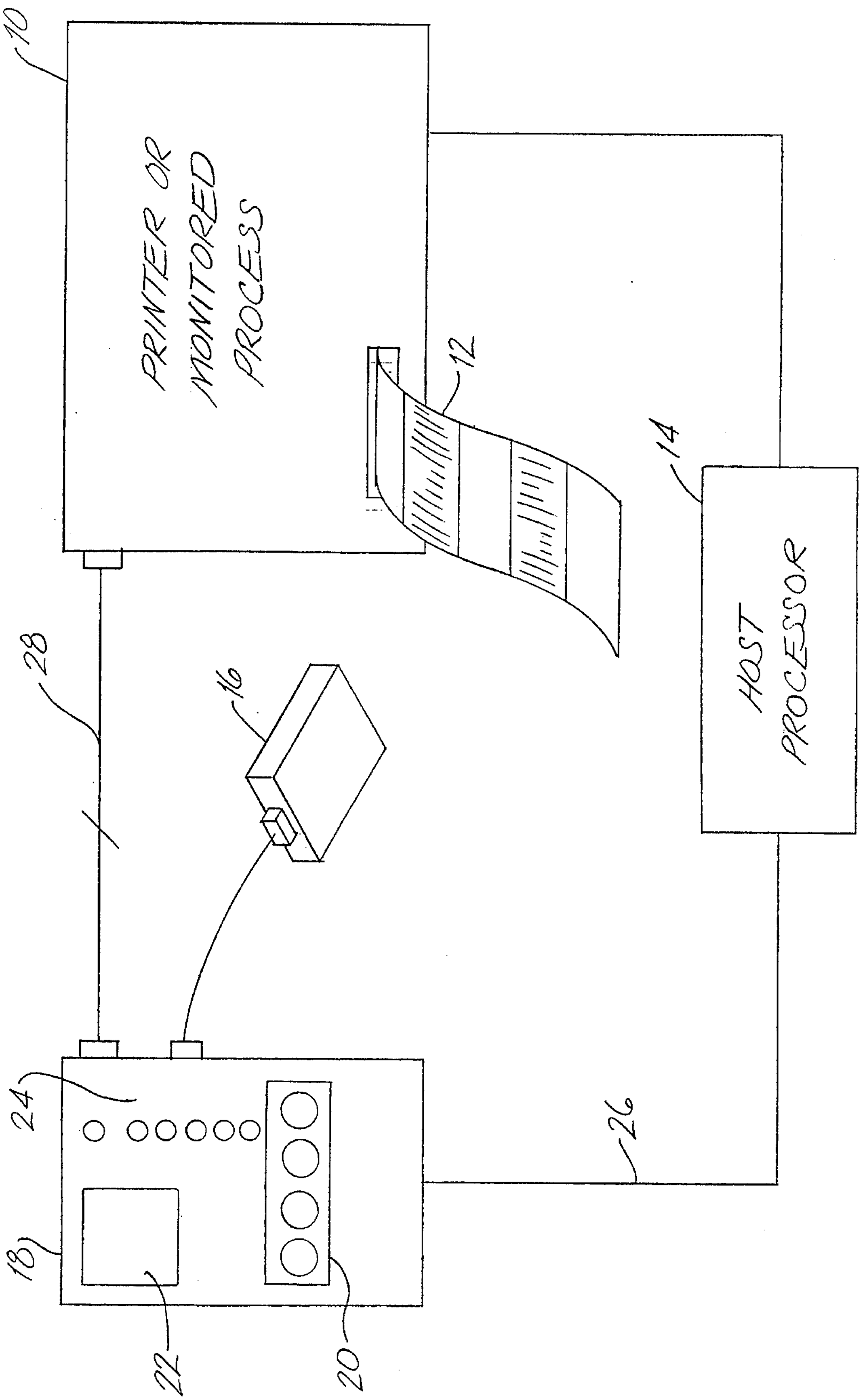
FIG. 1*a* is a block diagram of an implementation of the present system in a printing or process application for verification/validation of bar codes.

Referring to the drawings, FIG. 1 demonstrates the operational environment of the present invention. A printer or other monitored process 10 provides the bar code labels 12 to be monitored by the system. These bar code labels may be present on label stock exiting from a printer, bar code labels applied to packaging present on a conveyor or on the packaging machine for the product itself. Such printers or processes are typically controlled by a host processor 14 which downloads control information to the process and/or bar code information, including symbology definition and data encoded in the bar code. A non-contact scanner 16 is employed in the present invention to observe the bar code. In the embodiment shown in the drawings, a moving beam laser scanner having a visible laser diode light source at 670 nanometers is employed. The scanner communicates with a controller 18 which incorporates an input keypad 20 for operator communication with the device, an LCD display 22 for data output and communication with the operator, and a plurality of function LEDs 24 to identify the operation and status of the invention.

A communications interface 26 is provided between the controller and any host processor for data transmission, as will be described in greater detail subsequently. In addition, a plurality of control outputs 28 are provided in the controller for direct output of control signals to the printer or monitored process. Various functionality for these signals can be provided by the controller responsive to preprogrammed conditions. Those skilled in the art will recognize that the scanner and controller are mountable in a common enclosure, and are shown separately in FIG. 1 merely for convenience.

Figure 1B:
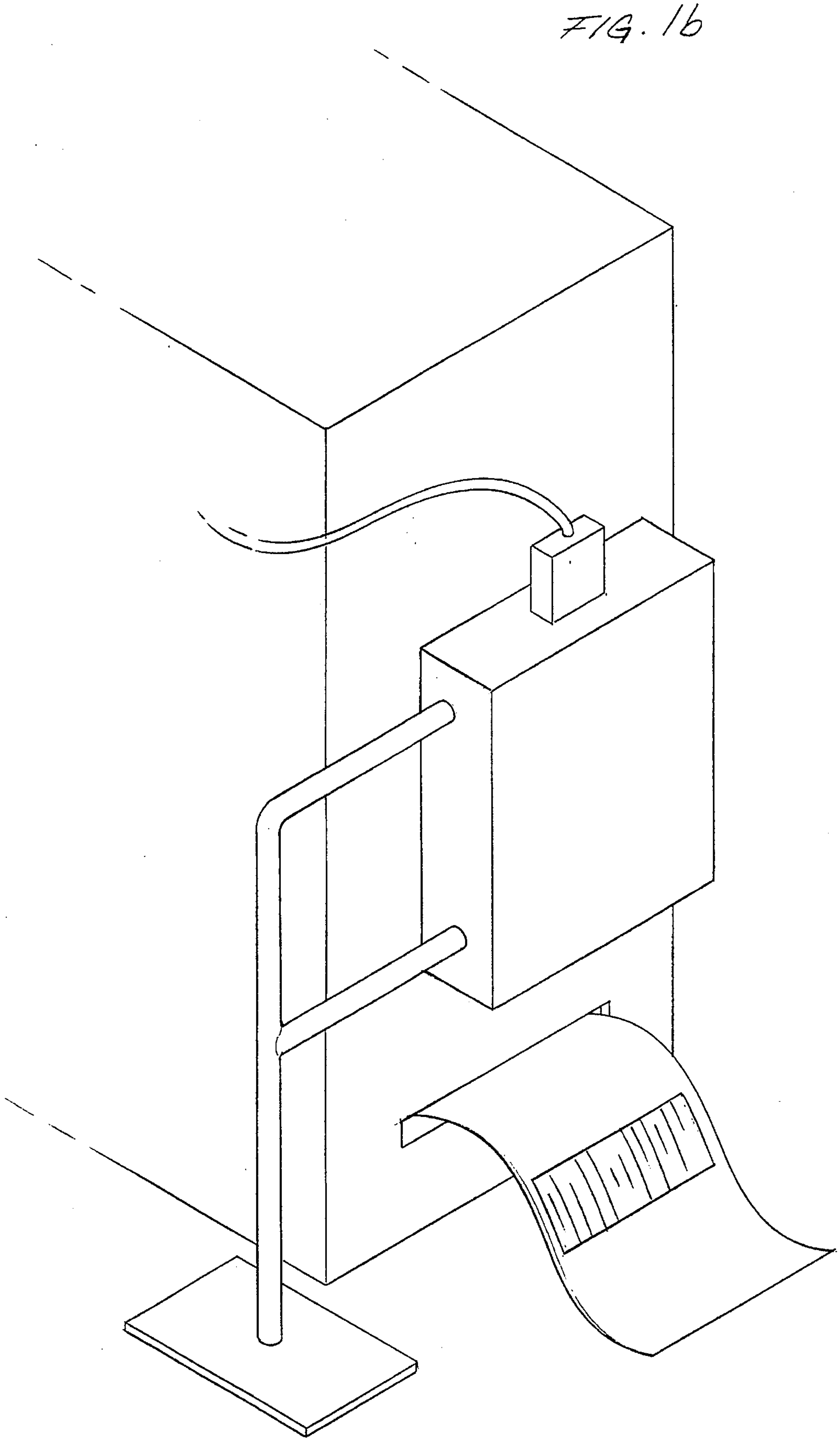
FIG. 1*b* shows the scanner of the present invention oriented to read "picket fence" oriented bar codes.
Figure 1C:
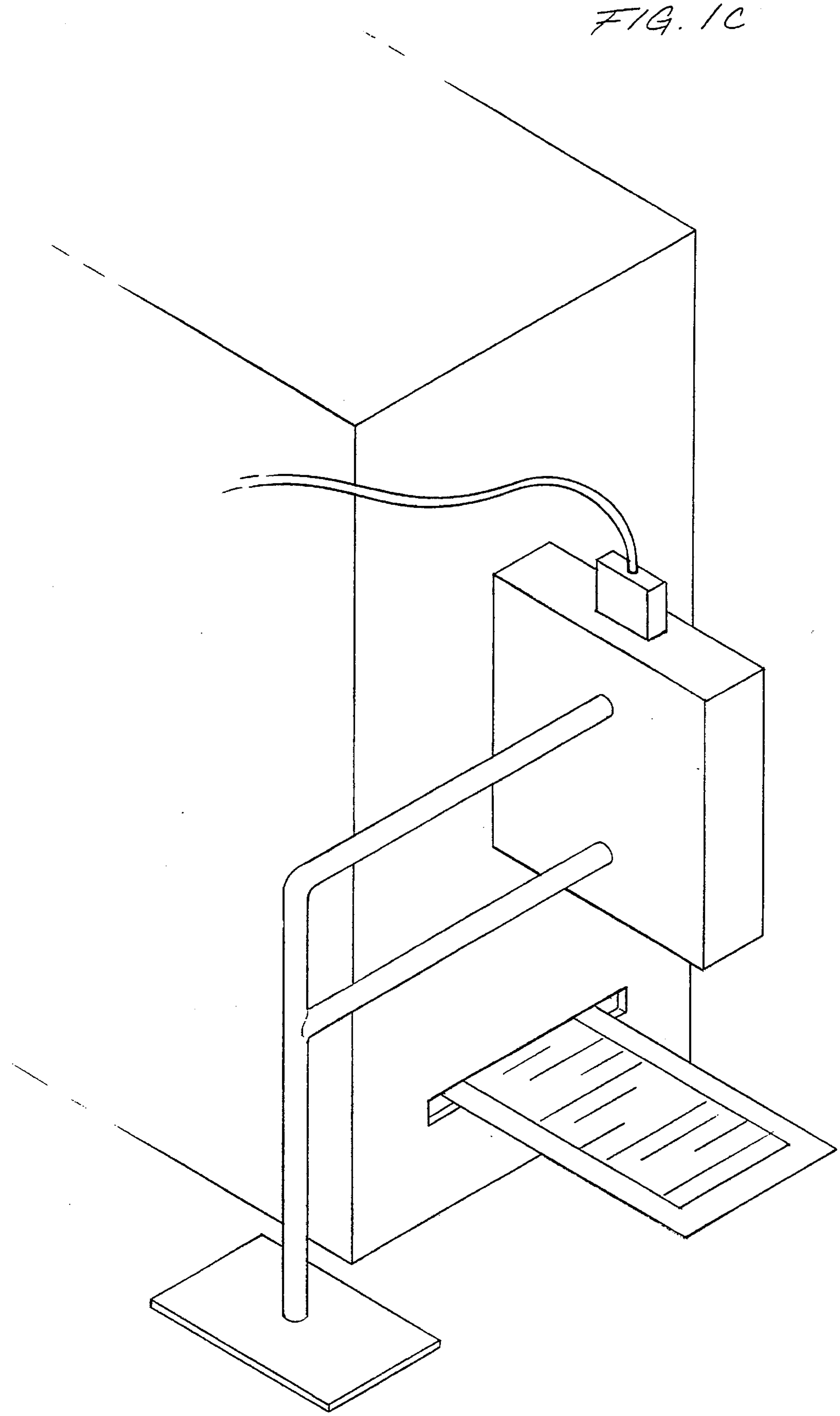
FIG. 1*c* shows the scanner of the present invention oriented to read "ladder" oriented bar codes.

FIGS. 1*b* and 1*c* demonstrate the flexible mounting of the scanner in the present invention using stand 17 to accommodate "picket fence" (1*b*) and "ladder" (1*c*) oriented bar codes. The invention provides scanner control, as will be described in greater detail subsequently, which facilitates operation in either mounting position.

Figure 2:
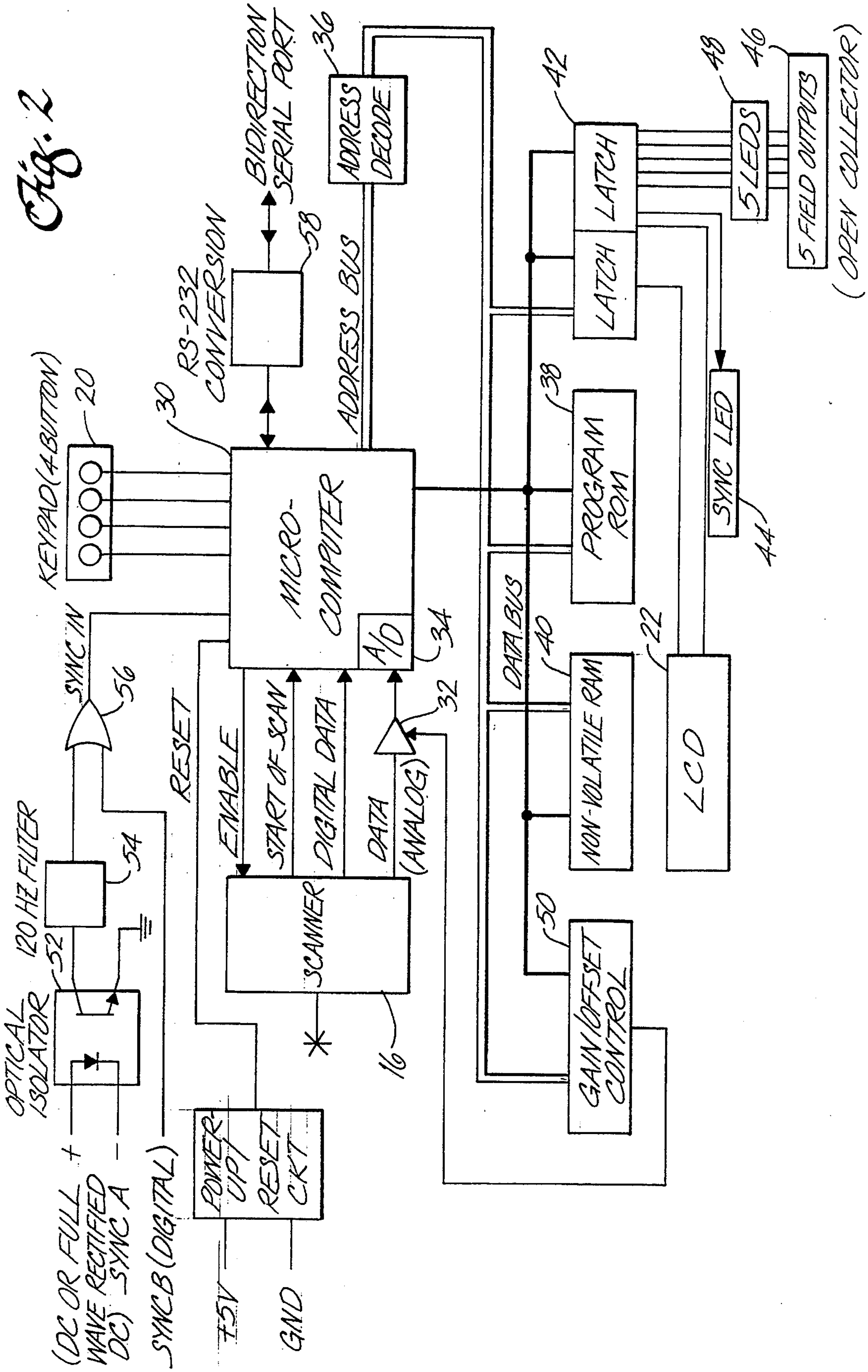
FIG. 2 is a block diagram of an embodiment of the system demonstrating the various input, output and operational elements of the invention.

As shown in FIG. 2, a microcomputer controls the scanner and receives data input from the scanner. An ENABLE signal activates the scanner, which responds with a START OF SCAN signal. Digital data is then provided for scan results. Analog data is also provided in the embodiment shown in the drawings through a controllable operational amplifier 32, which transmits data to the microcomputer through an analog to digital converter 34.

As previously described, operator interface with the system of the invention is accomplished through a keypad 20. In present embodiments, this keypad comprises a four key membrane switch, providing for separate function inputs to the microcomputer.

Internal communication in the controller is accomplished through a two bus architecture. An ADDRESS BUS operating through an address decoder 36 allows the microcomputer to access system memory, including a program read-only memory (ROM) 38 and a non-volatile random access memory (RAM) 40. Addressable latches 42 allow data output and control for the LCD, a synch LED 44 and field outputs 46 with associated identification LEDs 48 for distribution of external control signals. In the embodiment shown in the drawings, five field outputs are provided employing open collector transistors.

The operational amplifier for analog data input from the scanner is controlled using a gain/offset control 50, also addressed by the ADDRESS BUS. Data transmission to the memories, latches and control circuits is provided employing a DATA BUS.

The present invention operates in a synchronized or free-scan mode for flexibility in adapting to the requirements of a monitored process. For processes in which the bar code labels being scanned appear at a synchronized time, inputs for analog (SYNCA) or digital (SYNCB) signals are provided. Analog synchronization signals are received by an optical isolator 52 and pass through a 120 Hz filter 54 to or gate 56, which provides the SYNC_IN signal for use by the microcomputer. Digital synchronization inputs are provided directly through the or gate.

External communication with a host processor or other control system for the process is provided through a standard communications channel. In the embodiment shown in the drawings, a bi-directional serial port employing a standard RS 232 interface 58 is employed.

Figure 3:
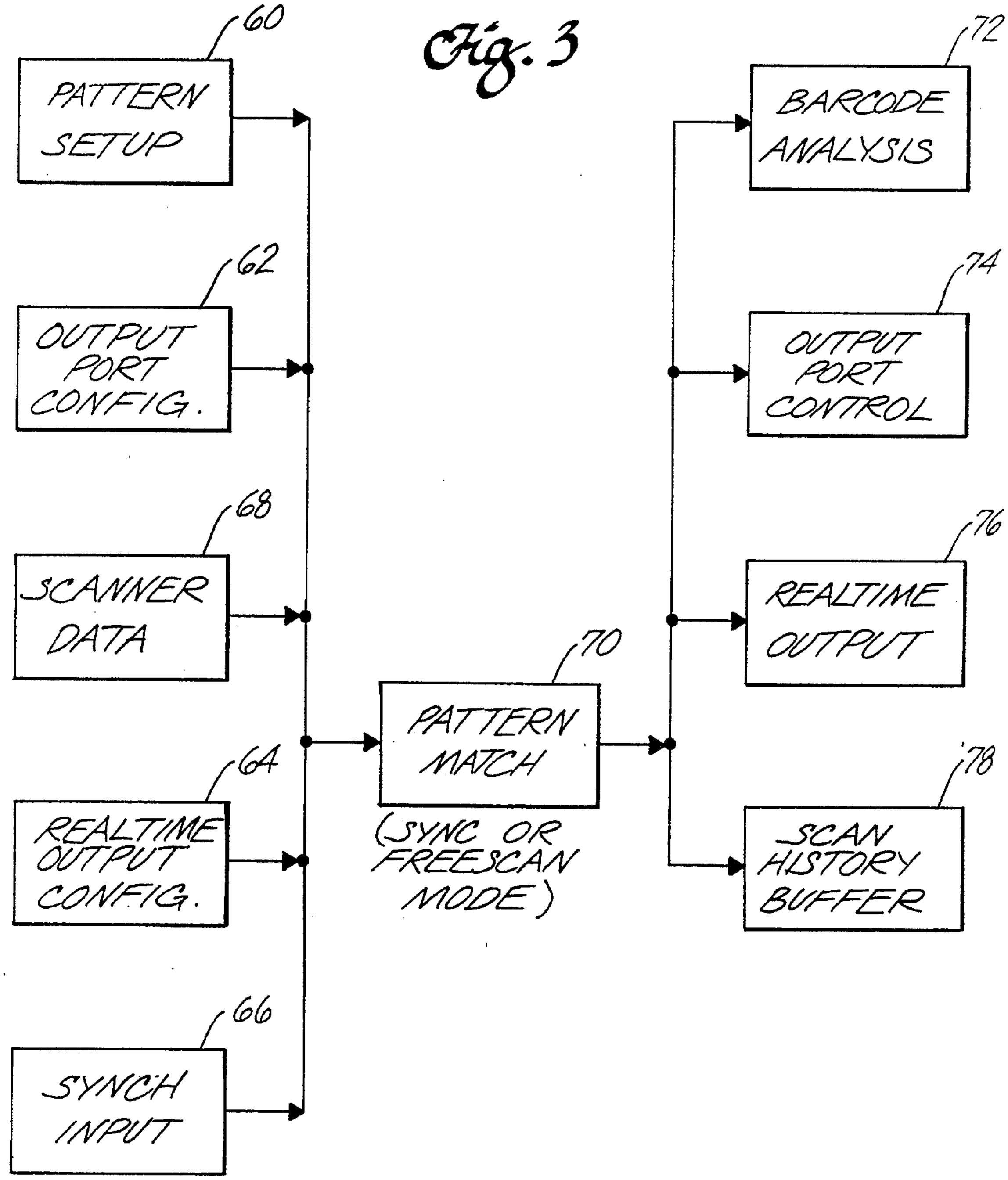
FIG. 3 is a system flow diagram in block form demonstrating various software elements of the invention.
Figures 4A, 4B:
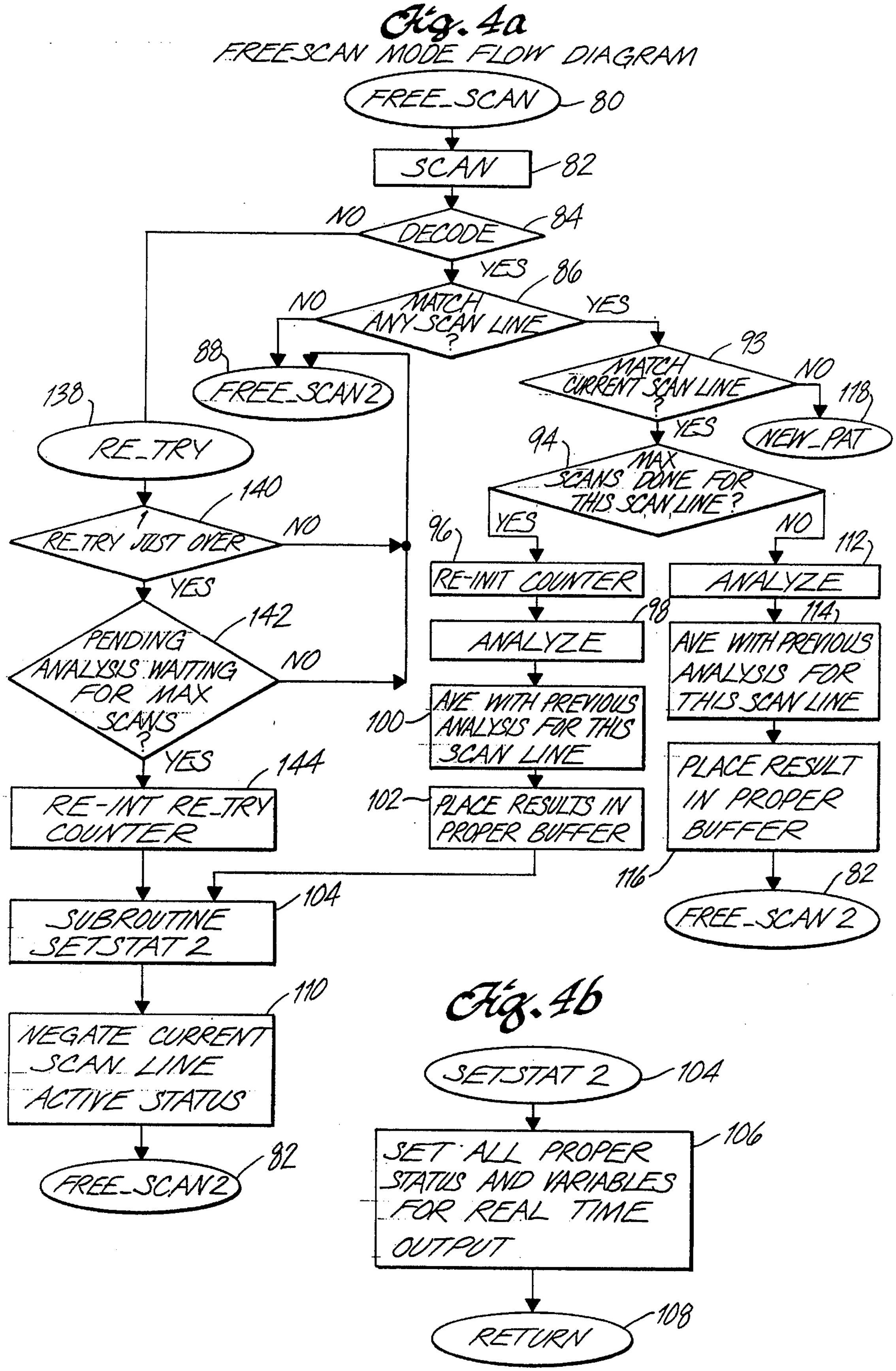

A basic system flow for software employed in the microprocessor of the invention is shown in FIG. 3. A subroutine for pattern setup 60 allows definition of the symbology employed by the bar codes in the monitored process. The present embodiment employs decoding capability for code 39, CODABAR, interleaved 2 of 5, UPC/EAN including two- and five-digit addenda, Code 128 and Code 93 symbologies. Definition of the pattern is accomplished through direct operator input using the four key interface prompted via menus on the LCD. The embodiment of the invention disclosed in the drawings provides for defining a pattern of up to six scan lines with up to four symbols across each scan line. A total of ten symbols is allowed in the pattern of the present embodiment due to memory and processing limitations. Those skilled in the art will recognize that other combinations of the number scan lines and symbols may be employed.

Each scan line is defined through an input format displayed on the LCD in the form

```
L#XX   YYYYYYYYYYY
ZZZ   ZZZ   ZZZ   ZZZ
```

In this format, the "L #" refers to the particular scan line number, while the "Z Z Z" fields represent the possible four symbols available for the scan line. Exemplary symbol abbreviations for use in the "Z" fields in this format for entry on the keypad are shown in Table 1. Additional definition of subsymbology is accomplished using key inputs on the "Z" field subsequent to input of the symbol abbreviations. Exemplary subsymbology abbreviations are also shown in Table 1. The "Y" field in the format described provides an alpha numeric description of the field indicated by the symbol field selected.

TABLE 1

| Symbol Abbreviations | |
|---|---|
| C39 - Code 3 of 9 | I25 - Interleaved 2 of 5 |
| C93 - Code 93 | 128 - Code 128 |
| CBR - Codabar | U/E - UPC/EAN |
| **Subsymbology Abbreviations** | |
| Code 39 | Interleaved 2 of 5 |
| USS - USS 3 of 9 | USS - USS I2of5 |
| B1 - AIAG-BL | ANS - ANSI I2of5 |
| 345 - AIAG-B3/4/5 | CAS - UPC Casecode |
| LOG - LOGMARS | |
| HIB - HIBC | Code 93 |
| ANS - ANSI | USS - USS Code 93 |
| W43 - ANSI W/43 | ANS - ANSI Code 93 |
| Code 128 | UPC/EAN |
| USS - USS Code 128 | 80 - 80–89% |
| ANS - ANSI Code 128 | 90 - 90–115% |
| CODABAR | 116 - 116–150% |
| USS - USS Codabar | 151 - 200% |
| ANS - ANSI Codabar | |

Analysis parameters, which will be discussed in greater detail subsequently, may also be defined by the operator through the key pad/menu display interface. Both pattern setup and analysis parameters are alternately communicated to the invention directly from a host processor using the bi-directional communication interface.

The bidirectional communication interface is established in the subroutine real time output configuration 64, as will be described in greater detail subsequently. Similarly, control of the field outputs is accomplished in a subroutine for output port configuration 62. The five separate field outputs are individually controllable to provide user programmable response to various scanning conditions. For example, failure of a bar code verification step can be programmed to result in a signal on one field output to pause a printer system in response the failure. Similarly, for process control, field outputs can be employed to activate alarms or other communication signals for notifying operators of a verification failure and/or provide real time control of the process to suspend processing or re-route items with failed bar codes.

The external synchronization is managed by the microcomputer through a subroutine synch input 66 and interface with the scanner is accomplished through subroutine scanner data 68.

Control of the scanner and processing of received data is accomplished through a plurality of subroutines, which will be described in greater detail subsequently, generally identified in FIG. 3 as pattern match 70. Downstream functions handled by the microprocessor include bar code analysis 72, which is accomplished in present embodiments using standard ANSI decodability grades A, B, C, D and F and ANSI reference decode calculations, as well as traditional parameters for encodation check, mod check, average bar width deviation, quiet zone, intercharacter gap (ICG), addendum parity (UPC/EAN) and wide-to-narrow ratio evaluation.

Capability of the present invention to provide direct communication with a host processor, as well as direct operator input, allows character validation for the bar codes, as well as bar code verification. Character representations for the bar code being printed or present on marked articles in other monitored processes is either entered manually by an operator using menu directed input or downloaded from the host processor and stored in RAM for access by the microcomputer during bar code analysis.

Outputs to the field outputs resulting from bar code analysis are accomplished through subroutines output port control 74, as defined by parameters established in the output port configuration subroutine. Similarly, real time output subroutines 76 control communication to the host based on the real time output configuration previously established.

Data from scanned patterns is stored by the scan history buffer routines 78 for scan comparison and bar code analysis, as will be described in greater detail subsequently.

As previously described, the present invention allows operation in either synchronized or free-scan modes for bar code detection, verification and validation. The free-scan mode allows operation of the invention in monitoring a process in which appearance of bar codes to be scanned does not occur in a rigidly timed sequence and/or a sync signal is not available. An embodiment of the present invention for this mode is shown in FIGS. 4*a–d*. Upon entering the free-scan subroutine at block 80, the microcomputer directs a scan 82 by enabling the scanner, as previously described. The scanner provides a start of scan signal for timing purposes, followed by digital data and/or analog data comprising the scan information, which is then decoded at block 84.

As a means for increasing data throughput in the invention, a text recognizer is incorporated in the decode routine for the present invention. Identification of scanned elements having a 5X or larger dimension quickly isolates non-bar code patterns. This type of pattern is typically associated with text, which may be printed on a label adjacent a bar code within the scan path. Prescreening of such greater than 5X elements with decoding significantly increases computation efficiency.

A determination is made if the decoded scan matches any scan line in block 86. If no scan line is matched, the program transitions to subroutine FREE_SCAN2 block 88, which is further depicted in FIG. 4*d*.

In the free-scan mode, a background timer can be employed by the microcomputer to establish a maximum time during the monitored process at which a bar code should appear for scanning. If the background timer is enabled at block 89, the microcomputer determines if the timer has reached the set limit at block 90. If the time limit has been reached, the timer is reinitialized at block 91 and a "no read status" is set at block 92 by the microcomputer. Dependent on the output port configuration and real time output configurations established in the software, a no read status can result in a real time output or communication to the host processor indicating a process failure. If the background timer is not enabled, or the timer has not reached its limit, the program reenters the free-scan routine at block 80. Disabling of the background timer is also useful in cases where symbols being analyzed may be passing the scanner at a rate higher than can be 100% analyzed. The symbols will then be "spot checked" at the fastest rate of analysis. A "no read condition" does not exist for the invention operating in this fashion.

If, upon decoding a scan line, a match is found with any scan line in the pattern in block 86, a determination is made if the match is with the current scan line in block 93. If the match is with the current scan line, a determination is made if the maximum number of scans has been completed for this scan line in block 94.

Definition of a maximum number of scans for evaluation of each scan line provides flexibility for the invention to accommodate differing processing speeds for the symbols or labels being evaluated by the invention. In the present embodiment, the MAXSCANs parameter may be set for values from 1 to 10. When the programmed number of scans are analyzed, the system then assumes that the next successful decode will be on the next symbol or scan line in the pattern.

The setting of maximum number of scans for a scan line, the maximum scans value is calculated to be the most times the scan line can be scanned knowing the speed at which the labels or symbols will pass the scanner, the bar code height, the number of symbols in the scan line, and the symbol analysis calculation time. A setting of 10 on the MAXSCANs parameter provides the maximum advantage of multiple scan averaging for analysis of symbology parameters, while a setting of 1 allows maximum throughput speed for the processed symbols or labels. The MAXSCANs parameter also allows precise control of the number of scans to facilitate flexible orientation of the scanner 1*b* to read "ladder" or "picket fence" oriented bar codes, as shown in FIGS. 1*b* and 1*c*, at the process flow rate.

If the check in block 94 shows the maximum number of scans has been completed, the scan counter is reinitialized at block 96, the data from the scan line is analyzed based on the parameters and symbologies previously established in block 98, averaged with the previous analysis for the scan line at block 100, and the results are placed in the proper scan history buffer in block 102. The analysis conducted in the invention provides standard evaluation of bar code symbols for the various symbologies accommodated by the invention. Table 2 defines the parameters checked for each symbology.

TABLE 2

| | PARAMETERS CHECKED FOR EACH SYMBOLOGY | | | | |
|---|---|---|---|---|---|
| SYMBOLOGY | RATIO | ICG | DATA CHARACTER | MOD CHECK | +- TOLERANCE |
| USS CODE 39 | 2.0–3.0 | .5X–8X | STD CODE 39 | N/A | ((12R-8)/81)X |
| AIAG B-1 | 2.2–3.2 | .5X–8X | STD CODE 39 | N/A | ((12R-8)/81)X |

TABLE 2-continued

| | PARAMETERS CHECKED FOR EACH SYMBOLOGY | | | | |
|---|---|---|---|---|---|
| SYMBOLOGY | RATIO | ICG | DATA CHARACTER | MOD CHECK | +- TOLERANCE |
| AIAG B-3 | | | $/+% | | |
| B-4 B-5 | 2.8–3.2 | .5X–8X | NOT ALLOWED | N/A | ((12R-8)/81)X |
| LOGMARS | 2.2–3.0 | .5X–8X | STD CODE 39 | N/A | ((12R-8)/81)X |
| ANSI 3OF9 | 2.2–3.0 | .5X–8X | STD CODE 39 | N/A | ((12R-8)/81)X |
| 3OF9 W/43 | 2.2–3.0 | .5X–8X | STD CODE 39; 4 CHARS MIN | MOD 43 | ((12R-8)/81)X |
| HIBC 3OF9 | 2.2–3.0 | .5X–8X | STD CODE 39; MIN 2 CHARS; 1ST. = "+" | MOD 43 | ((12R-8)/81)X |
| USS I2OFS | 2.0–3.0 | N/A | N/A | N/A | ((18R-21)/80)X |
| ANSI 2OF5 | 2.2–3.0 | N/A | N/A | N/A | ((18R-21)/80)X |
| CASE CODE | 2.3–2.9 | N/A | 3 DATA CHARS MIN. | MOD 10 | ((18R-21)/80)X |
| USS 128 | N/A | N/A | N/A | MOD 103 | .40X |
| CODE 128 | N/A | N/A | N/A | MOD 103 | .35X |
| UPC/EAN | N/A | N/A | N/A | MOD 10 | PER MAGNIFI-CATION SETTING |
| USS CODABAR | 2.0–3.0 | .5X-8X | STD CODABAR | N/A | ((5R-8)/20)X |
| CODABAR VARIANT | 2.2–3.0 | .5X-8X | STD CODABAR | N/A | ((5R-8)/20)X |
| CODE 93 | N/A | N/A | STD CODE 93 | C&K | .35X |
| USS CODE 93 | N/A | N/A | STD CODE 93 | C&K | .45X |

Additional analysis is provided in the invention by defining the number of characters per symbol and/or defining specific data content for the programmed scan lines with a data match mode.

The number of characters per symbol is entered during definition of the pattern, as previously described, and allows definition of 4 through 32 characters. Recognition of the number of characters provides additional data security in the analysis over mere evaluation of the parameters of the symbology.

Similarly, defining a complete data match for symbols in a scan line provides maximum security for the analysis. A data match of the encoded data assures the integrity of the label or bar code sensed by the invention. In the embodiment shown in the drawings, entry of the data to be matched is accomplished by scanning of a data target in response to a prompt on the LCD during the pattern setup previously described.

In the embodiment of the invention described herein, analysis is conducted as a background computing function. Higher security levels enabled by defining the number of characters per symbol and/or data matching allows maximum scan speed by avoiding filtering of the scan data required for standard symbology analysis. Stacking of decoded scan data in RAM 40 allows decoupling of the scan operation and analysis routines described, thereby allowing maximum throughput for the system. Effective scan rate and system throughput for the scanned process/printer output is dependent on total analysis time.

Subroutine SETSTAT2 is then entered at block 104 and all status and variables for real time output from the system are established in block 106, resulting in real time output on the field outputs and/or communication to the host processor.

The status parameters provided for real time output based on the analysis are identified in Table 3.

TABLE 3

| Parameter | Message Provided on Data Analysis Screen |
|---|---|
| Ratio | WARNING RATIO |
| Inter-Character Gap (ICG) | WARN ICG |
| Valid Data Character | INVALID FORMAT |
| Mod Check Digits | BAD MOD CHECK |
| Bar Width Deviation Range | WARNING WIDE (or NARROW) |
| Bar Width Deviation Average | REJECTED WIDE (or NARROW) |
| Addendum Parity | INVALID FORMAT |
| ANSI Decodability | WARN D/BILITY (DCD. in initial Pass/Fail screen) |
| ANSI Reference Decode | WARN REF. DEC. |
| Object in Quiet Zone | WARN QZ/SS |

Activation of the field outputs of the invention based on the analysis results is accomplished responsive to the analysis parameters. The setup subroutine for real time output configuration 64, previously described, allows designation of one or more analysis parameter failures from Table 3 to activate the associated field output. Additional limitations for activation of the field output are selectable to require a number of accumulated failures or consecutive failures to occur prior to activation of the port. The form of signal provided on the field output is also defined. The present embodiment provides four port durations, including per scan, per scan pulse, latch, and latch pulse. The per scan duration updates the output of each port after each scan that decodes a valid scan line. For example, if a port activation has occurred and the next analysis produces results that would not activate the port, the field output will go to the inactive state. The latch mode continues to hold the output port in the active state after an activating occurrence until reset. The per scan pulse mode or latch pulse mode will hold the output in the active state for a length of time specified.

Real time output via communication to the host is similarly defined in the subroutine real time output configuration 64, as previously described, to accommodate the formats shown in Table 4.

TABLE 4

| Choice | Description |
|---|---|
| DISABLED | No symbol information will be transmitted |
| STATUS ONLY | Analysis status will be transmitted |
| STATUS + SYMBOLOGY | Status and symbology type will be transmitted |
| STAT + SYMB + DECODE | Status, symbology and all decode symbol characters will be transmitted |
| DECODE ONLY | Only decoded symbol characters will be transmitted |
| STAT + SYMB + DATA | Status, symbology and data characters will be transmitted |
| DATA ONLY | Only data characters will be transmitted |

Status outputs to the host are defined based on the analysis parameters of Table 3. Standard framing and communications protocols are employed for the transmission.

Return from the subroutine SETSTAT2 is accomplished at block 108 and the microcomputer negates the current scan line active status at block 110. The program then transitions to the FREE_SCAN2 routine, which has been previously described.

If the maximum number of scans has not been completed for the present scan line in block 94, the scan data is analyzed in block 112, averaged with the previous analysis for this scan line in block 114, with the results placed in the proper scan history buffer in block 116, and the program transitions to FREE_SCAN2.

If a decoded scan does not match the current scan line in block 92, the program transitions to the new pattern subroutine NEW_PAT in block 118. The new pattern subroutine is disclosed in FIG. 4*c*.

If a new pattern is detected, a determination is made if analysis is pending of the pattern with the maximum number of scans not complete in block 120. If the maximum number of scans is not complete, subroutine SETSTAT2, previously described, is entered. Upon return from SETSTAT2 or if the maximum number of scans is not complete, a high security pointer is created for the new pattern scan line in block 122 and the scan line match flag is set in block 124. The pattern data is then analyzed in block 126 as previously described. Data is stored in the proper scan history buffer in block 128 and a determination is made if all scan lines in the pattern have been matched, block 130. If affirmative, the flags and variables for the scan line are reinitialized in block 132. If the scan lines in the pattern are not matched, or upon reinitialization of the flags and variables, a determination is made if maximum number of scans set at 1 in block 134. If not, subroutine FREE_SCAN2 is executed for a no read status check, as previously described. If the maximum number of scans is set at 1 in block 134, subroutine SETSTAT2 is again executed and any current scan line active status is negated in block 136, prior to executing subroutine FREE_SCAN2.

The final leg of the free-scan subroutine is accomplished if no decode is accomplished in block 84. A RE_TRY subroutine is executed in block 138. A determination is made if the RE_TRY subroutine has been executed in block 140 and, if not, the FREE_SCAN2 subroutine is entered. If the RE_TRY subroutine has been executed, a determination is made if the pending analysis is waiting for the maximum number of scans in block 142. If not, subroutine FREE_SCAN2 is entered. If the analysis is waiting for MAXSCANs, the RE_TRY counter is reinitialized in block 144 and the subroutine SETSTAT2 is executed. Upon return, the current scan line active status is negated in block 110 and subroutine FREE_SCAN2 is executed.

As previously described, the free-scan mode allows the present invention to be employed in monitoring bar codes for processes without uniquely timed bar code arrival. The present invention is also employed for systems wherein bar code arrival at the scanner is predictably timed and a synchronizing signal from an external source is available.

Figures 5A, 5B:
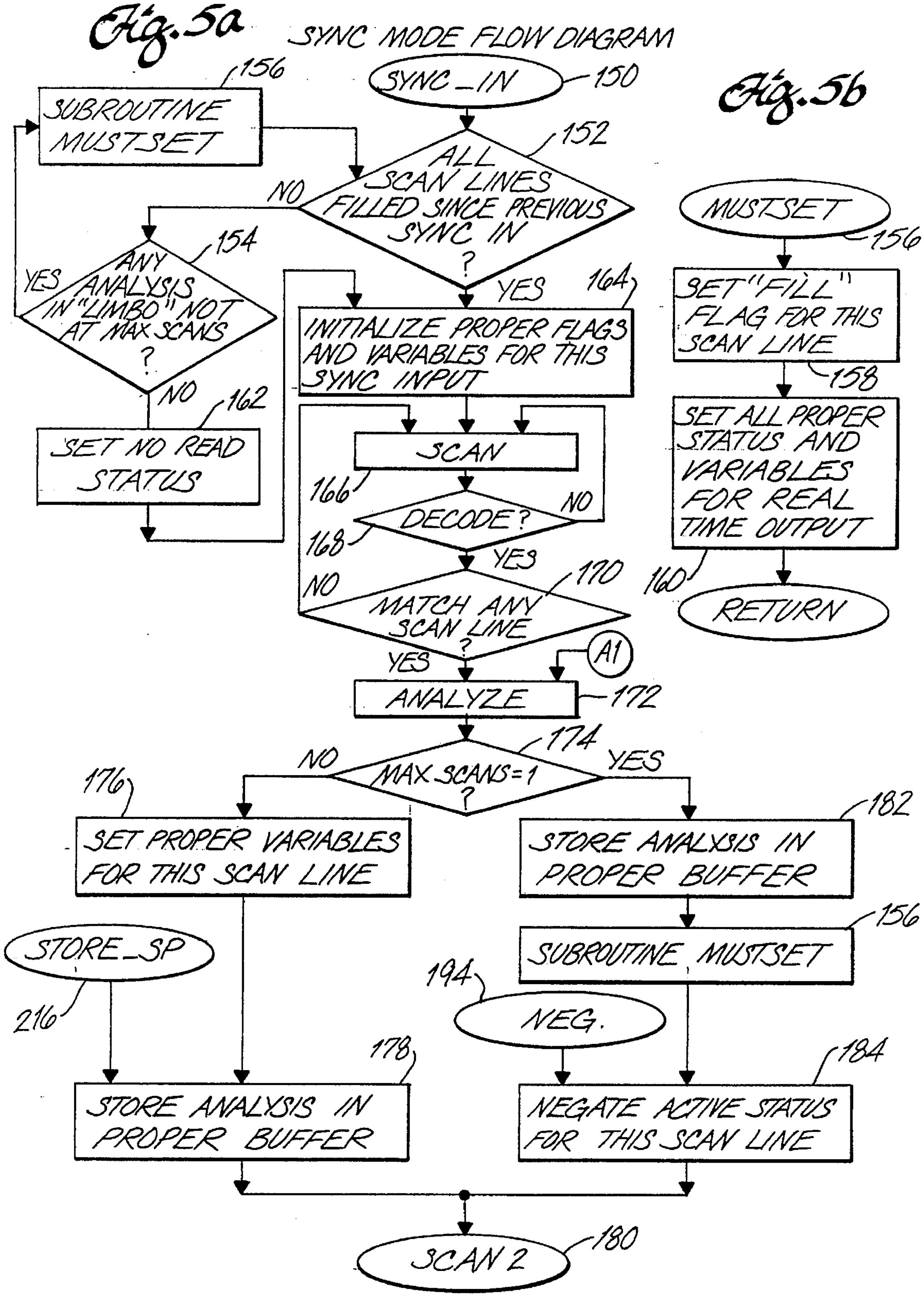
FIGS. 5*a* through 5*c* are flow diagrams for software implementing the synchronized mode of operation of the invention.
Figure 5C:
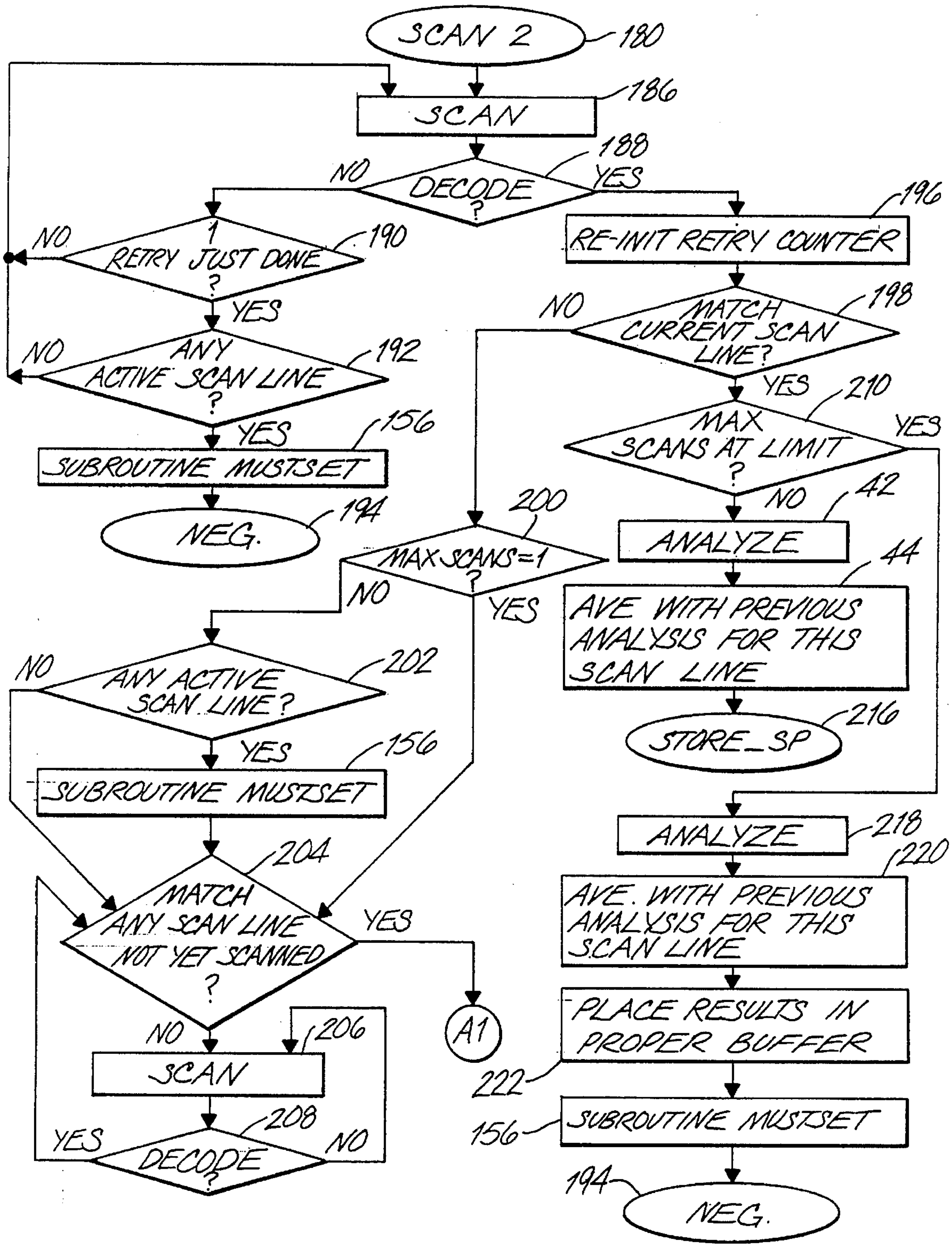

FIGS. 5*a–c* provide a flow diagram for operation of one embodiment of the present invention for synchronized scanning. Triggered by a synch signal from OR gate 56, the microcomputer initiates the routine SYNC_IN in block 150. A determination is made if all scan lines have been filled since the previous synch signal was received block 152. If all scan lines had been filled previous to the prior SYNC_IN, flags and variables for the synch input are set in block 164. A scan is executed, as previously described, in block 166 and a determination made if the scan can be decoded in block 168. If no decode was present, a scan is reexecuted. If a decode was possible, a determination is made in block 170 if a match with any scan line is present. If no match is present, an additional scan is conducted. If a match is present, the data is analyzed in block 172, as previously described. A determination is then made if MAXSCANs has been set at 1 in block 174 and, if not, the variables for the present scan line are set in block 176. The analysis is stored in the scan history buffer in block 178 and subroutine SCAN2 block 180 is executed.

If MAXSCAN was set to 1 in block 174, the analysis is stored in proper scan history buffer in block 182 and subroutine MUSTSET is executed. Active status for the present scan line is then negated in block 184 and subroutine SCAN2 is executed.

The SCAN2 subroutine is shown in FIG. 5*c*. A scan is accomplished at block 186 and a determination made if the scan can be decoded at block 188. If the scan cannot be decoded, a determination is made if a retry has just been accomplished, block 190 and, if not, an additional scan is made. If a retry has been accomplished, a determination is made if any active scan line is present, block 192, and, if not, an additional scan is attempted. If an active scan line is present, subroutine MUSTSET is executed and the active status for the present scan line is negated by entering at block 194 on FIG. 5*a*.

If no analysis was remaining, a NO READ status is set in block 162.

If a successful decode was accomplished in block 188, the retry counter is reinitialized in block 196 and a determination is made if the scan line matches any current scan line block 198. If no current scan line match is made, it is determined if MAXSCANs equal 1, block 200. If not, a determination is made if any active scan line is present, block 202 and if so, subroutine MUSTSET is accomplished. Upon return from subroutine MUSTSET or, if no active scan line was present in block 202, a determination is made if a match with any scan line not yet scanned is present, block 204. If not, a scan is accomplished, block 206, and a decode attempted, block 208. If a decode is successful, the determination of block 204 is again attempted and if the decode is not successful, the scan is reattempted in block 206. If a match with any scan line not yet scanned is accomplished in block 204, analysis is accomplished by entering at point A1.

If a match was accomplished with the current scan line in block 198, a determination is made if the maximum number of scans is at the limit, block 210. If not, the decoded scan line is analyzed, block 212, and averaged with previous analysis for the scan line, block 214. The analysis is then stored in the proper buffer by reentry into FIG. 5*a* at STORE_SP block 216. If the determination was made in block 210 that maximum number of scans is at the limit, the decoded scan is analyzed, block 218, and the results are averaged with previous analysis for the scan line, block 220, results are placed in the proper scan history buffer, block 222, and subroutine MUSTSET is executed prior to negating the active status for the scan line by entering block 194 of the FIG. 5*a*.

If all scan lines have not been filled in the check at block 152, a determination is made if any analysis has not been completed without the maximum number of scans, block 154. If analysis is indeterminate, a subroutine MUSTSET block 156 is executed. The MUSTSET subroutine is demonstrated in FIG. 5*b*. A "fill" flag is set for the present scan line in block 158 identifying that element of the patter has been identified and all status and variables are defined for real time output in block 160.

Scanning of bar codes on a synchronized basis, as described, provides high accuracy in timing of the scans to assure proper performance of the scanner in the invention, thereby precluding errors in scanning from appearing as bar code verification or validation errors. In addition, specific identification of a "NO READ status" may be made if a bar code does not appear during the synchronized scan time.

The flexibility of the present invention allows application to numerous bar code production systems wherein verification and/or validation of the data in the bar codes is critical. For example, multi-pass ribbon systems and ribbon saving devices on many bar code printing systems may ultimately result in degradation of the bar codes produced. Consequently, verification of the bar codes printed by such systems on a real time basis is desirable. The present invention provides added capability through the programmable field outputs, which can be easily interfaced to multiple bar code production or usage systems, including allowing activation of alarms to notify operators of the requirement for ribbon changes or unacceptable degradation of the product in multi-pass ribbon systems or malfunctioning of ribbon saving devices, resulting in degraded bar code output. In sophisticated applications of the present system, additional control signals from the field outputs can be applied to switch ribbons or adjust ribbon saving devices to achieve a verifiable product output.

APPENDIX A

This appendix provides a source code listing for the control software for the microcomputer of the present invention to accomplish the functions described in the present specification.

```
/*****************************************************************
*******
 *  Title:  AN.C - Laser Inspector Analysis Module
                *
 *  Ident:  Rev. A
                     *

******************************************************************
******
 *   Copyright (c) 1993     All rights reserved.
         *
 *
    *
 *   This software is furnished under a license and may be used and
  *
 *   copied only in accordance with the terms of such license and
    *
 *    with the inclusion of the above copyright notice.  This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

******************************************************************
******
 *
 *  Abstract:
 *
 *        This module contains all of the functions and data
structures
 *        required to analyze the barcode data just scanned.
 *
 *  Author:
 *
 *        Donald R. Palmer, 14-SEP-93, Version X0.00
 *
 *  Modification History
```

```
 *
 *  Date          Who      Version     Why
 *    - - - - - - - - - -        - - - - - - -        - - - - - - - - -
----------------------------------
 * 14-SEP-93   DRP       Rev. A       Original Writing
 *

*******************************************************************
******/

/******************************************************************
*******
 * Include Files

*******************************************************************
******/

#include "system.h"                           /* system wide header
file      */
#include "io6811.h"                           /*  system  wide  IO
definitions    */
#include "int6811.h"                       /* interrupt definitions
     */


#include "stdlib.h"                           /*  standard  library
header file    */
#include "string.h"                           /*  standard  string
header file    */
#include "stdio.h"                            /* standard library io
header    */

#include "mm.h"                                    /*    memory
movement header file      */
#include "cf.h"                                    /* configuration
header file    */
#include "dz.h"                                    /             *
digitizer/decoder header file*/
#include "an.h"                                    /*    analysis
header file               */
#include "lc.h"                                    /* LCD/LED header
file           */

#pragma codeseg(AN)                           /*  define  our  code
segment        */
/******************************************************************
*******
 * Local Prototypes

*******************************************************************
******/

static void an_profile(an_struct *an);  /*    calculate    ANSI
```

```
parameters*/
static   void   an_symbology(an_struct   *an);/*   do   individual
symbology */
static void an_finish(an_struct *an);   /* finish up analysis
    */
static UBYTE an_grader(UWORD, UBYTE, UBYTE, UBYTE, UBYTE);
static BOOLEAN an_RATCK(UBYTE,UBYTE,UBYTE); /* ratio checker
        */

static void an_C39(an_struct *);        /* code 39 analysis
        */
static void an_I25(an_struct *);        /*   interleaved   2of5
analysis  */
static void an_C128(an_struct *);       /* Code 128 analysis
        */
static void an_CBR(an_struct *);        /* Codabar analysis
        */
static void an_C93(an_struct *);        /* code 93 analysis
        */
static void an_UE(an_struct *);             /* upc/ean analysis
            */


/*****************************************************************
*******
 * Function:        an_ANALYZE
 * Description:          Perform basic analysis on barcode just
scanned
 * Arguments:       an_struct * - structure to receive analysis
 * Returns:              none

******************************************************************
******/


void an_ANALYZE(an_struct *an)
     {
     UBYTE tmp;
     memclr(an, sizeof(an_struct));          /* clear out analysis
structure */
     an->RESULTS.icgfail= icg_flag;          /* ICG failure
            */
     if (DECODFLG)  an->RESULTS.reffail = 1;
     an->CHARS = CHARS;                      /*   characters   in
barcode decode */
//   printf("CHAR=%d\r",CHARS);
     memcpy(&an->SBUF, SBUF, max_symbol);/* barcode decode
        */
     an->STYPE = STYPE;                      /*   barcode   type
update          */
     an->AVG_GAIN     = ((AVG_GAIN * 100L) / AVG_NARROW);
     an->MIN_GAIN     = ((MIN_GAIN * 100L) / AVG_NARROW);
     an->MAX_GAIN     = ((MAX_GAIN * 100L) / AVG_NARROW);
     an->AVG_NARROW   = AVG_NARROW;
```

```
     an->AVG_WIDE      = AVG_WIDE;
     if (an->BACKWARDS)
          {
          an->QZ_LEAD       = QZ_TRAIL;
          an->QZ_TRAIL      = QZ_LEAD;
          }
     else
          {
          an->QZ_LEAD       = QZ_LEAD;
          an->QZ_TRAIL      = QZ_TRAIL;
          }
     an->DECODABILITY = ((((DECODABILITY & 0xff00) / 256) * 100) /
256);
     memcpy(&an->MODCKSB, MODCK, 2);
     an->UETYPE        = utype;
     an->ADTYPE        = uadndm;
     if (an->STYPE == UPC)
          {
          if (STYPE & 0x04)
               {
               switch (utype)
                    {
                    case 1:/*upc a*/
                         tmp = 16;break;
                    case 2:/*upc e*/
                         tmp = 10;break;
                    case 4:/*ean 8*/
                         tmp = 16;break;
                    case 8:/*ean13*/
                         tmp = 16;break;
                    }
               switch (uadndm)
                    {
                    case 1:/* adendum 2*/
                         tmp = tmp + 3;break;
                    case 255:/* adendum 5*/
                         tmp = tmp + 6;break;
                    }
             an->SBUF[tmp] = 0x00;
               }
          }
     else if (an->STYPE == I25)
          an->SBUF[CHARS]= 0x00;
     }

/*****************************************************************
*******
 * Function:          an_FINAL
 * Description:            Perform final analysis on barcode
 * Arguments:         an_struct * - structure to receive analysis
 *                         NOTE: This structure must contain the
basic
 *                                analysis   information.      (See
an_ANALYZE)
```

```
 * Returns:              none

*****************************************************************
******/

void an_FINAL(an_struct *an)
     {
     UBYTE idx;
     result *rs;

     an_profile(an);                                    /*    do    scan
profile stuff       */
     an_symbology(an);                         /*    do   individual
symbology       */
     an_finish(an);                            /*    finish    up
analysis            */
     idx = 0;
     rs = (result *)&an->RESULTS;
     idx += rs->qzfail;
     idx += rs->reffail;
     idx += rs->icgfail;
     idx += rs->warnw;
     idx += rs->warnn;
     idx += rs->rejectw;
     idx += rs->rejectn;
     idx += rs->formatfail;
     idx += rs->chkfail;
     idx += rs->ratiofail;
     idx += rs->dcdfail;
     idx += rs->pcsfail;
     if (!idx) rs->good = 1;                   /* no failures = good
scan       */
     }

/*****************************************************************
*******
 * Function:          an_AVGCLEAR
 * Description:            Clear out averaging structure
 * Arguments:         an_avgstruct *  -  averaging structure to be
cleared
 * Returns:                none

*****************************************************************
******/

void an_AVGCLEAR(an_avgstruct *avg)
     {
     memclr(&avg, sizeof(an_avgstruct));
     }


/*****************************************************************
*******
 * Function:          an_AVERAGE
```

```
 * Description:          average in just completed barcode scan
 * Arguments:       an_struct *    - Basic analysis structure to be
 *                                          accumulated into the
averaging
 *                                          structure. **NOTE**
- The analysis
 *                                          structure    must
contain only the basic
 *                                          analysis for the bar
code scan.
 *                      an_avgstruct * - Averaging structure.
 *
 * Returns:             none

*****************************************************************
******/

void an_AVERAGE(an_struct *an, an_avgstruct *avg)
     {
     UBYTE idx;
     UBYTE *avgr,*anr;

     avg->SCAN_AVG++;                         /*  bump  #scans  in
average        */
     avg->AVGGAIN_AVG += an->AVG_GAIN;  /*    add    in    various
parameters     */
     avg->MINGAIN_AVG += an->MIN_GAIN;
     avg->MAXGAIN_AVG += an->MAX_GAIN;
     avg->NARROW_AVG  += an->AVG_NARROW;
     avg->WIDE_AVG    += an->AVG_WIDE;
     avg->QZTRAIL_AVG += an->QZ_TRAIL;
     avg->QZLEAD_AVG  += an->QZ_LEAD;
     avg->DECODABILITY_AVG += an->DECODABILITY;
     avg->CHARS_AVG    =  an->CHARS;
     memcpy(&avg->SBUF_AVG,   &an->SBUF,   max_symbol);/*  barcode
decode        */
     avg->STYPE_AVG = an->STYPE;              /*    barcode    type
update          */
     avg->SUBTYPE_AVG = an->SUBTYPE;          /*    barcode    type
update          */
     avg->UETYPE_AVG  = an->UETYPE;
     avg->ADTYPE_AVG  = an->ADTYPE;
     memcpy(&avg->MODCKSB_AVG, &an->MODCKSB, 2);


     avgr = (UBYTE *)&avg->RESULTS_AVG;
     anr  = (UBYTE *)&an->RESULTS;
     for (idx = 0;idx <sizeof(result);*avgr++ |= *anr++,idx++);
     }

/****************************************************************
*******
 * Function:        an_AVERAGE
 * Description:          Average the averaging structure into an
```

```
analysis
 *                        structure
 * Arguments:        an_avgstruct *  -  Averaging  structure  to  be
used.
 *                        an_struct *    - Final analysis structure
for the
 *                                                   multi-scanned
barcode.
 *                                                   **NOTE**   -   This
function will perform
 *                                                   a   final   analysis
after the averaging
 *                                                   is completed.
 * Returns:               none

*****************************************************************
******/

void an_UNAVERAGE(an_avgstruct *avg, an_struct *an)
     {
     UBYTE idx;
     UBYTE *avgr,*anr;

     an->SCANS = idx = avg->SCAN_AVG;
     an->AVG_GAIN     = avg->AVGGAIN_AVG / idx;
     an->MIN_GAIN     = avg->MINGAIN_AVG / idx;
     an->MAX_GAIN     = avg->MAXGAIN_AVG / idx;
     an->AVG_NARROW    = avg->NARROW_AVG  / idx;
     an->AVG_WIDE     = avg->WIDE_AVG      / idx;
     an->DECODABILITY = avg->DECODABILITY_AVG / idx;
     an->QZ_TRAIL       = avg->QZTRAIL_AVG / idx;
     an->QZ_LEAD        = avg->QZLEAD_AVG / idx;
     an->CHARS         = avg->CHARS_AVG;
     memcpy(&an->SBUF,  &avg->SBUF_AVG,  max_symbol);/*  barcode
decode         */
     an->STYPE= avg->STYPE_AVG;                          /* barcode
type update     */
     an->SUBTYPE = avg->SUBTYPE_AVG;
     an->UETYPE  = avg->UETYPE_AVG;
     an->ADTYPE  = avg->ADTYPE_AVG;
     memcpy(&an->MODCKSB, &avg->MODCKSB_AVG, 2);

     avgr = (UBYTE *)&avg->RESULTS_AVG;
     anr  = (UBYTE *)&an->RESULTS;
     memcpy(anr, avgr, sizeof(result));
     an_FINAL(an);
     }

/*****************************************************************
*******
 * Function:          an_CHKSUM
 * Description:            calculate checksum for given SBUF
 * Arguments:         UBYTE * - pointer to SBUF string
 * Returns:                LONG     - check sum calculated
```

```
*****************************************************************
******/

LONG an_CHKSUM(UBYTE *cp)
     {
     LONG tx;
     UBYTE idx;

     tx = idx = 0;
     while (*cp)                                          /* use weighted
checksum for   */
          {                                               /* calculation of
decode data    */
          tx += ((++idx) * (*cp++));          /* equivalence test
               */
          }
     return (tx);
     }

/****************************************************************
*******
 * Function:          an_3CHKSUM
 * Description:            calculate checksum for given SBUF using
every third char.
 * Arguments:         UBYTE * - pointer to SBUF string
 * Returns:                LONG    - check sum calculated

*****************************************************************
******/

LONG an_3CHKSUM(UBYTE *cp)
     {
     LONG tx;
     UBYTE idx;

     tx = idx = 0;
     while (*cp)                                          /* use weighted
checksum for   */
          {                                               /* calculation of
decode data    */
          tx += ((++idx) * (*cp++));          /* equivalence test
               */
          if (*cp=='\0'||*(cp+1)=='\0') /* on every third data
          */
               break;                                     /* character in
decode buffer  */
          idx += 3;                           /* SBUF
                    */
          cp+=2;
          }
     return (tx);
     }
```

```
/***************************************************************
*******
 * Function:        an_profile
 * Description:         Calculate available ANSI parameters
 * Arguments:       an_struct * - analysis structure
 * Returns:              none

****************************************************************
******/

static void an_profile(an_struct *an)
     {
     an->GRADE = GRADE_A;                     /*   assume   highest
possible GRADE*/
     an->DECGRADE = an_grader(an->DECODABILITY, 62, 50, 37, 25);
     if (CF.dcdthres != 0xFF)
          {
          if (an->DECGRADE <= CF.dcdthres) an->RESULTS.dcdfail = 1;
          }
     an->GRADE = min(an->GRADE, an->DECGRADE);     /* decodability
GRADE           */
     an->REFGRADE = (an->RESULTS.reffail ? GRADE_F : GRADE_A);
     an->GRADE = min(an->GRADE, an->REFGRADE);     /*    referance
decode GRADE        */
     }

/***************************************************************
*******
 * Function:        an_grader
 * Description:         return grade based on arguments given
 * Arguments:       UWORD    - value of actual argument
 *                       UBYTE(S) - threshold for each grade.
 * Returns:              UBYTE - ANSI grade

****************************************************************
******/

static UBYTE an_grader(UWORD target, UBYTE A, UBYTE B, UBYTE C,
UBYTE D)
     {
     if (target >= A) return(GRADE_A);
     if (target >= B) return(GRADE_B);
     if (target >= C) return(GRADE_C);
     if (target >= D) return(GRADE_D);
     return (GRADE_F);
     }

/***************************************************************
*******
 * Function:        an_finish
 * Description:         Finish up barcode evaluation
 *                       Calculated min/max gains cannot be larger
```

```
than
 *                      the tolerance else warning wide/narrow
flag set.
 *                      Calculated average gain cannot be larger
than
 *                      the tolerance else reject flag set.
 * Arguments:      an_struct * - Analysis structure to be used.
 * Returns:                 none

*****************************************************************
******/

static void an_finish(an_struct *an)
     {
     if (an->MAX_GAIN > an->TOLER)           an->RESULTS.warnw = 1;
     if (an->MAX_GAIN < -(an->TOLER))   an->RESULTS.warnn = 1;
     if (an->MIN_GAIN > an->TOLER)           an->RESULTS.warnw = 1;
     if (an->MIN_GAIN < -(an->TOLER))   an->RESULTS.warnn = 1;

     if (an->AVG_GAIN > an->TOLER)           an->RESULTS.rejectw =
1;
     if (an->AVG_GAIN < -(an->TOLER))   an->RESULTS.rejectn = 1;
     }

/****************************************************************
*******
 * Function:        an_RATCK
 * Description:         check out ratio limits
 * Arguments:       UBYTE(s) - lower/upper limits
 * Returns:                 none

*****************************************************************
******/

static BOOLEAN an_RATCK(UBYTE ratio, UBYTE lower, UBYTE upper)
     {
     if ((ratio > upper) || (ratio < lower))
          return(1);
     else
          return(FALSE);
     }

/****************************************************************
*******
 * Function:        an_symbology
 * Description:         dispatch off to Individual symbology
analysis
 * Arguments:       an_struct * - analysis structure to be used
 * Returns:                 none

*****************************************************************
******/
```

```
static void an_symbology(an_struct *an)
     {
     switch (an->STYPE)
          {
          case C39:      an_C39(an); break;
          case I25:      an_I25(an); break;
          case UPC:      an_UE(an);  break;
          case C128:     an_C128(an); break;
          case CBR:      an_CBR(an);  break;
          case C93:      an_C93(an);  break;
          }
     }

/*****************************************************************
********

*****************************************************************
*******

*****************************************************************
*******
 ***
                ***
 ***                  CODE 39 ANALYSIS SECTION
           ***
 ***
                ***

*****************************************************************
*******

*****************************************************************
*******

*****************************************************************
*******/

/*****************************************************************
********
 * Local Prototypes

*****************************************************************
*******/

static UBYTE c39_ml(UBYTE);                    /* mod-check search
function  */
static void  c39_plus(an_struct *an);   /* find HIBC "plus" sign
     */
static void c39_modchk(an_struct *an);  /* calculate code 39 mod
check     */


const UBYTE c39_modtbl[44] =
```

```
    {
    '0','1','2','3','4','5','6','7','8','9','A','B','C','D',
    'E','F','G','H','I','J','K','L','M','N','O','P','Q','R',
    'S','T','U','V','W','X','Y','Z','-','.',' ','$','/','+',
    '%',0x00
    };

/****************************************************************
*******
 * Function:         c39_ml
 * Description:          Obtain numeric representation for code 39
character
 * Arguments:        UBYTE - code 39 character
 * Returns:               UBYTE - numeric representation
 *                               (255 when not found)

****************************************************************
******/

static UBYTE c39_ml(UBYTE ch)
     {
     UBYTE ix;
     UBYTE *ptr;

     ptr = c39_modtbl;
     ix = 0;

     while (*ptr)
          {
          if (*ptr == ch) break;
          ptr++;
          ix++;
          }
     return(ix);
     }

/****************************************************************
*******
 * Function:         c39_plus
 * Description:          Make sure HIBC "plus" sign occurs in decode
 * Arguments:        an_struct * - analysis structure to be used
 * Returns:               none

****************************************************************
******/


static void c39_plus(an_struct *an)
     {
     if (an->SBUF[1] != '+')
          {
          an->RESULTS.formatfail = 1;
          }
```

```
     }
/*****************************************************************
*******
 * Function:        c39_modchk
 * Description:        Calculate code 39 mod-check digit
 * Arguments:       an_struct * - analysis structure to be used
 * Returns:              none

*****************************************************************
******/


static void c39_modchk(an_struct *an)
     {
     UWORD SUM;
     UBYTE ix;

     if (an->CHARS < 4)                    /* must have at least
4 chars    */
          {
          an->RESULTS.formatfail = 1;       /*  indicate  invalid
format        */
          }
     if (an->RESULTS.formatfail == 0)   /* any format error ??
          */
          {
          SUM = 0;
          an->MODCKIS[0]  =  an->SBUF[an->CHARS  -  2];  /*  actual
decoded modchk*/
          for (ix = 1;ix < an->CHARS - 2; ix++)
               SUM += c39_ml(an->SBUF[ix]); /* sum up each of the
data chars*/

          SUM = SUM % 43;
          an->MODCKSB[0]  = c39_modtbl[SUM]; /* look up mod check
digit      */
          if (an->MODCKSB[0] != an->MODCKIS[0])
               an->RESULTS.chkfail = 1; /*    show    mod    check
failure        */
          }
     }
/*****************************************************************
*******
 * Function:        c39_schar
 * Description:        Check for certain invalid characters
 * Arguments:       an_struct * - analysis structure to be used
 * Returns:              none

*****************************************************************
******/
```

```
static void c39_schar(an_struct *an)
     {
     UBYTE ix;

     for (ix = 0;ix < an->CHARS; ix++)  /* check each character in
code */
          {
          switch (an->SBUF[ix])
               {
               case '$':                         /*   any   of   these
characters          */
               case '/':                         /* will cause a fomat
failure   */
               case '+':
               case '%':
                    an->RESULTS.formatfail = 1;
                    break;
               }
          }
     }

/****************************************************************
*******
 * Function:          an_C39
 * Description:            validate/analyize code 39 decode
 * Arguments:         an_struct * - analysis structure to be used
 * Returns:                 none

*****************************************************************
******/


static void an_C39(an_struct *an)
     {
     an->RATIO = (an->AVG_WIDE * 10L) / an->AVG_NARROW; /* calc
ratio     */
     an->TOLER = ((an->RATIO * 120) - 800) / 81;  /*    calculate
tolerance */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_USS39:
               a n - > R E S U L T S . r a t i o f a i l    =
an_RATCK(an->RATIO,20,30);
               break;

          case se_AIAGB1:
               a n - > R E S U L T S . r a t i o f a i l    =
an_RATCK(an->RATIO,22,32);
```

```
                break;

            case se_AIAGB2:
                a n - > R E S U L T S . r a t i o f a i l    =
an_RATCK(an->RATIO,28,32);
                c39_schar(an);                /* and invalid special
chars      */
                break;

            case se_LOGMARS:
            case se_ANSI39:
                a n - > R E S U L T S . r a t i o f a i l    =
an_RATCK(an->RATIO,22,30);
                break;

          case se_HIBC:
                a n - > R E S U L T S . r a t i o f a i l    =
an_RATCK(an->RATIO,22,30);
                c39_plus(an);                 /* make sure we have
a "plus"  */
                c39_modchk(an);                    /*    calc    and
confirm mod check  */
                break;

          case se_39W43:
                a n - > R E S U L T S . r a t i o f a i l    =
an_RATCK(an->RATIO,22,30);
                c39_modchk(an);                    /*    calc    and
confirm mod check  */
                break;
            }

     }

UBYTE CSTRT_STOP_BUF(UBYTE *sbufptr, UBYTE *ptr1, UBYTE chars)
     {
     strncpy(ptr1,sbufptr+1,chars-2);
     ptr1[chars-2] = '\0';
     return(chars-2);
     }
/*****************************************************************
********

*****************************************************************
*******

*****************************************************************
*******
 ***
                 ***
 ***                 INTERLEAVED 2OF5 ANALYSIS SECTION
       ***
 ***
                 ***
```

```
*****************************************************************
*******

*****************************************************************
*******

*****************************************************************
*******/

/****************************************************************
********
 * Local Prototypes

*****************************************************************
*******/

static UBYTE I25_mcalc(UBYTE *, UBYTE *);
static void I25_modck(an_struct *);



/****************************************************************
*******
 * Function:        I25_mcalc
 * Description:         calculate Mod Check Digit
 * Arguments:       UBYTE * - pointer to starting character
 *                       UBYTE * - pointer to ending character
 * Returns:              UBYTE   - mod check digit (ASCII format)

*****************************************************************
******/

static UBYTE I25_mcalc(UBYTE *st, UBYTE *end)
     {
     UBYTE m;
     UWORD SUM;

     m = 3;
     SUM = 0;
     while (st <= end)
          {
          SUM += ((*st - '0') * m);
          m ^= 0x02;
          st++;
          }
     SUM = 10 - (SUM % 10);
     if (SUM == 10) SUM = 0;
     return ((UBYTE)SUM + '0');
     }

/****************************************************************
*******
```

```
 * Function:          I25_modck
 * Description:           Determine validity of mod check digit
 * Arguments:         an_struct * - analysis structure to be used
 * Returns:                none

*****************************************************************
******/

static void I25_modck(an_struct *an)
     {
     if (an->CHARS >= 4)                         /* must have at least
6 chars   */
          {
          an->MODCKSB[0]    =    I25_mcalc(an->SBUF,    (UBYTE
*)(an->SBUF+an->CHARS-2));
          an->MODCKIS[0] = *((UBYTE *)(an->SBUF+an->CHARS-1));
          if (an->MODCKSB[0] != an->MODCKIS[0])
               {
               an->RESULTS.chkfail = 1; /*    show    mod    check
failure        */
               }
          }
     }

/*****************************************************************
*******
 * Function:          an_I25
 * Description:           validate/analyize I25 39 decode
 * Arguments:         an_struct * - analysis structure to be used
 * Returns:                none

*****************************************************************
******/

void an_I25(an_struct *an)
     {
     an->RATIO = (an->AVG_WIDE * 10L) / an->AVG_NARROW; /* calc
ratio     */
     an->TOLER = ((an->RATIO * 180) - 2100) / 80; /*    calculate
tolerance */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_USSI25:
               a n - > R E S U L T S . r a t i o f a i l    =
an_RATCK(an->RATIO,20,30);
               break;

          case se_ANSI25:
```

```
               a n - > R E S U L T S . r a t i o f a i l    =
an_RATCK(an->RATIO,22,30);
               break;

          case se_CASEI25:
               an->RESULTS.ratiofail = an_RATCK(an->RATIO,23,29);
               I25_modck(an);                /* calculate/confirm
mod check */
          }

     }

/*****************************************************************
********

*****************************************************************
*******

*****************************************************************
*******
 ***
                  ***
 ***                    CODE 128 ANALYSIS SECTION
             ***
 ***
                  ***

*****************************************************************
*******

*****************************************************************
*******

*****************************************************************
*******/

#define strt_128 0
#define end_128  107

#define START_A       103
#define START_B       104
#define START_C       105
#define FORWARD_STOP 106
#define REVERSE_STOP 107
#define SHIFT         98
#define CODE_C        99
#define CODE_B        100
#define CODE_A        101
#define FNC1          102

/*****************************************************************
*******
 * Function:          an_C128
```

```
 * Description:        validate/analyize code 128 decode
 * Arguments:        an_struct * - analysis structure to be used
 * Returns:             none

*****************************************************************
******/

static void an_C128(an_struct *an)
     {
    an->RATIO = FALSE;                    /* no ratio available
          */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_ANSIC128:   an->TOLER = 35;     break    ;    /*
calculate tolerance */
          default:       an->TOLER = 40; break;
          }

     if (an->MODCKSB[0] & 0x80)                   / *    v a l i d
mod-check digit ?        */
          {
          an->RESULTS.chkfail = 1;      /*    show    mod    check
failure       */
          an->MODCKSB[0] &= 0x7F;            /* erase flag
               */
          }
     an->MODCKIS[0] = an->SBUF[an->CHARS - 2]; /* actual decoded
modchk*/
     }

/****************************************************************
*******
 * decoder tables

*****************************************************************
******/



const UWORD table_a[108]=
     {
 0x2020 /*   ,00 */ ,0x2021 /*  !,01 */,0x2022 /* QT,02 */ ,0x2023
/*  #,03 */
,0x2024 /*  $,04 */ ,0x2025 /*  %,05 */,0x2026 /*  &,06 */ ,0x2027
/*  ',07 */
,0x2028 /*  (,08 */ ,0x2029 /*  ),09 */,0x202A /*  *,10 */ ,0x202B
```

```
/*  +,11 */
,0x202C /*  ,,12 */ ,0x202D /*  -,13 */,0x202E /*  .,14 */ ,0x202F
/*  /,15 */
,0x2030 /*  0,16 */ ,0x2031 /*  1,17 */,0x2032 /*  2,18 */ ,0x2033
/*  3,19 */
,0x2034 /*  4,20 */ ,0x2035 /*  5,21 */,0x2036 /*  6,22 */ ,0x2037
/*  7,23 */
,0x2038 /*  8,24 */ ,0x2039 /*  9,25 */,0x203A /*  :,26 */ ,0x203B
/*  ;,27 */
,0x203C /*  <,28 */ ,0x203D /*  =,29 */,0x203E /*  >,30 */ ,0x203F
/*  ?,31 */
,0x2040 /*  @,32 */ ,0x2041 /*  A,33 */,0x2042 /*  B,34 */ ,0x2043
/*  C,35 */
,0x2044 /*  D,36 */ ,0x2045 /*  E,37 */,0x2046 /*  F,38 */ ,0x2047
/*  G,39 */
,0x2048 /*  H,40 */ ,0x2049 /*  I,41 */,0x204A /*  J,42 */ ,0x204B
/*  K,43 */
,0x204C /*  L,44 */ ,0x204D /*  M,45 */,0x204E /*  N,46 */ ,0x204F
/*  O,47 */
,0x2050 /*  P,48 */ ,0x2051 /*  Q,49 */,0x2052 /*  R,50 */ ,0x2053
/*  S,51 */
,0x2054 /*  T,52 */ ,0x2055 /*  U,53 */,0x2056 /*  V,54 */ ,0x2057
/*  W,55 */
,0x2058 /*  X,56 */ ,0x2059 /*  Y,57 */,0x205A /*  Z,58 */ ,0x205B
/*  [,59 */
,0x205C /*  \,60 */ ,0x205D /*  ],61 */,0x205E /*  ^,62 */ ,0x205F
/*  _,63 */
,0x4E4C /* NL,64 */ ,0x5348 /* SH,65 */,0x5358 /* SX,66 */ ,0x4558
/* EX,67 */
,0x4554 /* ET,68 */ ,0x4551 /* EQ,69 */,0x414B /* AK,70 */ ,0x424C
/* BL,71 */
,0x4253 /* BS,72 */ ,0x4854 /* HT,73 */,0x4C46 /* LF,74 */ ,0x5654
/* VT,75 */
,0x4646 /* FF,76 */ ,0x4352 /* CR,77 */,0x534F /* SO,78 */ ,0x5349
/* SI,79 */
,0x4445 /* DE,80 */ ,0x4431 /* D1,81 */,0x4432 /* D2,82 */ ,0x4433
/* D3,83 */
,0x4434 /* D4,84 */ ,0x4E4B /* NK,85 */,0x534E /* SN,86 */ ,0x4542
/* EB,87 */
,0x434E /* CN,88 */ ,0x454D /* EM,89 */,0x5342 /* SB,90 */ ,0x4543
/* EC,91 */
,0x4653 /* FS,92 */ ,0x4753 /* GS,93 */,0x5253 /* RS,94 */ ,0x5553
/* US,95 */
,0x4633 /* F3,96 */ ,0x4632 /* F2,97 */,0x5354 /* ST,98 */ ,0x4343
/* CC,99 */
,0x4342 /* CB,CB */ ,0x4634 /* F4,CA */,0x4631 /* F1,F1 */ ,0x4341
/* CA,CA */
,0x4342 /* CB,CB */ ,0x4343   /*  CC,CC  */,0x2A2A  /*  **,**  */
,0x2A2A /* **,** */
      };

const UWORD table_b[108]=
{
 0x2020    /*     , 00 */ ,0x2021    /*   ! , 01 */ ,0x2022   /*QT
```

```
 , 02 */
,0x2023     /*   # , 03 */ ,0x2024     /*   $ , 04 */ ,0x2025     /*
 % , 05 */
,0x2026     /*   & , 06 */ ,0x2027     /*   ' , 07 */    ,0x2028
/*   ( , 08 */
,0x2029     /*   ), 09  */ ,0x202A     /*   * , 10 */ ,0x202B     /*
 + , 11 */
,0x202C     /*   , , 12 */ ,0x202D     /*   - , 13 */ ,0x202E     /*
 . , 14 */
,0x202F     /*   / , 15 */ ,0x2030     /*   0 , 16 */ ,0x2031     /*
 1 , 17 */
,0x2032     /*   2 , 18 */ ,0x2033     /*   3 , 19 */ ,0x2034     /*
 4 , 20 */
,0x2035     /*   5 , 21 */ ,0x2036     /*   6 , 22 */ ,0x2037     /*
 7 , 23 */
,0x2038     /*   8 , 24 */ ,0x2039     /*   9 , 25 */ ,0x203A     /*
 : , 26 */
,0x203B     /*   ; , 27 */ ,0x203C     /*   < , 28 */ ,0x203D     /*
 = , 29 */
,0x203E     /*   > , 30 */ ,0x203F     /*   ? , 31 */ ,0x2040     /*
 @ , 32 */
,0x2041     /*   A , 33 */ ,0x2042     /*   B , 34 */ ,0x2043     /*
 C , 35 */
,0x2044     /*   D , 36 */ ,0x2045     /*   E , 37 */ ,0x2046     /*
 F , 38 */
,0x2047     /*   G , 39 */ ,0x2048     /*   H , 40 */ ,0x2049     /*
 I , 41 */
,0x204A     /*   J , 42 */ ,0x204B     /*   K , 43 */ ,0x204C     /*
 L , 44 */
,0x204D     /*   M , 45 */ ,0x204E     /*   N , 46 */ ,0x204F     /*
 O , 47 */
,0x2050     /*   P , 48 */ ,0x2051     /*   Q , 49 */ ,0x2052     /*
 R , 50 */
,0x2053     /*   S , 51 */ ,0x2054     /*   T , 52 */ ,0x2055     /*
 U , 53 */
,0x2056     /*   V , 54 */ ,0x2057     /*   W , 55 */ ,0x2058     /*
 X , 56 */
,0x2059     /*   Y , 57 */ ,0x205A     /*   Z , 58 */ ,0x205B     /*
 [ , 59 */
,0x205C     /*   \ , 60 */ ,0x205D     /*   ] , 61 */ ,0x205E     /*
 ^ , 62 */
,0x205F     /*   _ , 63 */ ,0x2060     /*   ` , 64 */ ,0x2061     /*
 a , 65 */
,0x2062     /*   b , 66 */ ,0x2063     /*   c , 67 */ ,0x2064     /*
 d , 68 */
,0x2065     /*   e , 69 */ ,0x2066     /*   f , 70 */ ,0x2067     /*
 g , 71 */
,0x2068     /*   h , 72 */ ,0x2069     /*   i , 73 */ ,0x206A     /*
 j , 74 */
,0x206B     /*   k , 75 */ ,0x206C     /*   l , 76 */ ,0x206D     /*
 m , 77 */
,0x206E     /*   n , 78 */ ,0x206F     /*   o , 79 */ ,0x2070     /*
 p , 80 */
,0x2071     /*   q , 81 */ ,0x2072     /*   r , 82 */ ,0x2073     /*
```

```
 s , 83 */
,0x2074    /*  t , 84 */ ,0x2075    /*  u , 85 */ ,0x2076    /*
 v , 86 */
,0x2077    /*  w , 87 */ ,0x2078    /*  x , 88 */ ,0x2079    /*
 y , 89 */
,0x207A    /*  z , 90 */ ,0x207B    /*  { , 91 */ ,0x207C    /*
 | , 92 */
,0x207D    /*  } , 93 */ ,0x207E    /*  ~ , 94 */ ,0x444C    /*
DL , 95 */
,0x4633    /* F3 , 96 */ ,0x4632    /* F2 , 97 */ ,0x5354    /*
ST , 98 */
,0x4343    /* CC , 99 */ ,0x4634    /* F4 , CB */ ,0x4341    /*
CA , CA */
,0x4631    /* F1 , F1 */ ,0x4341   /* CA , CA */ ,0x4342     /*
CB , CB */
,0x4343     /* CC , CC */ ,0x2A2A   /* ** , ** */ ,0x2A2A    /*
** , ** */
};
void C128_BUF(UBYTE *sbufptr, UBYTE *ptr1, UBYTE *ptr2, UBYTE
chars)
     {
     UWORD shift_flg;
     UWORD print_flg;
     UWORD i;


     shift_flg = FALSE;
     print_flg = CODE_C;

     switch (*sbufptr++)                    /* parse code 128
start code    */
          {
          case START_A:
               print_flg = CODE_A;          /* starting out in
Code A         */
               *ptr1++ = '*';
               *ptr2++ = 'A';
               break;

          case START_B:                     /* starting out in
Code B         */
               print_flg = CODE_B;
               *ptr1++ = '*';
               *ptr2++ = 'B';
               break;

          case START_C:                     /* starting out in
Code C         */
          default:
               print_flg = CODE_C;
               *ptr1++ = '*';
               *ptr2++ = 'C';
               break;
          }
```

```
for (i = 1; i < chars; i++)
     {
     switch (print_flg)
          {
          case CODE_A:
               *ptr1++ = (table_a[*sbufptr] & 0xFF00) >> 8;
               *ptr2++ = (table_a[*sbufptr] & 0x00FF);
               if  (shift_flg  ==  TRUE)//is  was  a  shifted
character
                    {
                    shift_flg = FALSE;
                    print_flg = CODE_B;
                    sbufptr++;
                    continue;
                    }
               break;

          case CODE_B:
               *ptr1++ = (table_b[*sbufptr] & 0xFF00) >> 8;
               *ptr2++ = (table_b[*sbufptr] & 0x00FF);
               if (shift_flg == TRUE)
                    {
                    shift_flg = FALSE;
                    print_flg = CODE_A;
                    sbufptr++;
                    continue;
                    }
               break;


          case CODE_C:
               if (*sbufptr <= 99)
                    {
                    *ptr1++ = *sbufptr / 10 + '0';
                    *ptr2++ = *sbufptr % 10 + '0';
                    }
               else
                    {
                    switch (*sbufptr)
                         {
                         case FORWARD_STOP:
                         case REVERSE_STOP:
                              *ptr1++ = '*';
                              *ptr2++ = '*';
                              break;

                         case FNC1:
                              *ptr1++ = 'F';
                              *ptr2++ = '1';
                              break;
                         case CODE_A:
                              *ptr1++ = 'C';
                              *ptr2++ = 'A';
```

```
                              break;
                         case CODE_B:
                              *ptr1++ = 'C';
                              *ptr2++ = 'B';
                              break;
                         }
                    }
               break;
          }

     switch (*sbufptr++)
          {
          case CODE_A :
               print_flg = CODE_A;
               break;

          case CODE_B :
               print_flg = CODE_B;
               break;

          case CODE_C :
               print_flg = CODE_C;
               break;

          case SHIFT  :
               if (print_flg != CODE_C)
                    {
                    shift_flg = TRUE;
                    if (print_flg == CODE_A)
                         {
                         print_flg = CODE_B;
                         break;
                         }
                    if (print_flg == CODE_B)
                         {
                         print_flg = CODE_A;
                         break;
                         }
                    }
                break;
          }
     }
*ptr1 = '\0';
*ptr2 = '\0';
}


UBYTE C128_CBUF(UBYTE *sbufptr, UBYTE *ptr1, UBYTE chars)
     {
     UWORD shift_flg;
     UWORD print_flg;
     UWORD i;
     UBYTE *str;
```

```
     str = ptr1;
     shift_flg = FALSE;
     print_flg = CODE_C;

     switch (*sbufptr++)                          /*  parse  code  128
start code      */
          {
          case START_A:
               print_flg = CODE_A;                /*  starting  out  in
Code A         */
               break;

          case START_B:                           /*  starting  out  in
Code B         */
               print_flg = CODE_B;
               break;

          case START_C:                           /*  starting  out  in
Code C         */
          default:
               print_flg = CODE_C;
               break;
          }


     for (i = 1; i < chars; i++)
          {
          switch (print_flg)
               {
               case CODE_A:
                    if  (((table_a[*sbufptr]  &  0xFF00)  >>  8)  ==
0x20)
                         *ptr1++ = (table_a[*sbufptr] & 0x00FF);
                    if  (shift_flg  ==  TRUE)//is  this  a  shifted
character
                         {
                         shift_flg = FALSE;
                         print_flg = CODE_B;
                         sbufptr++;
                         continue;
                         }
                    break;

               case CODE_B:
                    if  (((table_b[*sbufptr]  &  0xFF00)  >>  8)  ==
0x20)
                         *ptr1++ = (table_b[*sbufptr] & 0x00FF);
                    if (shift_flg == TRUE)
                         {
                         shift_flg = FALSE;
                         print_flg = CODE_A;
                         sbufptr++;
                         continue;
                         }
```

```
                break;

            case CODE_C:
                if (*sbufptr <= 99)
                    {
                    *ptr1++ = *sbufptr / 10 + '0';
                    *ptr1++ = *sbufptr % 10 + '0';
                    }
            }

        switch (*sbufptr++)
            {
            case CODE_A :
                print_flg = CODE_A;
                break;

            case CODE_B :
                print_flg = CODE_B;
                break;

            case CODE_C :
                print_flg = CODE_C;
                break;

            case SHIFT  :
                if (print_flg != CODE_C)
                    {
                    shift_flg = TRUE;
                    if (print_flg == CODE_A)
                        {
                        print_flg = CODE_B;
                        break;
                        }
                    if (print_flg == CODE_B)
                        {
                        print_flg = CODE_A;
                        break;
                        }
                    }
                 break;
            }
        }
    *ptr1 = '\0';
    return (strlen(str));
    }

void C128_REALTIME(UBYTE *ptr1,UBYTE *ptr2, UBYTE *ptr3)
    {
    UBYTE idx,idy;

    for (idx=0,idy=0;ptr1[idx]!='\0';idx++)
        {
        ptr3[idy++]=ptr1[idx];
```

```
          ptr3[idy++]=ptr2[idx];
/*        if (ptr1[idx] == ' ')
**                  {
**                  ptr3[idy++]=ptr2[idx];
**                  }
**             else
**                  {
**                  ptr3[idy++]=ptr1[idx];
**                  ptr3[idy++]=ptr2[idx];
**                  }
*/         }
     ptr3[idy]='\0';
     }

/*****************************************************************
********

*****************************************************************
*******

*****************************************************************
*******
 ***
                 ***
 ***                 CODABAR ANALYSIS SECTION
            ***
 ***
                 ***

*****************************************************************
*******

*****************************************************************
*******

*****************************************************************
*******/

/*****************************************************************
*******
 * Function:          an_CBR
 * Description:           validate/analyize code codabar decode
 * Arguments:         an_struct * - analysis structure to be used
 * Returns:                none

*****************************************************************
******/

static void an_CBR(an_struct *an)
     {
     an->RATIO = (an->AVG_WIDE * 10L) / an->AVG_NARROW; /* calc
ratio     */
     an->TOLER = ((an->RATIO * 50) - 20) / 81;     /*    calculate
```

```
tolerance */
     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;


     if (an->MODCKSB[0] & 64)                /* icg too wide  bit
6 of MODCK */
          {
          an->RESULTS.icgfail = 1;
          an->MODCKSB[0] = 0;
          }
     switch (an->SUBTYPE)
          {
          case se_USSCBR:
               a n - > R E S U L T S . r a t i o f a i l    =
an_RATCK(an->RATIO,20,30);
               break;

          case se_ANSICBR:
               a n - > R E S U L T S . r a t i o f a i l    =
an_RATCK(an->RATIO,22,30);
               break;
          }
     }

/*****************************************************************
********

*****************************************************************
*******

*****************************************************************
*******
 ***
                 ***
 ***                 CODE 93 ANALYSIS SECTION
            ***
 ***
                 ***

*****************************************************************
*******

*****************************************************************
*******

*****************************************************************
*******/


/*****************************************************************
*******
```

```
 * Function:          an_C93
 * Description:          validate/analyize code 93 decode
 * Arguments:         an_struct * - analysis structure to be used
 * Returns:               none

*****************************************************************
******/

static void an_C93(an_struct *an)
     {
    an->RATIO = FALSE;                    /* no ratio available
          */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_ANSIC93:an->TOLER = 35;    break ; /* calculate
tolerance */
          default:       an->TOLER = 45; break;
          }

     if (an->MODCKSB[0] & 0x80)                    / *    v a l i d
mod-check digit ?         */
          {
          an->RESULTS.chkfail = 1;      /*    show    mod    check
failure       */
          an->MODCKSB[0] &= 0x7F;            /* erase flag
               */
          }
     if (an->MODCKSB[1] & 0x80)
          {
          an->RESULTS.chkfail = 1;      /*    show    mod    check
failure       */
          an->MODCKSB[1] &= 0x7F;            /* erase flag
               */
          }

     an->MODCKIS[1] = an->SBUF[an->CHARS - 2]; /* actual decoded
modchk*/
     an->MODCKIS[0] = an->SBUF[an->CHARS - 3];
     }

UBYTE C93_CBUF(UBYTE *sbufptr, UBYTE *ptr1, UBYTE chars)
     {
     strncpy(ptr1,sbufptr+1,chars-4);
     ptr1[chars-4] = '\0';
     return(chars-4);
     }

/*****************************************************************
```

```
********

*****************************************************************
*******

*****************************************************************
*******
 ***
                 ***
 ***                 UPC/EAN ANALYSIS SECTION
            ***
 ***
                 ***

*****************************************************************
*******

*****************************************************************
*******

*****************************************************************
*******/

#define stype_upca   1
#define stype_upce   2
#define stype_ean8   4
#define stype_ean13  8

#define noaddon      0
#define addon2       1
#define addon5       255


const UBYTE ue_tol[4] = { 30, 34, 38, 14 };

/****************************************************************
*******
 * Function:         an_UE
 * Description:          validate/analyize UPC/EAN decode
 * Arguments:        an_struct * - analysis structure to be used
 * Returns:               none

*****************************************************************
******/

static void an_UE(an_struct *an)
     {

     UBYTE ue_magtype;

     ue_magtype = an->SUBTYPE;              /*  save  UPC  size
selection       */
     an->TOLER = ue_tol[an->SUBTYPE];
```

```
    an->RATIO = FALSE;                          /* no ratio available
          */

     switch (an->UETYPE)
          {
          case stype_upca:
               an->SUBTYPE = se_UPCA;
               break;
          case stype_upce:
               an->SUBTYPE = se_UPCE;
               break;
          case stype_ean8:
               an->SUBTYPE = se_EAN8;
               break;
          case stype_ean13:
               an->SUBTYPE = se_EAN13;
               break;
          }
     an->SUBTYPE += ue_magtype;
     if (an->ADTYPE == addon2) an->SUBTYPE += 4;
     if (an->ADTYPE == addon5) an->SUBTYPE += 8;

     if (an->MODCKSB[0] & 0x80)                /*   valid  mod-check
digit ?        */
          {
          an->RESULTS.chkfail = 1;        /*    show    mod    check
failure        */
          an->MODCKSB[0] &= 0x7F;              /* erase flag
               */
          }

     if (an->MODCKSB[0] & 0x40)
          {
          an->RESULTS.formatfail = 1;          /*   addendum   check
failure        */
          an->MODCKSB[0] &= ~(0x40);
          }

     an->MODCKSB[0] = (an->MODCKSB[1] + '0');
     an->MODCKSB[1] = 0;

    if ((an->SUBTYPE >= se_UPCE) && (an->SUBTYPE < se_EAN13))
          {
          an->MODCKIS[0] = an->SBUF[9];
          }
     else
          an->MODCKIS[0] = an->SBUF[15];

     an->SBUF[25] = 0x00;

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;
```

```
     }
UBYTE CU_E_CBUF(UBYTE *src, UBYTE *dest)
     {
     UBYTE *tsrc, *tdest;
     if (utype == 4)
          tsrc = src + 6;
     else
          tsrc = src;
     tdest = dest;
     while (*tsrc)
          {
          if (*tsrc != ' ')
               {
               *tdest = *tsrc;
               tdest++;
               }
          tsrc++;
          }
     *tdest = '\0';
     return (strlen(dest));
     }
```

```
/*****************************************************************
*******
 *  Title:  AN.H - Laser Inspector Analysis Header File
                *
 *  Ident:  Rev. A
                     *

*****************************************************************
******
 *   Copyright (c) 1993     All rights reserved.
         *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *   notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 14-SEP-93, Version X0.00
 *
 *  Modification History
 *
 *  Date         Who     Version     Why
 *    ----------        -------        ---------
-----------------------------------
 * 14-SEP-93   DRP       Rev. A        Original Writing
```

```
*****************************************************************
******/

/****************************************************************
*******
 * global contants

*****************************************************************
******/

#define GRADE_A         4                       /*  ANSI  grade
assignments         */
#define GRADE_B         3
#define GRADE_C         2
#define GRADE_D         1
#define GRADE_F         0


/* code 39 subtypes */

#define se_USS39        0
#define se_AIAGB1       1
#define se_AIAGB2       2
#define se_LOGMARS      3
#define se_HIBC              4
#define se_ANSI39       5
#define se_39W43        6


/* Interleaved 2 of 5 subtypes */

#define se_USSI25       0
#define se_ANSI25       1
#define se_CASEI25      2

/* Codabar subtypes */

#define se_USSCBR       0
#define se_ANSICBR      1

/* Code 93 subtypes */

#define se_USSC93       0
#define se_ANSIC93      1

/* Code 128 subtypes */

#define se_USSC128     0
#define se_ANSIC128     1


/* UPC/EAN subtypes */

#define se_UE           0
```

```
#define se_UPCA             0
#define se_UPCA_2       4
#define se_UPCA_5       8
#define se_UPCE             12
#define se_UPCE_2      16
#define se_UPCE_5      20
#define se_EAN13       24
#define se_EAN13_2     28
#define se_EAN13_5     32
#define se_EAN8             36
#define se_EAN8_2      40
#define se_EAN8_5      44


/* Error message numbers */

#define qzfail_c      0x00
#define reffail_c     0x01
#define icgfail_c     0x02
#define warnw_c       0x03
#define warnn_c       0x04
#define rejectw_c     0x05
#define rejectn_c     0x06
#define formatfail_c 0x07
#define chkfail_c     0x08
#define ratiofail_c   0x09
#define dcdfail_c     0x0A
#define pcsfail_c     0x0B
#define readfail_c    0x0C
#define good_c        0x0D


/*******************************************************************
*******
 * global structures

********************************************************************
******/

typedef struct                                   /*    failure    flag
structure      */
     {
     BOOLEAN    qzfail,                          /* quiet zone failure
                */
                     reffail,                    /*  reference  decode
failure    */
                     icgfail,                    /* intercharacter gap
failure    */
                     warnw,                           /* warning wide
failure              */
                     warnn,                           /* warning narrow
failure         */
```

```
        rejectw,        /* rejected wide failure */
        rejectn,        /* rejected narrow failure */
        formatfail,     /* format failure */
        chkfail,        /* mod-check failure */
        ratiofail,      /* ratio failure */
        dcdfail,        /* decodability failure */
        pcsfail,        /* print contrast failure */
        good;           /* no failure */
    } result;

typedef struct
    {
    UBYTE   SCANS,          /* # of scans averaged */
            BACKWARDS,      /* true when scanned backwards */
            SUCCESS,        /* success flag (hi-bit only) */
            STYPE,          /* barcode symbology type */
            SUBTYPE,        /* barcode subsymbology type */
            UETYPE,         /* UPC/EAN subtype */
            ADTYPE,         /* UPC/EAN addendum type */
            CHARS,          /* # of symbol chars decoded */
            MODCKIS[2],     /* actual mod-check digits */
            MODCKSB[2],     /* calculated mod-check digits */
            DECODABILITY,   /* decodability value */
            DECGRADE,       /* decodability grade */
            GRADE,          /* overall scan profile grade */
            REFGRADE;       /* reference decode grade */
    WORD    MIN_GAIN,       /* smallest bar deviation */
            AVG_GAIN,       /* average bar devation */
            MAX_GAIN,       /* largest bar deviation */
```

```
                        TOLER;                          /*    barcode
tolerance               */
      UWORD             AVG_NARROW,                     /* average narrow
element width */
                        AVG_WIDE,                 /*    average    wide
element width   */
                        RATIO,                          /* wide to narrow
ratio                   */
                        QZ_LEAD,                  /* leading QZ size
                  */
                        QZ_TRAIL;                 /* ending QZ size
                  */
      UBYTE             SBUF[max_symbol];         /*   decoded   symbol
characters        */
      result      RESULTS;                  /*    failure    flag
structure         */
      } an_struct;


typedef struct
      {
      UBYTE             SCAN_AVG,                 /*    #    of    scans
accumulated             */
                        STYPE_AVG,                      /* barcode symbol
type              */
                        SUBTYPE_AVG,              / *    b a r c o d e
sub-symbology type      */
                        UETYPE_AVG,                     /*    UPC/EAN
symbology type          */
                        ADTYPE_AVG,                     /*    UPC/EAN
addendum type           */
                        CHARS_AVG,                      /* # of symbol
chars                   */
                        SBUF_AVG[max_symbol],     /*   symbol    chars
buffer                  */
                        MODCKSB_AVG[2];                 /*   calculated
mod-check digit(s)*/
      UWORD       DECODABILITY_AVG;         /* decodability value
               */
      LONG        MINGAIN_AVG,              /*    smallest    bar
deviation         */
                        AVGGAIN_AVG,              /*    average    bar
deviation         */
                        MAXGAIN_AVG;              /*    maximum    bar
deviation         */
      ULONG             NARROW_AVG,                     /* average narrow
element width     */
                        WIDE_AVG,                 /*    average    wide
element width     */
                        QZLEAD_AVG,                     /* leading quiet
zone size         */
                        QZTRAIL_AVG;              /* trailing quiet zone
size        */
```

```
    result          RESULTS_AVG;              /*    failure    flag
structure       */
    } an_avgstruct;

/****************************************************************
********
 Function Prototypes

*****************************************************************
******/

void an_ANALYZE(an_struct *an);               /*    basic    barcode
analysis      */
void an_FINAL(an_struct *an);              /*    final    barcode
analysis      */
void an_AVGCLR(an_avgstruct *);               /* clear out average
structure */
void an_AVERAGE(an_struct *,an_avgstruct *); /* accumulate for
averaging*/
void  an_UNAVERAGE(an_avgstruct  *,  an_struct  *);  /*  average
function      */
LONG an_CHKSUM(UBYTE *);                      /* calc. checksum from
buffer    */
LONG an_3CHKSUM(UBYTE *);                     /* calc. checksum from
buffer    */
void C128_BUF(UBYTE *, UBYTE *, UBYTE *, UBYTE); /* convert C128 to
text*/
UBYTE  C128_CBUF(UBYTE  *,  UBYTE  *,  UBYTE);/*  convert  C128  to
compress text*/
UBYTE CSTRT_STOP_BUF(UBYTE *, UBYTE *, UBYTE);/* strip strt and
stop chars */
void C128_REALTIME(UBYTE *, UBYTE *, UBYTE*);/* convert C128 to
compress text*/
UBYTE CU_E_CBUF(UBYTE *, UBYTE *);
UBYTE C93_CBUF(UBYTE *, UBYTE *, UBYTE);
```

```
/                                                                  *
*******************************************************************
*******
 *  Title:  AS.S - Collection of assembly language routines
        *
 *  Ident:  X0.00
                  *

*******************************************************************
*******
 *   Copyright (c) 1989, 1990, 1991, 1992    All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of  *
 *   the software is hereby transferred.
     *
 *
     *
 *   The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *

*******************************************************************
*******
 *
 *  Abstract:
 *
 *  Author:      Donald R. Palmer, 19-NOV-92, Version X0.00
 *
 *  Modification History
 *
 *  WHEN           WHO       VERSION        WHAT
 *  ----           ---       -------
------------------------------------
 *  19-NOV-92  DRP       X0.00          Original Writing
```

```
*****************************************************************
*******/

/****************************************************************
*******
 * function prototypes

*****************************************************************
******/

non_banked void gn_GATHER(void);         /*    data    gathering
function       */
```

```
*******************************************************************
*******
*  Title:  AS.S - Collection of assembly language routines
        *
*  Ident:  X0.00
                   *
*******************************************************************
*******
```

```
*   Copyright (c) 1989, 1990, 1991, 1992     All rights reserved.
    *
*
    *
*   This software is furnished under a license and may be used and
   *
*   copied only in accordance with the terms of such license and
    *
*    with the inclusion of the above copyright notice.   This
software   *
*   or any other copies thereof may not be provided or otherwise
    *
*   made available to any other person.  No title to and ownership
of  *
*   the software is hereby transferred.
    *
*
    *
*   The information in this software is subject to change without
    *
*   notice and should not be construed as a commitment by RJS, Inc.
  *
*
    *
*   RJS assumes no responsibility for the user or reliability of
    *
*   its software on equipment that is not supplied by RJS.
    *
*
    *
```

```
*******************************************************************
*******
*
*  Abstract:
*
*  Author:      Donald R. Palmer, 19-NOV-92, Version X0.00
*
*  Modification History
*
*  WHEN             WHO       VERSION        WHAT
*  ----             ---       -------
-------------------------------------
*  19-NOV-92   DRP       X0.00          Original Writing
*******************************************************************
*******/
```

```
                 P68H11
                 RSEG RCODE

                 EXTERN  gn_end:ZPAGE
                 extern  gn_stop:ZPAGE
                 extern  gn_time:ZPAGE
                 extern  gn_temp:ZPAGE
                 PUBLIC  gn_GATHER

HCREGOFFSET equ 0                  * Default for 68HC11
TIC2 equ         HCREGOFFSET + $12
TFLG1      equ        HCREGOFFSET + $23
ic1f       equu       4                  * IC1 interrupt flag
ic2f       equ        2                  * IC2 interrupt flag


gn_GATHER:       LDX     gn_end
?0011:           BRSET   $23,#ic1f,?0012          * SOS means clear
out
?0014:       BRCLR   $23,#ic2f,?0014        * wait for digital
change
               LDD     $12                        * get IC timer
         STD     gn_time                   * put away for later
               LDAB    #ic2f                      * clear flag for
next time
               STAB    $23
               LDD     gn_time                    *  restore  IC
timer
               SUBD    gn_temp                    * subtract from
previous
               BPL     ?0017                      * negative means
overflow
         COMA                                  *  turn  into  valid
number
          COMB
?0017:       STD     0,X                          * put away into
the buffer
               INX                                     * bump up
buffer pointer
         INX
          LDD     gn_time
               STD     gn_temp                    * make current =
previous
                 CPX      gn_stop
                 BLO      ?0011
                 DEX
                 DEX


?0012:       STX     gn_end

                 RTS
                  END
```

```
     MODULE     ?BANK_SWITCHER_L09
     TITL '6801/6301/68HC11 - C - BANK-SWITCHER'
     RSEG RCODE
$def6811b.inc
*----------------------------------------------------------------*
*
               *
*              - BK.S -
          *
*
               *
*    Function(s):   Banked swiched CALL and RETURN
     *
*
               *
*    Must be tailored for actual bank-switching hardware.          *
*    In the sample system a PIA-type of port was used.             *
*
               *
*    The port is assumed to be readable but this is not
     *
*    needed if the current bank-number is also stored in
     *
*    RAM. This solution is suitable for a 74HC374-type        *
*    of port.
          *
*
               *
*    Note: A PIA type of port must be initialized in
     *
*    CSTARTUP.S07 to become an output device.
     *
*
               *
*    Version: 3.00 [A.R. 16/Nov/88]
          *
*
               *
*----------------------------------------------------------------*

IOPORT    EQU        $0
IO12 EQU             $30            *  $18
NOTIO12   EQU        $CF

*----------------------------------------*
*                                                    *
*    Call a non-local function                  *
*                                                    *
*    Input:                                          *
*                                                    *
*      X: 32-bit function-addr:                 *
*         -------------------------             *
*    X-> | ??? | bank | High | Low |            *
*         -------------------------             *
```

```
*                                                    *
*---------------------------------------*

     PUBLIC     ?X_CALL_L09
?X_CALL_L09:

*===========================*
*       Save old bank        *
*===========================*

     XGDY
     LDAA IOPORT                  Could be RAM
     ANDA #(IO12)
     PSHA                         Always stack port value

*===========================*
*       Get new bank         *
*===========================*

     LDAA 1,X                     Get new bank-number
     LDX       2,X                     Get offset in bank

*===========================*
*       Bank-switch      *
*===========================*

     LSLA
     LSLA
     LSLA
     LSLA
     LDAB IOPORT
     ANDB #NOTIO12
     STAB IOPORT
     ORAA IOPORT
     STAA IOPORT                  Switch (and possible save in RAM)

*===========================*
*    End of switch            *
*===========================*
     XGDY
     JMP       0,X                     Execute that function!

*---------------------------------------*
*                                                    *
*    Leave current function                     *
*                                                    *
*---------------------------------------*
*                                                    *
*    Input:                                          *
*      Stack TOP                                     *
*                                                    *
*---------------------------------------*

     PUBLIC     ?X_RET_L09
```

```
?X_RET_L09:
     %XGDX                Save D (function return value)

*===========================*
*       Bank-switch        *
*===========================*

     PULA           Get old bank
     LDAB IOPORT
     ANDB #NOTIO12
     STAB IOPORT
     ORAA IOPORT
     STAA IOPORT              Switch (and possible save in RAM)

*===========================*
*    End of switch          *
*===========================*

     %XGDX                Restore D
     RTS            Return to calling function

     END
```

```
/*******************************************************************
*******
 *  Title:  CF.C - Laser Inspector Configure Setup
                *
 *  Ident:  Rev. A
                     *

*******************************************************************
******
 *   Copyright (c) 1993     All rights reserved.
        *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.   *
 *
    *
 *   RJS assumes no responsibility for the user or reliability of
    *
 *   its software on equipment that is not supplied by RJS.
    *
 *
    *

*******************************************************************
******
 *
 *  Abstract:
 *
 *  Author:       Donald R. Palmer, 14-SEP-93, Version X0.00
 *
 *  Modification History
 *
 *  Date          Who     Version     Why
 *   -----------          -------          ---------
-----------------------------------
 * 14-SEP-93   DRP        Rev. A        Original Writing
 * 18-OCT-93   DG         Rev. C        N e w    p a s s w o r d
```

```
function;password is the
 *                                                k      e      y
sequence:SELECT,F1,F2,ENTER,ENTER.
 *                                                The  Define  value
PASSWORD in LZB.MAK will
 *                                                include  this
function.

*****************************************************************
******/

/****************************************************************
*******
 * Include Files

*****************************************************************
******/

#include "system.h"
#include "io6811.h"
#include "stdio.h"
#include "string.h"

#include "df.h"

#include "se.h"
#include "sw.h"
#include "lc.h"
#include "mm.h"
#include "cf.h"

#pragma codeseg(CF)

/****************************************************************
*******
 * Local Variables Files

*****************************************************************
******/


#pragma memory = no_init

static UBYTE cf_init;                             /*   Configuration
initialized byte*/
static UBYTE cf_hold;
static UBYTE cf_port;

cf_struct CF;
cf_struct *CFP;

#pragma memory = default

/****************************************************************
```

```
*******
 * configuration constants

**********************************************************************
******/
const UBYTE PORT_str[]="PORT   PARAMETERS";
const UBYTE ACT_str[]="PORT   ACTIVATE ";
const UBYTE TIMER_str[]="   TIMER VALUE   ";
const UBYTE ONESHOT_str[]="  PULSE  TIMER   ";
const UBYTE YES_str[] = "YES";
const UBYTE NO_str[] = "NO ";

#ifdef SATO
const cf_struct cf_INIT = {
      SYNCMODE,
      0,
      0,
      1,
      2,
      1,1,0,1,2,cf_latched,0,
      0,1,0,0,0xFF,cf_latched,1,
      0,0,0,1,2,cf_latched,1,
      1,0,0,0,0xFF,cf_latched,1,
      0,0,1,0,0xFF,cf_pershot,1,
      1,1,1,1,1,
      1,1,1,1,1,
      1,1,1,1,1,
      1,1,1,1,1
      };
#else
const cf_struct cf_INIT = {
      FREESCAN,
      0,
      0,
      1,
      0xFF,
      0,0,0,0,0xFF,cf_perscan,0,
      0,0,0,0,0xFF,cf_perscan,0,
      0,0,0,0,0xFF,cf_perscan,0,
      0,0,0,0,0xFF,cf_perscan,0,
      0,0,0,0,0xFF,cf_perscan,0,
      0xFF,0xFF,0xFF,0xFF,0xFF,
      0xFF,0xFF,0xFF,0xFF,0xFF,
      1,1,1,1,1,
      1,1,1,1,1
      };
#endif
const SE2 cf_opmodechoice =
      {
      &cf_hold, 2, " OPERATION MODE ", " SYNC  FREESCAN ",
           17, SYNCMODE, NULL, NULL,
           23, FREESCAN, NULL, NULL
      };
```

```
const SE2 cf_syncpolchoice =
     {
     &cf_hold, 2, " SYNC POLARITY  ", "ACTIVE = ON OFF ",
          25, 255, NULL, NULL,
          28,   0, NULL, NULL
     };

const SE2 cf_freetimechoice =
     {
     &cf_hold, 2 ," FREESCAN TIMER ", "ENABLED DISABLED",
          16,255, NULL, NULL,
          24,  0, NULL, NULL
     };

const SE10 cf_pershot_10ths =
     {
     &cf_hold, 9,ONESHOT_str, NULL,
          21, 1, NULL, "1",
          21, 2, NULL, "2",
          21, 3, NULL, "3",
          21, 4, NULL, "4",
          21, 5, NULL, "5",
          21, 6, NULL, "6",
          21, 7, NULL, "7",
          21, 8, NULL, "8",
          21, 9, NULL, "9"
     };

const SE10 cf_freetime_9ths =
     {
     &cf_hold, 9,TIMER_str, NULL,
          21, 1, NULL, "1",
          21, 2, NULL, "2",
          21, 3, NULL, "3",
          21, 4, NULL, "4",
          21, 5, NULL, "5",
          21, 6, NULL, "6",
          21, 7, NULL, "7",
          21, 8, NULL, "8",
          21, 9, NULL, "9"
     };

const SE10 cf_freetime_10ths =
     {
     &cf_hold, 10,TIMER_str, NULL,
          21, 0, NULL, "0",
          21, 1, NULL, "1",
          21, 2, NULL, "2",
          21, 3, NULL, "3",
          21, 4, NULL, "4",
          21, 5, NULL, "5",
          21, 6, NULL, "6",
          21, 7, NULL, "7",
          21, 8, NULL, "8",
```

```
        21, 9, NULL, "9"
    };

const SE10 cf_freetime_1s =
    {
    &cf_hold, 10,TIMER_str, NULL,
        19, 0, NULL, "0",
        19, 1, NULL, "1",
        19, 2, NULL, "2",
        19, 3, NULL, "3",
        19, 4, NULL, "4",
        19, 5, NULL, "5",
        19, 6, NULL, "6",
        19, 7, NULL, "7",
        19, 8, NULL, "8",
        19, 9, NULL, "9"
    };


const SE10 cf_freetime_10s =
    {
    &cf_hold, 10,TIMER_str, NULL,
        18, 0, NULL, "0",
        18, 1, NULL, "1",
        18, 2, NULL, "2",
        18, 3, NULL, "3",
        18, 4, NULL, "4",
        18, 5, NULL, "5",
        18, 6, NULL, "6",
        18, 7, NULL, "7",
        18, 8, NULL, "8",
        18, 9, NULL, "9"
    };

const SE10 cf_oneshot_9ths =
    {
    &cf_hold, 9,ONESHOT_str, NULL,
        21, 1, NULL, "1",
        21, 2, NULL, "2",
        21, 3, NULL, "3",
        21, 4, NULL, "4",
        21, 5, NULL, "5",
        21, 6, NULL, "6",
        21, 7, NULL, "7",
        21, 8, NULL, "8",
        21, 9, NULL, "9"
    };

const SE10 cf_oneshot_10ths =
    {
    &cf_hold, 10,ONESHOT_str, NULL,
        21, 0, NULL, "0",
        21, 1, NULL, "1",
        21, 2, NULL, "2",
```

```
            21, 3, NULL, "3",
            21, 4, NULL, "4",
            21, 5, NULL, "5",
            21, 6, NULL, "6",
            21, 7, NULL, "7",
            21, 8, NULL, "8",
            21, 9, NULL, "9"
      };

const SE10 cf_oneshot_1s =
      {
      &cf_hold, 10,ONESHOT_str, NULL,
            19, 0, NULL, "0",
            19, 1, NULL, "1",
            19, 2, NULL, "2",
            19, 3, NULL, "3",
            19, 4, NULL, "4",
            19, 5, NULL, "5",
            19, 6, NULL, "6",
            19, 7, NULL, "7",
            19, 8, NULL, "8",
            19, 9, NULL, "9"
      };


const SE5 cf_portchoice =
      {
      &cf_port, 5, "OUTPUT SELECTION",  "PORT  1 2 3 4 5 ",
            22, 0, NULL, NULL,
            24, 1, NULL, NULL,
            26, 2, NULL, NULL,
            28, 3, NULL, NULL,
            30, 4, NULL, NULL
      };

const SE2 cf_portpawarn =
      {
      &cf_hold, 2, PORT_str, "ANY WARNINGS    ",
            29,   1, "@", YES_str,
            29,   0, "@", NO_str
      };


const SE2 cf_portpareject =
      {
      &cf_hold, 2, PORT_str, "ANY REJECT      ",
            29,   1, "@", YES_str,
            29,   0, "@", NO_str
      };

const SE2 cf_portpagood =
      {
      &cf_hold, 2, PORT_str, "GOOD EVAL.      ",
            29,   1, "@", YES_str,
```

```
        29,   0, "@", NO_str
    };

const SE2 cf_portpaansi =
    {
    &cf_hold, 2, PORT_str, "SCAN PROFILE    ",
        29,   1, "@", YES_str,
        29,   0, "@", NO_str
    };


const SE5 cf_portansith =
    {
    &cf_hold, 4, "PORT   FAIL GRDE",  "   B C D F      ",
        19,   3, "@", NULL,
        21,   2, "@", NULL,
        23,   1, "@", NULL,
        25,   0, "@", NULL,
    };

const SE30 cf_portaccum =
    {
    &cf_hold, 21, ACT_str, "ACCUMULATVE:    ",
        29, 255, "@", "OFF",
        29,   1, "@", "  1",
        29,   2, "@", "  2",
        29,   3, "@", "  3",
        29,   4, "@", "  4",
        29,   5, "@", "  5",
        29,   6, "@", "  6",
        29,   7, "@", "  7",
        29,   8, "@", "  8",
        29,   9, "@", "  9",
        29,  10, "@", " 10",
        29,  11, "@", " 11",
        29,  12, "@", " 12",
        29,  13, "@", " 13",
        29,  14, "@", " 14",
        29,  15, "@", " 15",
        29,  16, "@", " 16",
        29,  17, "@", " 17",
        29,  18, "@", " 18",
        29,  19, "@", " 19",
        29,  20, "@", " 20",
    };

const SE13 cf_portcons =
    {
    &cf_hold, 11, ACT_str, "CONSECUTIVE:    ",
        29, 255, "@", "OFF",
        29,   1, "@", "  1",
        29,   2, "@", "  2",
        29,   3, "@", "  3",
        29,   4, "@", "  4",
```

```
          29,    5, "@", "  5",
          29,    6, "@", "  6",
          29,    7, "@", "  7",
          29,    8, "@", "  8",
          29,    9, "@", "  9",
          29,    10, "@", " 10",
     };

const SE5 cf_portdur =
     {
     &cf_hold, 4, "PORT   DURATION ", "                ",
          17,    cf_perscan, "@","PER SCAN       ",
          17,    cf_pershot, "@","PER SCAN PULSE ",
          17,    cf_latched, "@","LATCH          ",
          17,    cf_oneshot, "@","LATCH PULSE    "
     };

const SE2 cf_portpol =
     {
     &cf_hold, 2, "PORT   POLARITY ", "ACTIVE = ON OFF ",
          25,    1, "@", NULL,
          28,    0, "@", NULL
     };

/****************************************************************
*******
 * Local Function Prototypes

*****************************************************************
******/

void cf_wait(void);
#ifdef PASSWORD
/****************************************************************
*******
 * Function:        cf_PASSWORD
 * Description:          Custom Configuration password protection
 * Arguments:       none
 * Returns:              TRUE for correct password, FALSE for
incorrect password
 * Password:        The key sequence SELECT,F1,F2,ENTER,ENTER
triggers a TRUE

*****************************************************************
******/

BOOLEAN cf_PASSWORD(void)
     {
     lc_LINE1B();
     lc_LINE2B();
     lc_WRITE();
     sw_WAIT();
     if (sw_SELECT())
          {
```

```
        lc_PUTS(0, "*");
        lc_WRITE();
        sw_WAIT();
        if (sw_PRINT())
             {
             lc_PUTS(1, "*");
             lc_WRITE();
             sw_WAIT();
             if (sw_DATA())
                  {
                  lc_PUTS(2, "*");
                  lc_WRITE();
                  sw_WAIT();
                  if (sw_ENTER())
                       {
                       lc_PUTS(3, "*");
                       lc_WRITE();
                       sw_WAIT();
                       if (sw_ENTER())
                            return(TRUE);
                       }
                  }
             }
        }
     return(FALSE);
     }
#endif

/*****************************************************************
*******
 * Function:        cf_RESET
 * Description:          Initialize system for processing
 * Arguments:       none
 * Returns:              none

*****************************************************************
******/

void cf_RESET(void)
     {
     UBYTE idx,flag;

     if (cf_init != 0xA5)                    /*  system  already
initialized    */
          {
//        memclr(&CF, sizeof(cf_struct));
          memcpy(&CF, (cf_struct *)&cf_INIT,sizeof(cf_struct));
          cf_init = 0xA5;                          /* show system
initialized         */
          }
     CF.dcdthres = 0;
     flag = FALSE;
     for (idx = 0;idx < 5;idx++)   /* find smallest decodability */
          {                                  /* threshold setting
```

```
to use as global*/
          if   ((CF.portpara[idx].dbthres   >=   CF.dcdthres)   &&
(CF.portpara[idx].dbthres != 0xFF))
               {
               flag =TRUE;
               CF.dcdthres = CF.portpara[idx].dbthres;
               }
          }
     if (!flag)
          CF.dcdthres = 0xFF;
     }

/****************************************************************
*******
 * Function:         cf_OPEN
 * Description:           Open  Configuration  Setup  system  for
processing
 * Arguments:        none
 * Returns:               none

*****************************************************************
******/

void cf_OPEN(void)
     {
     UBYTE idx,ch[17],cf_tens,cf_sec,cf_10ths;
     UBYTE flag;

     se_setcursor(0);
     cf_hold = CF.opmode;
     se_choice((SE *)&cf_opmodechoice); /* operation mode choice
     */
     CF.opmode = cf_hold;
     if (CF.opmode)                        /* sync operation mode
?         */
          {
          cf_hold = CF.syncpol;            /*  yes  -  determine
polarity     */
          se_choice((SE *)&cf_syncpolchoice);     /* sync polarity
choice       */
          CF.syncpol = cf_hold;
          }
     else
          {
          cf_hold = CF.freetime;           /*  no   -  determine
freescan timer*/
          se_choice((SE *)&cf_freetimechoice);
          CF.freetime = cf_hold;
          if (CF.freetime)                 /*   freescan   timer
enabled      */
               {
               if (CF.timerval == 0)
                    CF.timerval = 1;
               cf_10ths = (CF.timerval % 10);
```

```
                cf_sec   = ((CF.timerval / 10) % 10);
                cf_tens  = ((CF.timerval / 100) % 10);
                lc_LINE2B();
                sprintf(ch, "%1d%1d.%1d seconds", cf_tens,cf_sec,
cf_10ths);
                lc_PUTS(18, ch);

                cf_hold = cf_tens;
                se_setchoice((SE *)&cf_freetime_10s);
                cf_wait();
                cf_tens = cf_hold;

                cf_hold = cf_sec;
                se_setchoice((SE *)&cf_freetime_1s);
                cf_wait();
                cf_sec = cf_hold;

                cf_hold  = cf_10ths;
                if (cf_sec == 0 && cf_tens == 0)
                     se_setchoice((SE *)&cf_freetime_9ths);
                else
                     se_setchoice((SE *)&cf_freetime_10ths);
                cf_wait();
                cf_10ths = cf_hold;

                CF.timerval = (cf_tens * 100) + (cf_sec * 10) +
(cf_10ths);
                }

          }


     while (1)
          {
          se_choice((SE *)&cf_portchoice);/* obtain port # to work
on        */
          se_setport(cf_port+1);

          cf_hold = CF.portpara[cf_port].warnings;
          se_choice((SE  *)&cf_portpawarn);/*  obtain  warnings
selection */
          CF.portpara[cf_port].warnings = cf_hold;

          cf_hold = CF.portpara[cf_port].reject;
          se_choice((SE  *)&cf_portpareject);/*  obtain  reject
selection     */
          CF.portpara[cf_port].reject = cf_hold;

          cf_hold = CF.portpara[cf_port].good;
          se_choice((SE  *)&cf_portpagood);  /*  obtain  good
selection     */
          CF.portpara[cf_port].good = cf_hold;
```

```
          cf_hold = CF.portpara[cf_port].ansi;
          se_choice((SE   *)&cf_portpaansi);   /*  obtain  decode
selection      */
          CF.portpara[cf_port].ansi = cf_hold;
          if (cf_hold)
               {
               cf_hold = CF.portpara[cf_port].dbthres;
               se_choice((SE *)&cf_portansith);
                                                      /*   obtain
decodability threshold*/
               CF.portpara[cf_port].dbthres = cf_hold;
               }
          else
               {
               CF.portpara[cf_port].dbthres = 0xFF;
               }

          CF.dcdthres = 0;
          flag = FALSE;
          for (idx = 0;idx < 5;idx++)   /*   find   smallest
decodability   */
               {                                      /*   threshold
setting to use as global*/
               if ((CF.portpara[idx].dbthres >= CF.dcdthres) &&
(CF.portpara[idx].dbthres != 0xFF))
                    {
                    flag =TRUE;
                    CF.dcdthres = CF.portpara[idx].dbthres;
                    }
               }
          if (!flag)
               CF.dcdthres = 0xFF;


          cf_hold = CF.portacc[cf_port];
          se_choice((SE *)&cf_portaccum);     /*   accumulative
selection      */
          CF.portacc[cf_port] = cf_hold;

          cf_hold = CF.portcons[cf_port];
          se_choice((SE *)&cf_portcons);            /*  consecutive
selection      */
          CF.portcons[cf_port] = cf_hold;

          cf_hold = CF.portpara[cf_port].duration;
          se_choice((SE *)&cf_portdur);             /*   obtain
duration selection  */
          CF.portpara[cf_port].duration = cf_hold;
          if (cf_hold == cf_oneshot)          /* one shot selected
?              */
               {
               if (CF.oneshotval[cf_port] == 0)
                    CF.oneshotval[cf_port] = 1;
               cf_10ths = (CF.oneshotval[cf_port] % 10);
```

```
                cf_sec    = ((CF.oneshotval[cf_port] / 10) % 10);
                lc_LINE2B();
                sprintf(ch, " %1d.%1d seconds", cf_sec, cf_10ths);
                lc_PUTS(18, ch);

                cf_hold = cf_sec;
                se_setchoice((SE *)&cf_oneshot_1s);
                cf_wait();
                cf_sec = cf_hold;

                cf_hold  = cf_10ths;
                if (cf_sec == 0)
                     se_setchoice((SE *)&cf_oneshot_9ths);
                else
                     se_setchoice((SE *)&cf_oneshot_10ths);
                cf_wait();
                cf_10ths = cf_hold;

                CF.oneshotval[cf_port] = (cf_sec * 10) + (cf_10ths);
                }
           else if (cf_hold == cf_pershot)
                {
                if (CF.pershotval[cf_port] == 0)
                     CF.pershotval[cf_port] = 1;
                cf_10ths = CF.pershotval[cf_port];

                lc_LINE2B();
                sprintf(ch, "   .%1d seconds",cf_10ths);
                lc_PUTS(18, ch);

                cf_hold  = cf_10ths;
                se_setchoice((SE *)&cf_pershot_10ths);
                cf_wait();
                cf_10ths = cf_hold;

                CF.pershotval[cf_port] = cf_10ths;
                }
           cf_hold = CF.portpara[cf_port].polarity;
           se_choice((SE *)&cf_portpol);           /*    o b t a i n
polarity selection  */
           CF.portpara[cf_port].polarity = cf_hold;
           }
     }


/*****************************************************************
*******
 * Function:         cf_wait
 * Description:           Wait for user to select item
 * Arguments:        none
 * Returns:               none
```

```
*****************************************************************
******/

void cf_wait(void)
     {
     lc_ON();
     lc_BLINK();                              /* turn on cursor
               */
     do
          {
          sw_WAIT();
          if (sw_SELECT())               /* select key depressed
          */
               {
               se_nextchoice();
               }
          }  while (!sw_ENTER());
     se_activatechoice();
     }
```

```
/*****************************************************************
********
 *  Title:  CF - Configuration Setup Module Header File
                *
 *  Ident:  X0.00
                     *

******************************************************************
*******
 *   Copyright (c) 1989, 1990, 1991, 1992    All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of  *
 *   the software is hereby transferred.
     *
 *
     *
 *   The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *

******************************************************************
*******
 *
 *  Modification History
 *
 *  WHEN       WHO       VERSION       WHAT
 *  ----       ---       -------
-------------------------------------
 * 19-NOV-92  DRP       X0.00         Original Writing

******************************************************************
*******/

/*****************************************************************
```

```
********
 Global Constants

*****************************************************************
*******/

#define FREESCAN FALSE
#define SYNCMODE TRUE

#define cf_perscan 0x01
#define cf_latched 0x02
#define cf_oneshot 0x03
#define cf_pershot 0x04

/*****************************************************************
********
 Structure Prototypes

*****************************************************************
*******/

typedef struct cf_param
     {
     UBYTE warnings,reject,good,ansi;
     UBYTE dbthres,duration,polarity;
     };


typedef struct
     {
     BOOLEAN opmode;                          /* operation mode
             */
     BOOLEAN syncpol;                         /* sync polarity
             */
     BOOLEAN freetime;
     UWORD   timerval;
     UBYTE   dcdthres;                        /* global decodability
threshold*/
     struct cf_param portpara[5];        /*    port    output
parameters         */
     UBYTE portacc[5], portcons[5];
     UBYTE oneshotval[5];
     UBYTE pershotval[5];
     } cf_struct;


extern cf_struct CF;

/*****************************************************************
********
 Function Prototypes

*****************************************************************
******/
```

```
void cf_RESET(void);
void cf_OPEN(void);
void cf_autoprint(BOOLEAN);

BOOLEAN cf_PASSWORD(void);
```

```
void cf_RESET(void)
     {
     UBYTE idx,flag;

     if (cf_init != 0xA5)                     /*   system   already
initialized    */
          {
          memclr(&CF, sizeof(cf_struct));
#ifdef SATO
          CF.opmode = SYNCMODE;
          CF.portpara[0].duration = cf_latched;
          CF.portpara[0].warnings = 1;/* set to YES */
          CF.portpara[0].reject = 1;/* set to YES */
          CF.portpara[0].ansi = 1;/* set to YES */
          CF.portpara[0].dbthres = 2;/* initial dcd threshold of
grade C */
          CF.portacc[0] = 1;
          CF.portcons[0] = 1;

          CF.portpara[1].duration = cf_latched;
          CF.portpara[1].polarity = 1;/* set to ON */
          CF.portpara[1].reject = 1;/* set to YES */
          CF.portpara[1].dbthres = 0xFF;/* initial dcd threshold of
grade C */
          CF.portacc[1] = 1;
          CF.portcons[1] = 1;

          CF.portpara[2].duration = cf_latched;
          CF.portpara[2].polarity = 1;/* set to ON */
          CF.portpara[2].ansi = 1;/* set to YES */
          CF.portpara[2].dbthres = 2;/* initial dcd threshold of
grade C */
          CF.portacc[2] = 1;
          CF.portcons[2] = 1;

          CF.portpara[3].duration = cf_latched;
          CF.portpara[3].polarity = 1;/* set to ON */
          CF.portpara[3].warnings = 1;/* set to YES */
          CF.portacc[3] = 1;
          CF.portcons[3] = 1;

          CF.portpara[4].duration = cf_pershot;
          CF.pershotval[4] = 1;/* .1 seconds or 100 ms */
          CF.portpara[4].polarity = 1;/* set to ON */
          CF.portpara[4].good = 1;/* set to YES */
          CF.portacc[4] = 1;
          CF.portcons[4] = 1;

          CF.dcdthres = 2;                    /* global decodability
threshold*/
#else
          for (idx = 0;idx < 5; idx++)
               {
               CF.portpara[idx].duration = cf_perscan;
```

```
                CF.portpara[idx].dbthres = 0xFF;    /* initial dcd
threshold*/
                CF.portacc[idx] = 0xFF;
                CF.portcons[idx] = 0xFF;
                }
          CF.dcdthres = 0xFF;               /* global decodability
threshold*/
#endif
          cf_init = 0xA5;                        /* show system
initialized         */
          }
     CF.dcdthres = 0;
     flag = FALSE;
     for (idx = 0;idx < 5;idx++)    /* find smallest decodability */
          {                                  /* threshold setting
to use as global*/
          if   ((CF.portpara[idx].dbthres   >=   CF.dcdthres)   &&
(CF.portpara[idx].dbthres != 0xFF))
                {
                flag =TRUE;
                CF.dcdthres = CF.portpara[idx].dbthres;
                }
          }
     if (!flag)
          CF.dcdthres = 0xFF;
     }

/*****************************************************************
*******
 * Function:         cf_OPEN
 * Description:           Open  Configuration  Setup  system  for
processing
 * Arguments:        none
 * Returns:               none

******************************************************************
******/

void cf_OPEN(void)
     {
     UBYTE idx,ch[17],cf_tens,cf_sec,cf_10ths;
     UBYTE flag;

     se_setcursor(0);
     cf_hold = CF.opmode;
     se_choice((SE *)&cf_opmodechoice); /* operation mode choice
     */
     CF.opmode = cf_hold;
     if (CF.opmode)                      /* sync operation mode
?          */
          {
          cf_hold = CF.syncpol;              /*  yes  -  determine
polarity      */
          se_choice((SE *)&cf_syncpolchoice);      /* sync polarity
```

```
choice          */
          CF.syncpol = cf_hold;
          }
     else
          {
          cf_hold = CF.freetime;            /*  no  -  determine
freescan timer*/
          se_choice((SE *)&cf_freetimechoice);
          CF.freetime = cf_hold;
          if (CF.freetime)                  /*   freescan   timer
enabled        */
               {
               if (CF.timerval == 0)
                    CF.timerval = 1;
               cf_10ths = (CF.timerval % 10);
               cf_sec   = ((CF.timerval / 10) % 10);
               cf_tens  = ((CF.timerval / 100) % 10);
               lc_LINE2B();
               sprintf(ch, "%1d%1d.%1d seconds", cf_tens,cf_sec,
cf_10ths);
               lc_PUTS(18, ch);

               cf_hold = cf_tens;
               se_setchoice((SE *)&cf_freetime_10s);
               cf_wait();
               cf_tens = cf_hold;

               cf_hold = cf_sec;
               se_setchoice((SE *)&cf_freetime_1s);
               cf_wait();
               cf_sec = cf_hold;

               cf_hold  = cf_10ths;
               if (cf_sec == 0 && cf_tens == 0)
                    se_setchoice((SE *)&cf_freetime_9ths);
               else
                    se_setchoice((SE *)&cf_freetime_10ths);
               cf_wait();
               cf_10ths = cf_hold;

               CF.timerval = (cf_tens * 100) + (cf_sec * 10) +
(cf_10ths);
               }

          }


     while (1)
          {
          se_choice((SE *)&cf_portchoice);/* obtain port # to work
on        */
          se_setport(cf_port+1);
```

```
          cf_hold = CF.portpara[cf_port].warnings;
          se_choice((SE   *)&cf_portpawarn);/*  obtain   warnings
selection */
          CF.portpara[cf_port].warnings = cf_hold;

          cf_hold = CF.portpara[cf_port].reject;
          se_choice((SE   *)&cf_portpareject);/*  obtain   reject
selection     */
          CF.portpara[cf_port].reject = cf_hold;

          cf_hold = CF.portpara[cf_port].good;
          se_choice((SE   *)&cf_portpagood);   /*  obtain   good
selection     */
          CF.portpara[cf_port].good = cf_hold;

          cf_hold = CF.portpara[cf_port].ansi;
          se_choice((SE   *)&cf_portpaansi);  /*  obtain   decode
selection     */
          CF.portpara[cf_port].ansi = cf_hold;
          if (cf_hold)
               {
               cf_hold = CF.portpara[cf_port].dbthres;
               se_choice((SE *)&cf_portansith);
                                             /*    o b t a i n
decodability threshold*/
               CF.portpara[cf_port].dbthres = cf_hold;
               }
          else
               {
               CF.portpara[cf_port].dbthres = 0xFF;
               }

          CF.dcdthres = 0;
          flag = FALSE;
          for (idx = 0;idx < 5;idx++)   /*   find    smallest
decodability   */
               {                             /*    threshold
setting to use as global*/
               if  ((CF.portpara[idx].dbthres >= CF.dcdthres)  &&
(CF.portpara[idx].dbthres != 0xFF))
                    {
                    flag =TRUE;
                    CF.dcdthres = CF.portpara[idx].dbthres;
                    }
               }
          if (!flag)
               CF.dcdthres = 0xFF;


          cf_hold = CF.portacc[cf_port];
          se_choice((SE *)&cf_portaccum);    /*    accumulative
selection     */
          CF.portacc[cf_port] = cf_hold;
```

```
          cf_hold = CF.portcons[cf_port];
          se_choice((SE *)&cf_portcons);          /*  consecutive
selection      */
          CF.portcons[cf_port] = cf_hold;

          cf_hold = CF.portpara[cf_port].duration;
          se_choice((SE *)&cf_portdur);           / *    o b t a i n
duration selection  */
          CF.portpara[cf_port].duration = cf_hold;
          if (cf_hold == cf_oneshot)          /* one shot selected
?              */
               {
               if (CF.oneshotval[cf_port] == 0)
                    CF.oneshotval[cf_port] = 1;
               cf_10ths = (CF.oneshotval[cf_port] % 10);
               cf_sec   = ((CF.oneshotval[cf_port] / 10) % 10);
               lc_LINE2B();
               sprintf(ch, " %1d.%1d seconds", cf_sec, cf_10ths);
               lc_PUTS(18, ch);

               cf_hold = cf_sec;
               se_setchoice((SE *)&cf_oneshot_1s);
               cf_wait();
               cf_sec = cf_hold;

               cf_hold  = cf_10ths;
               if (cf_sec == 0)
                    se_setchoice((SE *)&cf_oneshot_9ths);
               else
                    se_setchoice((SE *)&cf_oneshot_10ths);
               cf_wait();
               cf_10ths = cf_hold;

               CF.oneshotval[cf_port] = (cf_sec * 10) + (cf_10ths);
               }
          else if (cf_hold == cf_pershot)
               {
               if (CF.pershotval[cf_port] == 0)
                    CF.pershotval[cf_port] = 1;
               cf_10ths = CF.pershotval[cf_port];

               lc_LINE2B();
               sprintf(ch, "  .%1d seconds",cf_10ths);
               lc_PUTS(18, ch);

               cf_hold  = cf_10ths;
               se_setchoice((SE *)&cf_pershot_10ths);
               cf_wait();
               cf_10ths = cf_hold;

               CF.pershotval[cf_port] = cf_10ths;
               }
          cf_hold = CF.portpara[cf_port].polarity;
          se_choice((SE *)&cf_portpol);           / *    o b t a i n
```

```
polarity selection  */
          CF.portpara[cf_port].polarity = cf_hold;
          }
     }



/****************************************************************
*******
 * Function:        cf_wait
 * Description:          Wait for user to select item
 * Arguments:       none
 * Returns:              none

****************************************************************
******/

void cf_wait(void)
     {
     lc_ON();
     lc_BLINK();                                  /* turn on cursor
               */
     do
          {
          sw_WAIT();
          if (sw_SELECT())                   /* select key depressed
          */
               {
               se_nextchoice();
               }
          }  while (!sw_ENTER());
     se_activatechoice();
     }
```

```
/*******************************************************************
*******
 *  Title:  CL.C - Real Time Clock Timer Controller File
        *
 *  Ident:  Rev. A
                   *

*******************************************************************
******
 *   Copyright (c) 1993     All rights reserved.
       *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *  made available to any other person.  No title to and ownership
of *
 *   the software is hereby transferred.
    *
 *
    *
 *   The information in this software is subject to change without
   *
 *   notice and should not be construed as a commitment by RJS,
Inc.   *
 *
    *
 *   RJS assumes no responsibility for the user or reliability of
    *
 *   its software on equipment that is not supplied by RJS.
    *
 *
    *

*******************************************************************
******
 *
 *  Abstract:
 *
 *  Author:      Donald R. Palmer, 08-SEP-89, Version X0.00
 *
 *  Modification History
 *
 *  Date         Who     Version      Why
 *   ----------       -------      ---------
--------------------------------

*******************************************************************
```

```
******/

#include "system.H"
#include "int6811.h"
#include "io6811.h"

#include "cm.h"
#include "dz.h"
#include "an.h"
#include "ol.h"
#include "cl.h"
#include "lc.h"

#pragma memory = zpage

ULONG           OSTimerCount;

#pragma memory = no_init

extern UBYTE print_prot;

#pragma memory = default

extern UBYTE cm_cts;


#pragma codeseg(CL)

/*****************************************************************
******
 * real-time timer handler

*****************************************************************
*****/

#define rt_freq 16

void OSTimerOn(void)
     {
     PACTL |=  (rtr1 + rtr0);          /*  setup  rt  for  16  ms
ticks          */
     TFLG2 = rtif;                          /*   turn   on   RTII
interrupt      */
     TMSK2 |= rtii;
     }

void OSTimerOff(void)
     {
     TFLG2 = rtif;                          /*   turn   off   RTII
interrupt      */
     TMSK2 &= ~rtii;
     }

ULONG OSTimerConvert(ULONG t)
```

```
     {
     return (t / (ULONG)rt_freq);
     }

ULONG OSTimerTick(void)
     {
     return(OSTimerCount);
     }

void  OSTimerSet(void)
     {
     disable_interrupt();
     OSTimerCount = 0;
     enable_interrupt();
     }


void cl_interrupt(void)
     {
     TFLG2 = rtif;
     OSTimerCount++;
     enable_interrupt();
     ol_TIMER();
     if (print_prot)
          if ((cm_cts) && !(PORTD & cts))
               {
               cm_cts = FALSE;
               SCCR2 |= tcie;                /* enable transmitter
inter */
               }
     }
```

```
/*****************************************************************
*******
 *  Title:  CL.H - Real Time Clock Timer Controller Header File
 *
 *  Ident:  Rev. A
                  *

*****************************************************************
******
 *   Copyright (c) 1993     All rights reserved.
        *
 *
    *
 *  This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *  made available to any other person.  No title to and ownership
of *
 *   the software is hereby transferred.
    *
 *
    *
 *  The information in this software is subject to change without
   *
 *    notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------         -------         ---------
-----------------------------------

*****************************************************************
```

```
******/

/***************************************************************
********
 Function Prototypes

****************************************************************
******/
void OSTimerOn(void);
void OSTimerOff(void);
ULONG OSTimerConvert(ULONG);
ULONG OSTimerTick(void);
void  OSTimerSet(void);
```

```
/*****************************************************************
********
 *  Title:  CM - Serial Communications Control Module
               *
 *  Ident:  X0.00
                          *

*****************************************************************
*******
 *   Copyright (c) 1989, 1990, 1991, 1992     All rights reserved.
    *
 *
     *
 *   This software is furnished under a license and may be used and
   *
 *    copied only in accordance with the terms of such license and
     *
 *     with the inclusion of the above copyright notice.   This
software    *
 *    or any other copies thereof may not be provided or otherwise
     *
 *   made available to any other person.  No title to and ownership
of   *
 *    the software is hereby transferred.
     *
 *
     *
 *   The information in this software is subject to change without
    *
 *    notice and should not be construed as a commitment by RJS,
Inc.     *
 *
     *
 *    RJS assumes no responsibility for the user or reliability of
     *
 *    its software on equipment that is not supplied by RJS.
     *
 *
     *

*****************************************************************
*******
 *
 *   Abstract:
 *
 *   Author:       Donald R. Palmer, 19-NOV-92, Version X0.00
 *
 *   Modification History
 *
 *   WHEN       WHO       VERSION        WHAT
 *    ----      ---       -------
-------------------------------------
 * 19-NOV-92   DRP       X0.00          Original Writing
```

```
*****************************************************************
*******/

/****************************************************************
********
 Include Files

*****************************************************************
*******/

#include "system.h"
#include "io6811.h"
#include "int6811.h"
#include "stdio.h"

#include "df.h"

#include "wb.h"
#include "cl.h"

#include "cm.h"

#pragma codeseg(CM)

#pragma memory = zpage
UBYTE   cm_xoff;
UBYTE     cm_cts;
UBYTE     cm_wait;

#pragma memory = no_init

extern UBYTE print_prot;

#pragma memory = default

WB_BUF    cm_ibuf;                                    /*   CM   input
buffer structure*/
WB_BUF    cm_obuf;                                    /*   CM   output
buffer struct  */

#define cm_ibufsize 16                                /* input buffer
size       */
#define cm_obufsize 2048
static UBYTE   cm_oarea[cm_obufsize];
static UBYTE   cm_iarea[cm_ibufsize];

/****************************************************************
********
 * Function:    cm_START
              *
 * Description: Start up CM system
              *
 * Arguments:   none
```

```
            *
 * Returns:          none
                     *

*****************************************************************
*******/

void cm_START(void)
     {
     if (print_prot)
          PORTD &= ~(dtr + rts);
     else
          SCDR = XON;
     SCCR2 &= ~tcie;                                    /* disable
transmitter inter*/
     SCCR2 |= (rie + te + re);                     /*  turn  on  CM
interrupts      */
     }

/****************************************************************
********
 * Function:    cm_STOP
                     *
 * Description: Stop CM system
                     *
 * Arguments:  none
            *
 * Returns:          none
                     *

*****************************************************************
*******/

void cm_STOP(void)
     {
     SCCR2 &= ~(rie + te + re + tcie);        /*   turn   off   CM
interrupts      */
     if (print_prot)
          PORTD &= ~rts;                                /* lower the
RTS line        */
     else
          SCDR = XOFF;                                  /* send out
XOFF            */
     }

/****************************************************************
********
 * Function:    cm_WAITOK
            *
 * Description: Setup ok to wait for printer flag
       *
 * Arguments:  none
            *
 * Returns:          none
```

```
                     *
*****************************************************************
*******/

void cm_WAITOK(void)
     {
     cm_wait = TRUE;
     }

/****************************************************************
********
 * Function:    cm_NOWAIT
                *
 * Description: Setup not ok to wait for printer flag
           *
 * Arguments:   none
                *
 * Returns:          none
                     *
*****************************************************************
*******/

void cm_NOWAIT(void)
     {
     cm_wait = FALSE;
     }


/****************************************************************
********
 * Function:    cm_READ
                     *
 * Description: Read byte from CM input buffer
                *
 * Arguments:   none
                *
 * Returns:          UBYTE - character read from buffer
                *
 * ***NOTE**** waits for a character to be read before returning
     *
*****************************************************************
*******/

UBYTE cm_READ(void)
     {

     UBYTE      cm_temp,err;                         /*    temporary
holding area    */

     while (WBStatus(&cm_ibuf) == 0);
     cm_temp = WBGet(&cm_ibuf, &err);        /* pend forever on
```

```
queue*/
     return (cm_temp);
     }

/*****************************************************************
********
 * Function:     cm_WRITE
               *
 * Description: Output character to communications port
               *
 * Arguments:   UBYTE - character to be output
               *
 * Returns:          none
                    *
 * ***NOTE**     will not place character into buffer when full
          *

*****************************************************************
*******/

void cm_WRITE(UBYTE cp)
     {
     if (WBStatus(&cm_obuf) >= cm_obufsize - 1)
          {
          if (cm_wait)
               {
               while (WBStatus(&cm_obuf) >= cm_obufsize - 1);
               }
          }
     WBPut(&cm_obuf, cp);
     if ((!(SCCR2 & tcie)) && (!cm_cts) && print_prot)
          {
          SCCR2 |= tcie;                     /* enable transmitter
inter*/
          }
     else if ((!(SCCR2 & tcie)) && (!cm_xoff) && !print_prot)
          {
          SCCR2 |= tcie;                     /* enable transmitter
inter*/
          }
     }
/*****************************************************************
********
 * Function:     cm_RESET
               *
 * Description: Reset the communications system to a known state
     *
 * Arguments:   none
               *
 * Returns:          none
                    *

*****************************************************************
*******/
```

```
void cm_RESET(void)
     {
     SCCR2 = 0;                                            /* TIE   -
Off                 */
                                                           /* TCIE  -
Off                 */
                                                           /* RIE   -
Off                 */
                                                           /* ILIE  -
Off                 */
                                                           /* TE    -
Off                 */
                                                           /* RE    -
Off                 */
                                                           /* RWU   -
Normal              */
                                                           /* SBK   -
Off                 */
     DDRD |= (dtr + rts);                             /* set all for
output         */
     cm_xoff = cm_cts = FALSE;
     cm_wait = TRUE;
#ifdef TWOMHZ
#message "4 Mhz "
     BAUD = 0x31;                                     /*  setup  9600
baud           */
//   BAUD = 0x30;                                     /*  setup  9600
baud           */
#else
#message "2.5 Mhz Version"
     BAUD = 0x04;                                     /*  setup  9600
baud           */
#endif

     WBInit(&cm_ibuf, cm_iarea, cm_ibufsize);/* initalize queues
     */
     WBInit(&cm_obuf, cm_oarea, cm_obufsize);
     cm_START();
     }


/*****************************************************************
********
 * Function:    putchar
                    *
 * Description: Put a character out the communications port
        *
 * Arguments:  UBYTE - character to be outputted
        *
 * Returns:         none
                    *

*****************************************************************
```

```
*******/

int putchar(int cm_ochar)
     {
     cm_WRITE(cm_ochar);
     return(TRUE);
     }


/**************************************************************
********
 * Function:   cm_interrupt
                *
 * Description: Communications Input/Output ISR
        *
 * Arguments:  none
                *
 * Returns:         none
                     *

**************************************************************
*******/

void cm_interrupt(void)
     {
     UBYTE cp,err;

     if (SCSR & rdrf)                              /*   receiver
interrupt ?         */
          {
          SCCR2 &= ~rie;                           / *   r e s e t
interrupt flag      */
          enable_interrupt();
          cp = SCDR;
          if (!print_prot)
               {
               switch (cp)
                    {
                    case XON:                           /* received
on XON              */
                         cm_xoff = FALSE;               /*   clear
XOFF flag           */
                         SCCR2 |= tcie;                 /*  enable
transmitter inter */
                         break;

                    case XOFF:
                         cm_xoff = TRUE;
                         SCCR2 &= ~tcie;                     /   *
disable transmitter inter*/
                         break;
```

```
                    default:
                         err = WBPut(&cm_ibuf, cp);     /* out byte
into buffer         */
                    }
               }
          else
               {
               err = WBPut(&cm_ibuf, cp);     /*   out   byte   into
buffer         */
               }
          SCCR2 |= rie;                            / *    r e s e t
interrupt flag      */
          }
     else if (SCSR & tc)                           /* transmission
completed ?    */
          {
          SCCR2 &= ~tcie;                               /* disable
transmitter inter*/
          enable_interrupt();
          if (print_prot)
               {
               if (WBStatus(&cm_obuf))
                    {
                    if (!(PORTD & cts))
                         {
                         cm_cts = FALSE;
                         SCDR = WBGet(&cm_obuf, &err); /* get char
from buffer    */
                         SCCR2 |= tcie;                 /*  enable
transmitter inter*/
                         }
                    else
                         {
                         cm_cts = TRUE;
                         SCCR2 &= ~tcie;                     /    *
disable if buffer empty  */
                         }
                    }
               }
          else
               {
               if (WBStatus(&cm_obuf))
                    {
                    SCDR = WBGet(&cm_obuf, &err); /* get char from
buffer    */
                    SCCR2 |= tcie;                /*    e n a b l e
transmitter inter*/
                    }
               }
          }
     }
```

```
/*****************************************************************
********
 *  Title:  CM - Communications Control Module Header File
          *
 *  Ident:  X0.00
                    *

*****************************************************************
*******
 *   Copyright (c) 1989, 1990, 1991, 1992    All rights reserved.
    *
 *
     *
 *   This software is furnished under a license and may be used and
   *
 *    copied only in accordance with the terms of such license and
     *
 *     with the inclusion of the above copyright notice.   This
software   *
 *    or any other copies thereof may not be provided or otherwise
     *
 *   made available to any other person.  No title to and ownership
of   *
 *    the software is hereby transferred.
     *
 *
     *
 *   The information in this software is subject to change without
    *
 *    notice and should not be construed as a commitment by RJS,
Inc.    *
 *
     *
 *    RJS assumes no responsibility for the user or reliability of
     *
 *    its software on equipment that is not supplied by RJS.
     *
 *
     *
*****************************************************************
*******
 *
 *  Modification History
 *
 *  WHEN        WHO        VERSION        WHAT
 *   ----       ---        -------
------------------------------------
 * 19-NOV-92   DRP        X0.00          Original Writing

*****************************************************************
*******/
```

```
/*****************************************************************
********
 Constants

*****************************************************************
*******/

#define XON                    17
#define XOFF              19

/*****************************************************************
********
 Function Prototypes

*****************************************************************
*******/

void    cm_RESET(void);
void cm_START(void);                         /* fire-up the CM
system        */
void cm_STOP(void);                     /* shut down the CM
system        */
UWORD     cm_STATUS(void);                   /* obtain CM system
status        */
UBYTE     cm_READ(void);                     /* read CM buffer
              */
void cm_WRITE(UBYTE);                   /* write to CM output
buffer    */
int  putchar(int);
void      cm_NOWAIT(void);
void cm_WAITOK(void);
```

```
*-------------------------------------------------------------*
*                                                   *
*              CSTARTUP.S07                 *
*                                                   *
*  This module contains the 6301/68HC11 startup   routine and    *
*  must usually be tailored to suit special hardware needs  *
*                                                   *
*  Note:  The routine ?SEG_INIT_L07 is now included in CSTARTUP *
*      The size of stack is set in the link-file        *
*      The segment INTVEC is declared COMMON            *
*                                                   *
*  Version:    3.30 [IHAW 11/Feb/92]                    *
*  Revised:    3.31 [IHAW 07/Jul/92] Bug in stack init.      *
*-------------------------------------------------------------*
     NAME CSTARTUP

*    - DEF6811B.INC -
*
*    Include file containing 6801/6301/68HC11
*    differences.

     P68H11
proc6811  DEFINE    1
proc6801  DEFINE    0
proc6301  DEFINE    0
banking        DEFINE    1

     MACRO     %XGDX
     XGDX
     ENDMAC

     extern  main
     public seg_init,power
*-------------------------------------------------------------*
*  CSTACK - The C stack segment                        *
*                                                   *
*  Please look in the link-file lnk6???.xcl how to increment     *
*  the stack without having to reassemble cstartup.s07 !     *
*-------------------------------------------------------------*
     RSEG CSTACK
     RMB  0         A bare minimum !!


*-------------------------------------------------------------*
*  Forward declarations of segments used in initialization  *
*-------------------------------------------------------------*

     RSEG    NO_INIT
     RSEG UDATA
     RSEG IDATA
     RSEG CDATA
     RSEG ZVECT
     RSEG CONST
     RSEG CSTR
```

```
     RSEG    NO_INIT

power:          rmb       1              power up flag

*------------------------------------------------------------*
*  RCODE - Where the program actually starts           *
*------------------------------------------------------------*
     RSEG RCODE
C`init:
init_C:
     LDAA PORTE
     STAA power
start:
     LDS       #.SFE.(CSTACK-1)    From high to low addresses
*------------------------------------------------------------*
* If the 68HC11 OPTION register MUST be modified, here is the    *
* place to do it in order to meet the 64-cycle requirement. *
*------------------------------------------------------------*

PORTE     EQU       $100A
INIT EQU       $103D
TMSK2     EQU       $0024
PACTL     EQU       $0026
OPTION    equ     $0039
     clra
     staa INIT                          ; move ram/reg to zero
     staa TMSK2                              ;  timer  prescale  -
500ns
     ldaa PACTL
     oraa #1
     staa PACTL                              ; RT clock = 8.19ms

*------------------------------------------------------------*
* If it is not a requirement that static/global data is set *
* to zero or to some explicit value at startup, the next line    *
* of code can be deleted.                            *
*------------------------------------------------------------*
               BSR       seg_init  The old ?SEG_INIT_L07

               IF        banking
               EXTERN    ?X_CALL_L09
               LDX       #main
               JSR       ?X_CALL_L09

               ELSE

segnoinit:     JSR       main

               ENDIF

*------------------------------------------------------------*
* Now when we are ready with our C program (usually 6301/6811    *
* programs are continouous) we must perform a system-dependent   *
```

```
* action.  In this simple case we jump to ?C_EXIT.          *
*-----------------------------------------------------------*
* DO NOT CHANGE NEXT LINE OF CSTARTUP IF YOU WANT TO RUN YOUR   *
* SOFTWARE WITH THE AID OF THE C-SPY HLL DEBUGGER.          *
*-----------------------------------------------------------*
               JMP   ?C_EXIT


*-----------------------------------------------------------*
*  Copy initialized PROMmed code to shadow RAM and clear    *
*  uninitialized variables.                         *
*-----------------------------------------------------------*
seg_init:

*-----------------------------------------------------------*
*  Zero out UDATA                               *
*-----------------------------------------------------------*

     LDX  #.SFE.(UDATA)
     LDD  #.SFB.(UDATA)
     BSR  zero_mem

*-----------------------------------------------------------*
*  Zero out ZVECT's                             *
*-----------------------------------------------------------*

     LDX  #.SFB.(ZVECT)
     PSHX
     LDX  #.SFE.(ZVECT)
     PSHX
     TSX

more_ZVECT:
     LDD  0,X              load end address
     SUBD 2,X
     BEQ  no_more_ZVECT
     LDX  2,X
     LDD  0,X              D - start zero field
     LDX  2,X              X = End zero field + 1
     BSR  zero_mem
     TSX                   increase start address
     LDD  #4
     ADDD 2,X
     STD  2,X
     BRA  more_ZVECT

no_more_ZVECT:

*-----------------------------------------------------------*
* Copy CDATA into IDATA                             *
*-----------------------------------------------------------*
     LDD  #.SFE.(CDATA)
     STD  2,X
     LDD  #.SFB.(CDATA)
```

```
     STD  0,X
     LDX  #.SFB.(IDATA)
     PSHX
     BSR  copy_mem

*---------------------------------------------------------------*
* Copy CCSTR into ECSTR                                     *
*---------------------------------------------------------------*
*    TSX
*    LDD  #.SFE.(CCSTR)
*    STD  4,X
*    LDD  #.SFB.(CCSTR)
*    STD  2,X
*    LDD  #.SFB.(ECSTR)
*    STD  0,X
*    BSR  copy_mem
     INS
     INS
     INS
     INS
     INS
     INS
     RTS               * End of initialization

*---------------------------------------------------------------*
* Clear memory                                         *
*---------------------------------------------------------------*
zero_mem:
     PSHB
     PSHA
     PSHX
     TSX
again:
     LDD  0,X
     SUBD 2,X
     BEQ  return
     LDX  2,X
     CLR  0,X
     INX
     %XGDX
     TSX
     STD  2,X
     BRA  again
return:
     INS
     INS
     INS
     INS
     RTS

*---------------------------------------------------------------*
*  Copy memory                                         *
*---------------------------------------------------------------*
copy_mem:
```

```
     TSX
more_copy:
     LDD  6,X
     SUBD 4,X
     BEQ  quit_copy
     LDX  4,X
     LDAA 0,X
     PSHA
     INX
     %XGDX
     TSX
     STD  5,X
     PULA
     LDX  3,X
     STAA 0,X
     INX
     %XGDX
     TSX
     STD  2,X
     BRA  more_copy
quit_copy:
     RTS

*-----------------------------------------------------------------*
* Function/module: exit(int code)                        *
*                                         *
* When C-SPY is used this code will automatically be replaced    *
* by a 'debug' version of exit().                        *
*-----------------------------------------------------------------*

     RSEG RCODE

?C_EXIT:
*-----------------------------------------------------------------*
* The next line could be replaced by user defined code.          *
*-----------------------------------------------------------------*
end_loop:
     BRA  end_loop

     IF   banking

     RSEG FLIST
exit:
     FQB  ?C_EXIT

     ELSE

exit EQU  ?C_EXIT

     ENDIF

*-----------------------------------------------------------------*
* Function/module: reset(void)
          *
```

```
*------------------------------------------------------------------*
     PUBLIC  reset


     RSEG RCODE

reset:
     jmp        start



*------------------------------------------------------------------*
*  Interrupt vectors must be inserted by the user.    Here we      *
*  only used RESET.                                   *
*------------------------------------------------------------------*

     COMMON    INTVEC
     RMB  40
     FDB  init_C



     END
```

```
#include "system.h"
#include <stdio.h>
#include <mem.h>

UBYTE huge mem[0x40000L];
UBYTE huge *ptr, huge *ptrr;
void main(void)
     {
     FILE *fp;
     fp = fopen("bin.img","r+b");
     for ( ptr = mem; ptr < &mem[0x40000L] ;ptr+=0x400)
          {
          fread((UBYTE huge *)ptr,sizeof(UBYTE)*0x400,1,fp);
          }
     fclose(fp);
     fopen("lzb.rom","w+b");
     for ( ptr = &mem[0x8000],ptrr=&mem[0x10000L]; *(ptr+0x100) !=
0xFF;ptr+=0x10000L,ptrr+=0x4000L)
          {
          _fmemcpy(ptrr,ptr,0x4000L);
          _fmemset(ptr,0xFF,0x4000L);
          }
     for ( ptr = mem; ptr < &mem[0x20000L] ;ptr+=0x400)
          {
          fwrite((UBYTE huge *)ptr,sizeof(UBYTE)*0x400,1,fp);
          }
     fclose(fp);
     }
```

```
*     - DEF6811B.INC -
*
*     Include file containing 6801/6301/68HC11
*     differences.

      P68H11
proc6811  DEFINE    1
proc6801  DEFINE    0
proc6301  DEFINE    0
banking        DEFINE    1

      MACRO     %XGDX
      XGDX
      ENDMAC
```

```
#define TWOMHZ
#define SATO
//#define PSC
//#define PASSWORD

#ifdef TWOMHZ
#message "4 Mhz "
#endif

#ifdef SATO
#message "VERI-SCAN"
#else
#ifdef PSC
#message "QUICK CHECK OLV"
#else
#ifdef PASSWORD
#message "ILV-100"
#message "PASSWORD"
#else
#message "INSPECTOR V"
#endif
#endif
#endif
```

```
/*****************************************************************
*******
 *  Title:  DS.C - Laser Inspector Analysis Display Task
       *
 *  Ident:  Rev. A
                 *

******************************************************************
******
 *   Copyright (c) 1993     All rights reserved.
       *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be consTRUEd as a commitment by RJS,
Inc.   *
 *
    *
 *   RJS assumes no responsibility for the user or reliability of
    *
 *   its software on equipment that is not supplied by RJS.
    *
 *
    *

******************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------        -------        ---------
-----------------------------------

******************************************************************
```

```
******/

/*****************************************************************
*******
 * Include Files

******************************************************************
******/

#include "system.h"
#include "io6811.h"
#include "int6811.h"                          /*  only  for  HC11
system        */


#include "stdlib.h"
#include "string.h"
#include "stdio.h"

#include "dz.h"
#include "an.h"
#include "ds.h"                                         /* analysis
task header file*/
#include "sw.h"
#include "pr.h"
#include "lc.h"
#include "se.h"

#pragma codeseg(DS)

/*****************************************************************
********
 * Local Variables

******************************************************************
******/

#pragma memory = no_init

static UBYTE ds_pfmode;
static UBYTE ds_init;

#pragma memory = default

/*****************************************************************
********
 * Global Variables

******************************************************************
******/

extern const UBYTE C39USS_str[];
extern const UBYTE C39B1_str[];
extern const UBYTE C39B3_str[];
```

```
extern const UBYTE C39LOG_str[];
extern const UBYTE C39HIBC_str[];
extern const UBYTE C39ANSI_str[];
extern const UBYTE C39W43_str[];

extern const UBYTE I25USS_str[];
extern const UBYTE I25ANSI_str[];
extern const UBYTE I25CC_str[];

extern const UBYTE C93USS_str[];
extern const UBYTE C93ANSI_str[];

extern const UBYTE C128USS_str[];
extern const UBYTE C128ANSI_str[];


extern const UBYTE CBRUSS_str[];
extern const UBYTE CBRANSI_str[];


extern const UBYTE UPC80_str[];
extern const UBYTE UPC90_str[];
extern const UBYTE UPC116_str[];
extern const UBYTE UPC151_str[];
extern const char l_grade[];


/*****************************************************************
*******
 * string constants

*****************************************************************
******/

const UBYTE *ds_c39str[7] =
     {
     C39USS_str,    C39B1_str,     C39B3_str,     C39LOG_str,
C39HIBC_str,
     C39ANSI_str,C39W43_str
     };

const UBYTE *ds_I25str[3] =
     {
     I25USS_str,    I25ANSI_str, I25CC_str
     };

const UBYTE *ds_CBRstr[2] =
     {
     CBRUSS_str, CBRANSI_str
     };


const UBYTE *ds_C93str[2] =
     {
```

```
     C93USS_str, C93ANSI_str
     };

const UBYTE *ds_C128str[2] =
     {
     C128USS_str, C128ANSI_str
     };

const UBYTE *ds_ANYstr[1] =
     {
     "AUTOMATIC"
     };


const UBYTE *ds_UEstr[12] =
     {
     "UPC-A"          ,   "UPCA+2"          ,   "UPCA+5"
       ,
     "UPC-E"          ,   "UPCE+2"          ,   "UPCE+5"
       ,
     "EAN13"          ,   "EAN13+2"         ,   "EAN13+5"
       ,
     "EAN-8"          ,   "EAN8+2"          ,   "EAN8+5"
     };

const UBYTE *ds_UEMagStr[4] =
     {
     UPC90_str,    UPC116_str,    UPC151_str,    UPC80_str
     };

const UBYTE *ds_c39sstr[7] =
     {
     "U39"  ,"B-1"  ,"B345" ,"LOG"  ,"HIBC" ,"3of9" , "39+C"
     };

const UBYTE *ds_I25sstr[3] =
     {
     "U25"  , "I25" ,"CC"
     };

const UBYTE *ds_C128sstr[2] =
     {
     "U128", "C128"
     };

const UBYTE *ds_CBRsstr[2] =
     {
     "UCBR", "CBR"
     };


const UBYTE *ds_C93sstr[2] =
     {
     "UC93", "C93"
```

```
     };

const UBYTE *ds_UEsstr[12] =
     {
     "UPCA" ,"UA+2" ,"UA+5" ,"UPCE" ,"UE+2" ,"UE+5" ,
     "EN13" ,"13+2" ,"13+5" ,"EAN8" ,"E8+2" ,"E8+5"
     };

/*** NOTE **  The order of the following error messages
                 MUST not be changed
                    */

#define errbadchk   0x00
#define errformat   0x01
#define errrejw     0x02
#define errrejn     0x03
#define erref       0x04
#define errdcd      0x05
#define errwarnw    0x06
#define errwarnn    0x07
#define erratio     0x08
#define erricg      0x09
#define errqzss          0x0A

const UBYTE *ds_errmsg[11] =
     {
     "BAD MOD CK"     ,
     "FORMAT EROR"    ,
     "REJECT WIDE"    ,
     "REJECT NARR"    ,
     "FAIL REF."          ,
     "FAIL DCD."          ,
     "WARN WIDE"      ,
     "WARN NARROW"    ,
     "WARN RATIO"     ,
     "WARN ICG"           ,
     "WARN QZ/SS"
     };

const UBYTE *ds_longerr[12] =
     {
     "BAD MOD CHECK   " ,
     "FORMAT ERROR    " ,
     "REJECTED WIDE   " ,
     "REJECTED NARROW " ,
     "FAILURE REF. DEC" ,
     "FAILURE D/BILITY" ,
     "WARNING WIDE    " ,
     "WARNING NARROW  " ,
     "WARNING RATIO   " ,
     "WARNING ICG     " ,
     "WARNING QZ/SS   " ,
     "ACCEPTABLE      "
     };
```

```
/****************************************************************
*******
 * Local Prototypes

****************************************************************
******/
static void ds_PAdisplay(an_struct *);


/****************************************************************
*******
 * Function:         ds_RESET
 * Description:          Initialize analysis task for processing
 * Arguments:        none
 * Returns:              none

****************************************************************
******/

void ds_RESET(void)
     {
     if (ds_init != 0xA5)
          {
          ds_pfmode = 0;
          ds_init = 0xA5;
          }
     }

/****************************************************************
*******
 * Function:         ds_WRITE
 * Description:          Analysis main processing task
 * Arguments:        none
 * Returns:              none

****************************************************************
******/

void ds_WRITE(an_struct *ds)
     {
     ds_PAdisplay(ds);
     }

/****************************************************************
*******
 * Function:         ds_RESULT
 * Description:         Determine error message string based on
error
 * Arguments:        an_struct * - analysis structure pointer
 * Returns:              *UBYTE - error message number (255 = no
error)

****************************************************************
```

```
******/

static UBYTE ds_RESULTS(an_struct *ds)
     {

     if (ds->RESULTS.chkfail)           /* bad check digit
          */
          return(errbadchk);

     if (ds->RESULTS.formatfail)              /* format failure
               */
          return(errformat);

     if (ds->RESULTS.rejectw)           /* rejected wide
          */
          return(errrejw);

     if (ds->RESULTS.rejectn)                 /* rejected narrow
               */
          return(errrejn);

     if (ds->RESULTS.reffail)                 /*  referance  decode
failure        */
         return(erref);

     if (ds->RESULTS.dcdfail)                 /*    decodability
failure             */
          return(errdcd);

     if (ds->RESULTS.ratiofail)               /* ratio failure
               */
          return(errratio);

     if (ds->RESULTS.warnw)                   /* warning wide
                    */
          return(errwarnw);

     if (ds->RESULTS.warnn)                   /* warning narrow
               */
          return(errwarnn);

     if (ds->RESULTS.icgfail)           /* warning ICG failure
          */
          return(erricg);

     if (ds->RESULTS.qzfail)            /* quiet zone failure
          */
          return(errqzss);

     return(255);
     }

/*****************************************************************
```

```
*******
 * Function:          ds_WARNINGS
 * Description:          Determine error message string based on
error
 * Arguments:         an_struct * - analysis structure pointer
 *                       UBYTE *       - message string (must be
large enough)
 * Returns:              none

*****************************************************************
******/

void ds_WARNING(an_struct *ds, UBYTE *cp)
     {
     *cp = '\0';
     if (ds->RESULTS.good)
          {
          strcat(cp, ds_longerr[11]);
          return;
          }
     if (ds->RESULTS.chkfail)            /* bad check digit
          */
          strcat(cp, ds_longerr[errbadchk]);

     if (ds->RESULTS.formatfail)                /* format failure
               */
          strcat(cp, ds_longerr[errformat]);

     if (ds->RESULTS.rejectw)            /* rejected wide
          */
          strcat(cp, ds_longerr[errrejw]);

     if (ds->RESULTS.rejectn)                   /* rejected narrow
               */
          strcat(cp, ds_longerr[errrejn]);

     if (ds->RESULTS.reffail)                   /*  referance  decode
failure        */
          strcat(cp, ds_longerr[errref]);

     if (ds->RESULTS.dcdfail)                   /*    decodability
failure                  */
          strcat(cp, ds_longerr[errdcd]);

     if (ds->RESULTS.ratiofail)                 /* ratio failure
               */
          strcat(cp, ds_longerr[errratio]);

     if (ds->RESULTS.warnw)                     /* warning wide
                    */
          strcat(cp, ds_longerr[errwarnw]);

     if (ds->RESULTS.warnn)                     /* warning narrow
               */
```

```
          strcat(cp, ds_longerr[errwarnn]);

     if (ds->RESULTS.icgfail)            /* warning ICG
          */
          strcat(cp, ds_longerr[erricg]);

     if (ds->RESULTS.qzfail)             /* quiet zone failure
          */
          strcat(cp, ds_longerr[errqzss]);
     }

/****************************************************************
*******
 * Function:        ds_LONGNAME
 * Description:         Obtain symbology text based on type/subtype
 * Arguments:       UBYTE        - barcode symbology type
 *                       UBYTE          - barcode subsymbology type
 * Returns:              UBYTE *      - pointer to text string

****************************************************************
******/

static UBYTE ue_str[25];
UBYTE *ds_UPC( UBYTE subtype)
     {
     UBYTE *cp;

     ue_str[0] = '\0';
     strcpy(ue_str, ds_UEMagStr[subtype % 4]);
     strcat(ue_str, " ");
     strcat(ue_str, "UPC/EAN");
     cp = ue_str;
     return(cp);
     }

UBYTE *ds_LONGNAME(UBYTE type, UBYTE subtype)
     {
     UBYTE *cp;
     switch (type)
          {
          case C39:                     /* code 39
               */
               cp = ds_c39str[subtype];
               break;
          case I25:
               cp = ds_I25str[subtype];
               break;
          case C128:
               cp = ds_C128str[subtype];
               break;
          case CBR:
               cp = ds_CBRstr[subtype];
               break;
          case C93:
```

```
               cp = ds_C93str[subtype];
               break;
          case UPC:
               ue_str[0] = '\0';
               strcpy(ue_str, ds_UEMagStr[subtype % 4]);
               strcat(ue_str, " ");
               strcat(ue_str, ds_UEstr[subtype / 4]);
               cp = ue_str;
               break;
          default:
               cp = ds_ANYstr[0];
               break;
          }
     return(cp);
     }

/**************************************************************
*******
 * Function:          ds_PFTOP
 * Description:            Display top pass/fail line
 * Arguments:         an_struct * - analysis structure pointer
 *                         UBYTE           - start of decoded data
position
 * Returns:                none

**************************************************************
******/


static UBYTE ds_PFTOP(an_struct *ds, UBYTE start)
     {
     UBYTE tx, *cp, *c8_b1;
     UBYTE chars;

     lc_LINE1B();                              /* blank out first
line           */
     lc_LINE2B();                              /* blank out second
LCD line  */
     switch (ds->STYPE)
          {
          case C39:
          case I25:
          case UPC:
          case CBR:
          case C93:
               chars = strlen(ds->SBUF);
               lc_PUTCS(0, &ds->SBUF[start], dc_1); /* put first
decode line on LCD  */
               break;

          case C128:
               c8_b1 = (UBYTE *)malloc(max_symbol * 2);
               chars = C128_CBUF(ds->SBUF, c8_b1, ds->CHARS-2);
               lc_PUTCS(0, &c8_b1[start], dc_1);
```

```
                free(c8_b1);
                break;
           }
     tx = ds_RESULTS(ds);                         /* get results message
string     */
     if (tx == 255)                               /* acceptable scan (no
errors) ?*/
          {
          cp = ds_LONGNAME(ds->STYPE,ds->SUBTYPE);
          lc_PUTS(24 - strlen(cp) / 2, cp); /* output long form of
type */
          }
     else
          {
          lc_PUTS(21, ds_errmsg[tx]);     /* output error message
          */
          switch (ds->STYPE)
               {
               case C39:                          /* code 39
                    */
                    cp = ds_c39sstr[ds->SUBTYPE];
                    break;
               case I25:
                    cp = ds_I25sstr[ds->SUBTYPE];
                    break;
               case C128:
                    cp = ds_C128sstr[ds->SUBTYPE];
                    break;
               case CBR:
                    cp = ds_CBRsstr[ds->SUBTYPE];
                    break;
               case C93:
                    cp = ds_C93sstr[ds->SUBTYPE];
                    break;
               case UPC:
                    cp = ds_UEsstr[(ds->SUBTYPE / 4)];
                    break;
               }
          lc_PUTS(16, cp);
                                                       /* extract short
subtype text   */
          }
     lc_WRITE();
     return(chars);
     }

/****************************************************************
*******
 * Function:         ds_PFgain
 * Description:          Calculate gain graph position
 * Arguments:        WORD              - gain
 *                       an_struct  *  -  pointer  to  analysis
structure
 * Returns:              UBYTE - graph position (0 - 15)
```

```
*****************************************************************
******/

BYTE ds_PFgain(WORD gain, an_struct *ds)
     {
     WORD tpos;

     tpos = (((gain * 100) / ds->TOLER) * 7) / 100;    /*   graph
position  */
     if (tpos < -7) tpos = -7;                       /*   make   sure
within range        */
     if (tpos >  7) tpos = 7;
     if (tpos >= 0) tpos++;
     return ((BYTE)tpos + 7);
     }

/*****************************************************************
*******
 * Function:         ds_PAdisplay
 * Description:          Analysis Realtime Mode Display
 * Arguments:        an_struct * - analysis structure pointer
 * Returns:               none

*****************************************************************
******/


static void ds_PAdisplay(an_struct *ds)
     {
     UBYTE cp[17];

     ds_PFTOP(ds, 0);                           /* output first screen
on text   */
     ds_GRAPH(ds, cp);
     cp[16] = '\0';
     lc_PUTS(16, cp);
     lc_WRITE();
     }

/*****************************************************************
*******
 * Function:         ds_PFdisplay
 * Description:          Analysis Pass/Fail Mode Display
 * Arguments:        an_struct * - analysis structure pointer
 * Returns:               none

*****************************************************************
******/

void ds_PFdisplay(an_struct *ds)
     {
     UBYTE ds_max, ds_select,chars;
     UBYTE cp[17],tx,*cptr,*pass_fail_str, *c8_b1, *c8_b2;
```

```
     UWORD d1,d2;

     chars = ds_PFTOP(ds, 0);                                  /*  output
first screen on text     */
     ds_max = chars / 16;                 /*  calculate  #lines  to
display   */
     if (!(chars % 16)) ds_max--;
     ds_select = 0;                                 /*    current    line
displayed      */
     while (1)
          {
          sw_WAIT();                                     /*  wait  for  a
button press        */
          if (sw_PRINT() || sw_DATA()) return;
          if (sw_SELECT())                               /* select button
pressed ?       */
               {
               ds_select++;                              /* update to next
screen          */
               if (ds_select > ds_max) ds_select = 0;
               ds_PFTOP(ds, ds_select * 16);
               }
          if (sw_ENTER())                                     /*    enter
button pressed       */
               {
               while (1)
                    {
                    lc_LINE1B();                  /*    blank    LED
display   */
                    lc_LINE2B();
                    switch (ds_pfmode)
                         {
                         case 0:                              /* analysis
results screen */
                              cptr    =    ds_LONGNAME(ds->STYPE,
ds->SUBTYPE);
                              lc_PUTS(8  -  (strlen(cptr)  /  2),
cptr);
                              tx = ds_RESULTS(ds);
                              if (tx == 255) tx = 11;
                              lc_PUTS(16, ds_longerr[tx]);/* output
error message  */
                              lc_WRITE();
                              break;

                         case 1:                              /*  decode
screen               */
                              switch (ds->STYPE)
                                   {
                                   case C39:
                                   case I25:
                                   case UPC:
                                   case CBR:
                                   case C93:
```

```
                lc_PUTCS(0, ds->SBUF, 32);
                lc_WRITE();
                break;

            case C128:
                c8_b1 = (UBYTE *)malloc(max_symbol * 2);
                c8_b2 = (UBYTE *)malloc(max_symbol * 2);
                C128_BUF(ds->SBUF, c8_b1, c8_b2, ds->CHARS);
                lc_PUTCS(0, c8_b1, 16);
                lc_PUTCS(16, c8_b2, 16);
                lc_WRITE();
                free(c8_b1);
                free(c8_b2);
                break;
            }
        break;

    case 2:                                     /* mod check screen */
        if ((ds->MODCKIS[0]) || (ds->STYPE == C128))
            {
            pass_fail_str = pass_fail(ds->RESULTS.chkfail);
            //prt mod chk
            switch (ds->STYPE)
                {
                case C39:
                case I25:
                case UPC:
                case CBR:
                    sprintf(cp,"MODCK: %c %s",ds->MODCKIS[0],pass_fail_str);
                    lc_PUTS(0, cp);
                    sprintf(cp,"EXPECT:%c",ds->MODCKSB[0]);
                    lc_PUTS(16, cp);
                    lc_WRITE();
                    break;

                case C128:
                    sprintf(cp,"MODCK: %3d %s",ds->MODCKIS[0],pass_fail_str );
                    lc_PUTS(0, cp);
                    sprintf(cp,"EXPECT:%3d",ds->MODCKSB[0]);
                    lc_PUTS(16, cp);
                    lc_WRITE();
                    break;

                case C93:
```

```
                                        sprintf(cp, "MODCK: %c
%c %s",ds->MODCKIS[0],ds->MODCKIS[1],pass_fail_str );
                                        lc_PUTS(0, cp);
                                        sprintf(cp, "EXPECT:%c
%c",ds->MODCKSB[0],ds->MODCKSB[1]);
                                        lc_PUTS(16,cp);
                                        lc_WRITE();
                                        break;
                                    }
                              break;
                              }
                        else
                              {
                              ds_pfmode++;
                              }
                  case 3:                               /*   ratio
screen            */
                        if (ds->RATIO != 0)
                              {
                              d1 = ds->RATIO/10;
//prt ratio
                              d2 = ds->RATIO%10;
                              s p r i n t f ( c p , " R A T I O :
%1d.%1d",d1,d2);
                              lc_PUTS(0, cp);
                              lc_WRITE();
                              break;
                              }
                        else
                              {
                              ds_pfmode++;
                              }
                  case 4:                               /*    scan
profile screen      */
                        sprintf(cp,    "D/BILITY:    0.%02d
%c",ds->DECODABILITY,l_grade[ds->DECGRADE]);
                        lc_PUTS(0, cp);
                        sprintf(cp,   "REF.   DEC:
%c",l_grade[ds->REFGRADE]);
                        lc_PUTS(16, cp);
                        lc_WRITE();
                        break;
                  case 5:                               /*   graph
screen            */
                        sprintf(cp, "-100%% TOL. +100%%");
                        lc_PUTS(0, cp);
                        ds_GRAPH(ds, cp);
                        lc_PUTS(16, cp);
                        lc_WRITE();
                        break;
                  default:
                        ds_pfmode = 0;
                  }
```

```
                    sw_WAIT();
                    if (sw_PRINT() || sw_DATA()) return;
                    if (sw_ENTER()) break;          /*    out    of
detailed screens    */
                    if (sw_SELECT())
                         {
                         ds_pfmode++;
                         if (ds_pfmode > 5) ds_pfmode = 0;
                         }
                    }
               ds_PFTOP(ds, 0);                          /*  output
first screen on text     */
               ds_select = 0;                            /* current
line displayed      */
               }
          }
     }


/***************************************************************
*******
 * Function:         ds_GRAPH
 * Description:          Analysis gain graph
 * Arguments:        an_struct * - analysis structure pointer
 *                        UBYTE *     - pointer to string to build
graph
 * Returns:               NONE

***************************************************************
******/

void ds_GRAPH(an_struct *an, UBYTE *cp)
     {
     UBYTE min_p,avg_p,max_p,j;

     min_p = ds_PFgain(an->MIN_GAIN, an);
     max_p = ds_PFgain(an->MAX_GAIN, an);
     avg_p = ds_PFgain(an->AVG_GAIN, an);

     strcpy(cp,"--------++++++++");
     for(j = min_p; j<= max_p; j++ )
          {
          cp[j] = 'R';
          }
     if (abs(an->AVG_GAIN) <= an->TOLER)     /* only place the A on
the graph*/
          {                                       /*    when    the
average gain is     */
          cp[avg_p] = 'A';                   /*  actually  on  the
graph !!       */
          }
     }
```

```
/*****************************************************************
*******
 *  Title:  DS.H - Laser Inspector Display Header File
        *
 *  Ident:  Rev. A
                  *

******************************************************************
******
 *   Copyright (c) 1993     All rights reserved.
        *
 *
    *
 *   This software is furnished under a license and may be used and
  *
 *   copied only in accordance with the terms of such license and
    *
 *     with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

******************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------        -------        ---------
----------------------------------

******************************************************************
```

```
******/

/*****************************************************************
*******
 * global contants

*****************************************************************
******/

#define GRADE_A          4
#define GRADE_B          3
#define GRADE_C          2
#define GRADE_D          1
#define GRADE_F          0

/*****************************************************************
********
 Function Prototypes

*****************************************************************
******/

void ds_RESET(void);                                   /* analysis task
reset          */
void ds_WRITE(an_struct *);
BYTE ds_PFgain(WORD, an_struct *);
UBYTE *ds_LONGNAME(UBYTE, UBYTE);
UBYTE *ds_UPC(UBYTE);
void ds_WARNING(an_struct *, UBYTE *);
void ds_GRAPH(an_struct *, UBYTE *);
void ds_PFdisplay(an_struct *);
```

```
/*****************************************************************
*******
 *  Title:  DIG.C - Digital Buffer Controller
                *
 *  Ident:  Rev. A
                     *

*****************************************************************
******
 *   Copyright (c) 1993     All rights reserved.
         *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------        -------        ---------
----------------------------------

*****************************************************************
```

```
******/

/*****************************************************************
*******
 * Include Files

******************************************************************
******/

#include "string.h"
#include "system.h"
#include "io6811.h"

#include "stdio.h"

#include "mm.h"
#include "dz.h"

#pragma codeseg(DZ)

/*****************************************************************
********
 * Local Variables

******************************************************************
******/

#pragma memory = zpage


UWORD wb_width,nb_width,ws_width,ns_width;

UWORD     TEMP[16],TEMPX[16];

WORD  TEMPX_sli;            /* temp storage for gain value
       */




UWORD     *dz_sptr;                        /*    scan    buffer
pointer        */


UWORD     symbactv;                        / *    a c t i v e
symbologies         */
UWORD     *diststrt;                            /* holding buffer
start pointer  */
UWORD     *diststop;                            /* holding buffer
end pointer*/
UWORD     *distlast;
UWORD   *distbegin,*distend;          /* scan buffer start/end */
```

```
UBYTE     QZRESULT,DECODFLG,BACKWARDS,SUCCESS,STYPE,SUBTYPE;
UBYTE     CHARS;
WORD    MIN_GAIN,AVG_GAIN,MAX_GAIN;
UWORD     AVG_NARROW;
UWORD     AVG_WIDE;
UWORD   QZ_LEAD, QZ_TRAIL;
UBYTE     MODCK[2];
UWORD     DECODABILITY;
UBYTE   icg_flag;
UBYTE   utype,uadndm;
UWORD   Z,W;

#pragma memory = no_init

UBYTE     SBUF[max_symbol];
UBYTE   qzb0[max_symbol];

#pragma memory = default

extern void D3START(void);
extern non_banked void ILSTART(void);
extern non_banked void uestart(void);
extern non_banked void c8start(void);
extern void cbstart(void);
extern void c9start(void);

extern UBYTE pz1,pw1,vflg;
extern UWORD pz2,pw2,pqt;
#pragma memory = default

/*****************************************************************
*******
 * Function:         dz_RESET
 * Description:           Initialize digital buffer processing
 * Arguments:        none
 * Returns:               none

******************************************************************
******/

static void dz_RESET(void)
     {
//   symbactv = 0xffff;
     QZRESULT = 0;
     DECODFLG = 0;
     CHARS = 0;
     BACKWARDS = 0;
     AVG_GAIN = 0;
     AVG_NARROW = 0;
     AVG_WIDE = 0;
     MODCK[0] = 0;
     MODCK[1] = 0;
     SUCCESS = 0;
     icg_flag = 0;
```

```
     Z = W = 0;
     MIN_GAIN = 32767;
     MAX_GAIN = -1;
     DECODABILITY = -1;
     memclr(SBUF, max_symbol);
     vflg = pz1 = pw1 = pz2 = pw2 = pqt = 0;

     }


/*****************************************************************
*******
 * Function:        dz_SCAN
 * Description:          Obtain digital data from laser gun
 * Arguments:       none
 * Returns:              BOOLEAN - true:successful

******************************************************************
******/


BOOLEAN dz_SCAN(void)
     {
     UBYTE idx;
     UWORD *ws_ptr;
     UWORD ratio;


     SUCCESS = 0;
     while (diststop - diststrt >= 19)
                                                              /* must have
at least 2qz's */
          {                                                   /*  plus  9
bars and 8 spaces   */

          nb_width = ns_width = 32767;
          ws_width = wb_width = 0;
          dz_sptr = diststrt;

          dz_sptr++;
          if (*dz_sptr < nb_width) nb_width = *dz_sptr; /* find the
smallest bar*/
          if (*dz_sptr > wb_width) wb_width = *dz_sptr;

          dz_sptr++;
          if (*dz_sptr < ns_width) ns_width = *dz_sptr;/* and the
smallest space*/
          if (*dz_sptr > ws_width)      /* find widest space
          */
               {
               ws_width = *dz_sptr;
               ws_ptr = dz_sptr;
               }
```

```
          dz_sptr++;
          if (*dz_sptr < nb_width) nb_width = *dz_sptr; /* find the
smallest bar*/
          if (*dz_sptr > wb_width) wb_width = *dz_sptr;

          dz_sptr++;
          if (*dz_sptr < ns_width) ns_width = *dz_sptr;/* and the
smallest space*/
          if (*dz_sptr > ws_width)
               {
               ws_width = *dz_sptr;
               ws_ptr = dz_sptr;
               }

          dz_sptr++;
          if (*dz_sptr < nb_width) nb_width = *dz_sptr; /* find the
smallest bar*/
          if (*dz_sptr > wb_width) wb_width = *dz_sptr;

          dz_sptr++;
          if (*dz_sptr < ns_width) ns_width = *dz_sptr;/* and the
smallest space*/
          if (*dz_sptr > ws_width)
               {
               ws_width = *dz_sptr;
               ws_ptr = dz_sptr;
               }


/* rule #1 - Widest Space must be less than 5 times narrowest bar
*/
/* rule #2 - Widest Bar  must be less than 5 times narrowest space
*/

          if  ((ws_width < (6 * nb_width)) && (wb_width < (6 *
ns_width)))
               {
/* rule #3 - narrowest bar and narrowest space must be within 1.6
times */
               if ((ns_width < (16 * nb_width / 10)) &&
                   (nb_width < (16 * ns_width / 10)))
                     {
                     ns_width = (ns_width + nb_width) / 2 * 6;     /*
6x module size       */

                     dz_sptr = diststrt;

                     if ((ns_width < *(dz_sptr+0)) &&
                          (ns_width > *(dz_sptr+2)) &&
                          (ns_width > *(dz_sptr+4)) &&
                          (ns_width > *(dz_sptr+6)))
                          {
                          idx = 0;
                          while (idx < 6)
```

```
                    {
                    dz_RESET();
                    switch (idx++)
                         {
                         case 0:
                              D3START();
                              break;
                         case 1: ILSTART(); break;
                         case 2: uestart(); break;
                         case 3: c8start(); break;
                         case 4: cbstart(); break;
                         case 5: c9start(); break;
                         }
                    if (SUCCESS & good_scan)
                         {
                         if (CHARS >= 4)
                              {
                      /****************/
                              if (STYPE & 0x04)
                                   {
                                   switch (utype)
                                        {
                                        case 1:
                                             CHARS     =
12;break;
                                        case 2:
                                             CHARS     =
8;break;
                                        case 4:
                                             CHARS     =
8;break;
                                        case 8:
                                             CHARS     =
13;break;
                                        }
                                   switch (uadndm)
                                        {
                                        case 1:
                                             CHARS     =
CHARS + 2;break;
                                        case 255:
                                             CHARS     =
CHARS + 5;break;
                                        }
                                   }
                      /****************/
                              break;/*  good  scan,4  or
more symbol characters */
                              }
/*****************************************************************
**********/
                         else if (CHARS < 4)
                              {
                              diststrt  =  distbegin  =
```

```
diststop;/* move pointers over previous */
                                        diststop   =   distend   =
distlast;
                                        }
/*****************************************************************
**********/
//                                 else if (STYPE & 0x13)
                                        {
                                        ratio    =    AVG_WIDE    /
AVG_NARROW;
                                        if (ratio < 1 || ratio > 5)
                                             {
                                             diststrt = distbegin
= diststop;/* move pointers over previous    */
                                             diststop = distend =
distlast;
                                             }
                                        }
                                   }
                              }
                         if (SUCCESS & good_scan)
                              {
                              QZ_LEAD  = *diststrt;
                              QZ_TRAIL = *diststop;
                              break;
                              }
                         diststrt = ws_ptr;
                         }
                    else
                         {
                         diststrt += 8;
                         }
                    }
               else
                    {
                    diststrt += 8;
                    }
               }
          else
               {
               diststrt = ws_ptr;
               }
          }
     return (SUCCESS & good_scan);
     }

non_banked void clrbuf(void)
     {
     memclr(SBUF, max_symbol);
     }

non_banked void clrsbuf(void)
     {

     memset(SBUF, 0x20, max_symbol);
     }
```

```
/*****************************************************************
********
 *  Title:  DIG - Digital Buffer Controller Module Header File
         *
 *  Ident:  X0.00
                    *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *

*****************************************************************
*******
 *
 *  Modification History
 *
 *  WHEN        WHO        VERSION        WHAT
 *   ----       ---        -------
-------------------------------------
 * 19-NOV-92   DRP        X0.00          Original Writing

*****************************************************************
*******/

/*****************************************************************
```

```
*********
 * global variables

******************************************************************
********/

#define C39             0x01
#define I25             0x02
#define UPC             0x04
#define C128        0x08
#define CBR             0x10
#define C93             0x20
#define C16K        0x40


#define max_symbol 64
#define good_scan  0x80


#pragma memory = default

#pragma memory = zpage

extern    UWORD     symbactv;                        /*  active
symbologies         */
extern    UWORD     *diststrt;                            /   *
buffer start pointer         */
extern    UWORD     *diststop;                            /   *
buffer end pointer       */
extern  UWORD   *distbegin,*distend;           /*  scan  buffer
start/end */
extern    UWORD     *distlast;                            /   *
buffer end pointer       */

extern    UBYTE
QZRESULT,DECODFLG,BACKWARDS,SUCCESS,STYPE,SUBTYPE;
extern    UBYTE     CHARS, spr_CHARS;
extern    WORD      MIN_GAIN;
extern    WORD AVG_GAIN;
extern    WORD MAX_GAIN;
extern    UWORD     AVG_NARROW;
extern    UWORD     AVG_WIDE;
extern  UWORD   QZ_LEAD,QZ_TRAIL;
extern    UBYTE     MODCK[2];
extern    UWORD     DECODABILITY;
extern  UBYTE   icg_flag;
extern  UBYTE   utype,uadndm;
extern  UWORD  Z,W;

#pragma memory = default

extern    UBYTE     SBUF[max_symbol];
extern  UBYTE   qzb0[max_symbol];
```

```
/*****************************************************************
********
 Function Prototypes

******************************************************************
******/

BOOLEAN dz_SCAN(void);                            /* decode digital data
buffer     */
```

```
/***************************************************************
*******
 *  Title:  GN.C - Laser Inspector GUN Controller
        *
 *  Ident:  Rev. A
                   *

****************************************************************
******
 *   Copyright (c) 1993     All rights reserved.
        *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be consTRUEd as a commitment by RJS,
Inc.    *
 *
    *
 *   RJS assumes no responsibility for the user or reliability of
    *
 *   its software on equipment that is not supplied by RJS.
    *
 *
    *

****************************************************************
******
 *
 *  Abstract:
 *
 *  Author:      Donald R. Palmer, 22-JUL-93, Version X0.00
 *
 *  Modification History
 *
 *  Date         Who     Version     Why
  *    ----------         -------         ---------
----------------------------------
 * 22-JUL-93   DRP       Rev A.        Original Writing
```

```
*****************************************************************
******/

/****************************************************************
*******
 * Include Files

*****************************************************************
******/

#include "system.h"
#include "io6811.h"
#include "int6811.h"                         /*  only  for  HC11
system       */
#include "stdlib.h"
#include "stdio.h"

#include "as.h"
#include "wb.h"                                        /*    wrap
buffer header file  */
#include "dz.h"                                        /* decoder
header file        */
#include "sn.h"
#include "gn.h"                                        /*    our
header file             */

#pragma codeseg(GN)

/****************************************************************
********
 * Local Macros

*****************************************************************
******/

#define   gn_enable 0x80

/****************************************************************
********
 * Local Structures

*****************************************************************
******/

typedef struct
     {
     UWORD *gn_dist;                                   /* start of
distance buffer     */
     UWORD *gn_distend;                           /*    end    of
distance buffer     */
     UBYTE gn_digstart;                           /*  startup  on
black flag     */
     } gn_struct;
```

```
/**************************************************************
********
 * Local Variables

***************************************************************
******/

#pragma memory = zpage

static UBYTE gn_power;                          /*   power   up
byte            */
static UBYTE gn_SOScnt;                         /* SOS counter
                */
static UBYTE gn_digstat;                    /* scan start digital
status*/
static UBYTE gn_idx;
static UBYTE gn_markflg;
static UWORD *gn_mark;
UWORD gn_temp;
UWORD *gn_start,*gn_end,*gn_stop;
UWORD gn_time;
static BOOLEAN gn_leading;                      /*  leading  SOS
flag            */

#pragma memory = default

#define gn_bufsize 15                           /*   ten   scan
buffers max         */
#define gn_scbufsize 512                    /* .5k words per scan
          */

static UWORD     gn_dbuf[gn_bufsize][gn_scbufsize];
static gn_struct gn_buf[gn_bufsize];

static WB_BUF  gn_freebuf;                       /* ring buffer of
indexes    */
static UBYTE    gn_freearea[gn_bufsize];    /*   to the gun scan
struct     */
static WB_BUF  gn_usedbuf;                       /* ring buffer of
indexes    */
static UBYTE    gn_usedarea[gn_bufsize];    /*   to the gun scan
struct     */


static gn_struct *gn_scanptr;
/**************************************************************
*******
 * Function:        gn_RESET
 * Description:          Initialize gun for processing
 * Arguments:       none
 * Returns:              none

***************************************************************
******/
```

```
void gn_RESET(void)
     {
     UBYTE idx;

     TCTL2 |= (edg1a + edg1b);              /* IC1 capture on any
edge      */
     TCTL2 |= (edg2a + edg2b);              /* IC2 caputre on any
edge      */
     PACTL = 0;
     PACTL |= ddra7;                             /*   A7->output
(Scan Enable)        */
     gn_SOScnt = gn_power = 0;              /*   clear   out   SOS
counter        */
     gn_markflg = FALSE;
     gn_mark = NULL;
     WBInit(&gn_freebuf, gn_freearea, gn_bufsize);
     WBInit(&gn_usedbuf, gn_usedarea, gn_bufsize);
     for (idx = 0; idx < gn_bufsize; idx++)
          {
          WBPutD(&gn_freebuf, idx);
          gn_buf[idx].gn_dist = (UWORD *)&gn_dbuf[idx];
          gn_buf[idx].gn_distend     =     gn_buf[idx].gn_dist     +
gn_scbufsize;
          }
     gn_POWEROFF();                         /* power gun off to
start          */
     }

/*****************************************************************
*******
 * Function:        gn_SCAN
 * Description:          Obtain new data from laser scanner
 * Arguments:       none
 * Returns:              none

******************************************************************
******/

void gn_SCAN(void)
     {
//   UWORD icnt,ycnt;
     UBYTE err;

     while (WBStatus(&gn_usedbuf) == 0) wait_for_interrupt();
     gn_idx = WBGet(&gn_usedbuf, &err);
     gn_scanptr = (gn_struct *)&gn_buf[gn_idx];
     distlast = diststop = distend = gn_scanptr->gn_distend;
     diststrt   =   distbegin   =   gn_scanptr->gn_dist;/*   update
beginning/end of scan     */
     if ((gn_markflg) && (diststrt == gn_mark)) /* this scan been
marked         */
               {
               sn_SETSIGNAL();                       /*  setup  synch
signal flag          */
```

```
                gn_markflg = FALSE;           /* clear out our own
mark flag */
                gn_mark = NULL;
                }
//   icnt = WBStatus(&gn_usedbuf);
//   ycnt = WBStatus(&gn_freebuf);
//   printf("bs: %d:%d\r",icnt,ycnt);
     dz_SCAN();                                    /*  attempt  to
decode the scan      */
     }

/**************************************************************
*******
 * Function:         gn_RESCAN
 * Description:           Obtain new data from laser scanner
 * Arguments:        none
 * Returns:               none

**************************************************************
******/

void gn_RESCAN(void)
     {
     diststrt = distbegin = diststop;                  /*    move
pointers over previous   */
     diststop = distend = distlast;
     dz_SCAN();                                    /*  attempt  to
decode the scan      */
     }


/**************************************************************
*******
 * Function:         gn_POWERON
 * Description:           power up gun + interrupt from cold start
 * Arguments:        none
 * Returns:               none

**************************************************************
******/

void gn_POWERON(void)
     {
     if (!gn_power) PORTA |= gn_enable; /* turn on power to gun
     */
     TFLG1 = ic1f;                           /* reset SOS interrupt
flag */
     TMSK1 |= ic1i;                          /*    start    SOS
interrupt       */
     gn_power = TRUE;                        /*   flag   the   gun
powered up      */
     gn_leading = TRUE;                      /*    update    first
interrupt flag */
     gn_SOScnt = 10;                              /* wait for 10
```

```
SOS's          */
     }

/*****************************************************************
*******
 * Function:          gn_BEAMON
 * Description:            power up gun only from a cold start
 * Arguments:         none
 * Returns:                none

*****************************************************************
******/

void gn_BEAMON(void)
     {

     if (gn_power) gn_POWEROFF();              /*  turn  off  gun
interrupt */
     PORTA |= gn_enable;                            /* turn on power
to gun         */
     gn_power = TRUE;
     }



/*****************************************************************
*******
 * Function:          gn_POWEROFF
 * Description:            power down gun
 * Arguments:         none
 * Returns:                none

*****************************************************************
******/

void gn_POWEROFF(void)
     {

     PORTA &= ~(gn_enable);                         /* turn off power
to gun     */
     TMSK1 &= ~ic1i;                                     /* stop SOS
interrupt      */
     gn_power = FALSE;                              /* show power is
off        */
     }
/*****************************************************************
*******
 * Function:          gn_FREE
 * Description:            Free last used gun scan buffer to heap
 * Arguments:         none
 * Returns:                none

*****************************************************************
******/
```

```
void gn_FREE(void)
     {
     UBYTE err;
     err=WBPut(&gn_freebuf, gn_idx);
     }

/*****************************************************************
*******
 * Function:          gn_CLEAR
 * Description:            Free all used gun scan buffer to heap
 * Arguments:         none
 * Returns:                none

******************************************************************
******/

void gn_CLEAR(void)
     {
     UBYTE idx;

     disable_interrupt();
     WBInit(&gn_freebuf, gn_freearea, gn_bufsize);
     WBInit(&gn_usedbuf, gn_usedarea, gn_bufsize);
     for (idx = 0; idx < gn_bufsize; idx++)
          {
          WBPutD(&gn_freebuf, idx);
          gn_buf[idx].gn_dist = (UWORD *)&gn_dbuf[idx];
          gn_buf[idx].gn_distend     =     gn_buf[idx].gn_dist     +
gn_scbufsize;
          }
     gn_leading = TRUE;
     gn_markflg = FALSE;
     gn_mark = NULL;
     enable_interrupt();
     }

/*****************************************************************
*******
 * Function:          gn_MARKNEXT
 * Description:            Mark  next  scan  for  the  Sync  signal
processor
 * Arguments:         none
 * Returns:                none

******************************************************************
******/

void gn_MARKNEXT(void)
     {
     disable_interrupt();
     gn_markflg = TRUE;
     enable_interrupt();
     }
```

```
/****************************************************************
*******
 * Function:        TIC1_interrupt
 * Description:          SOS interrupt handler
 * Arguments:       none
 * Returns:              none

*****************************************************************
******/

static gn_struct *gptr;
static UBYTE gn_freeidx;
static UBYTE err;

void gn1_interrupt(void)
     {
     if (!gn_SOScnt)
          {
          gn_SOScnt--;
          return;
          }
     if (!gn_leading)                         /*  not  first  time
through   */
          {                                        /*   finish   up
previous scan */
          gn_temp = TIC1 - gn_temp;          /* store last data in
buffer*/
          if (gn_temp > 0X7FFF) gn_temp = ~gn_temp;
          *gn_end++ = gn_temp;               /*   put   away   last
data      */
          gptr->gn_distend = gn_end;
          gptr->gn_digstart = gn_digstat;
          if (WBPutD(&gn_usedbuf, gn_freeidx)) /* add to wrap-buffer
?    */
               {
               WBPutD(&gn_freebuf, gn_freeidx);    /* no - clean up
memory    */
               }
          else
               {
               if (gn_markflg)
                    {
                    gn_mark = gn_start;       /* mark start of next
synch     */
                    }
               }
          }                                   /*    previous    scan
closed out     */
     TFLG1 = ic1i;
     gn_freeidx = WBGetD(&gn_freebuf, &err); /*  grab  next  free
buffer    */
     if (!err)
          {
          gn_temp = TIC1;
```

```
          gn_leading = FALSE;
          gptr = (gn_struct *)&gn_buf[gn_freeidx];
          gn_start = gptr->gn_dist;          /* use globals for
quick access   */
          gn_end = gn_start;
          gn_stop  = gn_end + gn_scbufsize;
          gn_digstat = (PORTA & ic2f);  /*  save  gun  digital
status    */
          TFLG1 = ic2f;                      /*  clear  pending
digital interrupt */
          TMSK1 |= ic2f;                     /*  enable  digital
interrupt */
          enable_interrupt();
          }
     else
          {
          TFLG1 = ic2f;                      /*  clear  pending
digital interrupt */
          TMSK1 &= ~ic2f;                         /*  disable
digital interrupt   */
          gn_leading = TRUE;                 /*  show  no  scan
opened           */
          }
     }
```

GN.H

```
/*****************************************************************
*******
 *  Title:  GUN.H - Laser Inspector GUN Controller Header File
        *
 *  Ident:  Rev. A
                   *

*****************************************************************
******
 *   Copyright (c) 1993     All rights reserved.
        *
 *
    *
 *   This software is furnished under a license and may be used and
  *
 *   copied only in accordance with the terms of such license and
    *
 *    with the inclusion of the above copyright notice.  This
software  *
 *   or any other copies thereof may not be provided or otherwise
    *
 *   made available to any other person. No title to and ownership
of *
 *   the software is hereby transferred.
    *
 *
    *
 *   The information in this software is subject to change without
   *
 *    notice and should not be construed as a commitment by RJS,
Inc.   *
 *
    *
 *   RJS assumes no responsibility for the user or reliability of
    *
 *   its software on equipment that is not supplied by RJS.
    *
 *
    *
*****************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------        -------       ---------
-----------------------------------
*****************************************************************
```

```
/*****************************************************************
********
 *  Title:  HT - Scan History Buffer Control Module
                  *
 *  Ident:  X0.00
                      *

*****************************************************************
*******
 *   Copyright (c) 1989, 1990, 1991, 1992    All rights reserved.
    *
 *
     *
 *  This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *  made available to any other person.  No title to and ownership
of   *
 *   the software is hereby transferred.
     *
 *
     *
 *  The information in this software is subject to change without
    *
 *   notice and should not be construed as a commitment by RJS,
Inc.    *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
------------------------------------
 * 19-NOV-92   DRP       X0.00          Original Writing
```

```
*****************************************************************
*******/

/****************************************************************
********
 Include Files

*****************************************************************
*******/

#include "system.h"
#include "io6811.h"
#include "stdlib.h"
#include "stdio.h"
#include "string.h"

#include "mm.h"
#include "wb.h"
#include "dz.h"
#include "an.h"
#include "pt.h"
#include "pa.h"
#include "ht.h"

/****************************************************************
*******
 * Local Variables

*****************************************************************
******/


#pragma memory = no_init

static UBYTE ht_init;                        /*    initialization
detection      */
static UBYTE ht_current;
static ht_struct htp[htp_size];              /*    scan    history
buffer          */
static WB_BUF ht_freebuf,ht_usedbuf;
static UBYTE  ht_freebufarea[htp_size], ht_usedbufarea[htp_size];
UBYTE ht_full;
#pragma memory = default


/****************************************************************
*******
 * Function:        ht_RESET
 * Description:          Initialize system for processing
 * Arguments:       none
 * Returns:              none
```

```
*****************************************************************
******/

void ht_RESET(void)
     {
     if (ht_init != 0xA5)                        /*   system   already
initialized    */
          {
          ht_CLEAR();
          ht_init = 0xA5;                          /* show  system
initialized          */
          }
     }

/****************************************************************
*******
 * Function:        ht_CLEAR
 * Description:          Initialize system for processing
 * Arguments:       none
 * Returns:              none

*****************************************************************
******/

void ht_CLEAR()
     {
     UBYTE idx;

     memclr(htp, sizeof(ht_struct) * htp_size);
     WBInit(&ht_freebuf, ht_freebufarea, htp_size);
     WBInit(&ht_usedbuf, ht_usedbufarea, htp_size);
     ht_full = FALSE;
     for (idx = 0;idx < htp_size;idx++)
          {
          WBPut(&ht_freebuf, idx);      /* initialize free buffer
queue     */
          }
     ht_current = TRUE;                          /* no active buffer
yet            */
     }

/****************************************************************
*******
 * Function:        ht_OPEN
 * Description:          Open new scan history buffers
 * Arguments:       UBYTE - number of buffers to open
 * Returns:              BOOLEAN - TRUE: open successful

*****************************************************************
******/

BOOLEAN ht_OPEN(void)
     {
```

```
     UBYTE idx,err;
     pt_struct *ptptr;
     if (ht_current != (UBYTE)TRUE)          /* any buffers now
opened         */
          {
          ht_CLOSE();                             /* close out
opened buffers      */
          }
     idx = WBGet(&ht_freebuf, &err);         /* setup starting
buffer pattern*/
     if (err) return(FALSE);                 /* cannot allocate
more space     */
     ht_current = idx;
     WBPut(&ht_usedbuf, ht_current);         /* place on used
buffer queue    */
//   cl_DATE(&htp[ht_current].odate);   /* opening date and time
     */
//   cl_TIME(&htp[ht_current].otime);

     for (idx = 0; idx < max_pattern; idx++)
          {
          ptptr = (pt_struct *)&htp[ht_current].ht_pt[idx];
          memcopy(ptptr, &ptb[idx], sizeof(pt_struct));/* move in
pattern buffer      */
          }
     return (TRUE);
     }


/*****************************************************************
*******
 * Function:        ht_CLOSE
 * Description:          Close existing scan history buffers
 * Arguments:       NONE
 * Returns:              NONE

******************************************************************
******/

void ht_CLOSE(void)
     {
     if (ht_current != (UBYTE)TRUE)               /* any buffers
now opened     */
          {
//        cl_DATE(&hpt[ht_current].cdate);   /*    post    closing
date/time */
//        cl_TIME(&htp[ht_current].ctime);
          ht_current = TRUE;
          ht_FULL();
          }
     }
```

```
/****************************************************************
*******
 * Function:          ht_WRITE
 * Description:            Update existing scan history buffer
 * Arguments:         an_struct * - pointer to scan analysis
 * Returns:                NONE

*****************************************************************
******/

void ht_WRITE(an_struct *an)
     {
     ht_struct *ht;

     if (ht_current == (UBYTE)TRUE)                    /*   must   have
buffers opened */
          {
          if (ht_OPEN() == 0) return;                  /*  cannot  open
another one    */
          }
     ht = (ht_struct *)&htp[ht_current];
     ht->ht_scans++;                                   /*  bump   scans
obtained        */
     ht->ht_param[good_c]        += an->RESULTS.good;
     ht->ht_param[qzfail_c]      += an->RESULTS.qzfail;
     ht->ht_param[ratiofail_c]   += an->RESULTS.ratiofail;
     ht->ht_param[warnw_c]       += an->RESULTS.warnw;
     ht->ht_param[warnn_c]       += an->RESULTS.warnn;
     ht->ht_param[dcdfail_c]     += an->RESULTS.dcdfail;
     ht->ht_param[reffail_c]      += an->RESULTS.reffail;
     ht->ht_param[icgfail_c]     += an->RESULTS.icgfail;
     ht->ht_param[pcsfail_c]     += an->RESULTS.pcsfail;
     ht->ht_param[chkfail_c]     += an->RESULTS.chkfail;
     ht->ht_param[formatfail_c]  += an->RESULTS.formatfail;
     ht->ht_param[rejectw_c]     += an->RESULTS.rejectw;
     ht->ht_param[rejectn_c]     += an->RESULTS.rejectn;
     }

/****************************************************************
*******
 * Function:          ht_NOREAD
 * Description:            Update existing scan history buffer
 * Arguments:         NONE
 * Returns:                NONE

*****************************************************************
******/

void ht_NOREAD(void)
     {
     ht_struct *ht;

     if (ht_current != (UBYTE)TRUE)                    /*   must   have
```

```
buffers opened */
          {
          ht = (ht_struct *)&htp[ht_current];
          ht->ht_scans++;                              /*  bump  scans
obtained       */
          ht->ht_param[readfail_c]++;
          }
     }

/**************************************************************
*******
 * Function:         ht_LAST
 * Description:           Obtain first existing scan history buffer
 * Arguments:        NONE
 * Returns:               ht_struct * - valid buffer pointer (NULL
when not)

**************************************************************
******/

ht_struct *ht_LAST(void)
     {
     UBYTE err, idx;

     idx = WBLast(&ht_usedbuf, &err);
     if (!err)
          {
          return ((ht_struct *)&htp[idx]);
          }
     else   return (NULL);
     }


/**************************************************************
*******
 * Function:         ht_PREV
 * Description:           Obtain existing scan history buffer
 * Arguments:        NONE
 * Returns:               ht_struct * - valid buffer pointer (NULL
when not)

**************************************************************
******/

ht_struct *ht_PREV(void)
     {
     UBYTE err, idx;

     idx = WBPrev(&ht_usedbuf, &err);
     return ((ht_struct *)&htp[idx]);
     }

/**************************************************************
*******
```

```
 * Function:          ht_STATUS
 * Description:            Obtain number of existing scan history
buffers
 * Arguments:         NONE
 * Returns:                UWORD - number of buffers

*****************************************************************
******/

UWORD ht_STATUS(void)
     {
     return (WBStatus(&ht_usedbuf));
     }

UWORD ht_FULL(void)
     {
     if (WBStatus(&ht_freebuf)==0)
          {
          ht_full = TRUE;
          }
     return (WBStatus(&ht_freebuf)==0);
     }
```

```
*****************************************************************
******/

#define htp_size 20

/****************************************************************
******
 * global structures

*****************************************************************
*****/


typedef struct
     {
     UBYTE ht_opened;
     UBYTE ht_odate[3],ht_otime[3];          /* opening date and
time      */
     UBYTE ht_cdate[3],ht_ctime[3];          /* closing date and
time      */
     ULONG ht_scans;                              /* total scans
obtained            */
     ULONG ht_param[15];                     /* failure counts
               */
     pt_struct ht_pt[max_pattern];      /* active pattern buffer
     */
     } ht_struct;



/****************************************************************
*******
 * Function Prototypes

*****************************************************************
******/

void ht_RESET(void);                         /* initialize buffer
controller     */
void ht_CLEAR(void);
BOOLEAN ht_OPEN(void);                       /* open up new history
buffers    */
void ht_CLOSE(void);                         /* close out history
buffers    */
void ht_WRITE(an_struct *);
ht_struct *ht_LAST(void);
ht_struct *ht_PREV(void);
UWORD ht_STATUS(void);
UWORD ht_FULL(void);
void ht_NOREAD(void);
```

```
/***************************************************************
*******
 * Function:        an_RATCK
 * Description:         check out ratio limits
 * Arguments:       UBYTE(s) - lower/upper limits
 * Returns:              none

****************************************************************
******/

static BOOLEAN an_RATCK(UBYTE ratio, UBYTE lower, UBYTE upper)
     {
     if ((ratio > upper) || (ratio < lower))
          return(1);
     else
          return(FALSE);
     }

/***************************************************************
*******
 * Function:        an_symbology
 * Description:         dispatch  off  to  Individual  symbology
analysis
 * Arguments:       an_struct * - analysis structure to be used
 * Returns:              none

****************************************************************
******/

static void an_symbology(an_struct *an)
     {
     switch (an->STYPE)
          {
          case C39:       an_C39(an); break;
          case I25:       an_I25(an); break;
          case UPC:       an_UE(an);  break;
          case C128:      an_C128(an); break;
          case CBR:       an_CBR(an);  break;
          case C93:       an_C93(an);  break;
          }
     }

/***************************************************************
********

****************************************************************
*******

****************************************************************
*******
 ***
                 ***
```

```
 ***                   CODE 39 ANALYSIS SECTION
           ***
 ***
                ***

******************************************************************
*******

******************************************************************
*******

******************************************************************
*******/

/*****************************************************************
********
 * Local Prototypes

******************************************************************
*******/

static UBYTE c39_ml(UBYTE);                  /* mod-check search
function */
static void  c39_plus(an_struct *an);  /* find HIBC "plus" sign
     */
static void c39_modchk(an_struct *an); /* calculate code 39 mod
check    */


const UBYTE c39_modtbl[44] =
     {
     '0','1','2','3','4','5','6','7','8','9','A','B','C','D',
    'E','F','G','H','I','J','K','L','M','N','O','P','Q','R',
    'S','T','U','V','W','X','Y','Z','-','.',' ','$','/','+',
    '%',0x00
     };


/*****************************************************************
*******
 * Function:        c39_ml
 * Description:         Obtain numeric representation for code 39
character
 * Arguments:       UBYTE - code 39 character
 * Returns:              UBYTE - numeric representation
 *                                (255 when not found)

******************************************************************
******/

static UBYTE c39_ml(UBYTE ch)
     {
     UBYTE ix;
     UBYTE *ptr;
```

```
     ptr = c39_modtbl;
     ix = 0;

     while (*ptr)
          {
          if (*ptr == ch) break;
          ptr++;
          ix++;
          }
     return(ix);
     }

/*****************************************************************
*******
 * Function:        c39_plus
 * Description:         Make sure HIBC "plus" sign occurs in decode
 * Arguments:       an_struct * - analysis structure to be used
 * Returns:              none

******************************************************************
******/


static void c39_plus(an_struct *an)
     {
     if (an->SBUF[1] != '+')
          {
          an->RESULTS.formatfail = 1;
          }
     }

/*****************************************************************
*******
 * Function:        c39_modchk
 * Description:         Calculate code 39 mod-check digit
 * Arguments:       an_struct * - analysis structure to be used
 * Returns:              none

******************************************************************
******/


static void c39_modchk(an_struct *an)
     {
     UWORD SUM;
     UBYTE ix;

     if (an->CHARS < 4)                         /* must have at least
4 chars    */
          {
          an->RESULTS.formatfail = 1;           /*  indicate  invalid
format          */
          }
     if (an->RESULTS.formatfail == 0)    /* any format error ??
```

```
          */
          {
          SUM = 0;
          an->MODCKIS[0]  =  an->SBUF[an->CHARS  -  2];  /*  actual
decoded modchk*/
          for (ix = 1;ix < an->CHARS - 2; ix++)
               SUM += c39_ml(an->SBUF[ix]); /* sum up each of the
data chars*/

          SUM = SUM % 43;
          an->MODCKSB[0] = c39_modtbl[SUM]; /* look up mod check
digit     */
          if (an->MODCKSB[0] != an->MODCKIS[0])
               an->RESULTS.chkfail = 1; /*    show    mod    check
failure        */
          }
     }

/****************************************************************
*******
 * Function:        c39_schar
 * Description:        Check for certain invalid characters
 * Arguments:       an_struct * - analysis structure to be used
 * Returns:              none

****************************************************************
******/


static void c39_schar(an_struct *an)
     {
     UBYTE ix;

     for (ix = 0;ix < an->CHARS; ix++)  /* check each character in
code */
          {
          switch (an->SBUF[ix])
               {
               case '$':                    /*   any   of   these
characters          */
               case '/':                    /* will cause a fomat
failure   */
               case '+':
               case '%':
                    an->RESULTS.formatfail = 1;
                    break;
               }
          }
     }

/****************************************************************
*******
 * Function:        an_C39
 * Description:        validate/analyize code 39 decode
```

```
 * Arguments:       an_struct * - analysis structure to be used
 * Returns:              none

*****************************************************************
******/

static void an_C39(an_struct *an)
     {
     an->RATIO = (an->AVG_WIDE * 10L) / an->AVG_NARROW; /* calc
ratio      */
     an->TOLER = ((an->RATIO * 120) - 800) / 81;  /*    calculate
tolerance */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_USS39:
               a n - > R E S U L T S . r a t i o f a i l    =
an_RATCK(an->RATIO,20,30);
               break;

          case se_AIAGB1:
               a n - > R E S U L T S . r a t i o f a i l    =
an_RATCK(an->RATIO,22,32);
               break;

          case se_AIAGB2:
               a n - > R E S U L T S . r a t i o f a i l    =
an_RATCK(an->RATIO,28,32);
               c39_schar(an);               /* and invalid special
chars      */
               break;

          case se_LOGMARS:
          case se_ANSI39:
               a n - > R E S U L T S . r a t i o f a i l    =
an_RATCK(an->RATIO,22,30);
               break;

        case se_HIBC:
               a n - > R E S U L T S . r a t i o f a i l    =
an_RATCK(an->RATIO,22,30);
               c39_plus(an);                /* make sure we have
a "plus"   */
               c39_modchk(an);                   /*    calc    and
confirm mod check   */
               break;

        case se_39W43:
```

```
            a n - > R E S U L T S . r a t i o f a i l    =
an_RATCK(an->RATIO,22,30);
            c39_modchk(an);                   /*   calc   and
confirm mod check  */
            break;
        }

    }

/*****************************************************************
********

*****************************************************************
*******

*****************************************************************
*******
 ***
                ***
 ***               INTERLEAVED 2OF5 ANALYSIS SECTION
      ***
 ***
                ***

*****************************************************************
*******

*****************************************************************
*******

*****************************************************************
*******/

/*****************************************************************
********
 * Local Prototypes

*****************************************************************
*******/

static UBYTE I25_mcalc(UBYTE *, UBYTE *);
static void I25_modck(an_struct *);



/*****************************************************************
*******
 * Function:        I25_mcalc
 * Description:         calculate Mod Check Digit
 * Arguments:       UBYTE * - pointer to starting character
 *                       UBYTE * - pointer to ending character
 * Returns:              UBYTE   - mod check digit (ASCII format)
```

```
*********************************************************************
******/

static UBYTE I25_mcalc(UBYTE *st, UBYTE *end)
     {
     UBYTE m;
     UWORD SUM;

     m = 3;
     SUM = 0;
     while (st <= end)
          {
          SUM += ((*st - '0') * m);
          m ^= 0x02;
          st++;
          }
     SUM = 10 - (SUM % 10);
     if (SUM == 10) SUM = 0;
     return ((UBYTE)SUM + '0');
     }

/*******************************************************************
*******
 * Function:        I25_modck
 * Description:          Determine validity of mod check digit
 * Arguments:       an_struct * - analysis structure to be used
 * Returns:              none

*******************************************************************
******/

static void I25_modck(an_struct *an)
     {
     if (an->CHARS >= 4)                      /* must have at least
6 chars    */
          {
          an->MODCKSB[0]    =    I25_mcalc(an->SBUF,    (UBYTE
*)(an->SBUF+an->CHARS-2));
          an->MODCKIS[0] = *((UBYTE *)(an->SBUF+an->CHARS-1));
          if (an->MODCKSB[0] != an->MODCKIS[0])
               {
               an->RESULTS.chkfail = 1; /*    show    mod    check
failure        */
               }
          }
     }

/*******************************************************************
*******
 * Function:        an_I25
 * Description:          validate/analyize I25 39 decode
 * Arguments:       an_struct * - analysis structure to be used
 * Returns:              none
```

```
*****************************************************************
******/

void an_I25(an_struct *an)
     {
     an->RATIO = (an->AVG_WIDE * 10L) / an->AVG_NARROW; /* calc
ratio     */
     an->TOLER = ((an->RATIO * 180) - 2100) / 80; /*    calculate
tolerance */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_USSI25:
               a n - > R E S U L T S . r a t i o f a i l    =
an_RATCK(an->RATIO,20,30);
               break;

          case se_ANSI25:
               a n - > R E S U L T S . r a t i o f a i l    =
an_RATCK(an->RATIO,22,30);
               break;

          case se_CASEI25:
               an->RESULTS.ratiofail = an_RATCK(an->RATIO,23,29);
               I25_modck(an);                /* calculate/confirm
mod check */
          }

     }

/*****************************************************************
********

*****************************************************************
*******

*****************************************************************
*******
 ***
                   ***
 ***                   CODE 128 ANALYSIS SECTION
              ***
 ***
                   ***

*****************************************************************
*******
```

```
*****************************************************************
*******

*****************************************************************
*******/

#define strt_128 0
#define end_128  107

#define START_A      103
#define START_B      104
#define START_C      105
#define FORWARD_STOP 106
#define REVERSE_STOP 107
#define SHIFT        98
#define CODE_C       99
#define CODE_B       100
#define CODE_A       101
#define FNC1         102

/*****************************************************************
*******
 * Function:        an_C128
 * Description:         validate/analyize code 128 decode
 * Arguments:       an_struct * - analysis structure to be used
 * Returns:              none

*****************************************************************
******/

static void an_C128(an_struct *an)
     {
    an->RATIO = FALSE;                    /* no ratio available
          */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_ANSIC128:   an->TOLER = 35;     break    ;    /*
calculate tolerance */
          default:       an->TOLER = 40; break;
          }

     if (an->MODCKSB[0] & 0x80)                      / *    v a l i d
mod-check digit ?          */
          {
          an->RESULTS.chkfail = 1;      /*    show    mod    check
failure       */
          an->MODCKSB[0] &= 0x7F;            /* erase flag
```

```
              */
          }
     an->MODCKIS[0] = an->SBUF[an->CHARS - 2]; /* actual decoded
modchk*/
     }

/*****************************************************************
*******
 * decoder tables

*****************************************************************
******/



const UWORD table_a[108]=
     {
 0x2020 /*  ,00 */ ,0x2021 /*  !,01 */,0x2022 /* QT,02 */ ,0x2023
/*  #,03 */
,0x2024 /*  $,04 */ ,0x2025 /*  %,05 */,0x2026 /*  &,06 */ ,0x2027
/*  ',07 */
,0x2028 /*  (,08 */ ,0x2029 /*  ),09 */,0x202A /*  *,10 */ ,0x202B
/*  +,11 */
,0x202C /*  ,,12 */ ,0x202D /*  -,13 */,0x202E /*  .,14 */ ,0x202F
/*  /,15 */
,0x2030 /*  0,16 */ ,0x2031 /*  1,17 */,0x2032 /*  2,18 */ ,0x2033
/*  3,19 */
,0x2034 /*  4,20 */ ,0x2035 /*  5,21 */,0x2036 /*  6,22 */ ,0x2037
/*  7,23 */
,0x2038 /*  8,24 */ ,0x2039 /*  9,25 */,0x203A /*  :,26 */ ,0x203B
/*  ;,27 */
,0x203C /*  <,28 */ ,0x203D /*  =,29 */,0x203E /*  >,30 */ ,0x203F
/*  ?,31 */
,0x2040 /*  @,32 */ ,0x2041 /*  A,33 */,0x2042 /*  B,34 */ ,0x2043
/*  C,35 */
,0x2044 /*  D,36 */ ,0x2045 /*  E,37 */,0x2046 /*  F,38 */ ,0x2047
/*  G,39 */
,0x2048 /*  H,40 */ ,0x2049 /*  I,41 */,0x204A /*  J,42 */ ,0x204B
/*  K,43 */
,0x204C /*  L,44 */ ,0x204D /*  M,45 */,0x204E /*  N,46 */ ,0x204F
/*  O,47 */
,0x2050 /*  P,48 */ ,0x2051 /*  Q,49 */,0x2052 /*  R,50 */ ,0x2053
/*  S,51 */
,0x2054 /*  T,52 */ ,0x2055 /*  U,53 */,0x2056 /*  V,54 */ ,0x2057
/*  W,55 */
,0x2058 /*  X,56 */ ,0x2059 /*  Y,57 */,0x205A /*  Z,58 */ ,0x205B
/*  [,59 */
,0x205C /*  \,60 */ ,0x205D /*  ],61 */,0x205E /*  ^,62 */ ,0x205F
/*  _,63 */
,0x4E4C /* NL,64 */ ,0x5348 /* SH,65 */,0x5358 /* SX,66 */ ,0x4558
/* EX,67 */
,0x4554 /* ET,68 */ ,0x4551 /* EQ,69 */,0x414B /* AK,70 */ ,0x424C
```

```
/* BL,71 */
,0x4253 /* BS,72 */ ,0x4854 /* HT,73 */,0x4C46 /* LF,74 */ ,0x5654
/* VT,75 */
,0x4646 /* FF,76 */ ,0x4352 /* CR,77 */,0x534F /* SO,78 */ ,0x5349
/* SI,79 */
,0x4445 /* DE,80 */ ,0x4431 /* D1,81 */,0x4432 /* D2,82 */ ,0x4433
/* D3,83 */
,0x4434 /* D4,84 */ ,0x4E4B /* NK,85 */,0x534E /* SN,86 */ ,0x4542
/* EB,87 */
,0x434E /* CN,88 */ ,0x454D /* EM,89 */,0x5342 /* SB,90 */ ,0x4543
/* EC,91 */
,0x4653 /* FS,92 */ ,0x4753 /* GS,93 */,0x5253 /* RS,94 */ ,0x5553
/* US,95 */
,0x4633 /* F3,96 */ ,0x4632 /* F2,97 */,0x5354 /* ST,98 */ ,0x4343
/* CC,99 */
,0x4342 /* CB,CB */ ,0x4634 /* F4,CA */,0x4631 /* F1,F1 */ ,0x4341
/* CA,CA */
,0x4342 /* CB,CB */ ,0x4343   /*  CC,CC  */,0x2A2A  /*  **,**  */
,0x2A2A /* **,** */
      };

const UWORD table_b[108]=
{
 0x2020    /*     , 00 */ ,0x2021    /*  ! , 01 */ ,0x2022   /*QT
 , 02 */
,0x2023    /*  # , 03 */ ,0x2024    /*  $ , 04 */ ,0x2025    /*
 % , 05 */
,0x2026    /*  & , 06 */ ,0x2027    /*  ' , 07 */    ,0x2028
/*   ( , 08 */
,0x2029    /*  ), 09  */ ,0x202A    /*  * , 10 */ ,0x202B    /*
 + , 11 */
,0x202C    /*  , , 12 */ ,0x202D    /*  - , 13 */ ,0x202E    /*
 . , 14 */
,0x202F    /*  / , 15 */ ,0x2030    /*  0 , 16 */ ,0x2031    /*
 1 , 17 */
,0x2032    /*  2 , 18 */ ,0x2033    /*  3 , 19 */ ,0x2034    /*
 4 , 20 */
,0x2035    /*  5 , 21 */ ,0x2036    /*  6 , 22 */ ,0x2037    /*
 7 , 23 */
,0x2038    /*  8 , 24 */ ,0x2039    /*  9 , 25 */ ,0x203A    /*
 : , 26 */
,0x203B    /*  ; , 27 */ ,0x203C    /*  < , 28 */ ,0x203D    /*
 = , 29 */
,0x203E    /*  > , 30 */ ,0x203F    /*  ? , 31 */ ,0x2040    /*
 @ , 32 */
,0x2041    /*  A , 33 */ ,0x2042    /*  B , 34 */ ,0x2043    /*
 C , 35 */
,0x2044    /*  D , 36 */ ,0x2045    /*  E , 37 */ ,0x2046    /*
 F , 38 */
,0x2047    /*  G , 39 */ ,0x2048    /*  H , 40 */ ,0x2049    /*
 I , 41 */
,0x204A    /*  J , 42 */ ,0x204B    /*  K , 43 */ ,0x204C    /*
 L , 44 */
,0x204D    /*  M , 45 */ ,0x204E    /*  N , 46 */ ,0x204F    /*
```

```
 O , 47 */
,0x2050    /*   P , 48 */ ,0x2051    /*   Q , 49 */ ,0x2052    /*
 R , 50 */
,0x2053    /*   S , 51 */ ,0x2054    /*   T , 52 */ ,0x2055    /*
 U , 53 */
,0x2056    /*   V , 54 */ ,0x2057    /*   W , 55 */ ,0x2058    /*
 X , 56 */
,0x2059    /*   Y , 57 */ ,0x205A    /*   Z , 58 */ ,0x205B    /*
 [ , 59 */
,0x205C    /*   \ , 60 */ ,0x205D    /*   ] , 61 */ ,0x205E    /*
 ^ , 62 */
,0x205F    /*   _ , 63 */ ,0x2060    /*   ` , 64 */ ,0x2061    /*
 a , 65 */
,0x2062    /*   b , 66 */ ,0x2063    /*   c , 67 */ ,0x2064    /*
 d , 68 */
,0x2065    /*   e , 69 */ ,0x2066    /*   f , 70 */ ,0x2067    /*
 g , 71 */
,0x2068    /*   h , 72 */ ,0x2069    /*   i , 73 */ ,0x206A    /*
 j , 74 */
,0x206B    /*   k , 75 */ ,0x206C    /*   l , 76 */ ,0x206D    /*
 m , 77 */
,0x206E    /*   n , 78 */ ,0x206F    /*   o , 79 */ ,0x2070    /*
 p , 80 */
,0x2071    /*   q , 81 */ ,0x2072    /*   r , 82 */ ,0x2073    /*
 s , 83 */
,0x2074    /*   t , 84 */ ,0x2075    /*   u , 85 */ ,0x2076    /*
 v , 86 */
,0x2077    /*   w , 87 */ ,0x2078    /*   x , 88 */ ,0x2079    /*
 y , 89 */
,0x207A    /*   z , 90 */ ,0x207B    /*   { , 91 */ ,0x207C    /*
 | , 92 */
,0x207D    /*   } , 93 */ ,0x207E    /*   ~ , 94 */ ,0x444C    /*
DL , 95 */
,0x4633    /*  F3 , 96 */ ,0x4632    /*  F2 , 97 */ ,0x5354    /*
ST , 98 */
,0x4343    /*  CC , 99 */ ,0x4634    /*  F4 , CB */ ,0x4341    /*
CA , CA */
,0x4631    /*  F1 , F1 */ ,0x4341   /*  CA , CA */ ,0x4342    /*
CB , CB */
,0x4343      /*  CC , CC */ ,0x2A2A    /*  ** , ** */ ,0x2A2A    /*
** , ** */
};
void C128_BUF(UBYTE *sbufptr, UBYTE *ptr1, UBYTE *ptr2, UBYTE
chars)
     {
     UWORD shift_flg;
     UWORD print_flg;
     UWORD i;


     shift_flg = FALSE;
     print_flg = CODE_C;

     switch (*sbufptr++)                    /*  parse  code  128
```

```
start code      */
          {
          case START_A:
               print_flg = CODE_A;            /* starting out in
Code A         */
               *ptr1++ = '*';
               *ptr2++ = 'A';
               break;

          case START_B:                       /* starting out in
Code B         */
               print_flg = CODE_B;
               *ptr1++ = '*';
               *ptr2++ = 'B';
               break;

          case START_C:                       /* starting out in
Code C         */
          default:
               print_flg = CODE_C;
               *ptr1++ = '*';
               *ptr2++ = 'C';
               break;
          }

     for (i = 1; i < chars; i++)
          {
          switch (print_flg)
               {
               case CODE_A:
                    *ptr1++ = (table_a[*sbufptr] & 0xFF00) >> 8;
                    *ptr2++ = (table_a[*sbufptr] & 0x00FF);
                    if  (shift_flg  ==  TRUE)//is  was  a  shifted
character
                         {
                         shift_flg = FALSE;
                         print_flg = CODE_B;
                         sbufptr++;
                         continue;
                         }
                    break;

               case CODE_B:
                    *ptr1++ = (table_b[*sbufptr] & 0xFF00) >> 8;
                    *ptr2++ = (table_b[*sbufptr] & 0x00FF);
                    if (shift_flg == TRUE)
                         {
                         shift_flg = FALSE;
                         print_flg = CODE_A;
                         sbufptr++;
                         continue;
                         }
                    break;
```

```
     case CODE_C:
          if (*sbufptr <= 99)
               {
               *ptr1++ = *sbufptr / 10 + '0';
               *ptr2++ = *sbufptr % 10 + '0';
               }
          else
               {
               switch (*sbufptr)
                    {
                    case FORWARD_STOP:
                    case REVERSE_STOP:
                         *ptr1++ = '*';
                         *ptr2++ = '*';
                         break;

                    case FNC1:
                         *ptr1++ = 'F';
                         *ptr2++ = '1';
                         break;
                    }
               }
          break;
     }

switch (*sbufptr++)
     {
     case CODE_A :
          print_flg = CODE_A;
          break;

     case CODE_B :
          print_flg = CODE_B;
          break;

     case CODE_C :
          print_flg = CODE_C;
          break;

     case SHIFT  :
          if (print_flg != CODE_C)
               {
               shift_flg = TRUE;
               if (print_flg == CODE_A)
                    {
                    print_flg = CODE_B;
                    break;
                    }
               if (print_flg == CODE_B)
                    {
                    print_flg = CODE_A;
                    break;
                    }
```

```
                        }
                    break;
               }
          }
     *ptr1 = '\0';
     *ptr2 = '\0';
     }


void C128_CBUF(UBYTE *sbufptr, UBYTE *ptr1, UBYTE chars)
     {
     UWORD shift_flg;
     UWORD print_flg;
     UWORD i;

     shift_flg = FALSE;
     print_flg = CODE_C;

     switch (*sbufptr++)                    /*  parse  code  128
start code     */
          {
          case START_A:
               print_flg = CODE_A;          /*  starting  out  in
Code A         */
               break;

          case START_B:                     /*  starting  out  in
Code B         */
               print_flg = CODE_B;
               break;

          case START_C:                     /*  starting  out  in
Code C         */
          default:
               print_flg = CODE_C;
               break;
          }

     for (i = 1; i < chars; i++)
          {
          switch (print_flg)
               {
               case CODE_A:
                    if  (((table_a[*sbufptr]  &  0xFF00)  >>  8)  ==
0x20)
                         *ptr1++ = (table_a[*sbufptr] & 0x00FF);
                    if  (shift_flg  ==  TRUE)//is  this  a  shifted
character
                         {
                         shift_flg = FALSE;
                         print_flg = CODE_B;
                         sbufptr++;
```

```
                    continue;
                    }
               break;

          case CODE_B:
               if (((table_b[*sbufptr] & 0xFF00) >> 8) ==
0x20)
                    *ptr1++ = (table_b[*sbufptr] & 0x00FF);
               if (shift_flg == TRUE)
                    {
                    shift_flg = FALSE;
                    print_flg = CODE_A;
                    sbufptr++;
                    continue;
                    }
               break;


          case CODE_C:
               if (*sbufptr <= 99)
                    {
                    *ptr1++ = *sbufptr / 10 + '0';
                    *ptr1++ = *sbufptr % 10 + '0';
                    }
          }

     switch (*sbufptr++)
          {
          case CODE_A :
               print_flg = CODE_A;
               break;

          case CODE_B :
               print_flg = CODE_B;
               break;

          case CODE_C :
               print_flg = CODE_C;
               break;

          case SHIFT  :
               if (print_flg != CODE_C)
                    {
                    shift_flg = TRUE;
                    if (print_flg == CODE_A)
                         {
                         print_flg = CODE_B;
                         break;
                         }
                    if (print_flg == CODE_B)
                         {
                         print_flg = CODE_A;
                         break;
                         }
```

```
                    }
                break;
            }
        }
    *ptrl = '\0';
    }

/****************************************************************
********

****************************************************************
*******

****************************************************************
*******
 ***
                ***
 ***                CODABAR ANALYSIS SECTION
            ***
 ***
                ***

****************************************************************
*******

****************************************************************
*******

****************************************************************
*******/

/****************************************************************
*******
 * Function:          an_CBR
 * Description:           validate/analyize code codabar decode
 * Arguments:         an_struct * - analysis structure to be used
 * Returns:               none

****************************************************************
******/

static void an_CBR(an_struct *an)
    {
    an->RATIO = (an->AVG_WIDE * 10L) / an->AVG_NARROW; /* calc
ratio     */
    an->TOLER = ((an->RATIO * 50) - 20) / 81;     /*    calculate
tolerance */
    if (an->QZ_LEAD  < 10 * an->AVG_NARROW) an->RESULTS.qzfail =
1;
    if (an->QZ_TRAIL < 10 * an->AVG_NARROW) an->RESULTS.qzfail =
1;


    if (an->MODCKSB[0] & 64)              /* icg too wide  bit
```

```
6 of MODCK */
          {
          an->RESULTS.icgfail = 1;
          an->MODCKSB[0] = 0;
          }
     switch (an->SUBTYPE)
          {
          case se_USSCBR:
               a n - > R E S U L T S . r a t i o f a i l   =
an_RATCK(an->RATIO,20,30);
               break;

          case se_ANSICBR:
               a n - > R E S U L T S . r a t i o f a i l   =
an_RATCK(an->RATIO,22,30);
               break;
          }
     }
/*****************************************************************
********

*****************************************************************
*******

*****************************************************************
*******
 ***
                    ***
 ***                    CODE 93 ANALYSIS SECTION
               ***
 ***
                    ***

*****************************************************************
*******

*****************************************************************
*******

*****************************************************************
*******/


/*****************************************************************
*******
 * Function:        an_C93
 * Description:         validate/analyize code 93 decode
 * Arguments:       an_struct * - analysis structure to be used
 * Returns:              none

*****************************************************************
******/
```

```
static void an_C93(an_struct *an)
    {
   an->RATIO = FALSE;                    /* no ratio available
          */

     if (an->QZ_LEAD  < 10 * an->AVG_NARROW) an->RESULTS.qzfail =
1;
     if (an->QZ_TRAIL < 10 * an->AVG_NARROW) an->RESULTS.qzfail =
1;

     switch (an->SUBTYPE)
          {
          case se_ANSIC93:an->TOLER = 35;    break ; /* calculate
tolerance */
          default:       an->TOLER = 45; break;
          }

     if (an->MODCKSB[0] & 0x80)                  / *   v a l i d
mod-check digit ?        */
          {
          an->RESULTS.chkfail = 1;      /*   show   mod   check
failure       */
          an->MODCKSB[0] &= 0x7F;            /* erase flag
               */
          }
     if (an->MODCKSB[1] & 0x80)
          {
          an->RESULTS.chkfail = 1;      /*   show   mod   check
failure       */
          an->MODCKSB[1] &= 0x7F;            /* erase flag
               */
          }

     an->MODCKIS[1] = an->SBUF[an->CHARS - 2]; /* actual decoded
modchk*/
     an->MODCKIS[0] = an->SBUF[an->CHARS - 3];
     }


/*****************************************************************
********

*****************************************************************
*******

*****************************************************************
*******
 ***
                 ***
 ***                UPC/EAN ANALYSIS SECTION
            ***
 ***
                 ***
```

```
*****************************************************************
*******

*****************************************************************
*******

*****************************************************************
*******/

#define stype_upca   1
#define stype_upce   2
#define stype_ean8   4
#define stype_ean13  8

#define noaddon      0
#define addon2       1
#define addon5       255


const UBYTE ue_tol[4] = { 30, 34, 38, 14 };

/****************************************************************
*******
 * Function:        an_UE
 * Description:         validate/analyize UPC/EAN decode
 * Arguments:       an_struct * - analysis structure to be used
 * Returns:              none

*****************************************************************
******/

static void an_UE(an_struct *an)
     {

     UBYTE ue_magtype;

     ue_magtype = an->SUBTYPE;               /*  save  UPC  size
selection       */
     an->TOLER = ue_tol[an->SUBTYPE];


    an->RATIO = FALSE;                   /* no ratio available
          */

     switch (an->UETYPE)
          {
          case stype_upca:
               an->SUBTYPE = se_UPCA;
               break;
          case stype_upce:
               an->SUBTYPE = se_UPCE;
               break;
          case stype_ean8:
```

```
            an->SUBTYPE = se_EAN8;
            break;
        case stype_ean13:
            an->SUBTYPE = se_EAN13;
            break;
        }
    an->SUBTYPE += ue_magtype;
    if (an->ADTYPE == addon2) an->SUBTYPE += 4;
    if (an->ADTYPE == addon5) an->SUBTYPE += 8;

    if (an->MODCKSB[0] & 0x80)              /*  valid  mod-check
digit ?     */
        {
        an->RESULTS.chkfail = 1;        /*   show   mod   check
failure     */
        an->MODCKSB[0] &= 0x7F;             /* erase flag
            */
        }

    if (an->MODCKSB[0] & 0x40)
        {
        an->RESULTS.formatfail = 1;         /*   addendum   check
failure     */
        an->MODCKSB[0] &= ~(0x40);
        }

    an->MODCKSB[0] = (an->MODCKSB[1] + '0');
    an->MODCKSB[1] = 0;

   if ((an->SUBTYPE >= se_UPCE) && (an->SUBTYPE < se_EAN13))
        {
        an->MODCKIS[0] = an->SBUF[9];
        }
    else
        an->MODCKIS[0] = an->SBUF[15];

    an->SBUF[25] = 0x00;

    if (an->QZ_LEAD  < 10 * an->AVG_NARROW) an->RESULTS.qzfail =
1;
    if (an->QZ_TRAIL < 10 * an->AVG_NARROW) an->RESULTS.qzfail =
1;


    }
```

```
/***************************************************************
*******
 *  Title:  IN.C - Laser Inspector Interrupt Control
        *
 *  Ident:  Rev. A
                  *

****************************************************************
******
 *   Copyright (c) 1993     All rights reserved.
        *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be consTRUEd as a commitment by RJS,
Inc.   *
 *
    *
 *   RJS assumes no responsibility for the user or reliability of
    *
 *   its software on equipment that is not supplied by RJS.
    *
 *
    *

****************************************************************
******
 *
 *  Abstract:
 *
 *  Author:      Donald R. Palmer, 22-JUL-93, Version X0.00
 *
 *  Modification History
 *
 *  Date         Who      Version     Why
 *    ----------         -------         ---------
-----------------------------------
 * 22-JUL-93   DRP       Rev A.        Original Writing
```

```
***************************************************************
******/

/**************************************************************
*******
 * Include Files

***************************************************************
******/

#include "system.h"
#include "io6811.h"
#include "int6811.h"                            /*  only  for  HC11
system        */

#pragma codeseg(RCODE)

extern void cm_interrupt(void);
extern void sw_interrupt(void);
extern void cl_interrupt(void);
extern void sn_interrupt(void);
extern void gn1_interrupt(void);
//extern void gn2_interrupt(void);

#pragma memory = zpage

extern UWORD gn_temp;
extern UWORD *gn_start,*gn_end,*gn_stop;
extern UWORD gn_time;

#pragma memory = default

interrupt void SCI_interrupt(void)
     {
     cm_interrupt();
     }

interrupt void TO_interrupt(void)
     {
     sw_interrupt();
     }

interrupt void RTI_interrupt(void)
     {
     cl_interrupt();
     }

interrupt void TIC3_interrupt(void)
     {
     sn_interrupt();
     }

interrupt void TIC1_interrupt(void)
     {
```

```
     gn1_interrupt();
     }

/* interrupt void TIC2_interrupt(void)
**          {
**          gn2_interrupt();
**          }
*/
interrupt void TIC2_interrupt(void)
     {
     PORTA |= a6;                              /* used for timing of
interrupt */
     TFLG1 = ic2f;
     gn_time = TIC2;
     gn_temp = gn_time - gn_temp;
     if (gn_temp > 0X7FFF) gn_temp = ~gn_temp;
     *gn_end++ = gn_temp;                 /* put away last data
     */
     gn_temp = gn_time;
     if (gn_end >= gn_stop)
          {
          TMSK1 &= ~ic2f;
          }
     PORTA &= ~a6;
     }
```

```
/*              - INT6811.H -

   This file defines the interrupt vector addresses of the 68HC11
   and appropriate function names that can be used with the
interrupts.
   It is assumed that the segment INTVEC is located at address
0xFFD6.
   See also CSTARTUP.S07 and LNK6811.XCL.

   Version: 3.10 [IANR]

*/

#pragma language=extended

#define   INTVEC_START    0        /* Default for 68HC11 (must be
matched
                                   to the value used at link-time)   */


          /*======================*/
          /* Interrupt Definitions */
          /*======================*/

#pragma function = non_banked

          /* SCI Serial Communication Interface */
interrupt [INTVEC_START +  0] void SCI_interrupt(void);

          /* SPI Serial Transfer Complete */
interrupt [INTVEC_START +  2] void SPI_interrupt(void);

          /* Pulse Accumulator Input Edge */
interrupt [INTVEC_START +  4] void PAIE_interrupt(void);

          /* Pulse Accumulator Overflow */
interrupt [INTVEC_START +  6] void PAO_interrupt(void);

          /* Timer Overflow */
interrupt [INTVEC_START +  8] void TO_interrupt(void);

          /* Timer Output Compare 5 */
interrupt [INTVEC_START + 10] void TOC5_interrupt(void);

          /* Timer Output Compare 4 */
interrupt [INTVEC_START + 12] void TOC4_interrupt(void);

          /* Timer Output Compare 3 */
interrupt [INTVEC_START + 14] void TOC3_interrupt(void);

          /* Timer Output Compare 2 */
interrupt [INTVEC_START + 16] void TOC2_interrupt(void);

          /* Timer Output Compare 1 */
```

```
interrupt [INTVEC_START + 18] void TOC1_interrupt(void);

          /* Timer Input Compare 3 */
interrupt [INTVEC_START + 20] void TIC3_interrupt(void);

          /* Timer Input Compare 2 */
interrupt [INTVEC_START + 22] void TIC2_interrupt(void);

          /* Timer Input Compare 1 */
interrupt [INTVEC_START + 24] void TIC1_interrupt(void);

          /* Real Time Interrupt */
interrupt [INTVEC_START + 26] void RTI_interrupt(void);

          /* Interrupt ReQuest */
interrupt [INTVEC_START + 28] void IRQ_interrupt(void);

          /* eXtended Interrupt ReQuest */
interrupt [INTVEC_START + 30] void XIRQ_interrupt(void);

          /* SoftWare Interrupt */
interrupt [INTVEC_START + 32] void SWI_interrupt(void);

          /* Illegal Opcode Trap */
interrupt [INTVEC_START + 34] void IOT_interrupt(void);

          /* COP Failure */
interrupt [INTVEC_START + 36] void NOCOP_interrupt(void);

          /* COP Monitor Failure */
interrupt [INTVEC_START + 38] void CME_interrupt(void);

#pragma function = default
```

```
/*              - IO6811.H -

   This file #defines the internal register addresses.

   Version: 3.10 [IANR]

*/

#ifndef HC_REG_OFFSET
#define   HC_REG_OFFSET 0x0000          /* Default for 68HC11 */
#endif

          /*=====================*/
          /* I/O Port Definitions */
          /*=====================*/

          /* I/O port A */
#define PORTA (* (UBYTE *) (HC_REG_OFFSET + 0))
#define a7 0x80
#define a6 0x40
#define a5 0x20
#define a4 0x10
#define a3 0x08
#define a2 0x04
#define a1 0x02
#define a0 0x01

          /* Parallel I/O Control Register */
#define PIOC (* (UBYTE *) (HC_REG_OFFSET + 2))

          /* I/O Port C */
#define PORTC (* (UBYTE *) (HC_REG_OFFSET + 3))

          /* I/O Port B */
#define PORTB (* (UBYTE *) (HC_REG_OFFSET + 4))

          /* Alternate Latched Port C */
#define PORTCL (* (UBYTE *) (HC_REG_OFFSET + 5))

          /* Data Direction Port C */
#define DDRC (* (UBYTE *) (HC_REG_OFFSET + 7))

          /* I/O Port D */
#define PORTD (* (UBYTE *) (HC_REG_OFFSET + 8))
#define dtr  0x10
#define cts  0x08
#define rts  0x04

          /* Data Direction Port D */
#define DDRD (* (UBYTE *) (HC_REG_OFFSET + 9))
#define ddr5 0x20
#define ddr4 0x10
#define ddr3 0x08
#define ddr2 0x04
```

```
#define ddr1 0x02
#define ddr0 0x01

          /* I/O Port E */
#define PORTE (* (UBYTE *) (HC_REG_OFFSET + 0xA))
#define e7 0x80
#define e6 0x40
#define e5 0x20
#define e4 0x10
#define e3 0x08
#define e2 0x04
#define e1 0x02
#define e0 0x01

          /* Compare Force Register */
#define CFORC (* (UBYTE *) (HC_REG_OFFSET + 0xB))
#define foc1 0x80                             /* force OC1 bit */
#define foc2 0x40                             /* force OC2 bit */
#define foc3 0x20                             /* force OC3 bit */
#define foc4 0x10                             /* force OC4 bit */
#define foc5 0x08                             /* force OC5 bit */

          /* OC1 Action Mask Register */
#define OC1M (* (UBYTE *) (HC_REG_OFFSET + 0xC))
#define oc1m7 0x80                            /* OC1 action mask */
#define oc1m6 0x40                            /* OC1 action mask */
#define oc1m5 0x20                            /* OC1 action mask */
#define oc1m4 0x10                            /* OC1 action mask */
#define oc1m3 0x08                            /* OC1 action mask */

          /* OC1 Action Data Register */
#define OC1D (* (UBYTE *) (HC_REG_OFFSET + 0xD))
#define oc1d7 0x80                            /* OC1 data bit */
#define oc1d6 0x40                            /* OC1 data bit */
#define oc1d5 0x20                            /* OC1 data bit */
#define oc1d4 0x10                            /* OC1 data bit */
#define oc1d3 0x08                            /* OC1 data bit */

          /* Timer Counter Register */
#define TCNT (* (UWORD *) (HC_REG_OFFSET + 0xE))

          /* Input Capture Register 1 */
#define TIC1 (* (UWORD *) (HC_REG_OFFSET + 0x10))

          /* Input Capture Register 2 */
#define TIC2 (* (UWORD *) (HC_REG_OFFSET + 0x12))

          /* Input Capture Register 3 */
#define TIC3 (* (UWORD *) (HC_REG_OFFSET + 0x14))

          /* Output Compare Register 1 */
#define TOC1 (* (UWORD *) (HC_REG_OFFSET + 0x16))

          /* Output Compare Register 2 */
```

```
#define TOC2 (* (UWORD *) (HC_REG_OFFSET + 0x18))

          /* Output Compare Register 3 */
#define TOC3 (* (UWORD *) (HC_REG_OFFSET + 0x1A))

          /* Output Compare Register 4 */
#define TOC4 (* (UWORD *) (HC_REG_OFFSET + 0x1C))

          /* Output Compare Register 5 */
#define TOC5 (* (UWORD *) (HC_REG_OFFSET + 0x1E))

          /* Timer Control Register 1 */
#define TCTL1 (* (UBYTE *) (HC_REG_OFFSET + 0x20))
#define om2   0x80                        /* OC1 compare action
bit */
#define ol2   0x40                        /* OC1 compare action
bit */
#define om3   0x20                        /* OC1 compare action
bit */
#define ol3   0x10                        /* OC1 compare action
bit */
#define om4   0x08                        /* OC1 compare action
bit */
#define ol4   0x04                        /* OC1 compare action
bit */
#define om5   0x02                        /* OC1 compare action
bit */
#define ol5   0x01                        /* OC1 compare action
bit */

          /* Timer Control Register 2 */
#define TCTL2 (* (UBYTE *) (HC_REG_OFFSET + 0x21))
#define edg1b 0x20                        /* IC1 edge detection
bit */
#define edg1a 0x10                        /* IC1 edge detection
bit */
#define edg2b 0x08                        /* IC2 edge detection
bit */
#define edg2a 0x04                        /* IC2 edge detection
bit */
#define edg3b 0x02                        /* IC3 edge detection
bit */
#define edg3a 0x01                        /* IC3 edge detection
bit */

          /* Timer Interrupt Mask Register 1 */
#define TMSK1 (* (UBYTE *) (HC_REG_OFFSET + 0x22))
#define oc1i  0x80                        /* OC1 interrupt mask
*/
#define oc2i  0x40                        /* OC2 interrupt mask
*/
#define oc3i  0x20                        /* OC3 interrupt mask
*/
#define oc4i  0x10                        /* OC4 interrupt mask
```

```
*/
#define oc5i  0x08                          /* OC5 interrupt mask
*/
#define ic1i  0x04                          /* IC1 interrupt mask
*/
#define ic2i  0x02                          /* IC2 interrupt mask
*/
#define ic3i  0x01                          /* IC3 interrupt mask
*/

          /* Timer Interrupt Flag Register 1 */
#define TFLG1 (* (UBYTE *) (HC_REG_OFFSET + 0x23))
#define oc1f  0x80                          /* OC1 interrupt flag
*/
#define oc2f  0x40                          /* OC2 interrupt flag
*/
#define oc3f  0x20                          /* OC3 interrupt flag
*/
#define oc4f  0x10                          /* OC4 interrupt flag
*/
#define oc5f  0x08                          /* OC5 interrupt flag
*/
#define ic1f  0x04                          /* IC1 interrupt flag
*/
#define ic2f  0x02                          /* IC2 interrupt flag
*/
#define ic3f  0x01                          /* IC3 interrupt flag
*/

          /* Timer Interrupt Flag Register 2 */
#define TMSK2 (* (UBYTE *) (HC_REG_OFFSET + 0x24))
#define toi      0x80                            /* timer overflow
interrupt mask */
#define rtii  0x40                          /* real-time interrupt
mask       */
#define paovi 0x20                          /*    pa    overflow
interrupt mask  */
#define paii  0x10                          /* pa input interrupt
mask       */
#define pr1   0x02                          /*  timer  prescaler
(high bit)      */
#define pr0   0x01                          /*  timer  prescaler
(low bit)  */

          /* Timer Interrupt Flag Register 2 */
#define TFLG2 (* (UBYTE *) (HC_REG_OFFSET + 0x25))
#define tof      0x80                            /* timer overflow
interrupt flag */
#define rtif  0x40                          /* real-time interrupt
flag       */
#define paovf 0x20                          /*    pa    overflow
interrupt flag  */
#define paif  0x10                          /* pa input interrupt
flag       */
```

```
        /* Pulse Accumulator Control Register */
#define PACTL (* (UBYTE *) (HC_REG_OFFSET + 0x26))
#define ddra7 0x80                              /*   PA7   direction
register */
#define paen  0x40                              /* PA system enable
      */
#define pamod 0x20                              /* PA system mode
      */
#define pedge 0x10                              /*  PA  system  edge
control */
#define rtr1  0x02                              /* RT clock interrupt
rate*/
#define rtr0  0x01                              /* RT clock interrupt
rate*/

        /* Pulse Accumulator Count Register */
#define PACNT (* (UBYTE *) (HC_REG_OFFSET + 0x27))

        /* SPI Control Register */
#define SPCR (* (UBYTE *) (HC_REG_OFFSET + 0x28))
#define spie  0x80                              /*   SPI   interrupt
enable              */
#define spe   0x40                              /*    SPI    system
enable                  */
#define dworm 0x20                              /*  Port  D  wire-or
mode                */
#define mstr  0x10                              /*    Master/Slave
select                  */
#define cpol  0x08                              /* clock polarity
                    */
#define cpha  0x04                              /* clock phase
                    */
#define spr1  0x02                              /*  SPI  clock  rate
(high order)        */
#define spr0  0x01                              /* SPI clock rate (low
order)         */

        /* SPI Status Register */
#define SPSR (* (UBYTE *) (HC_REG_OFFSET + 0x29))
#define spif  0x80                              /*   SPI   interrupt
flag                */
#define wcol  0x40                              /*  Write  collision
flag                */
#define modf  0x10                              /*  SPI  mode  error
flag                */

        /* SPI Data Register */
#define SPDR (* (UBYTE *) (HC_REG_OFFSET + 0x2A))

        /* SCI Baud Rate Control */
#define BAUD (* (UBYTE *) (HC_REG_OFFSET + 0x2B))

        /* SCI Control Register 1 */
#define SCCR1 (* (UBYTE *) (HC_REG_OFFSET + 0x2C))
```

```
#define r8      0x80                           /* Receive bit
8                       */
#define t8      0x40                           /* Transmit bit
8                       */
#define scim  0x10                          /* Mode select
              */
#define wake  0x08                          /* Wake up bit
              */

          /* SCI Control Register 2 */
#define SCCR2 (* (UBYTE *) (HC_REG_OFFSET + 0x2D))
#define tie   0x80                          /* Transmit interrupt
mask        */
#define tcie  0x40                          /* Transmit complete
interrupt mask */
#define rie   0x20                          /* Receiver interrupt
mask        */
#define ilie  0x10                          /* Idle line interrupt
mask        */
#define te    0x08                          /*    Transmitter
enable                  */
#define re    0x04                          /* Receiver enable
              */
#define rwu   0x02                          /*  Receiver  wake-up
control       */
#define sbk   0x01                          /* Send break
              */

          /* SCI Status Register */
#define SCSR (* (UBYTE *) (HC_REG_OFFSET + 0x2E))
#define tdre  0x80                          /* Transmit register
empty flag    */
#define tc    0x40                          /* Transmit complete
flag        */
#define rdrf  0x20                          /*  Receive  register
full flag   */
#define idle  0x10                          /* Idle line detected
flag        */
#define or    0x08                          /*   Over-run   error
flag          */
#define nf    0x04                          /* Noise error flag
              */
#define fe    0x02                          /*   Framing   error
flag          */

          /* SCI Data Register */
#define SCDR (* (UBYTE *) (HC_REG_OFFSET + 0x2F))

          /* A/D Control Register */
#define ADCTL (* (UBYTE *) (HC_REG_OFFSET + 0x30))
#define ccf   0x80                          /*    Conversions
complete flag */
#define scan  0x20                          /*  Continuous  scan
flag          */
```

```
#define mult  0x10                                /* Multiple channel
control              */
#define cd       0x08                                /* Channel select
D thru A             */
#define cc    0x04
#define cb    0x02
#define ca    0x01

          /* A/D Result Register 1 */
#define ADR1 (* (UBYTE *) (HC_REG_OFFSET + 0x31))

          /* A/D Result Register 2 */
#define ADR2 (* (UBYTE *) (HC_REG_OFFSET + 0x32))

          /* A/D Result Register 3 */
#define ADR3 (* (UBYTE *) (HC_REG_OFFSET + 0x33))

          /* A/D Result Register 4 */
#define ADR4 (* (UBYTE *) (HC_REG_OFFSET + 0x34))

          /* EEPROM Block Protect Register */
#define BPROT (* (UBYTE *) (HC_REG_OFFSET + 0x35))

          /* System Configuration Options */
#define OPTION (* (UBYTE *) (HC_REG_OFFSET + 0x39))
#define adpu  0x80                                /* A2D system power
up                   */
#define csel  0x40                                /* Clock select
                          */
#define irqe  0x20                                /* IRQ edge select
                     */
#define dly   0x10                                /* Ocillator start-up
delay                */
#define cme   0x08                                /*   Clock   monitor
enable                    */
#define cr1   0x02                                /*  COP  timer  rate
select (high)        */
#define cr0   0x01                                /*  COP  timer  rate
select (low)       */

          /* Arm/reset COP Timer Circuitry */
#define COPRST (* (UBYTE *) (HC_REG_OFFSET + 0x3A))

          /* EEPROM Programming Control Register */
#define PPROG (* (UBYTE *) (HC_REG_OFFSET + 0x3B))
#define byte  0x10                                /* Byte erase mode
                     */
#define row   0x08                                /* Row erase mode
                     */
#define erase 0x04                                /*   Erase/Normal
mode                 */
#define eelat 0x02                                /*   EEPROM   latch
control                   */
#define eepgm 0x01                                /*  EEPROM  program
```

```
control              */

           /* Highest Priority I-bit Interrupt And Misc. */
#define HPRIO (* (UBYTE *) (HC_REG_OFFSET + 0x3C))

           /* RAM -I/O Mapping Register */
#define INIT (* (UBYTE *) (HC_REG_OFFSET + 0x3D))

           /* Factory TEST Control Register */
#define TEST1 (* (UBYTE *) (HC_REG_OFFSET + 0x3E))

           /* COP, ROM & EEPROM Enables */
#define CONFIG (* (UBYTE *) (HC_REG_OFFSET + 0x3F))
```

```
/*              - IOSYST.H -

   This file #defines the external port addresses.

   Version: 3.10 [IANR]

*/

#ifndef PORT_OFFSET
#define   PORT_OFFSET 0x8000
#endif

          /*=====================*/
          /* I/O Port Definitions */
          /*=====================*/

#define LCD_PORT (* (UBYTE *)  (PORT_OFFSET + 0))
#define LED_PORT (* (UBYTE *)  (PORT_OFFSET + 0x40))
#define drs     0x01
#define denable 0x02
```

```
/*****************************************************************
*******
 *  Title:  LC.C - Laser Inspector LCD Controller Task
        *
 *  Ident:  Rev. A
                  *

*****************************************************************
******
 *   Copyright (c) 1993     All rights reserved.
        *
 *
    *
 *  This software is furnished under a license and may be used and
  *
 *   copied only in accordance with the terms of such license and
    *
 *    with the inclusion of the above copyright notice.  This
software  *
 *   or any other copies thereof may not be provided or otherwise
    *
 *  made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version      Why
  *    ----------        -------         ---------
----------------------------------

*****************************************************************
```

```
******/

/*****************************************************************
*******
 * Include Files

******************************************************************
******/

#include "system.h"
#include "io6811.h"
#include "iosyst.h"

#include "lc.h"
#include "cf.h"

#include <stdio.h>

#pragma codeseg(LC)

/*****************************************************************
*******
 * Constants

******************************************************************
******/


/*****************************************************************
********
 * Local Variables

******************************************************************
******/

#pragma memory = zpage
static UBYTE *lc_ptr;
static UBYTE lc_iochar, lc_iosl;                /* LCD/LED
               */
static UBYTE sync_status;
#pragma memory = default

static UBYTE lc_buf[db_buf*2];                       /* LCD  holding
buffer          */


const char blanks[17] =
     {
     0x20, 0x20, 0x20, 0x20, 0x20, 0x20, 0x20, 0x20,
     0x20, 0x20, 0x20, 0x20, 0x20, 0x20, 0x20, 0x20,
     0x00
     };

/*****************************************************************
```

```
*******
 * Function:        lc_PORT
 * Description:          Output display character to LCD/LED port
 * Arguments:       UBYTE - character to be displayed
 * Returns:              none

*****************************************************************
******/

static void lc_PORT(UBYTE ch, UBYTE io)
     {
//   printf("io=%x,ch=%x\r",io,ch);
     LCD_PORT = ch;
     LED_PORT = io;
     }



/****************************************************************
*******
 * Function:        lc_char
 * Description:          Output display character to LCD
 * Arguments:       UBYTE - character to be displayed
 * Returns:              none

*****************************************************************
******/

void lc_char(UBYTE ch)
     {
//   printf("lc_char\r");
     lc_iochar = ch;
     lc_iosl |= drs;                                      /*   setup
register select     */
     lc_iosl &= ~denable;                            /* LCD write/chip
select off*/
     lc_PORT(lc_iochar, lc_iosl | sync_status);   /*   write   to
port/leds       */
//   lc_PORT(lc_iochar, lc_iosl);
     lc_iosl |= denable;                             /* chip  select
on              */
     lc_PORT(lc_iochar, lc_iosl | sync_status);   /*   write   to
port/leds       */
//   lc_PORT(lc_iochar, lc_iosl);
     lc_iosl &= ~denable;                            /* chip  select
off             */
     lc_PORT(lc_iochar, lc_iosl | sync_status);   /*   write   to
port/leds       */
//   lc_PORT(lc_iochar, lc_iosl);
     }

/****************************************************************
*******
 * Function:        lc_cmd
```

```
 * Description:          Output display command to LCD
 * Arguments:       UBYTE - command to be output
 * Returns:              none

*****************************************************************
******/

void lc_cmd(UBYTE ch)
     {
//   printf("lc_cmd\r");
     lc_iochar = ch;
     lc_iosl &= ~(denable + drs);            /*  LCD  write/chip
select off*/
     lc_PORT(lc_iochar, lc_iosl | sync_status);   /*   write   to
port/leds      */
//   lc_PORT(lc_iochar, lc_iosl);
     lc_iosl |= denable;                          /* chip select
on             */
     lc_PORT(lc_iochar, lc_iosl | sync_status);   /*   write   to
port/leds      */
//   lc_PORT(lc_iochar, lc_iosl);
     lc_iosl &= ~denable;                         /* chip select
off            */
     lc_PORT(lc_iochar, lc_iosl | sync_status);   /*   write   to
port/leds      */
//   lc_PORT(lc_iochar, lc_iosl);
     }

/****************************************************************
*******
 * Function:        lc_GOTO
 * Description:          Position cursor to LCD position
 * Arguments:       UBYTE pos
 * Returns:              none

*****************************************************************
******/


void lc_GOTO(UBYTE pos)
     {
     if (pos > 0x0F)  pos += 0x30;           /* beyond the first
line ?    */
     lc_cmd(pos | 0x80);                          /* send command
to the LCD     */
     }

/****************************************************************
*******
 * Function:        lc_CLEAR
 * Description:          Clear LCD screen/position cursor to home
 * Arguments:       none
 * Returns:              none
```

```
*******************************************************************
******/

void lc_CLEAR(void)
     {
     UBYTE i;
     /* 200 = 2ms delay for clear command */
     lc_cmd(1);                                      /* send out
clear command  */
     for (i = 0; i < 200; i++);                 /*  wait  for  a
while              */
     }

/******************************************************************
*******
 * Function:         lc_HOME
 * Description:           Position cursor to home
 * Arguments:        none
 * Returns:               none

*******************************************************************
******/

void lc_HOME(void)
     {
     UBYTE i;
     /* 200 = 2ms delay for home command */
     lc_cmd(2);                                      /* send out
home command   */
     for (i = 0; i < 200; i++);                 /*  wait  for  a
while              */
     }

/******************************************************************
*******
 * Function:         lc_RESET
 * Description:           Reset LCD to known state
 * Arguments:        none
 * Returns:               none

*******************************************************************
******/

void lc_RESET(void)
     {
     if (CF.syncpol)
          sync_status = sync_led;
     else
          sync_status = 0;
     lc_cmd(0x30);                         /*   initialize   LCD
display        */
     lc_cmd(0x30);
     lc_cmd(0x30);
```

```
    lc_cmd(0x38);
    lc_OFF();                                   /*  turn  off  LCD
displau             */
    lc_CLEAR();                                 /*  clear  the  LCD
display         */
    lc_cmd(0x06);                               /*   incrementing
cursor/no shift     */
    lc_cmd(0x10);                               /*  display  shift
off             */
    lc_GOTO(0);                                     /* select DD RAM
address         */
    lc_ON();                                    /* display & cursor
on/blink off*/
    lc_ptr = lc_buf;                            /*   setup   LCD
pointer             */
    lc_iosl = output_led;
    lc_iochar = 0;
    }

/****************************************************************
*******
 * Function:        lc_PUTC
 * Description:         Place charcter into LCD output buffer
 * Arguments:       UBYTE pos, UBYTE ch
 * Returns:             none

*****************************************************************
******/

void lc_PUTC(UBYTE pos, UBYTE ch)
    {
    lc_buf[pos] = ch;                           /* put character into
buffer     */
    }

/****************************************************************
*******
 * Function:        lc_PUTCS
 * Description:         Place n chars of string into LCD output
buffer
 * Arguments:       UBYTE pos, UBYTE *ch, UBYTE n
 * Returns:             none

*****************************************************************
******/

void lc_PUTCS(UBYTE pos, UBYTE *ch, UBYTE n)
    {
    UBYTE ix;

    if (ch != NULL)
        {
        for (ix = 0;ix < n; ix++)
            {
```

```
                if (*ch) lc_buf[pos++] = *ch++;
                else break;
                }
          }
     }


/*************************************************************
*******
 * Function:        lc_PUTS
 * Description:          Place string into LCD output buffer
 * Arguments:       UBYTE pos, UBYTE *ch
 * Returns:              none

*************************************************************
******/

void lc_PUTS(UBYTE pos, UBYTE *ch)
     {
     if (ch != NULL)
          {
          lc_ptr = &lc_buf[pos];                  /*   setup   LCD
buffer pointer */
          while (*ch)    *lc_ptr++ = *ch++;       /* move in the
string        */
          }
     }

/*************************************************************
*******
 * Function:        lc_WRITE
 * Description:          Output LCD buffer to LCD
 * Arguments:       none
 * Returns:              none

*************************************************************
******/

void lc_WRITE(void)
     {
     UBYTE i;

     lc_ptr = lc_buf;
     lc_HOME();                                          /* position
cursor to home */
     for (i = 0;i < dc_l; lc_char(*lc_ptr++), i++);
     lc_GOTO(dc_l);                               /* position for
second line    */
     for (i = dc_l;i < db_buf; lc_char(*lc_ptr++),i++);
     }

void ld_SYNCON()
     {
```

```
     sync_status = sync_led;
//   printf("ld_SYNCON\r");
     lc_PORT(lc_iochar, lc_iosl | sync_status);
     }

void ld_SYNCOFF()
     {
     sync_status = 0;
//   printf("ld_SYNCOFF\r");
     lc_PORT(lc_iochar, lc_iosl | sync_status);   /*   write   to
port/leds      */
//   lc_PORT(lc_iochar, lc_iosl);
     }

/*****************************************************************
*******
 * Function:        ld_WRITE
 * Description:          Turn on specified LEDS
 * Arguments:       UBYTE - led mask bits of leds to turn on
 * Returns:              none

******************************************************************
******/

void ld_WRITE(UBYTE leds)
     {
     lc_iosl &= ~(all_leds);
     lc_iosl |= (leds);
//   printf("ld_WRITE\r");
     lc_PORT(lc_iochar, lc_iosl | sync_status);   /*   write   to
port/leds      */
     }
```

```
/*****************************************************************
********
 *  Title:  LC - LCD Control Module Header File
                *
 *  Ident:  X0.00
                     *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.   This
software    *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *    notice and should not be construed as a commitment by RJS,
Inc.     *
 *
     *
 *   RJS assumes no responsibility for the user or reliability of
     *
 *   its software on equipment that is not supplied by RJS.
     *
 *
     *

*****************************************************************
*******
 *
 *  Modification History
 *
 *  WHEN        WHO        VERSION         WHAT
 *   ----       ---        -------
-------------------------------------
 * 19-NOV-92   DRP        X0.00           Original Writing

*****************************************************************
*******/
```

```
/*****************************************************************
********
 * Global Macros

*****************************************************************
*******/
#define lc_OFF()         lc_cmd(0x08)
#define lc_CUROFF()      lc_cmd(0x0C)
#define lc_ON()          lc_cmd(0x0E)
#define lc_BLINK()       lc_cmd(0x0F)

#define db_buf      0x20                     /*  display  buffer
size       */
#define dc_1        0x10                     /*   display   line
size       */


/*****************************************************************
********
 * Global Macros

*****************************************************************
*******/

#define all_leds    0xFC
#define sync_led    0x04
#define output_led  0xF8


/*****************************************************************
********
 Function Prototypes

*****************************************************************
******/

void lc_cmd(UBYTE ch);                            /* output command
to LCD     */
void lc_GOTO(UBYTE pos);                     /*    position    LCD
cursor          */
void lc_CLEAR(void);                              / *    c l e a r
lcd/cursor home     */
void lc_HOME(void);                               /* cursor home
            */
void lc_RESET(void);                              /*   reset   LCD
system          */
void lc_PUTC(UBYTE pos, UBYTE ch);           /* put char in display
buff */
void lc_PUTCS(UBYTE pos, UBYTE *ch, UBYTE n);
void lc_PUTS(UBYTE pos, UBYTE *ch);               /*  put  str  in
display buffer*/
void lc_WRITE(void);                              /* write buffer
to LCD        */
```

```
void ld_WRITE(UBYTE leds);                        /* led control
function       */
void ld_SYNCON(void);
void ld_SYNCOFF(void);

extern const char blanks[17];

#define lc_LINE1B() lc_PUTS(0, blanks)
#define lc_LINE2B() lc_PUTS(dc_1, blanks)
```

```
/*****************************************************************
********
 *  Title:  MM.H - Memory Module Header File
        *
 *  Ident:  X0.00
                  *

******************************************************************
*******
 *   Copyright (c) 1989, 1990, 1991, 1992    All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *   notice and should not be construed as a commitment by RJS,
Inc.    *
 *
     *
 *   RJS assumes no responsibility for the user or reliability of
     *
 *   its software on equipment that is not supplied by RJS.
     *
 *
     *

******************************************************************
*******
 *
 *  Modification History
 *
 *  WHEN        WHO       VERSION        WHAT
 *  ----        ---       -------
-------------------------------------
 * 19-NOV-92  DRP       X0.00          Original Writing

******************************************************************
*******/
```

```
/*****************************************************************
********
 * function prototypes

*****************************************************************
*******/

non_banked void memclr(void *s1, int count);
non_banked void memcopy(void *s1, void *s2, int count);
```

```
            NAME     mm(16)
            RSEG     RCODE(0)
            PUBLIC   memclr
            PUBLIC   memcopy

            RSEG     RCODE
            P68H11


memclr:          xgdx
                 tsy
                 ldd        2,y
clrloop:    clr      0,x
                 inx
                 subd #1
                 bne        clrloop
                 rts


memcopy:    xgdy                         * Y = destination
                 tsx
                 ldd        4,x                    * D = count
                 ldx        2,x                    * X = source

copyloop:   pshb                         * (2) - save low half
of count
                 ldab 0,x                      * (4)
                 stab 0,y                      * (5)
                 inx                                * (3)
                 iny                                * (4)
                 pulb                          * (2)
                 subd #1                       * (4)
                 bne        copyloop           * (3)
                 rts

                 end
```

```
/*****************************************************************
*******
 *  Title:  MN.C - Laser Inspector Main Controller
               *
 *  Ident:  Rev. A
                 *

*****************************************************************
******
 *   Copyright (c) 1993     All rights reserved.
       *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version      Why
  *    ----------        -------        ---------
----------------------------------
 *   10-OCT-93 DG         VER C         Added  support  for  the
Custom Password
```

```
 *                                                     f u n c t i o n
cf_PASSWORD. The Define value
 *                                                   PASSWORD in LZB.MAK
will include this function.

*****************************************************************
******/

/****************************************************************
*******
 * Include Files

*****************************************************************
******/

#include "system.h"
#include "io6811.h"
#include "stdio.h"

#include "df.h"

#include "mm.h"
#include "lc.h"
#include "cm.h"
#include "sw.h"
#include "dz.h"
#include "gn.h"
#include "an.h"
#include "ds.h"
#include "pa.h"
#include "pt.h"
#include "cf.h"
#include "rt.h"
#include "ht.h"
#include "pr.h"
#include "ol.h"
#include "rs.h"
#include "cl.h"
#include "sn.h"

#pragma codeseg(MN)

/****************************************************************
*******
 * local constants

*****************************************************************
******/

#define fngr_init  0x55                               /*   initialize
fingerprint    */

/****************************************************************
*******
```

```
 * local function prototypes

*******************************************************************
******/

non_banked void reset(void);                              /* system wide
reset          */


static void mn_RESET(void);                                    /       *
initialize BIOS              */
static void mn_NVINIT(void);                                   /       *
initialize NVRAM             */
static void mn_MENUI(void);                                    /* main menu
initialization */
static void mn_MENU(void);                                          /* main
menu                 */
static void mn_execute(void);
static void mn_select(void);

/******************************************************************
*******
 * local variables

*******************************************************************
******/

#pragma memory = no_init

static UBYTE mn_SELECT;
static UBYTE mn_NVRAM;                                    /* NV ram init
flag           */


#pragma memory = default

UBYTE sys_debug;                                          /* system wide
debug flag     */

extern UBYTE power;


/******************************************************************
*******
 * Function:          mn_RESET
 * Description:            Reset BIOS system processing
 * Arguments:         none
 * Returns:                none

*******************************************************************
******/

void mn_RESET(void)
```

```
     {
     disable_interrupt();                                /* disable  all
interrupts    */
     cm_RESET();                                              /* reset SCI
system              */
     lc_RESET();                                              /* reset LCD
system              */
     sw_RESET();                                              /*    reset
SWITCH processing   */
     gn_RESET();
//   dz_RESET();
     ds_RESET();
     pa_RESET();
     ht_RESET();                                              /*    reset
scan history        */
     pt_RESET();                                              /*    reset
pattern setup       */
     pa_RESET();
     cf_RESET();                                              /*    reset
configuration setup*/
     rt_RESET();                                              /*    reset
realtime output     */
     pr_RESET();                                              /*    reset
printer control     */
     ol_RESET();
     sn_RESET();
     OSTimerOn();
     enable_interrupt();
     }

/*******************************************************************
*******
 * Function:          mn_NVINIT
 * Description:            non volitile ram initialization
 * Arguments:         none
 * Returns:                none

********************************************************************
******/

void mn_NVINIT(void)
     {
     UWORD idx;
     sys_debug = FALSE;
     if ((power & sw_select) == 0)
          {
          sys_debug = TRUE;
          lc_GOTO(0);
          lc_PUTS(0, " DEBUG MODE ON ");
          lc_LINE2B();
          lc_WRITE();
          for (idx = 0;idx < 65535; idx++);
```

```
         }

     if ((power & sw_data) == 0)
          {
          memclr((void *)0x40, 0x1FFF);
          disable_interrupt();
          wait_for_interrupt();
          }

     if (mn_NVRAM != fngr_init)                         /* NVram already
initialized*/
          {
          mn_NVRAM = fngr_init;                         /*  show  NVRAM
initialized     */
          }
     }

/*****************************************************************
*******
 * main menu functions

******************************************************************
******/

void mn_MENUI(void)                                     /*   main   menu
initialization */
     {
     lc_PUTS(0    , "GO CONFIG BUFFER");
     lc_PUTS(dc_1, "PATTERN REALTIME");                 /*  output  main
menu            */
     lc_WRITE();
     lc_GOTO(0);                                               /* position
the cursor         */
     lc_BLINK();                                               /* and blink
it.             */
     mn_SELECT = 0;                                     /* menu selection
zero       */
     }

void mn_select(void)
     {
     switch (mn_SELECT)
          {
          case 0:                                       / * * * *    G O
selection               */
               mn_SELECT++;
               lc_GOTO(3);                              /* move cursor to
next           */
               break;

          case 1:                                       /****     CONFIG
selection          */
               mn_SELECT++;
               lc_GOTO(10);                        /*  move  cursor  to
```

```
next            */
                break;

          case 2:                                       /****    PRINT
Selection             */
                mn_SELECT++;
                lc_GOTO(16);
                break;

          case 3:                                       /****   PATTERN
Selection             */
                mn_SELECT++;
                lc_GOTO(24);
                break;

          case 4:                                       /****  REALTIME
Selection         */
                mn_SELECT = 0;
                lc_GOTO(0);
                break;

          }
     }


void mn_execute(void)
     {
     lc_CUROFF();
     switch (mn_SELECT)
          {
          case 0:
          cm_NOWAIT();                             /* no longer wait for
host      */
          pa_MAIN();                                    / *    b e g i n
pattern/scanning task    */
          break;

          case 1:
#ifdef PASSWORD
          if (cf_PASSWORD()) cf_OPEN(); /* open up CONFIG setup
          */
#else
          cf_OPEN();
#endif
          break;

          case 2:
          pr_OPEN();                                    /* open up PRINT
selection      */
          break;

          case 3:
          pt_OPEN();                                    /*    open    up
```

```
PATTERN selection    */
          break;

          case 4:
          rt_OPEN();                                    /*    open    up
REALTIME selection  */
          break;

          }
     }


void main(void)
     {
     disable_interrupt();
     mn_RESET();                                        /*  reset  bios
stuff                 */
     mn_NVINIT();                                  /*    initialize
processing          */
     enable_interrupt();

     while(1)                                      /*   main   "forever"
loop            */
          {
          mn_MENUI();                                   /* display main
menu            */
          while (1)
               {
               sw_WAIT();                               /*  wait  for  a
button press        */
               if (sw_SELECT())                    /*    select    button
pressed         */
                    {
                    mn_select();                   /* select next item on
menu       */
                    }

               if (sw_ENTER())                          /* enter button
pressed                 */
                    {
                    mn_execute();                  /*    execute    item
selected        */
                    mn_MENUI();                         /*   redraw   the
main menu               */
                    }
               if (sw_PRINT() && sw_DATA())
                    {
                    rs_OPEN();
                    }
               }
          }

     }
```

```
/*****************************************************************
********
 *  Title:  OL - Output Port Control Module
                *
 *  Ident:  X0.00
                     *

*****************************************************************
*******
 *   Copyright (c) 1989, 1990, 1991, 1992     All rights reserved.
    *
 *
     *
 *   This software is furnished under a license and may be used and
   *
 *    copied only in accordance with the terms of such license and
     *
 *     with the inclusion of the above copyright notice.   This
software    *
 *    or any other copies thereof may not be provided or otherwise
     *
 *   made available to any other person.  No title to and ownership
of   *
 *    the software is hereby transferred.
     *
 *
     *
 *   The information in this software is subject to change without
    *
 *    notice and should not be construed as a commitment by RJS,
Inc.     *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION         WHAT
 *   ----      ---       -------
-------------------------------------
 * 19-NOV-92   DRP       X0.00           Original Writing
```

```
*****************************************************************
*******/

/****************************************************************
********
 Include Files

*****************************************************************
*******/

#include "system.h"
#include "io6811.h"
#include "stdio.h"
#include "stdlib.h"

#include "mm.h"
#include "cl.h"
#include "lc.h"
#include "dz.h"
#include "an.h"
#include "pt.h"
#include "cf.h"
#include "ol.h"

/****************************************************************
*******
 * local variables

*****************************************************************
******/

#pragma memory = no_init

static UBYTE ol_init;
static UBYTE   led_consecu_count[5];    /* # pass consecu. test
          */
static UBYTE   led_accum_count[5];
static ULONG   led_timer[5];
static BOOLEAN led_latched[5];
static UBYTE   led_nv;
static UBYTE   warn_flg,rej_flg,ansi_flg,good_flg;
static UBYTE   led_noread;

static an_struct led_an[5];
static UBYTE   led_activated[5];        /* led activation flag
          */


#pragma memory = default

/****************************************************************
*******
 * local prototypes
```

```
*****************************************************************
******/

static void sort_result(an_struct *,UBYTE);
static UBYTE ol_POLARITY(UBYTE);
static UBYTE ol_ACCUM(UBYTE);
static UBYTE ol_CONS(UBYTE);
static UBYTE ol_MAKE(an_struct *);
static void  ol_UPDATE(an_struct *);

/****************************************************************
*******
 * Function:       ol_RESET
 * Description:         Reset port output control system
 * Arguments:      none
 * Returns:             none

*****************************************************************
******/

void ol_RESET(void)
     {

     if (ol_init != 0xA5)
          {
          ol_CLEAR();
          ol_init = 0xA5;
          }
     else
          {
          ld_WRITE(ol_POLARITY(led_nv) << 3);
          }
     }

/****************************************************************
*******
 * Function:       ol_CLEAR
 * Description:         Reset port output control system
 * Arguments:      none
 * Returns:             none

*****************************************************************
******/


void ol_CLEAR(void)
     {
     UBYTE i;

     led_nv = 0;
     ld_WRITE(ol_POLARITY(led_nv) << 3);
     led_noread = 0;
```

```
     for (i = 0; i<= 4; i++)
          {
          led_timer[i]          = 0;
          led_latched[i]        = 0;
          led_accum_count[i]    = 0;
          led_consecu_count[i]  = 0;
          led_activated[i]      = notactive;
          }
     }

/*---------------------------------------------------------------
---------*/

void sort_result(an_struct *an, UBYTE port)
     {
     result *p_result;
     p_result = &an->RESULTS;
     warn_flg = p_result->qzfail
                  | p_result->icgfail
                  | p_result->warnn
                  | p_result->warnw
                  | p_result->ratiofail;

     rej_flg  = p_result->rejectn
                  | p_result->rejectw
                  | p_result->formatfail
                  | p_result->chkfail
                  | led_noread;

     ansi_flg = p_result->reffail;
     if (CF.portpara[port].dbthres != 0xFF)
          ansi_flg   |=   (0x01   &   (an->DECGRADE   <=
CF.portpara[port].dbthres));
     else if (CF.portpara[port].good)
          ansi_flg |= p_result->dcdfail;
//             (0x01 & (an->DECGRADE <= CF.dcdthres));

     good_flg = (warn_flg | rej_flg | ansi_flg) ^ 1;
     }

/*---------------------------------------------------------------
--------*/
UBYTE ol_POLARITY(UBYTE led)
     {
     char i;

     for (i = 0; i <= 4; i++ )
          {
          if (!CF.portpara[i].polarity)  led = led ^ (1 << i);

          }
     return(led);
     }
```

```
/*-------------------------------------------------------------
--------*/
UBYTE     ol_ACCUM(UBYTE led_status)
     {
     UBYTE i;
     UWORD exp;

     for (i = 0; i <= 4; i++ )
          {
          exp = (1 << i);
          if ((led_status & exp))         /* led already false ??
     */
               {
               if (CF.portacc[i] != 0xFF)  led_accum_count[i]++;
               if (CF.portcons[i] != 0xFF) led_consecu_count[i]++;

               if ((led_accum_count[i] < CF.portacc[i]) &&
                   (led_consecu_count[i] < CF.portcons[i]))
                    led_status &= ~exp;

               if (led_accum_count[i] >= CF.portacc[i])
                    led_accum_count[i] = 0;

               if (led_consecu_count[i] >= CF.portcons[i])
                    led_consecu_count[i] = 0;

               }
          else
               {
               led_consecu_count[i] = 0;
               led_status &= ~exp;
               }

          }
     return(led_status);
     }

/*-------------------------------------------------------------
--------*/

UBYTE     ol_MAKE(an_struct *an)
     {
     UBYTE  i,led_status;
     result *p_result;
     p_result = &an->RESULTS;

     led_status =  0;

     for ( i = 0; i <= 4; i++)
          {
          sort_result(an,i);
          led_status = led_status |
                        ((CF.portpara[i].warnings & warn_flg) <<
i ) |
```

```
                              ((CF.portpara[i].reject   & rej_flg)  <<
i ) |
                              ((CF.portpara[i].ansi     & ansi_flg) <<
i ) |
                              ((CF.portpara[i].good     & good_flg) <<
i );
          }
     return(led_status);
     }

/*--------------------------------------------------------------
--------*/
UBYTE ol_LATCH(UBYTE led_status)
     {
     UBYTE i;
     UWORD exp;

     for (i = 0; i <= 4; i++)
          {
          exp = (1 << i);
          switch (CF.portpara[i].duration)
               {
               case cf_latched:                    /*  led  type  =
latched        */
                    if (led_status & exp)          /* led now on
               */
                         {
                         led_latched[i] = TRUE;    /*    led    now
latched on          */
                         }
                    if (led_latched[i]) led_status |= exp;
                    break;


               case cf_oneshot:                    /* led type = one
shot       */
                    if (!led_latched[i])           /*    already
latched, leave    */
                         {
                         if (led_status & exp)     /* led now on
          */
                              {
                              led_latched[i] = TRUE;   /* led now
latched on    */
                              l e d _ t i m e r [ i ]     =
OSTimerConvert(CF.oneshotval[i] * 100L);
                              }
                         if (led_latched[i]) led_status |= exp;
                         }
                    else
                         {
                         if (led_timer[i]) led_status |= exp;
                         else              led_status &= ~exp;
```

```
                    }
                break;
            case cf_pershot:
                if (led_status & exp)     /* led now on
    */
                    {
                    l e d _ t i m e r [ i ]       =
OSTimerConvert(CF.pershotval[i] * 100L);
                    }
            }

        }
    return(led_status);
    }

void ol_NOREAD(void)
    {
    an_struct *p;
    UBYTE i, led_old;
    UWORD exp;


    led_noread = 1;
    p = malloc(sizeof(an_struct));
    memclr(p, sizeof(an_struct));
    p->DECGRADE = 0xFF;
    led_old = led_nv;
    ol_UPDATE(p);
    free(p);
    if (led_old != led_nv)
        {
        for (i = 0; i <= 4; i++)
            {
            exp = (1 << i);
            if (((led_old & exp) == 0) && ((led_nv & exp) ==
exp))
                {
                led_activated[i] = noread;
                }
            }
        }
    }


/*-----------------------------------------------------------------
--------*/

void ol_UPDATE(an_struct *an)
    {

    led_nv = ol_MAKE(an);
    led_nv = ol_LATCH(ol_ACCUM(led_nv));
    ld_WRITE(ol_POLARITY(led_nv) << 3);
    led_noread = FALSE;
```

```
     }
/*------------------------------------------------------------
--------*/
void ol_WRITE(an_struct *an)
     {
     UBYTE led_old, i;
     UWORD exp;

     led_old = led_nv;
     ol_UPDATE(an);
//   if (led_old != led_nv)
          {
          for (i = 0; i <= 4; i++)
               {
               exp = (1 << i);
               if    (CF.portpara[i].duration    >    1    &&
CF.portpara[i].duration < 4 )
                    {
                    if (((led_old & exp) == 0) && ((led_nv & exp)
== exp))
                         {
                         memcopy(&led_an[i],   an,
sizeof(an_struct));
                         led_activated[i] = active;
                         }
                    }
             else
                    {
                    if (led_nv & exp)
                         {
                         memcopy(&led_an[i],   an,
sizeof(an_struct));
                         led_activated[i] = active;
                         }
                    }
               }
          }
     }
/*------------------------------------------------------------
--------*/
an_struct *ol_ANREAD(UBYTE *flag, UBYTE idx)
     {
     *flag = led_activated[idx];
     return (an_struct *)&led_an[idx];
     }


/*------------------------------------------------------------
--------*/
void ol_TIMER(void)
     {
     UBYTE i;
     UWORD exp;
```

```
for (i = 0; i <= 4; i++)
      {
      if    (led_timer[i]    &&    (led_latched[i]    ||
CF.portpara[i].duration == cf_pershot))
            {
            if (--led_timer[i] == 0)
                  {
                  exp = (1 << i);
                  led_nv &= ~exp;
                  ld_WRITE(ol_POLARITY(led_nv) << 3);
                  }
            }
      }
}
```

```
/******************************************************************
*******
 *  Title:  OL.H - Output Port Control Header File
                *
 *  Ident:  Rev. A
                     *

*******************************************************************
******
 *   Copyright (c) 1993     All rights reserved.
         *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

*******************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------        -------       ---------
-----------------------------------

*******************************************************************
```

```
******/

#define notactive   0x00
#define active      0x01
#define noread      0x02

/***************************************************************
********
 Function Prototypes

****************************************************************
******/

void ol_RESET(void);
void ol_CLEAR(void);
void ol_WRITE(an_struct *);
void ol_NOREAD(void);
void ol_TIMER(void);
an_struct *ol_ANREAD(UBYTE *, UBYTE);
```

```
/*****************************************************************
********
 *  Title:  PA - Pattern Control Task
                *
 *  Ident:  X0.00
                     *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.   This
software    *
 *   or any other copies thereof may not be provided or otherwise
     *
 *   made available to any other person.  No title to and ownership
of  *
 *   the software is hereby transferred.
     *
 *
     *
 *   The information in this software is subject to change without
    *
 *    notice and should not be construed as a commitment by RJS,
Inc.     *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
-------------------------------------
 * 19-NOV-92   DRP       X0.00          Original Writing
```

```
****************************************************************
*******/

/***************************************************************
********
 Include Files

****************************************************************
*******/

#include "system.h"
#include "io6811.h"
#include "stdlib.h"
#include "stdio.h"
#include "string.h"

#include "mm.h"
#include "gn.h"
#include "dz.h"
#include "an.h"
#include "ds.h"
#include "pt.h"
#include "cl.h"
#include "cf.h"
#include "ro.h"
#include "ht.h"
#include "lc.h"
#include "ol.h"
#include "sn.h"
#include "sw.h"
#include "pr.h"
#include "pa.h"

//#define FILTER TRUE

#pragma codeseg(PA)

/***************************************************************
*******
 * global variables

****************************************************************
******/
#pragma memory = no_init
extern UBYTE pt_changed;
extern UBYTE SECURITY;

#pragma memory = default

BOOLEAN gbl_noread;
BOOLEAN gbl_nomatch;
```

```
/*****************************************************************
*******
 * local variables

*****************************************************************
******/


#pragma memory = default
static ULONG CHK1[4];
static ULONG CHK2[4];
static UBYTE skip_1st_scan;
static UBYTE idx_2nd_scan;
static UBYTE pa_symbcnt;                    /*  pattern  symbol
count              */
static UBYTE pa_idx;
static UBYTE pa_done;
static UBYTE pa_retry;                      /*   scan    retry
counter            */
static UBYTE pa_current;
static UBYTE pa_nomatchcnt;                 /* no match counter
               */
static UBYTE pa_init;
static UBYTE pa_maxacross;
static BOOLEAN pa_firstdecode;
static pt_struct pt_bf[max_pattern];    /* copy of pattern setup
     */
static pa_struct pam;                       /*  Current  pattern
structure */
static pa_struct pa;                        /*   pattern    scan
structure      */
static pa_avgstruct paavg;                  /* pattern averaging
structure */
static BOOLEAN pa_matched[max_pattern]; /* pattern matched flags
     */


/*****************************************************************
*******
 * local prototypes

*****************************************************************
******/

static void     pa_FREESCAN(void);
static void      pa_SYNCMODE(void);
static UBYTE    pa_MATCH(void);
static BOOLEAN  pa_patcnt(void);                 /* patterns all
matched check  */
static void     pa_UPDATE(UBYTE);
static void     pa_CLOSE(UBYTE);
static void     pa_OPEN(UBYTE);
static UBYTE    pa_nomatch(UBYTE);
static UBYTE    pa_matchup(UBYTE);
```

```
static void         pa_NOREAD(void);

/****************************************************************
*******
 * Function:        pa_RESET
 * Description:         Reset pattern control system
 * Arguments:       none
 * Returns:             none

*****************************************************************
******/

void pa_RESET(void)
     {
     }

/****************************************************************
*******
 * Function:        pa_MAIN
 * Description:         Pattern control system task
 * Arguments:       none
 * Returns:             none

*****************************************************************
******/

void pa_MAIN(void)
     {
     UBYTE idx, idy;

     symbactv = pa_maxacross = 0;
     for (idx = 0; idx < pt_cnt; idx++)
          {
          for (idy = 0;idy < ptb[idx].pt_count; idy++)
               symbactv |= ptb[idx].pt_stype[idy];      /*   accum
active symbologies */

          if (pa_maxacross < ptb[idx].pt_count)
               {
               pa_maxacross = ptb[idx].pt_count;   /* accumulate max
across    */
               }
          }
     if (pt_changed)
          {
          ht_CLOSE();              /*  close  out  previous  scan
buffer*/
          pt_changed = FALSE;
          }
     if ( ht_FULL() )
          {
          lc_LINE1B();
          lc_LINE2B();
          lc_PUTS(0,  "HISTORY BUFFER");
```

```
            lc_PUTS(16, "   IS FULL");
            lc_WRITE();
            sw_WAIT();
            return;
            }
       pt_setSECURITY();

       if (CF.opmode == FREESCAN)
            {
            pa_firstdecode = FALSE;
            gn_POWERON();                         /*   turn   on   gun
interrupts        */
            while (1) pa_FREESCAN();              /*   freescan   main
processing     */
            }
       else
            {
            sn_ON();
            gn_BEAMON();                          /*   turn   on   gun
beam/not interr.    */
            while (sn_STATUS() == (UBYTE)FALSE) wait_for_interrupt();
            while (1)
                 {
                 gn_POWERON();                    / *   t u r n   o n
power/interr to gun */
                 pa_SYNCMODE();                        /* sync mode main
processing       */
                 }
            }
       }


/*****************************************************************
*******
 * Function:        pa_FILTER
 * Description:          Pattern filter and match filling function
 * Arguments:       pa_struct - data storage area
 * Returns:              FALSE - no barcode found
 *                  other - number of barcodes found

******************************************************************
******/

UBYTE pa_FILTER(pa_struct *paptr, UBYTE across)
       {
       UBYTE idx,idx2,CHK_OK;
       idx = idx2 = 0;
       CHK_OK = TRUE;

       if (skip_1st_scan == FALSE)
            {
            gn_SCAN();
            if (SUCCESS & 0x80)
                 {
```

```
                CHK1[0]=CHK1[1]=CHK1[2]=CHK1[3]=0;
                CHK1[idx++] = an_3CHKSUM(SBUF);
                if (across > 1)
                     {
                     do
                          {
                          gn_RESCAN();
                          if (SUCCESS & 0x80)
                               {
                               CHK1[idx++] = an_3CHKSUM(SBUF);
                               }
                          } while ((SUCCESS & 0x80) && (across >
idx));
                     }
                gn_FREE();
                }
           else
                {
                gn_FREE();
                return(FALSE);
                }
           }/* endif (skip_1st_scan == FALSE) */
      else
           {
           idx = idx_2nd_scan;
           }
      skip_1st_scan = FALSE;
      gn_SCAN();
      if (SUCCESS & 0x80)
           {
           CHK2[0]=CHK2[1]=CHK2[2]=CHK2[3]=0;
           CHK2[idx2] = an_3CHKSUM(SBUF);
           if (CHK1[idx2] == CHK2[idx2])
                {
                an_ANALYZE(&paptr->pa_an[idx2++]);
                }
           else
                {
                idx2++;
                CHK_OK = FALSE;/* prevent any more an_ANALYZE calls
*/
                }
           if (across > 1)
                {
                do
                     {
                     gn_RESCAN();
                     if (SUCCESS & 0x80)
                          {
                          CHK2[idx2] = an_3CHKSUM(SBUF);
                          if (CHK1[idx2] == CHK2[idx2] && CHK_OK)
                               {
                               an_ANALYZE(&paptr->pa_an[idx2++]);
                               }
```

```
                              else
                                   {
                                   idx2++;
                                   CHK_OK = FALSE;/* prevent any more
an_ANALYZE calls */
                                   }
                              }
                         } while ((SUCCESS & 0x80) && (across > idx2));
                    }
          gn_FREE();
          }
     else
          {
          gn_FREE();
          return(FALSE);
          }
     if (CHK_OK == FALSE || idx != idx2)
          {
          for (idx=0;idx<4;idx++)
               CHK1[idx]=CHK2[idx];
          idx_2nd_scan = idx2;
          skip_1st_scan = TRUE;
          return(FALSE);
          }
     return(idx2);/* the number of correctly matched symbols */
     }

/*****************************************************************
*******
 * Function:          pa_FILL
 * Description:            Pattern match filling function
 * Arguments:         pa_struct - data storage area
 * Returns:                FALSE - no barcode found
 *                    other - number of barcodes found

*****************************************************************
******/

UBYTE pa_FILL(pa_struct *paptr, UBYTE across)
     {
     UBYTE idx;

     idx = 0;
     gn_SCAN();                                        /* request gun
data                */
     if (SUCCESS & 0x80)                          /* sucessfull decode
?            */
          {
          an_ANALYZE(&paptr->pa_an[idx++]);/*   analyze   barcode
scanned      */
          if (across > 1)                              /* more than one
across             */
               {
               do
```

```
                    {
                    gn_RESCAN();                        /*   try   next
scan                */
                    if (SUCCESS & 0x80)
                         {
                         an_ANALYZE(&paptr->pa_an[idx++]);     /*
analyze barcode scanned*/
                         }
                    } while ((SUCCESS & 0x80) && (across > idx));
               }
          }
     gn_FREE();                                         /* free up scan
buffers             */
     return(idx);
     }

/****************************************************************
*******
 * Function:          pa_FREESCAN
 * Description:            Pattern freescan mode function
 * Arguments:         none
 * Returns:                none

*****************************************************************
******/

void pa_FREESCAN(void)
     {
     UBYTE idx;
     ULONG pa_timer;

     pa_current = TRUE;                            /*  show  no  current
pattern        */
     pa_retry = 0;



     if (CF.freetime)                              /* freescan mode and
timer          */
          {
          pa_timer   =   OSTimerConvert(CF.timerval   *   100L)   +
OSTimerTick();
          }
     for (idx = 0;idx < pt_cnt;idx++)    /* allocate and copy over
the  */
          {
                                                    /* pattern setup
data           */
          memcopy(&pt_bf[idx], &ptb[idx], sizeof(pt_struct));
          pa_matched[idx] = FALSE;       /* pattern not matched
          */
          }
     while (!pa_patcnt())                          /* all patterns not
matched        */
```

```
{
if (CF.freetime && pa_firstdecode)/* something decoded
already */
        {
        if (OSTimerTick() >= pa_timer) break; /* time's up
?? */
        }

if (SECURITY < 3)
        pa_symbcnt = pa_FILTER(&pa, pa_maxacross);/* fill up
a pattern */
else
        pa_symbcnt = pa_FILL(&pa, pa_maxacross);/* fill up
a pattern */

if (pa_symbcnt)                         /* found at least
one symbol ?  */
        {
        if (!pa_firstdecode && CF.freetime)
                {
                pa_timer = OSTimerConvert(CF.timerval * 100L)
+ OSTimerTick();
                pa_firstdecode = TRUE;
                }
        pa_retry = 0;
        if (pa_MATCH())                 /*  match  up  the
pattern        */
                {
                pa_nomatchcnt = 0;
                if (pa_idx == pa_current)     /*  current
pattern match  */
                        {
                        pa_UPDATE(pa_current);   /* yes - update
current   */
                        }
                else
                        {
                        if (!(pa_current == (UBYTE)TRUE))
                                {
                                pa_CLOSE(pa_current);
                                pa_current = TRUE;
                                }
                        pa_current = pa_idx;
                        pa_OPEN(pa_idx);     /*  open  up  new
pattern             */
                        }
                }
        else                            /* PATTERN CANNOT BE
MATCHED   */
                {
                pa_current = pa_nomatch(pa_current);
                }
        }
else                                    /* NO BARCODE HAS BEEN
```

```
DECODED    */
               {
               pa_retry++;                          /*  bump  retry
counter             */
               if (pa_retry > 1)               /* over max retries
?              */
                    {
                    if (pa_current != (UBYTE)TRUE)      /*    any
pending averaged             */
                         {
                         pa_CLOSE(pa_current);    /*   close    out
pattern             */
                         pa_current = TRUE;
                         }
                    pa_retry = 0;
                    }
               }
          }    /* end of while */
     if (pa_current != (UBYTE)TRUE)            /*     any     pending
averaged            */
          {
          pa_CLOSE(pa_current);
          pa_current = TRUE;
          }
     if (!pa_patcnt()) pa_NOREAD();            /* all patterns not
completed */
     }


/*****************************************************************
*******
 * Function:         pa_SYNCMODE
 * Description:           Pattern synch mode function
 * Arguments:        none
 * Returns:               none

******************************************************************
******/

void pa_SYNCMODE(void)
     {
     UBYTE idx;

     pa_current = TRUE;                        /*  show  no  current
pattern        */
     pa_retry = 0;


     for (idx = 0;idx < pt_cnt;idx++)    /*   allocate   and   copy
pattern    */
          {
```

```
          memcopy(&pt_bf[idx], &ptb[idx], sizeof(pt_struct));
          pa_matched[idx] = FALSE;       /* pattern not matched
          */
          }
     while (!pa_patcnt())                    /* all patterns not
matched        */
          {
          if (sn_STATUS() == (UBYTE)TRUE) break;/* another synch
has come in    */

          if (SECURITY < 3)
               pa_symbcnt = pa_FILTER(&pa, pa_maxacross);/* fill up
a pattern */
          else
               pa_symbcnt = pa_FILL(&pa, pa_maxacross);/* fill up
a pattern */

          if (pa_symbcnt)                          /* found at least
one symbol ?   */
               {
               pa_retry = 0;
               if (pa_MATCH())             /*   match   up   the
pattern        */
                    {
                    pa_nomatchcnt = 0;
                    if (pa_idx == pa_current)     /*    current
pattern match  */
                         {
                         pa_UPDATE(pa_current);   /* yes - update
current   */
                         }
                    else
                         {
                         if (!(pa_current == (UBYTE)TRUE))
                              {
                              pa_CLOSE(pa_current);
                              pa_current = TRUE;
                              }
                         pa_current = pa_idx;
                         pa_OPEN(pa_idx);    /*   open   up   new
pattern             */
                         }
                    }
               else                        /* PATTERN CANNOT BE
MATCHED   */
                    {
                    pa_current = pa_nomatch(pa_current);
                    }
               }
          else                             /* NO BARCODE HAS BEEN
DECODED   */
               {
               pa_retry++;                         /*   bump   retry
counter             */
```

```
                if (pa_retry > 1)                  /* over max retries
?               */
                    {
                    if (pa_current != (UBYTE)TRUE)      /*    any
pending averaged            */
                        {
                        pa_CLOSE(pa_current);    /*   close   out
pattern             */
                        pa_current = TRUE;
                        }
                    pa_retry = 0;
                    }
                }
            }   /* end of while */

    gn_BEAMON();                                   /* reset gun to beam
only        */
    if (pa_current != (UBYTE)TRUE)                 /*    any    pending
averaged            */
        {
        pa_CLOSE(pa_current);                      /* yes - close out
scan line */
        pa_current = TRUE;                         /* no more patterns
active          */
        }
    if (!pa_patcnt()) pa_NOREAD();                 /* all patterns not
completed */
    else                                           /*    all    patterns
completed       */
        {                                               /* need to wait
for another sync*/
        gn_CLEAR();
        while (sn_STATUS() == (UBYTE)FALSE) wait_for_interrupt();
        }
    }

/*****************************************************************
*******
 * Function:        pa_patcnt
 * Description:          Check for all patterns matched
 * Arguments:       none
 * Returns:              BOOLEAN - true if all have been matched

*****************************************************************
******/

BOOLEAN pa_patcnt(void)
    {
    UBYTE idx;

    for (idx = 0;idx < pt_cnt; idx++)
        {
        if (pa_matched[idx] == FALSE)  return(FALSE);
```

```
	}
	return(TRUE);
	}

/*****************************************************************
*******
 * Function:		pa_OPEN
 * Description:		Pattern data updating function
 * Arguments:		UBYTE - pattern number to open
 * Returns:			none

******************************************************************
******/

void pa_OPEN(UBYTE ptx)
	{
	pt_struct *ptptr;				/*	pt	structure
pointer		*/
	UBYTE idx;
	memclr(&pam,sizeof(pa_struct));		/* clear out pattern
structure */
	ptptr = &pt_bf[ptx];

	if (ptptr->pt_scanper > 1)			/*	multiple	scan
analysis	*/
		{
		memclr(&paavg,	sizeof(pa_avgstruct));/*	clear	avging
struct		*/
		for (idx = 0;idx < ptptr->pt_count; idx++)
			{
			p t p t r - > p t _ c h k s u m [ i d x ]	=
an_CHKSUM(pa.pa_an[idx].SBUF);
							/*	calculate
check sum for code	*/
			ptptr->pt_level	= 4;		/* set security level
to 4	*/
			}
		}
	pa_UPDATE(ptx);					/* update pattern
averages	*/
	}

/*****************************************************************
*******
 * Function:		pa_UPDATE
 * Description:		Pattern data updating function
 * Arguments:		UBYTE - pattern number to update
 * Returns:			none

******************************************************************
******/

void pa_UPDATE(UBYTE ptx)
	{
```

```
     UBYTE idx,idend;
     pt_struct *ptptr;

     ptptr = &pt_bf[ptx];
     idend = ptptr->pt_count;

     for (idx = 0;idx < idend; idx++)
          {
          if (pa.pa_an[idx].STYPE != ANY_CODE)
               {
               pa.pa_an[idx].SUBTYPE = ptptr->pt_subtype[idx];
               }
          if (ptptr->pt_scanper > 1)
               {
               an_AVERAGE(&pa.pa_an[idx], &paavg.pa_avg[idx]);
               }
          else
               {
               pa.pa_an[idx].SCANS = 1;
               an_FINAL(&pa.pa_an[idx]);     /* final analysis for
the scan  */
               }
          }

     if (++paavg.pa_scancount >= ptptr->pt_scanper)
          {
          pa_CLOSE(ptx);                     /* yes - close out
pattern        */
          pa_current = TRUE;                 /* no pattern now
active         */
          }
     }

/*****************************************************************
*******
 * Function:         pa_CLOSE
 * Description:           Pattern data completion function
 * Arguments:        UBYTE - pattern number to close
 * Returns:               none

******************************************************************
******/

void pa_CLOSE(UBYTE ptx)
     {
     UBYTE idx,idend;
     pt_struct *ptptr;
     an_struct *anptr;

     ptptr = &pt_bf[ptx];
     idend = ptptr->pt_count;
     for (idx = 0; idx < idend; idx++)
          {
          if (ptptr->pt_scanper > 1)
```

```
            {
            anptr = (an_struct *)&pam.pa_an[idx];
            an_UNAVERAGE(&paavg.pa_avg[idx], anptr);
            }
        else
            {
            anptr = (an_struct *)&pa.pa_an[idx];
            }
        ol_WRITE(anptr);                    /* write to output
ports       */
        ro_WRITE(anptr);                    /* update realtime
outputs     */
        ht_WRITE(anptr);                    /* update scan history
buffer  */
        ds_WRITE(anptr);                    /*    update    LCD
display         */

        if (sys_debug) pr_ana(anptr);
        }
    pa_matched[ptx] = TRUE;
    }

/*****************************************************************
*******
 * Function:        pa_NOREAD
 * Description:         pattern no match function
 * Arguments:       none
 * Returns:             none

******************************************************************
******/

void pa_NOREAD(void)
    {
    UBYTE ptx;

    for (ptx = 0;ptx < pt_cnt; ptx++)
        {
        if (pa_matched[ptx] == FALSE) /*   pattern   not   yet
matched   */
            {
            ht_NOREAD();
            ol_NOREAD();
            ro_NOREAD();
            break;
            }
        }
    }


/*****************************************************************
*******
```

```
 * Function:        pa_nomatch
 * Description:          pattern no match function
 * Arguments:       Current pattern structure index
 * Returns:              Modified pattern structure index

*****************************************************************
******/

UBYTE pa_nomatch(UBYTE ptx)
     {
     pa_nomatchcnt++;
     if (pa_nomatchcnt > 0)
          {
          if (ptx != (UBYTE)TRUE)             /*    any    pending
averaged             */
               {
               pa_CLOSE(ptx);                      /*   close   out
pattern          */
               ptx = TRUE;                         /*   no   active
pattern anymore      */
               }
          pa_nomatchcnt = 0;                  /* clear out no match
counter    */
          }
     return (ptx);
     }


/****************************************************************
*******
 * Function:        pa_MATCH
 * Description:          Find pattern match with current scan data
 * Arguments:       none
 * Returns:              UBYTE - TRUE if match found.
 * Globals:              pa_idx - index pointing to matched pattern

*****************************************************************
******/


UBYTE pa_MATCH(void)
     {

     if (pa_current != (UBYTE)TRUE)           /* is there an active
pattern    */
          {
          pa_idx = pa_current;                /* yes - does it match
?          */
          if (pa_matchup(pa_idx)) return(TRUE);
          }
     pa_idx = 0;                                   /*    current
doesn't matchup,         */
     while (pa_idx < pt_cnt)                  /*    then    attempt
matchup with all*/
```

```
        {                                          /*   other
patterns                 */
        if (!pa_matched[pa_idx])      /*   pattern   not   yet
opened   */
             {
             if (pa_matchup(pa_idx)) return (TRUE);
             }
        pa_idx++;                           /* try matchup with
next pattern*/
        }
     return (FALSE);                            /*   no   match
found                    */
     }

/**************************************************************
*******
 * Function:         pa_MATCH
 * Description:           Pattern matching function
 * Arguments:        none
 * Returns:               UBYTE - TRUE if match found.
 * Globals:               pa_idx - index pointing to matched pattern

**************************************************************
******/

UBYTE pa_matchup(UBYTE ptx)
     {
     BOOLEAN m[5];                              /* security level
match flag */
     UBYTE idy;
     UBYTE symbmatch,security;
     ULONG pa_chksum;
     pt_struct *ptptr;                          /*   pointer   to
pattern setup   */
     pa_struct *paptr;                          /*   pointer   to
current scan    */

     m[0] = m[1] = m[2] = m[3] = m[4] = TRUE;



     ptptr = &pt_bf[ptx];
     paptr = (pa_struct *)&pa;
     security = ptptr->pt_level;          /*   security   level
rating    */
     if (ptptr->pt_count != pa_symbcnt)   /*    level    one
security        */
          {
          m[1] = FALSE;
          }
     else
```

```
          {
/***************************************************************
*****
 **    level two security check   - match barcode types in pattern
**

***************************************************************
****/
          symbmatch = 0;
          for (idy = 0; idy < pa_symbcnt; idy++)
               {
               if (ptptr->pt_char[idy] == 0)
                    {
                    i f    ( p t p t r - > p t _ s t y p e [ i d y ]    &
paptr->pa_an[idy].STYPE)
                         symbmatch++;
                    }
               else
                    {
                    i f    ( ( p t p t r - > p t _ s t y p e [ i d y ]    &
paptr->pa_an[idy].STYPE)   &&   ((ptptr->pt_char[idy]&0x3F)    ==
paptr->pa_an[idy].CHARS))
                         symbmatch++;
                    }
               }
          if (symbmatch != pa_symbcnt) m[2] = FALSE;

/***************************************************************
*****
 **     level  four  security  check    -  match  barcode  decode  in
pattern**

***************************************************************
****/
          if (security == 4)
               {
               symbmatch = 0;
               for (idy = 0; idy < pa_symbcnt; idy++)
                    {
                    pa_chksum = an_CHKSUM(pa.pa_an[idy].SBUF);
                    if (pa_chksum == ptptr->pt_chksum[idy])
symbmatch++;
                    }
               if (symbmatch != pa_symbcnt) m[4] = FALSE;
               }
          }
     return (m[1] & m[2] & m[4]);
     }
```

```
/*****************************************************************
*******
 *  Title:  PA.H - Laser Inspector Pattern Controller Header File
        *
 *  Ident:  Rev. A
                   *

*****************************************************************
******
 *   Copyright (c) 1993     All rights reserved.
        *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:       Donald R. Palmer, 08-SEP-89, Version X0.00
 *
 *  Modification History
 *
 *  Date          Who     Version      Why
 *    ----------         -------         ---------
-----------------------------------

*****************************************************************
```

```
******/

/*****************************************************************
*******
 * global contants

******************************************************************
******/

#define pa_STARTUP 0x01


extern BOOLEAN gbl_noread;
extern BOOLEAN gbl_nomatch;

/*****************************************************************
*******
 * local structures

******************************************************************
******/

typedef struct
     {
     UBYTE pa_scancount;                          /* scan counter
                    */
     an_avgstruct pa_avg[4];                      /* average analysis
               */
     } pa_avgstruct;

typedef struct
     {
     UWORD pa_totalscans;                         /*  total  #  scans
obtained       */
     an_struct pa_an[4];                          / *   a v e r a g e d
analysis            */
     } pa_struct;


/*****************************************************************
********
 Function Prototypes

******************************************************************
******/

void pa_RESET(void);
UBYTE pa_FILL(pa_struct *, UBYTE);
void pa_MAIN(void);
```

```
/*****************************************************************
********
 *  Title:  PA - Pattern Control Task
                  *
 *  Ident:  X0.00
                       *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of  *
 *   the software is hereby transferred.
     *
 *
     *
 *   The information in this software is subject to change without
    *
 *   notice and should not be construed as a commitment by RJS,
Inc.    *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:       Donald R. Palmer, 19-NOV-92, Version X0.00
 *
 *  Modification History
 *
 *  WHEN       WHO       VERSION        WHAT
 *   ----      ---       -------
-------------------------------------
 * 19-NOV-92   DRP       X0.00          Original Writing
```

```
******************************************************************
*******/

/*****************************************************************
********
 Include Files

******************************************************************
*******/

#include "system.h"
#include "io6811.h"
#include "stdlib.h"
#include "stdio.h"
#include "string.h"

#include "mm.h"
#include "gn.h"
#include "dz.h"
#include "an.h"
#include "ds.h"
#include "pt.h"
#include "cl.h"
#include "cf.h"
#include "ro.h"
#include "ht.h"
#include "lc.h"
#include "ol.h"
#include "sn.h"
#include "sw.h"
#include "pr.h"
#include "pa.h"

//#define FILTER TRUE
#define PRE_FILTER 255
#define POST_FILTER 0
#pragma codeseg(PA)

/*****************************************************************
*******
 * global variables

******************************************************************
******/
#pragma memory = no_init
extern UBYTE pt_changed;
extern UBYTE SECURITY;
extern UBYTE ht_full;

#pragma memory = default

BOOLEAN gbl_noread;
BOOLEAN gbl_nomatch;
```

```
non_banked void reset(void);                    /* system wide
reset          */

/**************************************************************
*******
 * local variables

**************************************************************
******/


#pragma memory = default
static ULONG CHK1[4];
static ULONG CHK2[4];
static UBYTE filter;
static UBYTE idx_1st_scan;
static UBYTE pa_symbcnt;                        /*  pattern  symbol
count          */
static UBYTE pa_idx;
static UBYTE pa_done;
static UBYTE pa_retry;                          /*   scan   retry
counter          */
static UBYTE pa_current;
static UBYTE pa_nomatchcnt;                     /* no match counter
               */
static UBYTE pa_init;
static UBYTE pa_maxacross;
static BOOLEAN pa_firstdecode;
static pt_struct pt_bf[max_pattern];     /* copy of pattern setup
     */
static pa_struct pam;                           /*  Current  pattern
structure */
static pa_struct pa;                            /*   pattern   scan
structure     */
static pa_avgstruct paavg;                      /* pattern averaging
structure */
static BOOLEAN pa_matched[max_pattern]; /* pattern matched flags
     */

/**************************************************************
*******
 * local prototypes

**************************************************************
******/

static void    pa_FREESCAN(void);
static void     pa_SYNCMODE(void);
static UBYTE   pa_MATCH(void);
static BOOLEAN pa_patcnt(void);                 /* patterns all
matched check  */
static void    pa_UPDATE(UBYTE);
static void    pa_CLOSE(UBYTE);
static void    pa_OPEN(UBYTE);
```

```
static UBYTE   pa_nomatch(UBYTE);
static UBYTE   pa_matchup(UBYTE);
static void        pa_NOREAD(void);

/*****************************************************************
*******
 * Function:         pa_RESET
 * Description:           Reset pattern control system
 * Arguments:        none
 * Returns:               none

*****************************************************************
******/

void pa_RESET(void)
     {
     }


void pa_FILTER_SETUP(void)
     {
     if (SECURITY < 3)
          {
          CHK1[0]=CHK1[1]=CHK1[2]=CHK1[3]=0;
          CHK2[0]=CHK2[1]=CHK2[2]=CHK2[3]=-1;
          filter = PRE_FILTER;
          idx_1st_scan = 0;
//        printf("f_set %d\r",filter);
          }
     }

/*****************************************************************
*******
 * Function:         pa_MAIN
 * Description:           Pattern control system task
 * Arguments:        none
 * Returns:               none

*****************************************************************
******/

void pa_MAIN(void)
     {
     UBYTE idx, idy;

     symbactv = pa_maxacross = 0;
     for (idx = 0; idx < pt_cnt; idx++)
          {
          for (idy = 0;idy < ptb[idx].pt_count; idy++)
               symbactv |= ptb[idx].pt_stype[idy];      /*   accum
active symbologies */

          if (pa_maxacross < ptb[idx].pt_count)
               {
```

```
                pa_maxacross = ptb[idx].pt_count;   /* accumulate max
across      */
                }
           }
     if (pt_changed)
           {
           ht_CLOSE();              /*  close  out  previous  scan
buffer*/
           pt_changed = FALSE;
           }
     if ( ht_full )
           {
           lc_LINE1B();
           lc_LINE2B();
           lc_PUTS(0,  "HISTORY BUFFER");
           lc_PUTS(16, "    IS FULL");
           lc_WRITE();
           sw_WAIT();
           disable_interrupt();                   /* disable all
interrupts     */
           reset();                               /*  will  never
return !!!     */
           }
     pt_setSECURITY();

     /* initialize the FILTER CHECKSUM AREAS for startup */
     pa_FILTER_SETUP();

     if (CF.opmode == FREESCAN)
           {
           pa_firstdecode = FALSE;
           gn_POWERON();                     /*   turn   on   gun
interrupts          */
           while (1) pa_FREESCAN();          /*   freescan   main
processing     */
           }
     else
           {
           sn_ON();
           gn_BEAMON();                      /*   turn   on   gun
beam/not interr.    */
           while (sn_STATUS() == (UBYTE)FALSE) wait_for_interrupt();
           while (1)
                {
                gn_POWERON();                / *   t u r n   o n
power/interr to gun */
                pa_SYNCMODE();                    /* sync mode main
processing     */
                }
           }
     }

/*****************************************************************
*******
```

```
 * Function:          pa_FILTER2
 * Description:            Pattern filter and match filling function
 * Arguments:         pa_struct - data storage area
 * Returns:                FALSE - no barcode found
 *                    other - number of barcodes found

*****************************************************************
******/

UBYTE pa_FILTER2(pa_struct *paptr, UBYTE across)
     {
     UBYTE i,idx2,CHK_OK,no_decode;

     if (filter == POST_FILTER)
          {
//        printf("post=%d\r",filter);
          idx2 = 0;
          CHK_OK = TRUE;
          gn_SCAN();
          if (SUCCESS & 0x80)
               {
//             printf("post_suc\r");
               CHK2[0]=CHK2[1]=CHK2[2]=CHK2[3]=0;
               CHK2[idx2] = an_3CHKSUM(SBUF);
               if (CHK1[idx2] == CHK2[idx2])
                    {
                    an_ANALYZE(&paptr->pa_an[idx2++]);
                    }
               else
                    {
                    idx2++;
                    CHK_OK = FALSE;/* prevent any more an_ANALYZE
calls */
                    }
               if (across > 1)
                    {
                    do
                         {
                         gn_RESCAN();
                         if (SUCCESS & 0x80)
                              {
                              CHK2[idx2] = an_3CHKSUM(SBUF);
                              if  (CHK1[idx2]  ==  CHK2[idx2]  &&
CHK_OK)
                                   {

an_ANALYZE(&paptr->pa_an[idx2++]);
                                   }
                              else
                                   {
                                   idx2++;
                                   CHK_OK = FALSE;/* prevent any
more an_ANALYZE calls */
                                   }
```

```
                            }
                        } while ((SUCCESS & 0x80) && (across >
idx2));
                    }
                }
            else
                {/* CHK2 value of (-1) indicates no decode */
//              printf("post_fai\r");
                CHK_OK = FALSE;
                }

            gn_FREE();
//
printf("CHK_OK=%d,idx2=%d,idx=%d\r",CHK_OK,idx2,idx_1st_scan);
            if (CHK_OK == (UBYTE)TRUE && idx2 == idx_1st_scan)
            /* A good decode occurred and the post_filter matched,
*/
            /* therefore, return the number of good symbols decoded.
*/
                {
//              printf("post_god\r");
                return(idx2);
                }
            else if ((CHK_OK == (UBYTE)TRUE && idx2 != idx_1st_scan)
||
                    (CHK_OK == (UBYTE)FALSE && idx2 !=0))
            /* A good decode occurred, but the post_filter did not
match,      */
            /* therefore, setup for a pre_filter processing of the
good symbols */
                {
//              printf("post_god_bad\r");
                for (i=0;i<4;i++)
                    CHK1[i] = CHK2[i];
                idx_1st_scan = idx2;
                filter = PRE_FILTER;
            }
            else
            /* No symbol decode occurred, therefore return zero. */
                {
//              printf("post_bad\r");
                idx2 = 0;
                return(idx2);
                }
            }

        if (filter == PRE_FILTER)
            {
//          printf("pre0=%d\r",filter);
            no_decode = 0;
            CHK_OK = FALSE;
            while (!CHK_OK)
                {
                idx2 = 0;
```

```
CHK_OK = TRUE;
gn_SCAN();
if (SUCCESS & 0x80)
     {
     no_decode = 0;
     CHK2[0]=CHK2[1]=CHK2[2]=CHK2[3]=0;
     CHK2[idx2] = an_3CHKSUM(SBUF);
     if (CHK1[idx2] == CHK2[idx2])
          {
          an_ANALYZE(&paptr->pa_an[idx2++]);
          }
     else
          {
          idx2++;
          CHK_OK   =   FALSE;/*   prevent   any   more
an_ANALYZE calls */
          }
     if (across > 1)
          {
          do
               {
               gn_RESCAN();
               if (SUCCESS & 0x80)
                    {
                    CHK2[idx2] = an_3CHKSUM(SBUF);
                    if (CHK1[idx2] == CHK2[idx2] &&
CHK_OK)
                         {

an_ANALYZE(&paptr->pa_an[idx2++]);
                         }
                    else
                         {
                         idx2++;
                         CHK_OK = FALSE;/* prevent
any more an_ANALYZE calls */
                         }
                    }
               } while ((SUCCESS & 0x80) && (across
> idx2));
          }
     }
else
     {/* CHK2 value of (-1) indicates no decode */
     no_decode++;
     CHK2[0]=CHK2[1]=CHK2[2]=CHK2[3]=-1;
     if (no_decode > 1)
          CHK_OK = TRUE;
     else
          CHK_OK = FALSE;
     }

gn_FREE();
if (CHK_OK == (UBYTE)FALSE || idx_1st_scan != idx2)
```

```
                    {
                    for (i=0;i<4;i++)
                         CHK1[i]=CHK2[i];
                    idx_1st_scan = idx2;
                    }
               }/* end while */
          if (no_decode > 1)
               filter = PRE_FILTER;
          else
               filter = POST_FILTER;
//        printf("pre1=%d,idx2=%d\r",filter,idx2);
          return(idx2);/* the number of correctly matched symbols
*/
          }
//   printf("bad=%d\r",filter);
     return(idx2);/* the number of correctly matched symbols */
     }

/*****************************************************************
*******
 * Function:         pa_FILL
 * Description:           Pattern match filling function
 * Arguments:        pa_struct - data storage area
 * Returns:               FALSE - no barcode found
 *                   other - number of barcodes found

******************************************************************
******/

UBYTE pa_FILL(pa_struct *paptr, UBYTE across)
     {
     UBYTE idx;

     idx = 0;
     gn_SCAN();                                  /* request gun
data                */
     if (SUCCESS & 0x80)                    /* sucessfull decode
?              */
          {
          an_ANALYZE(&paptr->pa_an[idx++]);/*   analyze   barcode
scanned        */
          if (across > 1)                        /* more than one
across              */
               {
               do
                    {
                    gn_RESCAN();                 /*   try   next
scan                */
                    if (SUCCESS & 0x80)
                         {
                         an_ANALYZE(&paptr->pa_an[idx++]);    /*
analyze barcode scanned*/
                         }
                    } while ((SUCCESS & 0x80) && (across > idx));
```

```
            }
        }
    gn_FREE();                                          /* free up scan
buffers         */
    return(idx);
    }

/*****************************************************************
*******
 * Function:        pa_FREESCAN
 * Description:         Pattern freescan mode function
 * Arguments:       none
 * Returns:             none

*****************************************************************
******/

void pa_FREESCAN(void)
    {
    UBYTE idx;
    ULONG pa_timer;

    pa_current = TRUE;                          /* show no current
pattern         */
    pa_retry = 0;

    pa_FILTER_SETUP();

    if (CF.freetime)                            /* freescan mode and
timer           */
        {
        pa_timer  =  OSTimerConvert(CF.timerval  *  100L)  +
OSTimerTick();
        }
    for (idx = 0;idx < pt_cnt;idx++)    /* allocate and copy over
the  */
        {
                                                /* pattern setup
data            */
        memcopy(&pt_bf[idx], &ptb[idx], sizeof(pt_struct));
        pa_matched[idx] = FALSE;        /* pattern not matched
        */
        }
    while (!pa_patcnt())                        /* all patterns not
matched         */
        {
        if (CF.freetime && pa_firstdecode)/* something decoded
already   */
            {
            if (OSTimerTick() >= pa_timer) break; /* time's up
??          */
            }

        if (SECURITY < 3)
```

```
                pa_symbcnt = pa_FILTER2(&pa, pa_maxacross);/* fill
up a pattern    */
          else
                pa_symbcnt = pa_FILL(&pa, pa_maxacross);/* fill up
a pattern */

          if (pa_symbcnt)                             /* found at least
one symbol ?    */
                {
                if (!pa_firstdecode && CF.freetime)
                     {
                     pa_timer = OSTimerConvert(CF.timerval * 100L)
+ OSTimerTick();
                     pa_firstdecode = TRUE;
                     }
                pa_retry = 0;
                if (pa_MATCH())                  /*   match   up   the
pattern         */
                     {
                     pa_nomatchcnt = 0;
                     if (pa_idx == pa_current)      /*    current
pattern match  */
                          {
                          pa_UPDATE(pa_current);    /* yes - update
current    */
                          }
                     else
                          {
                          if (!(pa_current == (UBYTE)TRUE))
                               {
                               pa_CLOSE(pa_current);
                               pa_current = TRUE;
                               }
                          pa_current = pa_idx;
                          pa_OPEN(pa_idx);      /*    open    up    new
pattern              */
                          }
                     }
                else                             /* PATTERN CANNOT BE
MATCHED    */
                     {
                     pa_current = pa_nomatch(pa_current);
                     }
                }
          else                                   /* NO BARCODE HAS BEEN
DECODED    */
                {
                pa_retry++;                           /*   bump   retry
counter              */
                if (pa_retry > 1)                /* over max retries
?               */
                     {
                     if (pa_current != (UBYTE)TRUE)      /*     any
pending averaged               */
```

```
                    {
                    pa_CLOSE(pa_current);   /*   close   out
pattern             */
                    pa_current = TRUE;
                    }
               pa_retry = 0;
               pa_FILTER_SETUP();
               }
          }
     }    /* end of while */
     if (pa_current != (UBYTE)TRUE)          /*    any    pending
averaged            */
          {
          pa_CLOSE(pa_current);
          pa_current = TRUE;
          }
     if (!pa_patcnt()) pa_NOREAD();          /* all patterns not
completed */
     }



/****************************************************************
*******
 * Function:          pa_SYNCMODE
 * Description:            Pattern synch mode function
 * Arguments:         none
 * Returns:                none

****************************************************************
******/

void pa_SYNCMODE(void)
     {
     UBYTE idx;

     pa_current = TRUE;                      /*  show  no  current
pattern        */
     pa_retry = 0;

     pa_FILTER_SETUP();

     for (idx = 0;idx < pt_cnt;idx++)   /*   allocate   and   copy
pattern   */
          {
          memcopy(&pt_bf[idx], &ptb[idx], sizeof(pt_struct));
          pa_matched[idx] = FALSE;      /* pattern not matched
          */
          }
     while (!pa_patcnt())                    /* all patterns not
matched        */
          {
          if (sn_STATUS() == (UBYTE)TRUE) break;/* another synch
```

```
has come in     */

          if (SECURITY < 3)
               pa_symbcnt = pa_FILTER2(&pa, pa_maxacross);/* fill
up a pattern   */
          else
               pa_symbcnt = pa_FILL(&pa, pa_maxacross);/* fill up
a pattern */

          if (pa_symbcnt)                         /* found at least
one symbol ?   */
               {
               pa_retry = 0;
               if (pa_MATCH())               /*   match   up   the
pattern        */
                    {
                    pa_nomatchcnt = 0;
                    if (pa_idx == pa_current)     /*    current
pattern match  */
                         {
                         pa_UPDATE(pa_current);   /* yes - update
current   */
                         }
                    else
                         {
                         if (!(pa_current == (UBYTE)TRUE))
                              {
                              pa_CLOSE(pa_current);
                              pa_current = TRUE;
                              }
                         pa_current = pa_idx;
                         pa_OPEN(pa_idx);    /*   open   up   new
pattern             */
                         }
                    }
               else                          /* PATTERN CANNOT BE
MATCHED   */
                    {
                    pa_current = pa_nomatch(pa_current);
                    }
               }
          else                               /* NO BARCODE HAS BEEN
DECODED   */
               {
               pa_retry++;                             /*   bump   retry
counter             */
               if (pa_retry > 1)             /* over max retries
?              */
                    {
                    if (pa_current != (UBYTE)TRUE)     /*    any
pending averaged          */
                         {
                         pa_CLOSE(pa_current);   /*   close   out
pattern             */
```

```
                        pa_current = TRUE;
                        }
                    pa_retry = 0;
                    pa_FILTER_SETUP();
                    }
                }
          }    /* end of while */

     gn_BEAMON();                                  /* reset gun to beam
only      */
     if (pa_current != (UBYTE)TRUE)                /*    any    pending
averaged           */
          {
          pa_CLOSE(pa_current);                    /* yes  -  close  out
scan line */
          pa_current = TRUE;                       /* no more patterns
active         */
          }
     if (!pa_patcnt()) pa_NOREAD();                /* all patterns not
completed */
     else                                          /*    all    patterns
completed      */
          {                                             /* need to wait
for another sync*/
          gn_CLEAR();
          while (sn_STATUS() == (UBYTE)FALSE) wait_for_interrupt();
          }
     }

/*****************************************************************
*******
 * Function:         pa_patcnt
 * Description:           Check for all patterns matched
 * Arguments:        none
 * Returns:               BOOLEAN - true if all have been matched

******************************************************************
******/

BOOLEAN pa_patcnt(void)
     {
     UBYTE idx;

     for (idx = 0;idx < pt_cnt; idx++)
          {
          if (pa_matched[idx] == FALSE)  return(FALSE);
          }
     return(TRUE);
     }

/*****************************************************************
*******
 * Function:         pa_OPEN
```

```
 * Description:          Pattern data updating function
 * Arguments:        UBYTE - pattern number to open
 * Returns:              none

*****************************************************************
******/

void pa_OPEN(UBYTE ptx)
     {
     pt_struct *ptptr;                         /*   pt    structure
pointer              */
     UBYTE idx;
     memclr(&pam,sizeof(pa_struct));           /* clear out pattern
structure */
     ptptr = &pt_bf[ptx];

     if (ptptr->pt_scanper > 1)                /*   multiple   scan
analysis  */
          {
          memclr(&paavg,  sizeof(pa_avgstruct));/*  clear  avging
struct        */
          for (idx = 0;idx < ptptr->pt_count; idx++)
               {
               p t p t r - > p t _ c h k s u m [ i d x ]    =
an_CHKSUM(pa.pa_an[idx].SBUF);
                                                    /*    calculate
check sum for code  */
               ptptr->pt_level  = 4;          /* set security level
to 4       */
               }
          }
     pa_UPDATE(ptx);                                /* update pattern
averages        */
     }

/****************************************************************
*******
 * Function:         pa_UPDATE
 * Description:           Pattern data updating function
 * Arguments:        UBYTE - pattern number to update
 * Returns:               none

*****************************************************************
******/

void pa_UPDATE(UBYTE ptx)
     {
     UBYTE idx,idend;
     pt_struct *ptptr;

     ptptr = &pt_bf[ptx];
     idend = ptptr->pt_count;

     for (idx = 0;idx < idend; idx++)
```

```
          {
          if (pa.pa_an[idx].STYPE != ANY_CODE)
               {
               pa.pa_an[idx].SUBTYPE = ptptr->pt_subtype[idx];
               }
          if (ptptr->pt_scanper > 1)
               {
               an_AVERAGE(&pa.pa_an[idx], &paavg.pa_avg[idx]);
               }
          else
               {
               pa.pa_an[idx].SCANS = 1;
               an_FINAL(&pa.pa_an[idx]);      /* final analysis for
the scan  */
               }
          }

     if (++paavg.pa_scancount >= ptptr->pt_scanper)
          {
          pa_CLOSE(ptx);                      /* yes - close out
pattern        */
          pa_current = TRUE;                  /* no pattern now
active         */
          }
     }

/****************************************************************
*******
 * Function:       pa_CLOSE
 * Description:         Pattern data completion function
 * Arguments:      UBYTE - pattern number to close
 * Returns:             none

****************************************************************
******/

void pa_CLOSE(UBYTE ptx)
     {
     UBYTE idx,idend;
     pt_struct *ptptr;
     an_struct *anptr;

     ptptr = &pt_bf[ptx];
     idend = ptptr->pt_count;
     for (idx = 0; idx < idend; idx++)
          {
          if (ptptr->pt_scanper > 1)
               {
               anptr = (an_struct *)&pam.pa_an[idx];
               an_UNAVERAGE(&paavg.pa_avg[idx], anptr);
               }
          else
               {
               anptr = (an_struct *)&pa.pa_an[idx];
```

```
          }
          ol_WRITE(anptr);                       /* write to output
ports          */
          ro_WRITE(anptr);                       /* update realtime
outputs        */
          ht_WRITE(anptr);                       /* update scan history
buffer    */
          ds_WRITE(anptr);                       /*    update    LCD
display         */

          if (sys_debug) pr_ana(anptr);
          }
     pa_matched[ptx] = TRUE;
     pa_FILTER_SETUP();
     }

/*****************************************************************
*******
 * Function:          pa_NOREAD
 * Description:            pattern no match function
 * Arguments:         none
 * Returns:                none

*****************************************************************
******/

void pa_NOREAD(void)
     {
     UBYTE ptx;

     for (ptx = 0;ptx < pt_cnt; ptx++)
          {
          if (pa_matched[ptx] == FALSE) /*   pattern   not   yet
matched   */
               {
               ht_NOREAD();
               ol_NOREAD();
               ro_NOREAD();
               break;
               }
          }
     }



/*****************************************************************
*******
 * Function:          pa_nomatch
 * Description:            pattern no match function
 * Arguments:         Current pattern structure index
 * Returns:                Modified pattern structure index

*****************************************************************
```

```
******/

UBYTE pa_nomatch(UBYTE ptx)
     {
     pa_nomatchcnt++;
     if (pa_nomatchcnt > 0)
          {
          if (ptx != (UBYTE)TRUE)             /*    any    pending
averaged             */
               {
               pa_CLOSE(ptx);                      /*   close   out
pattern              */
               ptx = TRUE;                         /*   no   active
pattern anymore      */
               }
          pa_nomatchcnt = 0;                  /* clear out no match
counter   */
          }
     return (ptx);
     }


/*****************************************************************
*******
 * Function:        pa_MATCH
 * Description:          Find pattern match with current scan data
 * Arguments:       none
 * Returns:              UBYTE - TRUE if match found.
 * Globals:              pa_idx - index pointing to matched pattern

*****************************************************************
******/


UBYTE pa_MATCH(void)
     {

     if (pa_current != (UBYTE)TRUE)          /* is there an active
pattern   */
          {
          pa_idx = pa_current;                /* yes - does it match
?         */
          if (pa_matchup(pa_idx)) return(TRUE);
          }
     pa_idx = 0;                                   /*    current
doesn't matchup,        */
     while (pa_idx < pt_cnt)                  /*   then   attempt
matchup with all*/
          {                                        / *   o t h e r
patterns                */
          if (!pa_matched[pa_idx])       /*   pattern   not   yet
opened    */
               {
               if (pa_matchup(pa_idx)) return (TRUE);
```

```
            }
          pa_idx++;                          /* try matchup with
next pattern*/
          }
     return (FALSE);                              /*   no   match
found                   */
     }

/***************************************************************
*******
 * Function:         pa_MATCH
 * Description:           Pattern matching function
 * Arguments:        none
 * Returns:               UBYTE - TRUE if match found.
 * Globals:               pa_idx - index pointing to matched pattern

****************************************************************
******/

UBYTE pa_matchup(UBYTE ptx)
     {
     BOOLEAN m[5];                                /* security level
match flag */
     UBYTE idy;
     UBYTE symbmatch,security;
     ULONG pa_chksum;
     pt_struct *ptptr;                            /*  pointer  to
pattern setup  */
     pa_struct *paptr;                            /*  pointer  to
current scan   */

     m[0] = m[1] = m[2] = m[3] = m[4] = TRUE;


     ptptr = &pt_bf[ptx];
     paptr = (pa_struct *)&pa;
     security = ptptr->pt_level;             /*   security   level
rating    */
     if (ptptr->pt_count != pa_symbcnt)      /*    level    one
security       */
          {
          m[1] = FALSE;
          }
     else


          {
/***************************************************************
*****
 **    level two security check   - match barcode types in pattern
**
```

```
******************************************************************
****/
          symbmatch = 0;
          for (idy = 0; idy < pa_symbcnt; idy++)
               {
               if (ptptr->pt_char[idy] == 0)
                    {
                    i f    ( p t p t r - > p t _ s t y p e [ i d y ]    &
paptr->pa_an[idy].STYPE)
                         symbmatch++;
                    }
               else
                    {
                    i f    ( p t p t r - > p t _ s t y p e [ i d y ]    &
paptr->pa_an[idy].STYPE)
                         if (paptr->pa_an[idy].STYPE == I25)
                              {
                              if  ((ptptr->pt_char[idy]&0x3F)  ==
paptr->pa_an[idy].CHARS/2)
                                   symbmatch++;
                              }
                         else
                              {
                              if  ((ptptr->pt_char[idy]&0x3F)  ==
paptr->pa_an[idy].CHARS)
                                   symbmatch++;
                              }
                    }
               }
          if (symbmatch != pa_symbcnt) m[2] = FALSE;

/*****************************************************************
*****
 **     level four security check    - match barcode decode in
pattern**

******************************************************************
****/
          if (security == 4)
               {
               symbmatch = 0;
               for (idy = 0; idy < pa_symbcnt; idy++)
                    {
                    pa_chksum = an_CHKSUM(pa.pa_an[idy].SBUF);
                    if (pa_chksum == ptptr->pt_chksum[idy])
symbmatch++;
                    }
               if (symbmatch != pa_symbcnt) m[4] = FALSE;
               }
          }
     return (m[1] & m[2] & m[4]);
     }
```

```
/*****************************************************************
********
 *  Title:  PR - Printer Output Control
                *
 *  Ident:  X0.00
                     *

*****************************************************************
*******
 *   Copyright (c) 1989, 1990, 1991, 1992    All rights reserved.
    *
 *
     *
 *   This software is furnished under a license and may be used and
   *
 *   copied only in accordance with the terms of such license and
     *
 *    with the inclusion of the above copyright notice.   This
software   *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *    notice and should not be construed as a commitment by RJS,
Inc.     *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN        WHO       VERSION        WHAT
 *   ----       ---       -------
-------------------------------------
 * 19-NOV-92   DRP       X0.00          Original Writing
```

```
*****************************************************************
*******/

/****************************************************************
********
 Include Files

*****************************************************************
*******/

#include "system.h"
#include "io6811.h"
#include "stdlib.h"
#include "stdio.h"
#include "string.h"

#include "df.h"

#include "se.h"
#include "sw.h"
#include "lc.h"
#include "cm.h"
#include "mm.h"
#include "dz.h"
#include "an.h"
#include "ds.h"
#include "pt.h"
#include "cf.h"
#include "ht.h"
#include "ol.h"
#include "pr.h"
#include "rt.h"


#pragma codeseg(PR)

/****************************************************************
********
 Global Variables

*****************************************************************
*******/

#pragma memory = no_init

UBYTE pr_setup;                                    /* printer output
mode           */
UBYTE pr_init;
UBYTE pr_port;

#pragma memory = default

/****************************************************************
```

```
********
 PR setup structure

***************************************************************
*******/

const SE10 pr_modechoice =
     {
     &pr_setup, 6,"BUFFER INTERFACE", "                    ",
          16, 00, NULL, "PRNT ACTIVATIONS",
          16, 01, NULL, "PRT SCAN HISTORY",
          16, 02, NULL, "PRNT PORT CONFIG",
          16, 03, NULL, "  PRNT PATTERN  ",
          16, 04, NULL, "VIEW ACTIVATIONS",
          16, 05, NULL, "  PRNT REALTIME "
     };

const SE5 pr_portchoice =
     {
     &pr_port, 5, "OUTPUT SELECTION",  "PORT  1 2 3 4 5 ",
          22, 0, NULL, NULL,
          24, 1, NULL, NULL,
          26, 2, NULL, NULL,
          28, 3, NULL, NULL,
          30, 4, NULL, NULL
     };

/***************************************************************
********
 Local Function Prototypes

***************************************************************
*******/

static void pr_config(void);           /*   printout   port
configuration  */
static void pr_htbuf(void);
static void pr_ANALYSIS(void);
static void prt_typedecode(UBYTE type, UBYTE subtype, UBYTE cnt,
UBYTE *cp);
static void pr_PATTERN(void);
static void pr_REALTIME(void);
static void c8_pr16(UBYTE *);
static void pr_VIEW(void);

/***************************************************************
*******
 * Function:        pr_RESET
 * Description:          Initialize system for processing
 * Arguments:       none
 * Returns:              none

***************************************************************
```

```
******/

void pr_RESET(void)
     {
     if (pr_init != 0xA5)                        /*  system  already
initialized    */
          {
          pr_setup = 0;
          pr_init = 0xA5;                             /* show system
initialized         */
          }
     }

/****************************************************************
*******
 * Function:          pr_OPEN
 * Description:            Open Printer Control system for processing
 * Arguments:         none
 * Returns:                none

****************************************************************
******/

void pr_OPEN(void)
     {
     se_setcursor(0);
     se_choice((SE *)&pr_modechoice);            /*  operation  mode
choice         */
     switch (pr_setup)
          {
          case 00:  pr_ANALYSIS(); break;     /* printout storage
buffer         */
          case 01:  pr_htbuf();    break;     /*  printout  scan
history buffer */
          case 02:  pr_config();   break;     / *   p r i n t o u t
configuration        */
          case 03:  pr_PATTERN();  break;     /* printout pattern
setup          */
          case 04:  pr_VIEW();        break; /*   v i e w   s c a n
analysis             */
          case 05:  pr_REALTIME(); break;     /* printout realtime
info */
          }
     }


/****************************************************************
*******
 * Function:          pr_title
 * Description:            Printout title
 * Arguments:         none
 * Returns:                none
```

```
*****************************************************************
******/

static void pr_title(void)
     {
#ifdef SATO
     printf("\r              VERI-SCAN   \r");
#else
#ifdef PSC
     printf("\r           QUICK CHECK OLV\r");
#else
#ifdef PASSWORD
     printf("\r               ILV-100    \r");
#else
     printf("\r             INSPECTOR V  \r");
#endif
#endif
#endif
     printf("            REVISION: C  \r\r");
     }

/****************************************************************
*******
 * Function:         pr_analysis
 * Description:           Printout pattern analysis
 * Arguments:        none
 * Returns:               none

*****************************************************************
******/

static void pr_ANALYSIS(void)
     {
     UBYTE anflag, ch[17];
     an_struct *an;

     while (1)
          {
          se_setcursor(0);
          se_choice((SE *)&pr_portchoice);
          an = ol_ANREAD(&anflag, pr_port);  /*    read    port
activation analysis*/
          lc_LINE1B();
          lc_LINE2B();

          switch (anflag)
               {
               case notactive:
                    sprintf(ch, "PORT %1d INACTIVE",pr_port + 1);
                    lc_PUTS(0, ch);
                    lc_PUTS(16, "ANY = CONTINUE");
                    lc_WRITE();
                    sw_WAIT();
```

```
                    break;
               case noread:
                    sprintf(ch, "PORT %1d NO READ",pr_port + 1);
                    lc_PUTS(0, ch);
                    lc_PUTS(16, "ANY = CONTINUE");
                    lc_WRITE();
                    sw_WAIT();
                    break;
               case active:
                    printf("\r               PORT %1d:",pr_port +
1);

                    pr_ana(an);
                    break;
               }
          }
     }


/****************************************************************
*******
 * Function:          pr_VIEW
 * Description:            View scan activations
 * Arguments:         none
 * Returns:                none

*****************************************************************
******/


void pr_VIEW(void)
     {
     UBYTE anflag,ch[17];
     an_struct *an;


     while (1)
          {
          se_setcursor(0);
          se_choice((SE *)&pr_portchoice);
          an = ol_ANREAD(&anflag, pr_port);  /*   read   port
activation analysis*/
          lc_LINE1B();
          lc_LINE2B();

          switch (anflag)
               {
               case notactive:
                    sprintf(ch, "PORT %1d INACTIVE",pr_port + 1);
                    lc_PUTS(0, ch);
                    lc_PUTS(16, "ANY = CONTINUE");
                    lc_WRITE();
                    sw_WAIT();
                    break;
```

```
                case noread:
                     sprintf(ch, "PORT %1d NO READ",pr_port + 1);
                     lc_PUTS(0, ch);
                     lc_PUTS(16, "ANY = CONTINUE");
                     lc_WRITE();
                     sw_WAIT();
                     break;
                case active:
                     ds_PFdisplay(an);
                     break;
                }
           }
     }


/*****************************************************************
*******
 * Function:         pr_htbuf
 * Description:           Printout scan history buffer
 * Arguments:        none
 * Returns:               none

*****************************************************************
******/


static void pr_htbuf(void)
     {
     UBYTE idz,idx,idy,*cp;
     ht_struct *htptr;


     htptr = ht_LAST();
     if (htptr == NULL) return;
     for (idz = 0;idz < ht_STATUS(); idz++)
          {
          pr_title();
          printf("          PATTERN SET BUFFER\r\r");
          for (idx = 0;idx < max_pattern; idx++)
               {
               if (htptr->ht_pt[idx].pt_count)
                    {
                    printf("SCAN LINE #%d     SECURITY: %d   MAX
SCAN:%2d\r",idx+1,htptr->ht_pt[idx].pt_level,htptr->ht_pt[idx].pt
_scanper);
                    for (idy = 0;idy < htptr->ht_pt[idx].pt_count;
idy++)
                         {
                         if  (htptr->ht_pt[idx].pt_stype[idy]  ==
UPC)
                              c        p                        =
ds_UPC(htptr->ht_pt[idx].pt_subtype[idy]);
                         else
```

```
                              c        p                          =
ds_LONGNAME(htptr->ht_pt[idx].pt_stype[idy],htptr->ht_pt[idx].pt_
subtype[idy]);
                         printf(" BARCODE #%d: %s, CHARS: %d\r",
idy+1, cp,htptr->ht_pt[idx].pt_char[idy]&0x3F);
                         }
                    printf("\r");
                    }
               }
          printf("          SCAN HISTORY BUFFER\r");
          printf("Opening Date ...... No Clock Installed\r");
          printf("        Time ......\r");
          printf("Scans Obtained ....%10ld\r",htptr->ht_scans);
          printf("          PATTERN SCAN ANALYSIS\r");
          printf("WARNINGS:\r");
          p r i n t f ( "         Q U I E T    Z O N E
......%10ld\r",*&htptr->ht_param[qzfail_c]);
          p   r   i   n   t   f   (   "      R   A   T   I   O
..........%10ld\r",*&htptr->ht_param[ratiofail_c]);
          p   r   i   n   t   f   (   "      W    I    D    E
...........%10ld\r",*&htptr->ht_param[warnw_c]);
          p   r   i   n   t   f   (   "   N   A   R   R   O   W
.........%10ld\r",*&htptr->ht_param[warnn_c]);
          p    r    i    n    t    f    (    "       I    C    G
............%10ld\r",*&htptr->ht_param[icgfail_c]);
//        p r i n t f ( "      P R I N T   C O N T R A S T
..%10ld\r",*&htptr->ht_param[pcsfail_c]);
          printf("PROFILE FAILURES:\r");
          p r i n t f ( "        R E F .   D E C O D E
.....%10ld\r",*&htptr->ht_param[reffail_c]);
          p r i n t f ( "       D E C O D A B I L I T Y
....%10ld\r",*&htptr->ht_param[dcdfail_c]);
          printf("REJECTS:\r");
          p r i n t f ( "       M O D    C H E C K
......%10ld\r",*&htptr->ht_param[chkfail_c]);
          p   r   i   n   t   f   (   "   F   O   R   M   A   T
.........%10ld\r",*&htptr->ht_param[formatfail_c]);
          p   r   i   n   t   f   (   "      W    I    D    E
...........%10ld\r",*&htptr->ht_param[rejectw_c]);
          p   r   i   n   t   f   (   "   N   A   R   R   O   W
.........%10ld\r",*&htptr->ht_param[rejectn_c]);
          p r i n t f ( "   N O      R E A D
........%10ld\r",*&htptr->ht_param[readfail_c]);
          p    r    i    n    t    f    (    "   G    O    O    D
.............%10ld\r",*&htptr->ht_param[good_c]);
          printf("\r");
          htptr = ht_PREV();
          }
     }

/***************************************************************
*******
 * Function:        pr_config
 * Description:          Printout port configuration
```

```
 * Arguments:        none
 * Returns:              none

******************************************************************
******/

const UBYTE truestr[3] = { "ON\0" } ;
const UBYTE falsestr[4] = { "OFF\0" };

static void pr_config(void)
     {
     UBYTE idx;


     pr_title();
     printf("         CONFIGURATION BUFFER\r");
//   pr_datetime();
     printf("\r\rOPERATION MODE .....");
     if (CF.opmode)
          {
          printf("SYNC\r");
          printf("SYNC POLARITY ......ACTIVE=");
          if  (CF.syncpol) printf("%s\r\r",truestr);
          else             printf("%s\r\r",falsestr);
//        printf("SCAN TIMER .........N/A\r\r");
          }
     else
          {
          printf("FREESCAN\r");
//        printf("SYNC POLARITY ......N/A\r");
          printf("SCAN TIMER .........");
          if (!CF.freetime)
               {
               printf("disabled\r\r");
               }
          else
               {
               printf("%2d.%d  second(s)\r\r",CF.timerval  /  10,
CF.timerval % 10);
               }
          }

     printf("          PORT CONFIGURATION\r\r");
     printf("                             PORT NUMBER\r");
     printf("                       1   2   3   4   5\r");
     printf("POLARITIY(ACTIVE=)..");
     for (idx = 0;idx < 5;idx++)
          {
          if (CF.portpara[idx].polarity) printf(" ON ");
          else                           printf("OFF ");
          }
     printf("\rDURATION............");
     for (idx = 0;idx < 5;idx++)
          {
```

```
          switch (CF.portpara[idx].duration)
               {
               case cf_perscan: printf(" P  "); break;
              case cf_latched: printf(" L  "); break;
               case cf_pershot:
                    printf(" .%1d ",CF.pershotval[idx]);
                    break;
               case cf_oneshot:
                    printf("%1d.%1d  ",CF.oneshotval[idx]  /  10,
CF.oneshotval[idx] % 10);
                    break;
               }
          }

     printf("\rWARNINGS............");
     for (idx = 0;idx < 5;idx++)
          {
          if (CF.portpara[idx].warnings) printf(" Y  ");
          else                           printf(" N  ");
          }

     printf("\rREJECT..............");
     for (idx = 0;idx < 5;idx++)
          {
          if (CF.portpara[idx].reject)   printf(" Y  ");
          else                           printf(" N  ");
          }

     printf("\rSCAN PROFILE........");
     for (idx = 0;idx < 5;idx++)
          {
          if (CF.portpara[idx].ansi)
               switch (CF.portpara[idx].dbthres)
                    {
                    case 3:printf(" B  ");break;
                    case 2:printf(" C  ");break;
                    case 1:printf(" D  ");break;
                    case 0:printf(" F  ");break;
                    }
          else
               printf(" N  ");
          }

     printf("\rGOOD................");
     for (idx = 0;idx < 5;idx++)
          {
          if (CF.portpara[idx].good)     printf(" Y  ");
          else                           printf(" N  ");
          }

     printf("\rACCUMULATIVE........");
     for (idx = 0;idx < 5;idx++)
          {
          if    (CF.portacc[idx]    !=    0xff)    printf("%2d
```

```
",CF.portacc[idx]);
          else                              printf("OFF ");
          }

     printf("\rCONSECUTIVE.........");
     for (idx = 0;idx < 5;idx++)
          {
          if    (CF.portcons[idx]    !=    0xff)    printf("%2d
",CF.portcons[idx]);
          else                              printf("OFF ");
          }
     printf("\r\r\r");
     }

/*****************************************************************
*******
 * Function:          pr_analysis
 * Description:            Printout pattern analysis
 * Arguments:         none
 * Returns:                none

*****************************************************************
******/

const char   l_grade[] = {'F','D','C','B','A'};

const char *space_str[4] =
     {
     "          ",                    //10 spaces
     "             ",                 //13 spaces
     "                   ",                //19 spaces
     "         "                           //9 spaces
     };
const char *msg_str[14] =
     {
     "INSPECTOR V",                        //0
     "REVISION: X",                        //1
     "SINGLE SCAN ANALYSIS",               //2
     "SCAN AVERAGE",                            //3
     "BARCODE   TYPE ... ",                //4
     "          DECODE ... ",              //5
     "RESULTS .......... ",                //6
     "MOD CHECK - IS ... ",                //7
     "     SHOULD BE ... ",                //8
     "RATIO ........... ",                 //9
     "DECODABILITY ..... ",                //10
     "REFERENCE DECODE ...... ",           //11
     "-100% TOL. +100%",                   //12
     };


char break_str[6][17];
```

```
/*****************************************************************
***********/
static void    prt_title(an_struct *p)
     {
     pr_title();

     if (p->SCANS == 1)
          printf("%s%s\r",space_str[3], msg_str[2]);
     else
          printf("%s  %d %s\r",space_str[3],p->SCANS,msg_str[3]);

     printf("\r");
     }

/*****************************************************************
***********/
static void    prt_range(an_struct *p)
     {
     char  range_str[28];

     ds_GRAPH(p, range_str);
     printf("%s %s\r",space_str[0],msg_str[12]);
     printf("%s %s\r\r",space_str[0],range_str);
     }

/*****************************************************************
***********/
/*argument: the string to be break down*/
/*return: number of string after break down*/
/*****************************************************************
***********/
static char break_down(UBYTE *old_str)
     {
     int k,j,len;
     char l;

     k   = 0;
     l   = 0;
     len = strlen(old_str);

     while(1)
          {
          if ( k > len ) break;

     for (j = 0; j <=15; j++)
            {
              if ( k > len ) break;
              break_str[l][j] = old_str[k];
              k++;
            }
          break_str[l][j] = '\0';
          l++;

          }
```

```
     return(1);
     }
/*************************************************************
***********/
static void    break_msg(UBYTE *inp_str,char n)
     {                                   //n=0:for barcde, n=1 for
warning
     char k,j;

     j = break_down(inp_str);
     printf("%s%s\r", msg_str[5+n],break_str[0]);

     k = 1;
     while (k < j)
          {
          printf("%s%s\r",    space_str[2],break_str[k]);
          k++;
          }
     }
/*************************************************************
***********/
UBYTE     *pass_fail(BOOLEAN flg)
     {
     static UBYTE p_f_str[5];
     UBYTE *p;

     p = p_f_str;
     p_f_str[0] = '\0';
     if (flg == 1)
          strcpy(p_f_str,"FAIL\0");
     else
          strcpy(p_f_str,"PASS\0");
     return(p);
     }

/*************************************************************
********/
static void prt_typedecode(UBYTE type, UBYTE subtype, UBYTE cnt,
UBYTE *cp)
     {
     UBYTE  *bar_type_str,*c8_b1, *c8_b2;
     BYTE   len, idx;

     bar_type_str = ds_LONGNAME(type,subtype);
     printf("%s%s\r",msg_str[4],bar_type_str);

     switch (type)
          {
          case C39:
          case I25:
          case UPC:
          case CBR:
          case C93:
               break_msg(cp,0);                   /*prt barcde */
```

```
            break;

        case C128:
            c8_b1 = (UBYTE *)malloc(cnt * 2 + 1);
            c8_b2 = (UBYTE *)malloc(cnt * 2 + 1);
            C128_BUF(cp, c8_b1, c8_b2, cnt);
            printf("%s",msg_str[5]);
            c8_pr16(&c8_b1[0]);
            printf("\r");
            printf("%s",space_str[2]);
            c8_pr16(&c8_b2[0]);
            printf("\r");
            len = strlen(c8_b1);
            len -= 16;
            idx = 16;
            while (len >= 0)
                {
                printf("%s",space_str[2]);
                c8_pr16(&c8_b1[idx]);
                printf("\r");
                printf("%s",space_str[2]);
                c8_pr16(&c8_b2[idx]);
                printf("\r");
                len -= 16;
                idx += 16;
                }
            free(c8_b2);
            free(c8_b1);
            break;
        }
    }

static void c8_pr16(UBYTE *cp)
    {
    UBYTE idx;

    for (idx = 0; idx < 16; idx++)
        {
        if (*cp) cm_WRITE(*cp++);
        else break;
        }
    }

/*****************************************************************
***********/
static void    prt_analy(an_struct *p)
    {
    UBYTE  *warning_str;
    UBYTE  *pass_fail_str;
    UWORD  d1,d2;

    prt_typedecode(p->STYPE, p->SUBTYPE, p->CHARS, p->SBUF);
```

```
     warning_str = malloc(128);
     if (warning_str)
          {
          ds_WARNING(p, warning_str);
          break_msg(warning_str,1);          //prt barcde
          free(warning_str);
          }

     if ((p->MODCKIS[0]) || (p->STYPE == C128))
          {
          pass_fail_str = pass_fail(p->RESULTS.chkfail);     //prt
mod chk

          switch (p->STYPE)
               {
               case C39:
               case I25:
               case UPC:
               case CBR:
                    printf("%s%c
%s\r",msg_str[7],p->MODCKIS[0],pass_fail_str );
                    printf("%s%c\r",msg_str[8],p->MODCKSB[0]);
                    break;

               case C128:
                    p r i n t f ( " % s % 3 d
%s\r",msg_str[7],p->MODCKIS[0],pass_fail_str );
                    printf("%s%3d\r",msg_str[8],p->MODCKSB[0]);
                    break;


               case C93:
                    printf("%s%c        %c
%s\r",msg_str[7],p->MODCKIS[0],p->MODCKIS[1],pass_fail_str );
                    p   r   i   n   t   f   (   "   %   s   %   c
%c\r",msg_str[8],p->MODCKSB[0],p->MODCKSB[1]);
                    break;

               }


          }

     if (p->RATIO)
          {
          d1          = p->RATIO/10;              //prt ratio
          d2          =  p->RATIO%10;
          pass_fail_str = pass_fail(p->RESULTS.ratiofail);
          printf("%s%1d.%1d                  %s\r",msg_str[9],d1,
d2,pass_fail_str);
          }

     pass_fail_str = pass_fail(p->RESULTS.dcdfail);
     p r i n t f ( " % s 0 . % 0 2 d        % c
```

```
%s\r",msg_str[10],p->DECODABILITY,l_grade[p->DECGRADE],pass_fail_
str);

     printf("%s %c\r",msg_str[11],l_grade[p->REFGRADE]);

     printf("\r");
     }
/*****************************************************************
***********/
/*****************************************************************
***********/
void pr_ana(an_struct *p)
     {
     prt_title(p);
     prt_analy(p);
     prt_range(p);
     }


/*****************************************************************
*******
 * Function:        pr_PATTERN
 * Description:          Printout pattern configuration
 * Arguments:       none
 * Returns:              none

******************************************************************
******/


static void pr_PATTERN(void)
     {
     UBYTE idx, idy, *cp;

     pr_title();
     printf("           PATTERN SET BUFFER\r\r");
     for (idx = 0;idx < pt_cnt; idx++)
          {
          printf("SCAN  LINE  #%d          SECURITY:  %d     MAX
SCAN:%2d\r",idx+1,ptb[idx].pt_level,ptb[idx].pt_scanper);
          for (idy = 0;idy < ptb[idx].pt_count; idy++)
               {
               if (ptb[idx].pt_stype[idy] == UPC)
                    cp = ds_UPC(ptb[idx].pt_subtype[idy]);
               else
                    c                                        p    =
ds_LONGNAME(ptb[idx].pt_stype[idy],ptb[idx].pt_subtype[idy]);
               printf("  BARCODE  #%d:  %s,  CHARS:  %d\r",  idy+1,
cp,ptb[idx].pt_char[idy]&0x3F);
               }
          printf("\r");
          }
     }
```

```
/*****************************************************************
*******
 * Function:        pr_REALTIME
 * Description:         Printout real-time configuration
 * Arguments:       none
 * Returns:             none

*****************************************************************
******/


static void pr_REALTIME(void)
     {
     pr_title();
     printf("            REALTIME SETUP\r\r");
     printf("REAL TIME XMIT\r");
     switch (rt_setup)
          {
          case rt_disable:printf(" DISABLED\r");break;
          case rt_status:printf(" STATUS ONLY\r");break;
          case rt_stat_symb:printf(" STATUS+SYMBOLGY\r");break;
          case  rt_stat_symb_decode:printf("
STAT+SYMB+DECODE\r");break;
          case rt_decode:printf(" DECODE ONLY\r");break;
          case rt_stat_symb_data:printf(" STAT+SYMB+DATA\r");break;
          case rt_data:printf(" DATA ONLY\r");break;
          }
     printf("\r");
     printf("XMIT FRAMING\r");
     switch (rt_frame)
          {
          case 00:printf(" DISABLED\r");break;
          case 01:printf(" STX+ETX\r");break;
          case 02:printf(" TRAILING <CR>\r");break;
          }
     printf("\r");
     printf("XMIT PROTOCOL\r");
     switch (print_prot)
          {
          case 00:printf(" XON/XOFF\r");break;
          case 255:printf(" RTS/CTS\r");break;
          }
     printf("\r");
     }
```

```
/*****************************************************************
********
 *  Title:  PR - Printer Control Header
                    *
 *  Ident:  X0.00
                         *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of  *
 *   the software is hereby transferred.
     *
 *
     *
 *   The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
------------------------------------
 * 19-NOV-92   DRP       X0.00          Original Writing
```

```
*****************************************************************
*******/

/****************************************************************
********
 Function Prototypes

*****************************************************************
******/

void pr_RESET(void);
void pr_OPEN(void);

void pr_ana(an_struct *);
UBYTE *pass_fail(BOOLEAN);
```

```
/*****************************************************************
*******
 *  Title:  PT.C - Laser Inspector Pattern Setup
         *
 *  Ident:  Rev. A
                   *

******************************************************************
******
 *   Copyright (c) 1993     All rights reserved.
         *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

******************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------         -------        ---------
-----------------------------------
```

```
*******************************************************************
******/

/******************************************************************
*******
 * Include Files

*******************************************************************
******/

#include "system.h"
#include "io6811.h"

#include "stdlib.h"
#include "stdio.h"
#include "string.h"

#include "df.h"

#include "se.h"
#include "sw.h"
#include "lc.h"
#include "mm.h"
#include "gn.h"
#include "dz.h"
#include "an.h"
#include "pa.h"
#include "pr.h"
#include "pt.h"
#include "ht.h"


#pragma codeseg(PT)

/******************************************************************
*******
 * Local Variables Files

*******************************************************************
******/


#pragma memory = no_init

static UBYTE pt_init;                           /* pattern initialized
byte       */
UBYTE SECURITY;
UBYTE pt_cnt;                                   /* pattern count
              */
UWORD pt_symb;                                  /* pattern symbology
enabled    */
UBYTE pt_codecnt;
pt_struct ptb[max_pattern];                     / *   p a t t e r n
structures              */
```

```
UBYTE pt_codeval;
UBYTE pt_charval;
UBYTE pt_codemax;
UBYTE pt_dmatchmode;
UBYTE pt_charmode;
UBYTE pt_oldval;
UBYTE pt_changed;

#pragma memory = default

/****************************************************************
*******
 * Pattern Code Constants

****************************************************************
******/
extern const UBYTE YES_str[4];
extern const UBYTE NO_str[4];
const UBYTE OFF_str[] = "OFF";
const UBYTE C39_str[] = "3OF9 CODE";
const UBYTE C39s[] = "C39";
const UBYTE I25_str[] = "I2OF5";
const UBYTE I25s[] = "I25";
const UBYTE C93_str[] = "CODE 93" ;
const UBYTE C93s[] = "C93";
const UBYTE C128_str[] = "CODE 128";
const UBYTE C12s[] = "128";
const UBYTE CBR_str[] = "CODABAR";
const UBYTE CBRs[] = "CBR";
const UBYTE UPC_str[] = "UPC/EAN";
const UBYTE UPCs[] = "U/E";
const UBYTE ANY_str[] = "AUTOMATIC";
const UBYTE ANYs[] = "ANY";

const UBYTE C39USS_str[]  = "USS 3OF9";
const UBYTE C39B1_str[]   = "AIAG-B1";
const UBYTE C39B3_str[]   = "AIAGB3/4/5";
const UBYTE C39LOG_str[]  = "LOGMARS";
const UBYTE C39HIBC_str[] = "HIBC";
const UBYTE C39ANSI_str[] = "ANSI 3OF9";
const UBYTE C39W43_str[]  = "ANSI W/43";

const UBYTE I25USS_str[]  = "USS I2OF5";
const UBYTE I25ANSI_str[] = "ANSI I2OF5";
const UBYTE I25CC_str[]   = "UPC CASEC";

const UBYTE C93USS_str[]  = "USS C93";
const UBYTE C93ANSI_str[] = "ANSI C93";

const UBYTE C128USS_str[]  = "USS C128";
const UBYTE C128ANSI_str[] = "ANSI C128";


const UBYTE CBRUSS_str[]      = "USS CODABR";
```

```
const UBYTE CBRANSI_str[]   = "ANSI CODAB";


const UBYTE UPC80_str[0]    = "80-89%";
const UBYTE UPC90_str[0]    = "90-115%";
const UBYTE UPC116_str[0]   = "116-150%";
const UBYTE UPC151_str[0]   = "151-200%";


const UBYTE pt_curcodepos[4] =
     {    16 , 20 , 24, 28 };

const SE13 pt_UPCchoice =                         /*  pattern   choice
table                */
     {
     &pt_charval , 13 , NULL , NULL,
          0,   0, UPC_str, "  0",
          0,  12, UPC_str, " UA",
          0,  14, UPC_str, "UA2",
          0,  17, UPC_str, "UA5",
          0,   8, UPC_str, " UE",
          0,  10, UPC_str, "UE2",
          0,  13, UPC_str, "UE5",
          0,  0x88, UPC_str, " E8",
          0,  0x8A, UPC_str, "E82",
          0,  0x8D, UPC_str, "E85",
          0,  0xCD, UPC_str, " E3",
          0,  15, UPC_str, "E32",
          0,  18, UPC_str, "E35"
     } ;


const SE30 pt_OTHER =
     {
     &pt_charval, 30,NULL, NULL,
          0, 0, "*", "  0",
          0, 4, "*", "  4",
          0, 5, "*", "  5",
          0, 6, "*", "  6",
          0, 7, "*", "  7",
          0, 8, "*", "  8",
          0, 9, "*", "  9",
          0,10, "*", " 10",
          0,11, "*", " 11",
          0,12, "*", " 12",
          0,13, "*", " 13",
          0,14, "*", " 14",
          0,15, "*", " 15",
          0,16, "*", " 16",
          0,17, "*", " 17",
          0,18, "*", " 18",
          0,19, "*", " 19",
          0,20, "*", " 20",
          0,21, "*", " 21",
```

```
        0,22, "*", " 22",
        0,23, "*", " 23",
        0,24, "*", " 24",
        0,25, "*", " 25",
        0,26, "*", " 26",
        0,27, "*", " 27",
        0,28, "*", " 28",
        0,29, "*", " 29",
        0,30, "*", " 30",
        0,31, "*", " 31",
        0,32, "*", " 32"
    };

//const SE8 pt_codechoice =                    /*   pattern   choice
table             */
//   {
//   &pt_codeval , 8 , NULL , NULL,
//        0,  0x00, OFF_str, NULL,
//        0,   C39, C39_str, NULL,
//        0,   I25, I25_str, NULL,
//        0,   C93, C93_str, NULL,
//        0,  C128, C128_str, NULL,
//        0,   CBR, CBR_str, NULL,
//        0,   UPC, UPC_str, NULL,
//        0,  0xFF, ANY_str, NULL
//   } ;

const SE8 pt_codechoice =                      /*   pattern   choice
table             */
     {
     &pt_codeval , 8 , NULL , NULL,
          0,  0x00, OFF_str, OFF_str,
          0,   C39, C39_str, C39s,
          0,   I25, I25_str, I25s,
          0,   C93, C93_str, C93s,
          0,  C128, C128_str, C12s,
          0,   CBR, CBR_str, CBRs,
          0,   UPC, UPC_str, UPCs,
          0,  0xFF, ANY_str, ANYs
     } ;

const SE8 pt_c39choice =                  /* code 39 choice table
          */
     {
     &pt_codeval, 7, NULL, NULL,
          0, 00, C39USS_str, "USS",
          0, 01, C39B1_str, " B1",
          0, 02, C39B3_str, "345",
          0, 03, C39LOG_str, "LOG",
          0, 04, C39HIBC_str, "HIB",
          0, 05, C39ANSI_str, "ANS",
          0, 06, C39W43_str, "W43"
     };
```

```
const SE5 pt_I25choice =                      /* code 39 choice table
        */
     {
     &pt_codeval, 3, NULL, NULL,
          0, 00, I25USS_str, "USS",
          0, 01, I25ANSI_str, "ANS",
          0, 02, I25CC_str, "CAS"
     };

const SE2 pt_C93choice =                      /* code 93 choice table
        */
     {
     &pt_codeval, 2, NULL, NULL,
          0, 00, C93USS_str, "USS",
          0, 01, C93ANSI_str, "ANS"
     };

const SE2 pt_C128choice =                          /*  code  128  choice
table          */
     {
     &pt_codeval, 2, NULL, NULL,
          0, 00, C128USS_str, "USS",
          0, 01, C128ANSI_str, "ANS"
     };

const SE2 pt_CBRchoice =                      /* code 39 choice table
        */
     {
     &pt_codeval, 2, NULL, NULL,
          0, 00, CBRUSS_str, "USS",
          0, 01, CBRANSI_str, "ANS"
     };

const SE5 pt_UEchoice =                            /*   UPC/EAN   choice
table               */
     {
     &pt_codeval, 4, NULL, NULL,
          0, 03, UPC80_str, " 80",
          0, 00, UPC90_str, " 90",
          0, 01, UPC116_str, "116",
          0, 02, UPC151_str, "151"
     };


const SE10 pt_maxscan =                            / *    m a x i m u m
scan/analysis screen      */
     {
     &pt_codemax , 10 , "L# Y MAXIMUM    ","SCANS/EVAL   YY ",
               29 ,  1, "!", " 1",
               29 ,  2, "!", " 2",
               29 ,  3, "!", " 3",
               29 ,  4, "!", " 4",
               29 ,  5, "!", " 5",
               29 ,  6, "!", " 6",
```

```
            29 ,  7, "!", " 7",
            29 ,  8, "!", " 8",
           29 ,  9, "!", " 9",
            29 , 10, "!", "10"
     };

const SE2 pt_dmatch =                          /* data match mode
selection */
     {
     &pt_dmatchmode , 2, "DATA MATCH MODE?", "   YES     NO  ",
            19, 255, NULL, NULL,
            27,   0, NULL, NULL
     };

const SE2 pt_charmatch =                       /* data match mode
selection */
     {
     &pt_charmode , 2, "# OF CHARS MODE?", "   YES     NO  ",
            19, 255, NULL, NULL,
            27,   0, NULL, NULL
     };

const SE2 pt_scanpattern1 =
     {
     &pt_codeval , 2, "SCAN LINE #1 ",NULL,
           13 ,255, NULL, YES_str,
            13 ,   0, NULL, NO_str
     };

const SE2 pt_scanpattern2 =
     {
     &pt_codeval , 2, "SCAN LINE #2 ",NULL,
           13 ,255, NULL, YES_str,
            13 ,   0, NULL, NO_str
     };

const SE2 pt_scanpattern3 =
     {
     &pt_codeval , 2, "SCAN LINE #3 ",NULL,
           13 ,255, NULL, YES_str,
            13 ,   0, NULL, NO_str
     };

const SE2 pt_scanpattern4 =
     {
     &pt_codeval , 2, "SCAN LINE #4 ",NULL,
           13 ,255, NULL, YES_str,
            13 ,   0, NULL, NO_str
     };

const SE2 pt_scanpattern5 =
     {
     &pt_codeval , 2, "SCAN LINE #5 ",NULL,
           13 ,255, NULL, YES_str,
```

```
            13 ,   0, NULL, NO_str
    };

const SE2 pt_scanpattern6 =
    {
    &pt_codeval , 2, "SCAN LINE #6 ",NULL,
            13 ,255, NULL, YES_str,
             13 ,   0, NULL, NO_str
    };

/****************************************************************
*******
 * Local Function Prototypes

****************************************************************
******/
static void pt_CLEAR(void);
static void pt_codes(void);             /* allow entry of pattern
codes      */
static void pt_match(void);             /* allow entry of pattern
match      */
static void pt_matchchars(void);              /*  allow  entry  of
pattern match  */
static void pt_setsecurity(UBYTE);      /*  setup  level  1  or  2
secruity  */
static void pt_dspcodes(UBYTE, UBYTE);
static void pt_dspnum(UBYTE, UBYTE);
static void pt_wait(void);
static void pt_dspsubtype(UBYTE, UBYTE);

/****************************************************************
*******
 * Function:        pt_CLEAR
 * Description:          Initialize system for processing
 * Arguments:       none
 * Returns:              none

****************************************************************
******/

void pt_CLEAR(void)
    {
    UBYTE i;
    memclr(ptb, sizeof(pt_struct) * max_pattern);
    ptb[0].pt_stype[0] = ANY_CODE;     /* single pattern of ANY
    */
    ptb[0].pt_count = 1;               /*    one    barcode    in
pattern     */
    for (i=0;i<max_pattern;i++)
         {
         ptb[i].pt_scanper = 1;              /*    single    scan
analysis         */
         ptb[i].pt_level = 1;
         }
```

```
#ifdef SATO
     ptb[0].pt_scanper = 10;              /* maximum scan analysis
          */
#endif

     SECURITY = ptb[0].pt_level = 1;                /* security level
one           */
     ptb[0].pt_char[0] = 0;
     ptb[0].pt_char[1] = 0;
     ptb[0].pt_char[2] = 0;
     ptb[0].pt_char[3] = 0;              /* single scan analysis
          */
     ptb[0].pt_symbactv = 0xffff;
     pt_cnt = 1;                              /* single pattern
               */
     pt_codecnt = 1;
     pt_symb = 0xffff;
     }

/****************************************************************
*******
 * Function:        pt_RESET
 * Description:          Initialize system for processing
 * Arguments:       none
 * Returns:              none

*****************************************************************
******/

void pt_RESET(void)
     {
     if (pt_init != 0xA5)                     /*  pattern  already
initialized     */
          {
          pt_CLEAR();
          pt_init = 0xA5;                          /* show has been
initialized     */
          }
     }

/****************************************************************
*******
 * Function:        pt_OPEN
 * Description:          Open Pattern Setup system for processing
 * Arguments:       none
 * Returns:              none

*****************************************************************
******/

void pt_OPEN(void)
     {
     UBYTE idx;
```

```
     pt_changed = FALSE;
     pt_codes();                                        /* allow entry of
pattern codes  */
     pt_matchchars();
     pt_match();                                        /* allow entry of
pattern match  */
     for (idx = pt_cnt;idx < max_pattern; idx++)
          {
          memclr(&ptb[idx], sizeof(pt_struct));
          }
     if (pt_changed)
          {
          ht_CLOSE();              /*  close  out  previous  scan
buffer*/
          pt_changed = FALSE;
          }
     }

void pt_setSECURITY(void)
     {
     UBYTE pt_no;
     pt_no = 0;
     SECURITY = 4; /* set to the highest security level */
     while (pt_no < pt_cnt)
          {
          if (SECURITY > ptb[pt_no].pt_level)
               SECURITY = ptb[pt_no].pt_level;
          pt_no++;
          }
     }

/*****************************************************************
*******
 * Function:          pt_CODES
 * Description:            Allow entry of pattern set
 * Arguments:         none
 * Returns:                none

*****************************************************************
******/

void pt_codes(void)
     {
     UBYTE     i,idx, idy;
     UBYTE     pt_no;                                   /*    current
pattern number      */
     UBYTE     ch[20];

     pt_no = pt_symb = 0;
     lc_LINE1B();
     lc_LINE2B();
     while (pt_no < max_pattern)
          {
          for (idx = 0; idx < 4; idx++)
```

```
                {
                pt_dspcodes(pt_no, idx);
                }
            sprintf(ch, "L#%2d            ", pt_no+1);
            lc_PUTS(0, ch);
            lc_WRITE();
            idx = 0;
//          printf("pt_no=%d,pt_cnt0=%d\r",pt_no,pt_cnt);
            while (idx < 4)
                {
//              printf("pt_no=%d,pt_cnt1=%d\r",pt_no,pt_cnt);
                pt_dspcodes(pt_no, idx);
                pt_oldval = pt_codeval;
                pt_wait();
                ptb[pt_no].pt_stype[idx] = pt_codeval;  /*    put
selection away      */
                for ( i=0 ; ptb[i].pt_stype[0]!=0 && i!=max_pattern;
i++ );
                pt_cnt = i;
                if (pt_oldval == 0 && pt_codeval != 0)
                    {
//                  printf("pt_no=%d,pt_cnt2=%d\r",pt_no,pt_cnt);
                    for ( i=0,pt_codecnt=0 ; ptb[i].pt_stype[0]!=0
&& i!=max_pattern ; i++ )
                        {
//
printf("ptb[%d].pt_count=%d\r",i,ptb[i].pt_count);
                        pt_codecnt += ptb[i].pt_count;      /    *
barcodes in this pattern        */
                        }
//
printf("pt_no=%d,pt_codecnt1=%d\r",pt_no,pt_codecnt);
                    if  (pt_codecnt+1  >  max_barcode)/*  too  many
barcodes ??             */
                        {
                        lc_PUTS(0,  "    TOO MANY    ");
                        lc_PUTS(16, "    BARCODES    ");
                        lc_WRITE();
                        if (idx == 0)
                            pt_cnt--;
//                      printf("ptb[%d].pt_stype[%d]    =
%d\r",pt_no,idx,ptb[pt_no].pt_stype[idx]);
                        ptb[pt_no].pt_stype[idx] = 0;
//                      printf("ptb[%d].pt_stype[%d]    =
%d\r",pt_no,idx,ptb[pt_no].pt_stype[idx]);
                        sw_WAIT();
                        break;
                        }
                    else
                        {
                        pt_codecnt++;/* add one more, pt_codeval
was OFF but is now SET */
                        ptb[pt_no].pt_count++;/*   add   another
symbol to this pattern */
```

```
                        }
                    }
                else if (pt_oldval != 0 && pt_codeval == 0)
                    {
                    pt_codecnt--;/* add one more, pt_codeval was
OFF but is now SET */
                    ptb[pt_no].pt_count--;/* add another symbol to
this pattern */
                    }
//
printf("pt_no=%d,pt_codecnt2=%d\r",pt_no,pt_codecnt);
                pt_symb |= pt_codeval;          /* update symbology
active    */
                ptb[pt_no].pt_symbactv |= pt_codeval;
                if (pt_oldval != pt_codeval)
                    { /* This if statement cleans up things in case
of a reset */
                    pt_changed = TRUE;
                    ptb[pt_no].pt_char[idx] = 0;/* set # char count
to 0 */
                    ptb[pt_no].pt_subtype[idx] = 0;/* set subtype
to default */
                    if (ptb[pt_no].pt_stype[idx] == ANY_CODE)
                        ptb[pt_no].pt_level = 1;
                    else
                        {
                        ptb[pt_no].pt_level = 2;
                        for ( i=0;i < ptb[pt_no].pt_count; i++)
                            if  (  ptb[pt_no].pt_stype[i]   ==
ANY_CODE)
                                ptb[pt_no].pt_level = 1;
                        }
                    }
                if (pt_codeval == 0) break;   /* OFF indicates end
of screen */
                if (pt_codeval != ANY_CODE)
                    {
                    pt_dspsubtype(pt_no, idx);    /* get  subtype
from user */
                    }
                else
                    {
                    ptb[pt_no].pt_subtype[idx] = 0;    /*  assign
default subtype*/
                    }
                idx++;
                }
//          ptb[pt_no].pt_count = idx;              /* barcodes  in
this pattern        */
            for (idy = idx + 1; idy < 4; idy++)     /*  clear  out
remaining pattern   */
                {
                if (ptb[pt_no].pt_stype[idy] != 0)
                    {
```

```
                    pt_codecnt--;/* add one more, pt_codeval was
OFF but is now SET */
                    ptb[pt_no].pt_count--;/* add another symbol to
this pattern */
                    }
               ptb[pt_no].pt_stype[idy] = 0;
               ptb[pt_no].pt_subtype[idy] = 0;
               ptb[pt_no].pt_chksum[idy] = 0;
               ptb[pt_no].pt_char[idy] = 0;
               }
          if (ptb[pt_no].pt_stype[0] == 0)    /* any barcodes in
pattern ? */
               {
               for (i = pt_no; i < max_pattern; i++)
                    {
                    ptb[i].pt_level = 1;
                    ptb[i].pt_scanper = 1;
                    ptb[i].pt_count = 0;
                    ptb[i].pt_symbactv = 0;
                    for (idy = 0; idy < 4; idy++)
                         {
                         ptb[i].pt_stype[idy] = 0;
                         ptb[i].pt_subtype[idy] = 0;
                         ptb[i].pt_chksum[idy] = 0;
                         ptb[i].pt_char[idy] = 0;
                         }
                    }
               if (ptb[0].pt_stype[0] == 0)
                    pt_CLEAR();
               break;                                 /* no - finished
with set       */
               }

          pt_no++;
//        printf("pt_no=%d,pt_codecnt3=%d\r",pt_no,pt_codecnt);
//        if (pt_no > pt_cnt)
//             pt_cnt = pt_no;      /* patterns in set
     */
//        printf("pt_no=%d,pt_codecnt4=%d\r",pt_no,pt_codecnt);
          pt_codemax = pt_oldval = ptb[pt_no-1].pt_scanper;
          se_setport(pt_no);
          se_setcursor(0);
          se_choice((SE *)&pt_maxscan); /*    allow    max    scans
selection */
          ptb[pt_no-1].pt_scanper = pt_codemax;
               if (pt_oldval != pt_codemax) pt_changed = TRUE;
          lc_LINE2B();
          }
//   pt_cnt = pt_no;                                  /* patterns in
set            */
//   printf("pt_no=%d,pt_codecnt5=%d\r",pt_no,pt_codecnt);

     }
```

```
void pt_matchchars(void)
     {
     UBYTE      idx;
     UBYTE      pt_no;                                  /*    current
pattern number       */
     UBYTE      ch[20];

     pt_no = 0;
//   lc_LINE1B();
//   lc_LINE2B();
     se_setcursor(0);
     pt_charmode = FALSE;                          /* startup with no
answer          */
     se_choice((SE *)&pt_charmatch);              /* allow data match
selection */
     lc_LINE1B();
     lc_LINE2B();
     if (pt_charmode)                              /*    data    match
requested ??          */
          {
          while (pt_no < pt_cnt)
               {
               for (idx = 0; idx < 4; idx++)
                    {
                    pt_dspnum(pt_no, idx);
                    }
               sprintf(ch, "L#%2d              ", pt_no+1);
               lc_PUTS(0, ch);
               lc_WRITE();
               idx = 0;
               while (idx < 4)
                    {
                    pt_dspnum(pt_no, idx);
                    pt_oldval = pt_charval;
                    pt_wait();
                    ptb[pt_no].pt_char[idx]= pt_charval;
                    if (pt_oldval != pt_charval)
                         { /* This if statement cleans up things in
case of a reset */
                         pt_changed = TRUE;
                         if   (ptb[pt_no].pt_char[idx]   ==   0   &&
ptb[pt_no].pt_level >2)
                              ptb[pt_no].pt_level = 2;
                         }
                    idx++;
                    if (ptb[pt_no].pt_stype[idx] == 0) break;     /*
OFF indicates end of screen */
                    }
               if (pt_changed)
                    pt_setsecurity(pt_no);
               if (ptb[pt_no].pt_stype[0] == 0)    /* any barcodes
is pattern ?    */
                    break;                              /*   no   -
finished with set          */
```

```
                pt_no++;
                }
            }
        else
            {
            while (pt_no < pt_cnt)
                {
                idx = 0;
                while (idx < 4)
                    {
                    if (ptb[pt_no].pt_char[idx] != 0)
                        {
                        pt_changed = TRUE;
                        ptb[pt_no].pt_char[idx] = 0;
                        }
                    idx++;
                    }
                pt_setsecurity(pt_no);
                pt_no++;
                }
            }
        }
/*****************************************************************
*******
 * Function:        pt_match
 * Description:          selection of data match mode
 * Arguments:       none
 * Returns:              none

******************************************************************
******/

void pt_match(void)
     {
     UBYTE    symmatch,symbcnt,idx,pt_idx;
     UBYTE    pt_no;                              /*    current
pattern number      */
     pa_struct *paptr;
     pt_struct *ptptr;


     pt_no = 0;
     se_setcursor(0);
     pt_dmatchmode = FALSE;                    /* startup with no
answer         */
     se_choice((SE *)&pt_dmatch);        /*   allow   data   match
selection */
     if (pt_dmatchmode)                        /*    data    match
requested ??          */
          {
          pt_changed = TRUE;
          for (pt_idx = 1;pt_idx <= pt_cnt; pt_idx++)
               {
```

```
lc_LINE1B();
lc_LINE2B();
for (idx = 16; idx < 32; idx+=4)
      {
      switch(ptb[pt_idx-1].pt_stype[(idx%16)/4])
            {
            case C39:lc_PUTS(idx,C39s);break;
            case I25:lc_PUTS(idx,I25s);break;
            case C128:lc_PUTS(idx,C12s);break;
            case CBR:lc_PUTS(idx,CBRs);break;
            case C93:lc_PUTS(idx,C93s);break;
            case UPC:lc_PUTS(idx,UPCs);break;
            case ANY_CODE:lc_PUTS(idx,ANYs);break;
            case 0:lc_PUTS(idx,OFF_str);break;
            }
      }
lc_WRITE();
pt_codeval = FALSE;
switch (pt_idx)
      {
      case 1:
      se_choice((SE *)&pt_scanpattern1);
      break;
      case 2:
      se_choice((SE *)&pt_scanpattern2);
      break;
      case 3:
      se_choice((SE *)&pt_scanpattern3);
      break;
      case 4:
      se_choice((SE *)&pt_scanpattern4);
      break;
      case 5:
      se_choice((SE *)&pt_scanpattern5);
      break;
      case 6:
      se_choice((SE *)&pt_scanpattern6);
      break;
      }
if (pt_codeval)
      {
      pt_codeval = (pt_idx - 1);
      symbactv = ptb[pt_codeval].pt_symbactv;
      lc_LINE1B();                          /*   clear   out
display buffer       */
      lc_LINE2B();
      lc_PUTS(0,  " PUT CODES UNDER");
      lc_PUTS(16, " BEAM/PRESS KEY ");
      lc_WRITE();                                /* output to
LCD display          */
      gn_BEAMON();                          /* turn on the
GUN power       */
      gn_CLEAR();
      sw_WAIT();                                 /* wait for
```

```
a switch press       */
//                   disable_interrupt();
                     paptr = malloc(sizeof(pa_struct));
//                   enable_interrupt();
                     if (paptr != (pa_struct *)NULL)
                          {
                          while (1)
                               {
                               memclr(paptr, sizeof(pa_struct));
                               gn_POWERON();   /* turn on the GUN
power            */
                               s y m b c n t          =
pa_FILL(paptr,ptb[pt_codeval].pt_count);
                               gn_POWEROFF(); /* turn off the GUN
power            */
                               i f   ( s y m b c n t   = =
ptb[pt_codeval].pt_count)
                                    {
                                    p t p t r   =   (p t _ s t r u c t
*)&ptb[pt_codeval];
                                    symmatch = 0;
                                    for (idx = 0; idx < symbcnt;
idx++)
                                         {
                                         if (ptptr->pt_stype[idx] &
paptr->pa_an[idx].STYPE)
                                              symmatch++;
                                         }
                                    if (symmatch == symbcnt)
                                         break;
                                    }
                               }

                          gn_CLEAR();
                          for (idx = 0; idx < symbcnt; idx++)
                               {
                               p t p t r   =   ( p t _ s t r u c t
*)&ptb[pt_codeval];
                               an_FINAL(&paptr->pa_an[idx]);    /*
final analysis */

                               if (ptptr->pt_stype[idx] == ANY_CODE)
                                    {
                                    p t p t r - > p t _ s y m b a c t v   & =
ptptr->pt_stype[idx];
                                    p t p t r - > p t _ s y m b a c t v   ! =
paptr->pa_an[idx].STYPE;
                                    p t p t r - > p t _ s t y p e [ i d x ]   =
paptr->pa_an[idx].STYPE;
                                    ptptr->pt_subtype[idx] = FALSE;
                                    }
                               switch (paptr->pa_an[idx].SUBTYPE)
                                    {
                                    case se_EAN8:
```

```
                                    case se_EAN13:
                                        ptptr->pt_char[idx]     =
paptr->pa_an[idx].CHARS+0x80;
                                    default:
                                        ptptr->pt_char[idx]     =
paptr->pa_an[idx].CHARS;
                                    }
                               if (paptr->pa_an[idx].STYPE == I25)
                                    ptptr->pt_char[idx]     =
ptptr->pt_char[idx]/2;

                               ptptr->pt_chksum[idx]     =
an_CHKSUM(paptr->pa_an[idx].SBUF);
                               }
                          ptb[pt_codeval].pt_level   = 4;   /* set
security level to 4       */
                          free(paptr);
                          }
                     else
                          {
                          gn_POWEROFF();
                          pt_codeval = FALSE;
                          lc_LINE1B();
                          lc_LINE2B();
                          lc_PUTS(0,  "ENTER CONTINUES");
                          lc_PUTS(16, "<ERROR> MEM:PT ");
                          lc_WRITE();
                          sw_WAIT();
                          break;
                          }
                     }
                else
                     {
                     pt_codeval = (pt_idx - 1);
                     pt_setsecurity(pt_codeval);
                     }
                }
           }
     else
           {
           while (pt_no < pt_cnt)
                {
                if (ptb[pt_no].pt_level == 4)
                     pt_setsecurity(pt_no);
                pt_no++;
                }
           }
     }

/******************************************************************
*******
 * Function:        pt_setsecurity
 * Description:          set security level one or two
 * Arguments:       pattern scan line number
```

```
 * Returns:                  none
 * Affects:                  updates security level in given pattern
scan line

*****************************************************************
******/

void pt_setsecurity(UBYTE ptx)
     {
     UBYTE idx;                                         /* array index
                    */
     UBYTE security;

     security = 3;                                   /* start off at level
#2         */
     for (idx = 0;idx < ptb[ptx].pt_count; idx++)
          {
          if (ptb[ptx].pt_char[idx] == 0)
               security = 2;
          if (ptb[ptx].pt_stype[idx] == ANY_CODE) /* "ANY" lowers
security*/
               {
               security = 1;                         /*  lower  security
rating         */
               break;                                    /*  no  need  to
check any further   */
               }
          }
     if (ptb[ptx].pt_level != security)
          {
          ptb[ptx].pt_level = security;      /* set the security
level         */
          pt_changed = TRUE;
          }
     }

/****************************************************************
*******
 * Function:         pt_dspcodes
 * Description:           display pattern
 * Arguments:        none
 * Returns:               none

*****************************************************************
******/

void pt_dspnum(UBYTE ptx, UBYTE id)
     {

     pt_charval = ptb[ptx].pt_char[id];
     if (ptb[ptx].pt_stype[id] == UPC)
          {
          pt_charval = ptb[ptx].pt_char[id];
          se_setcursor(pt_curcodepos[id]);
```

```
            se_setchoice((SE *)&pt_UPCchoice);
            }
      else
            {
            switch (ptb[ptx].pt_stype[id])
                  {
                  case C39:se_setstring(C39_str);break;
                  case I25:se_setstring(I25_str);break;
                  case C128:se_setstring(C128_str);break;
                  case CBR:se_setstring(CBR_str);break;
                  case C93:se_setstring(C93_str);break;
                  case ANY_CODE:se_setstring(ANY_str);break;
                  case 0:se_setstring(OFF_str);break;
                  }
            se_setcursor(pt_curcodepos[id]);
            se_setchoice((SE *)&pt_OTHER);
            }
      }
/*****************************************************************
*******
 * Function:        pt_dspcodes
 * Description:          display pattern
 * Arguments:       none
 * Returns:              none

*****************************************************************
******/

void pt_dspcodes(UBYTE ptx, UBYTE id)
      {
      pt_codeval = ptb[ptx].pt_stype[id];
      switch (pt_codeval)
            {
            case C39:se_setstring(C39_str);break;
            case I25:se_setstring(I25_str);break;
            case C128:se_setstring(C128_str);break;
            case CBR:se_setstring(CBR_str);break;
            case C93:se_setstring(C93_str);break;
            case ANY_CODE:se_setstring(ANY_str);break;
            case 0:se_setstring(OFF_str);break;
            }
      se_setcursor(pt_curcodepos[id]);
      se_setchoice((SE *)&pt_codechoice);

      }

/*****************************************************************
*******
 * Function:        pt_dspcodes
 * Description:          display pattern
 * Arguments:       none
 * Returns:              none
```

```
*****************************************************************
******/

void pt_dspsubtype(UBYTE ptx, UBYTE id)
     {
     pt_codeval = pt_oldval = ptb[ptx].pt_subtype[id];
     se_setcursor(pt_curcodepos[id]);

     switch (ptb[ptx].pt_stype[id])
          {
          case C39:                                         /* code 39
choice          */
               se_setchoice((SE *)&pt_c39choice);
               break;
          case I25:
               se_setchoice((SE *)&pt_I25choice);
               break;
          case UPC:
               se_setchoice((SE *)&pt_UEchoice);
               break;
          case CBR:
               se_setchoice((SE *)&pt_CBRchoice);
               break;
          case C128:
               se_setchoice((SE *)&pt_C128choice);
               break;
          case C93:
               se_setchoice((SE *)&pt_C93choice);
               break;
          }
     pt_wait();
     ptb[ptx].pt_subtype[id] = pt_codeval;
     if (pt_oldval != pt_codeval) pt_changed = TRUE;
     }

/*****************************************************************
*******
 * Function:          pt_wait
 * Description:            Wait for user to select item
 * Arguments:         none
 * Returns:                none

*****************************************************************
******/

void pt_wait(void)
     {
     lc_ON();
     lc_BLINK();                                  /* turn on cursor
               */
     do
          {
          sw_WAIT();
```

```
     if (sw_SELECT())                 /* select key depressed
     */
          {
          se_nextchoice();
          }
     }  while (!sw_ENTER());
se_activatechoice();
}
```

```
/***************************************************************
********
 *  Title:  PT - Pattern Setup Module Header File
          *
 *  Ident:  X0.00
                    *

****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *   notice and should not be construed as a commitment by RJS,
Inc.     *
 *
     *
 *   RJS assumes no responsibility for the user or reliability of
     *
 *   its software on equipment that is not supplied by RJS.
     *
 *
     *
****************************************************************
*******
 *
 *  Modification History
 *
 *  WHEN       WHO       VERSION        WHAT
 *  ----       ---       -------
-------------------------------------
 * 19-NOV-92  DRP       X0.00          Original Writing
****************************************************************
*******/

/***************************************************************
```

```
********
 Global Constants

*******************************************************************
*******/

#define ANY_CODE 0xFF
#define max_pattern 6
#define max_barcode 10

/******************************************************************
********
 Structure Prototypes

*******************************************************************
*******/

typedef struct
     {
     UBYTE      pt_stype[4];                    /* pattern symbology
types           */
     UBYTE    pt_subtype[4];                    /* pattern symbology
subtype   */
     UBYTE      pt_level;                       /* pattern security
level           */
     LONG pt_chksum[4];                    /* pattern barcode check
sum  */
     UBYTE      pt_char[4];
     UBYTE    pt_scanper;
     UBYTE      pt_count;                       /* barcodes in this
pattern         */
     UWORD      pt_symbactv;                    /* active symbologies
in pattern*/
     } pt_struct;

extern pt_struct ptb[max_pattern];                   /*    pattern
structures                 */
extern UBYTE pt_cnt;                            /* pattern count
              */
extern UWORD pt_symb;
extern UBYTE pt_codecnt;


/******************************************************************
********
 Function Prototypes

*******************************************************************
******/

void pt_RESET(void);
void pt_OPEN(void);
void pt_setSECURITY(void);
```

```
/*****************************************************************
********
 *  Title:  RO - Real Time Output Control
                 *
 *  Ident:  X0.00
                       *

******************************************************************
*******
 *   Copyright (c) 1989, 1990, 1991, 1992    All rights reserved.
    *
 *
     *
 *   This software is furnished under a license and may be used and
   *
 *   copied only in accordance with the terms of such license and
     *
 *    with the inclusion of the above copyright notice.  This
software    *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *

******************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
-------------------------------------
 * 19-NOV-92   DRP       X0.00          Original Writing
```

```
****************************************************************
*******/


/***************************************************************
********
 Include Files

****************************************************************
*******/

#include "system.h"
#include "io6811.h"
#include "stdlib.h"
#include "stdio.h"
#include "string.h"

#include "dz.h"
#include "an.h"
#include "rt.h"
#include "cm.h"
#include "pa.h"
#include "ro.h"

#define STX 2
#define ETX 3


static void ro_STARTFRAME(void);
static void ro_ENDFRAME(void);

/***************************************************************
*******
 * Function:        ro_WRITE
 * Description:          Update realtime status output
 * Arguments:       result * - pointer to analysis result structure
 * Returns:              none

****************************************************************
******/

void ro_WRITE(an_struct *an)
     {

     UBYTE rtw,rtr;                                   /* status output
holding byte   */
     UBYTE temp;
     result *r;
     UBYTE *c8_b1,*c8_b2,*c8_b3;


     r = (result *)&an->RESULTS;

     if (rt_setup != rt_disable)
```

```
        {
        ro_STARTFRAME();                            /* start string
with FRAME     */
        }

    if (rt_setup & rt_status)
        {

        rtw = 0;
        rtw = (rtw | r->qzfail)  << 1;     /*    quiet    zone
failure       */
        rtw = (rtw | r->reffail) << 1;     /* reference decode
failure   */
        rtw = (rtw | r->dcdfail) << 1;     /*    decodability
failure       */
        rtw = (rtw | r->icgfail) << 1;     /* ICG failure
        */
        rtw = (rtw | r->warnn)   << 1;     /*  warning  narrow
failure   */
        rtw = (rtw | r->warnw)   << 1;     /*   warning   wide
failure       */
        rtw = (rtw | r->pcsfail) << 1;     /*    warning    pcs
failure       */
        rtw = (rtw | r->ratiofail);        /*   warning   ratio
failure   */


        rtr = 0;
        rtr =  (rtr  |  gbl_nomatch)    << 1;/* reject no match
failure   */
        rtr  =  (rtr  |  gbl_noread)     << 1;/* reject no read
failure  */
        rtr = (rtr | r->chkfail)   << 1;/* reject bad mod check
error*/
        rtr = (rtr | r->formatfail)<< 1;/* reject format error
    */
        rtr = (rtr | r->rejectw)   << 1;/* reject wide error
    */
        rtr = (rtr | r->rejectn);     /* reject narrow error
    */

        temp = ((rtw & 0xf0) >> 4) + '0';
        if (temp > '9') temp += 7;
        cm_WRITE(temp);

        temp = ((rtw & 0x0f)) + '0';
        if (temp > '9') temp += 7;
        cm_WRITE(temp);

        temp = ((rtr & 0xf0) >> 4) + '0';
        if (temp > '9') temp += 7;
        cm_WRITE(temp);

        temp = ((rtr & 0x0f)) + '0';
```

```
        if (temp > '9') temp += 7;
        cm_WRITE(temp);
        }

/* output symbology type + subtype at this point */
     if (rt_setup & rt_symbology)
          {
          rtr = an->STYPE;                    /*  byte  one/two  -
symbology       */
          temp = ((rtr & 0xf0) >> 4) + '0';
          if (temp > '9') temp += 7;
          cm_WRITE(temp);

          temp = ((rtr & 0x0f)) + '0';
          if (temp > '9') temp += 7;
          cm_WRITE(temp);

          rtr = an->SUBTYPE;              /*  byte   three/four   -
subtype    */
          temp = ((rtr & 0xf0) >> 4) + '0';
          if (temp > '9') temp += 7;
          cm_WRITE(temp);

          temp = ((rtr & 0x0f)) + '0';
          if (temp > '9') temp += 7;
          cm_WRITE(temp);

          }

/* output symbology decode buffer at this point     */
     if (rt_setup & rt_decode)
          {
          switch (an->STYPE)
               {
               case C39:
               case I25:
               case UPC:
               case CBR:
               case C93:
                    printf("%s",an->SBUF);
                    break;

               case C128:
                    c8_b1 = (UBYTE *)malloc(max_symbol);     /    *
allocate for    */
                    c8_b2 = (UBYTE *)malloc(max_symbol);     /    *
conversion      */
                    c8_b3 = (UBYTE *)malloc(max_symbol*2);
                    C128_BUF(an->SBUF, c8_b1, c8_b2, an->CHARS);
                    C128_REALTIME(c8_b1,c8_b2,c8_b3);
                    free(c8_b1);
                    free(c8_b2);
```

```
                        printf("%s",c8_b3);
                        free(c8_b3);
                        break;
                  }
            }

/* output symbology decode buffer at this point     */
      if (rt_setup & rt_data)
            {
            switch (an->STYPE)
                  {
                  case C39:
                        c8_b1 = (UBYTE *)malloc(max_symbol);     /    *
allocate for     */
                        CSTRT_STOP_BUF(an->SBUF,c8_b1,an->CHARS);
                        printf("%s",c8_b1);
                        free(c8_b1);
                        break;
                  case I25:
                        printf("%s",an->SBUF);
                        break;
                  case UPC:
                        c8_b1 = (UBYTE *)malloc(max_symbol);     /    *
allocate for     */
                        CU_E_CBUF(an->SBUF,c8_b1);
                        printf("%s",c8_b1);
                        free(c8_b1);
                        break;
                  case C93:
                        c8_b1 = (UBYTE *)malloc(max_symbol);     /    *
allocate for     */
                        C93_CBUF(an->SBUF,c8_b1,an->CHARS);
                        printf("%s",c8_b1);
                        free(c8_b1);
                        break;
                  case CBR:
                        c8_b1 = (UBYTE *)malloc(max_symbol);     /    *
allocate for     */
                        CSTRT_STOP_BUF(an->SBUF,c8_b1,an->CHARS);
                        printf("%s",c8_b1);
                        free(c8_b1);
                        break;
                  case C128:
                        c8_b1 = (UBYTE *)malloc(max_symbol);     /    *
allocate for     */
                        C128_CBUF(an->SBUF, c8_b1, an->CHARS-2);
                        printf("%s",c8_b1);
                        free(c8_b1);
                        break;
                  }
            }

      if (rt_setup != rt_disable)
            {
```

```
          ro_ENDFRAME();
          }
     }

/***************************************************************
*******
 * Function:         ro_STARTFRAME
 * Description:           send out start frame character
 * Arguments:        none
 * Returns:               none

****************************************************************
******/

void ro_STARTFRAME(void)
     {
     switch (rt_frame)
          {
          case 1: cm_WRITE(STX); break;
          }
     }

/***************************************************************
*******
 * Function:         ro_ENDRAME
 * Description:           send out end frame character
 * Arguments:        none
 * Returns:               none

****************************************************************
******/

void ro_ENDFRAME(void)
     {
     switch (rt_frame)
          {
          case 1: cm_WRITE(ETX); break;
          case 2: cm_WRITE(0x0D); cm_WRITE(00); break;
          }
     }

/***************************************************************
*******
 * Function:         ro_NOREAD
 * Description:           Update realtime status output to no read
 * Arguments:        none
 * Returns:               none

****************************************************************
******/

void ro_NOREAD(void)
     {
     UBYTE rtw,rtr;                                 /* status output
```

```
holding byte   */
     UBYTE temp;

     if (rt_setup & rt_status)
          {
          ro_STARTFRAME();                         /* start string
with STX  */

          rtw = 0;
          rtr = 0x20;

          temp = ((rtw & 0xf0) >> 4) + '0';
          if (temp > '9') temp += 7;
          cm_WRITE(temp);

          temp = ((rtw & 0x0f)) + '0';
          if (temp > '9') temp += 7;
          cm_WRITE(temp);

          temp = ((rtr & 0xf0) >> 4) + '0';
          if (temp > '9') temp += 7;
          cm_WRITE(temp);

          temp = ((rtr & 0x0f)) + '0';
          if (temp > '9') temp += 7;
          cm_WRITE(temp);

          ro_ENDFRAME();
          }

     }
```

```
/*****************************************************************
********
 *  Title:  RO - Real Time Output Control Header
                *
 *  Ident:  X0.00
                          *

*****************************************************************
*******
 *   Copyright (c) 1989, 1990, 1991, 1992     All rights reserved.
    *
 *
     *
 *   This software is furnished under a license and may be used and
   *
 *    copied only in accordance with the terms of such license and
     *
 *     with the inclusion of the above copyright notice.   This
software    *
 *    or any other copies thereof may not be provided or otherwise
     *
 *   made available to any other person.  No title to and ownership
of   *
 *    the software is hereby transferred.
     *
 *
     *
 *   The information in this software is subject to change without
    *
 *    notice and should not be construed as a commitment by RJS,
Inc.     *
 *
     *
 *    RJS assumes no responsibility for the user or reliability of
     *
 *    its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
-------------------------------------
 * 19-NOV-92   DRP       X0.00          Original Writing
```

```
*****************************************************************
*******/

/****************************************************************
*******
 * function prototypes

*****************************************************************
******/

void ro_WRITE(an_struct *);
void ro_NOREAD(void);
```

```
/*****************************************************************
********
 *  Title:  RS - Reset Menu Controller
                  *
 *  Ident:  X0.00
                       *

*****************************************************************
*******
 *   Copyright (c) 1989, 1990, 1991, 1992    All rights reserved.
    *
 *
     *
 *   This software is furnished under a license and may be used and
   *
 *    copied only in accordance with the terms of such license and
     *
 *     with the inclusion of the above copyright notice.  This
software    *
 *    or any other copies thereof may not be provided or otherwise
     *
 *   made available to any other person.  No title to and ownership
of  *
 *    the software is hereby transferred.
     *
 *
     *
 *   The information in this software is subject to change without
    *
 *    notice and should not be construed as a commitment by RJS,
Inc.     *
 *
     *
 *    RJS assumes no responsibility for the user or reliability of
     *
 *    its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
-------------------------------------
 * 19-NOV-92   DRP       X0.00          Original Writing
```

```
*****************************************************************
*******/

/****************************************************************
********
 Include Files

*****************************************************************
*******/

#include "system.h"
#include "io6811.h"
#include "stdlib.h"
#include "stdio.h"
#include "string.h"

#include "sw.h"
#include "lc.h"
#include "se.h"
#include "dz.h"
#include "an.h"
#include "ol.h"
#include "pt.h"
#include "ht.h"
#include "rs.h"


#pragma codeseg(RS)

/****************************************************************
*******
 * global variables

*****************************************************************
******/


/****************************************************************
*******
 * local variables

*****************************************************************
******/


#pragma memory = default

static UBYTE rs_SELECT;
static UBYTE rs_temp;


const SE2 rs_portconfirm =
     {
```

```
     &rs_temp, 2, " RESET ALL PORTS", "NO          YES ",
          16,   0, NULL, NULL,
          28, 255, NULL, NULL
     };

const SE2 rs_buffconfirm =
     {
     &rs_temp, 2, "RESET ALL BUFFRS", "NO          YES ",
          16,   0, NULL, NULL,
          28, 255, NULL, NULL
     };


/*****************************************************************
*******
 * local prototypes

*****************************************************************
******/

non_banked void reset(void);


/*****************************************************************
*******
 * main menu functions

*****************************************************************
******/

static void rs_MENUI(void)                                  /* main
menu initialization */
     {
     lc_CLEAR();                                        /* clear out
LCD display    */
     lc_PUTS(0    , "MAIN RESET:PORTS");
     lc_PUTS(dc_1, "RESET:BUFFERS   ");             /*  output  main
menu           */
     lc_WRITE();
     lc_GOTO(0);                                        /* position
the cursor          */
     lc_BLINK();                                        /* and blink
it.            */
     rs_SELECT = 0;                                 /* menu selection
zero        */
     }

static void rs_select(void)
     {
     switch (rs_SELECT)

          {
          case 0:                                   /****    MAIN
```

```
selection          */
                rs_SELECT++;
                lc_GOTO(10);                  /*  move  cursor  to
next            */
                break;

          case 1:                                 /**** RESET PORTS
selection       */
                rs_SELECT++;
                lc_GOTO(16);                  /*  move  cursor  to
next            */
                break;

          case 2:                                 /****    RESET
HISTORY Selection  */
                rs_SELECT = 0;
                lc_GOTO(0);
                break;


          }
     }


static void rs_execute(void)
     {
     lc_CUROFF();
     switch (rs_SELECT)
          {
          case 0:
          reset();                            /*  back  to  main
menu            */
          break;

          case 1:
          rs_temp = 0;
          se_choice((SE *)&rs_portconfirm);
          if (rs_temp) ol_CLEAR();
          break;

          case 2:
          rs_temp = 0;
          se_choice((SE *)&rs_buffconfirm);
          if (rs_temp)
               {
               ht_CLEAR();
               }
          break;
          }
     }
```

```
/***************************************************************
*******
 * Function:          rs_OPEN
 * Description:            Open up reset menu processing
 * Arguments:         none
 * Returns:                none

****************************************************************
******/

void rs_OPEN(void)
     {
     rs_MENUI();                                    /*    display    main
menu              */
     while (1)
          {
          sw_WAIT();                                /* wait for a button
press             */
          if (sw_SELECT())                     /* select button pressed
     */
               {
               rs_select();                    /*  select  next  item  on
menu      */
               }

          if (sw_ENTER())                           /*    enter    button
pressed                */
               {
               rs_execute();                   /* execute item selected
     */
               rs_MENUI();                          /*  redraw  the  main
menu              */
               }
          }

     }
```

```
/******************************************************************
*******
 *  Title:  RS.H - Laser Inspector Reset Menu Controller Header
File   *
 *  Ident:  Rev. A
                  *

*******************************************************************
******
 *   Copyright (c) 1993     All rights reserved.
          *
 *
    *
 *  This software is furnished under a license and may be used and
  *
 *   copied only in accordance with the terms of such license and
    *
 *     with the inclusion of the above copyright notice.  This
software  *
 *   or any other copies thereof may not be provided or otherwise
    *
 *  made available to any other person.  No title to and ownership
of *
 *   the software is hereby transferred.
    *
 *
    *
 *  The information in this software is subject to change without
   *
 *   notice and should not be construed as a commitment by RJS,
Inc.   *
 *
    *
 *  RJS assumes no responsibility for the user or reliability of
    *
 *  its software on equipment that is not supplied by RJS.
    *
 *
    *
*******************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------         -------        ---------
--------------------------------

*******************************************************************
```

```
******/

/*****************************************************************
*******
 * global contants

******************************************************************
******/

/*****************************************************************
********
 Function Prototypes

******************************************************************
******/

void rs_OPEN(void);
```

```
/*****************************************************************
********
 *  Title:  RT - Real Time Output Control Setup
                      *
 *  Ident:  X0.00
                      *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.   This
software    *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *    notice and should not be construed as a commitment by RJS,
Inc.     *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN      WHO      VERSION       WHAT
 *   ----      ---      -------
-------------------------------------
 * 19-NOV-92   DRP      X0.00         Original Writing
```

```
*******************************************************************
*******/

/******************************************************************
********
 Include Files

*******************************************************************
*******/

#include "system.h"
#include "io6811.h"
#include "stdlib.h"
#include "stdio.h"
#include "string.h"

#include "df.h"

#include "se.h"
#include "sw.h"
#include "lc.h"
#include "mm.h"
#include "rt.h"

#pragma codeseg(RT)

/******************************************************************
********
 Global Variables

*******************************************************************
*******/

#pragma memory = no_init

UBYTE rt_frame;
UBYTE rt_setup;                          /* real-time output mode
     */
UBYTE rt_init;
UBYTE print_prot;

#pragma memory = default
extern UBYTE sys_debug;
/******************************************************************
********
 RT setup structure

*******************************************************************
*******/
const UBYTE blank[]="                    ";

const SE5 rt_framechoice =
     {
```

```
     &rt_frame, 3, "  XMIT FRAMING ", blank,
          16, 00,         NULL, "    DISABLED    ",
          16, 01,         NULL, "     STX+ETX    ",
          16, 02,         NULL, "  TRAILING <CR> "
     };

const SE10 rt_modechoice =
     {
     &rt_setup, 7," REAL TIME XMIT ", blank,
          16, rt_disable,               NULL,"    DISABLED    ",
          16, rt_status,             NULL,"   STATUS ONLY  ",
          16, rt_stat_symb,         NULL, " STATUS+SYMBOLGY",
          16, rt_stat_symb_decode,NULL, "STAT+SYMB+DECODE",
          16, rt_decode,             NULL, "   DECODE ONLY  ",
          16, rt_stat_symb_data,     NULL, " STAT+SYMB+DATA ",
          16, rt_data,               NULL, "    DATA ONLY   "
     };

const SE2 rt_printprot =
     {
     &print_prot,2," XMIT  PROTOCOL ", blank,
          16,    0, NULL, "    XON/XOFF    ",
          16,    255, NULL,   "    RTS/CTS     "
     };

/*****************************************************************
*******
 * Function:        rt_RESET
 * Description:          Initialize system for processing
 * Arguments:       none
 * Returns:              none

******************************************************************
******/

void rt_RESET(void)
     {
     if (rt_init != 0xA5)                    /*   system   already
initialized     */
          {
#ifdef SATO
          rt_setup = rt_disable;
#else
          rt_setup = rt_status;
#endif
          print_prot = 255;                  /* RTS/CTS
                    */
          rt_frame = FALSE;
          rt_init = 0xA5;                         /*  show  system
initialized          */
          }
     }
```

```
/*****************************************************************
*******
 * Function:        rt_OPEN
 * Description:          Open Realtime Setup system for processing
 * Arguments:       none
 * Returns:              none

******************************************************************
******/

void rt_OPEN(void)
     {
     se_setcursor(0);
     se_choice((SE *)&rt_modechoice);          /*   operation   mode
choice           */
     if (rt_setup)
          {
          se_choice((SE *)&rt_framechoice);
          se_choice((SE *)&rt_printprot);
          }
     }
```

```
/*****************************************************************
********
 *  Title:  RT - Real Time Output Control Setup   Header
                 *
 *  Ident:  X0.00
                       *

*****************************************************************
*******
 *   Copyright (c) 1989, 1990, 1991, 1992     All rights reserved.
    *
 *
     *
 *   This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *   made available to any other person.  No title to and ownership
of   *
 *   the software is hereby transferred.
     *
 *
     *
 *   The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *

*****************************************************************
*******
 *
 *  Abstract:
 *
 *  Author:       Donald R. Palmer, 19-NOV-92, Version X0.00
 *
 *  Modification History
 *
 *  WHEN        WHO       VERSION        WHAT
 *   ----       ---       -------
------------------------------------
 * 19-NOV-92   DRP       X0.00          Original Writing
```

```
************************************************************************
*******/

/***********************************************************************
********
 Global Constants

************************************************************************
*******/

#define rt_disable            0x00
#define rt_status             0x01
#define rt_symbology          0x02
#define rt_stat_symb          0x03
#define rt_decode             0x04
#define rt_stat_symb_decode   0x07
#define rt_data               0x08
#define rt_stat_symb_data     0x0B

/***********************************************************************
********
 Global Variables

************************************************************************
*******/

extern UBYTE rt_setup;                         /* real-time output
mode      */
extern UBYTE rt_frame;
extern UBYTE print_prot;
/***********************************************************************
********
 Function Prototypes

************************************************************************
******/

void rt_RESET(void);
void rt_OPEN(void);
```

```
/*****************************************************************
*******
 *  Title:  SE.C - Laser Inspector SETUP Controller
                *
 *  Ident:  Rev. A
                     *

*****************************************************************
******
 *·  Copyright (c) 1993     All rights reserved.
          *
 *
    *
 *  This software is furnished under a license and may be used and
  *
 *   copied only in accordance with the terms of such license and
    *
 *    with the inclusion of the above copyright notice.  This
software  *
 *   or any other copies thereof may not be provided or otherwise
    *
 *  made available to any other person.  No title to and ownership
of *
 *   the software is hereby transferred.
    *
 *
    *
 *  The information in this software is subject to change without
   *
 *   notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version      Why
 *    ----------        -------       ---------
----------------------------------

*****************************************************************
```

```
******/

/*****************************************************************
*******
 * Include Files

******************************************************************
******/

#include "system.h"
#include "io6811.h"

#include "stdio.h"
#include "string.h"

#include "lc.h"
#include "sw.h"
#include "se.h"

#pragma codeseg(SE)

/*****************************************************************
*******
 * Constants

******************************************************************
******/


/*****************************************************************
********
 * Local Variables

******************************************************************
******/

#pragma memory = default
static UBYTE        se_S;                    / *    c u r r e n t
selection       */
SE          *se_P;                           /*    active    table
address       */
UBYTE       se_CHANGE;                            /*    selection
changed       */
UBYTE       se_BUTTON;                            /*    selection
choosen       */
UBYTE       se_port;
UBYTE       se_gblcursor;                    /*    globally    set
cursor        */
UBYTE       se_gblstring[11];                     /* global display
string     */
                                                  /*  to  display
this string the*/
                                                  /* help entry for
the CHOICE */
```

```
                                                 /* must be set to
"*" string */
extern UBYTE sys_debug;

static void se_findchoice(void)                            /*    find
active choice        */
     {
     UBYTE se_temp, i;

     se_temp = *se_P->se_storage;       /* obtain current choice */
     for (i = 0; i < se_P->se_items; i++)
          {
          if (se_P->se_choice[i].val == se_temp)
               {
               se_S = i;
               return;
               }
          }
     se_S = 0;
     }

static void se_displayhead(void)
     {
//   lc_LINE1B();
//   lc_LINE2B();                             /* clear out display
buffer        */
     lc_PUTS(0, se_P->se_texttop);      /* put into buffer
          */
     lc_PUTS(dc_l, se_P->se_textnext);
     }

static void se_displaychoice(void)                    /*      display
choise #n            */
     {
//   UBYTE ch[10];
     CHOICE *se_Cptr;

     if (se_S >= se_P->se_items) se_S = 0;
                                                 /* wrap  around
the choices          */
     se_Cptr = &se_P->se_choice[se_S];
     if (se_Cptr->help != NULL && se_Cptr->msg != NULL)
          {
          lc_PUTS(se_Cptr->pos + se_gblcursor, se_Cptr->msg);
          if (se_Cptr->help[0] != '@' && se_Cptr->help[0] != '!')
               lc_PUTS(6, "          ");

          if (se_Cptr->help[0] == '*')
               lc_PUTS(6,se_gblstring);
          else if (se_Cptr->help[0] == '@')
               lc_PUTC(5,'0'+se_port);
          else if (se_Cptr->help[0] == '!')
               lc_PUTC(3,'0'+se_port);
          else
```

```
                lc_PUTS(6, se_Cptr->help);
            }
        else if (se_Cptr->help != NULL)
            {
            lc_PUTS(se_Cptr->pos + se_gblcursor, se_Cptr->msg);
            if (se_Cptr->help[0] != '@' && se_Cptr->help[0] != '!')
                lc_PUTS(6, "           ");
            if (se_Cptr->help[0] == '@')
                lc_PUTC(5,'0'+se_port);
            else if (se_Cptr->help[0] == '!')
                lc_PUTC(3,'0'+se_port);
//          sprintf(ch, "%3d", se_Cptr->val);
//          lc_PUTS(se_Cptr->pos + se_gblcursor, ch);
//          lc_PUTS(6, "          ");
//          lc_PUTS(6, se_Cptr->help);

            }
        else
            {
            lc_PUTS(se_Cptr->pos + se_gblcursor, se_Cptr->msg);
            }
        lc_WRITE();
        lc_GOTO(se_Cptr->pos + se_gblcursor);
        lc_BLINK();
        }

void se_nextchoice(void)                /* setup next available
choice    */
        {
        se_S++;
        se_displaychoice();
        }


void se_activatechoice(void)            /*   put   choice   into
storage        */
        {
        UBYTE choice;

        choice = se_P->se_choice[se_S].val;
        *se_P->se_storage = choice;             /* put into EEPROM
storage        */
        }


void se_setchoice(SE *tp)
        {
        se_P = tp;                                   /* make active
table          */
        se_findchoice();                             /* find active
choice         */
        se_displayhead();
        se_displaychoice();                          /* display active
choice    */
```

```
     }

void se_setcursor(UBYTE cp)
     {
     se_gblcursor = cp;
     }

void se_setstring(UBYTE *strr)
     {
     strcpy(se_gblstring,strr);
     }

void se_setport(UBYTE port)
     {
     se_port = port;
     }

void se_choice(SE *tp)                              /* select active
table             */
     {
     se_setchoice(tp);                              /* make active
table             */
     se_CHANGE = se_BUTTON = 0;                     /* reset change
flags             */
     while (!se_BUTTON)
          {
          sw_WAIT();                                     /* wait for
key press         */
          if (sw_SELECT())                          /*  select  key
pressed           */
               {
               se_CHANGE = TRUE;                    /* yes - update
selection */
               se_nextchoice();
               }
          else
               if (sw_ENTER())                           /* enter key
pressed           */
                    {
                    se_activatechoice();            /* activate the
choice            */
                    se_BUTTON = TRUE;               /*  show  button
pressed           */
                    }
          }
     }
```

```
/**************************************************************
*******
 *  Title:  SE.H - Laser Inspector SETUP Controller Head File
        *
 *  Ident:  Rev. A
                 *

***************************************************************
******
 *   Copyright (c) 1993     All rights reserved.
        *
 *
   *
 *  This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *  made available to any other person.  No title to and ownership
of *
 *   the software is hereby transferred.
    *
 *
    *
 *  The information in this software is subject to change without
   *
 *   notice and should not be construed as a commitment by RJS,
Inc.   *
 *
    *
 *   RJS assumes no responsibility for the user or reliability of
    *
 *   its software on equipment that is not supplied by RJS.
    *
 *
    *

***************************************************************
******
 *
 *  Abstract:
 *
 *  Author:       Donald R. Palmer, 08-SEP-89, Version X0.00
 *
 *  Modification History
 *
 *  Date          Who     Version      Why
 *    ----------        -------        ---------
----------------------------------

***************************************************************
```

```
******/

/*****************************************************************
*******
 * Structure Definitions

*****************************************************************
******/

typedef struct
     {
     UBYTE pos;                                /*    position    of
choice          */
     UBYTE val;                                /* value of choice
          */
     UBYTE *help;
     UBYTE *msg;
     } CHOICE;

typedef struct
     {
     UBYTE *se_storage;                             /*  address  of
setup variable*/
     UBYTE se_items;                                     /*  #  of
items in setup       */
     char  *se_texttop;                             /*  setup  text
message          */
     char  *se_textnext;
     CHOICE se_choice[20];
     } SE;

typedef struct
     {
     UBYTE *se_storage;                             /*  address  of
setup variable*/
     UBYTE se_items;                                     /*  #  of
items in setup       */
     char  *se_texttop;                             /*  setup  text
message          */
     char  *se_textnext;
     CHOICE se_choice[8];
     } SE8;

typedef struct
     {
     UBYTE *se_storage;                             /*  address  of
setup variable*/
     UBYTE se_items;                                     /*  #  of
items in setup       */
     char  *se_texttop;                             /*  setup  text
message          */
     char  *se_textnext;
     CHOICE se_choice[2];
     } SE2;
```

```
typedef struct
     {
     UBYTE *se_storage;                                /*  address  of
setup variable*/
     UBYTE se_items;                                       /*  #  of
items in setup      */
     char  *se_texttop;                                /*  setup  text
message        */
     char  *se_textnext;
     CHOICE se_choice[13];
     } SE13;

typedef struct
     {
     UBYTE *se_storage;                                /*  address  of
setup variable*/
     UBYTE se_items;                                       /*  #  of
items in setup      */
     char  *se_texttop;                                /*  setup  text
message        */
     char  *se_textnext;
     CHOICE se_choice[30];
     } SE30;

typedef struct
     {
     UBYTE *se_storage;                                /*  address  of
setup variable*/
     UBYTE se_items;                                       /*  #  of
items in setup      */
     char  *se_texttop;                                /*  setup  text
message        */
     char  *se_textnext;
     CHOICE se_choice[5];
     } SE5;

typedef struct
     {
     UBYTE *se_storage;                                /*  address  of
setup variable*/
     UBYTE se_items;                                       /*  #  of
items in setup      */
     char  *se_texttop;                                /*  setup  text
message        */
     char  *se_textnext;
     CHOICE se_choice[10];
     } SE10;

/*****************************************************************
********
 Function Prototypes

*****************************************************************
```

```
*******/

void     se_INIT(void);
void se_OPEN(void);
void     se_choice(SE *);
void       se_setchoice(SE *);
void     se_nextchoice(void);
void     se_activatechoice(void);
void       se_setcursor(UBYTE);
void       se_setstring(UBYTE *);
void       se_setport(UBYTE);

extern  SE *se_P;
```

```
/**************************************************************
********
 *  Title:  SN - Sync Signal Control Module
                *
 *  Ident:  X0.00
                     *

**************************************************************
*******
```

```
 *   Copyright (c) 1989, 1990, 1991, 1992    All rights reserved.
    *
 *
     *
 *  This software is furnished under a license and may be used and
   *
 *   copied only in accordance with the terms of such license and
     *
 *    with the inclusion of the above copyright notice.  This
software   *
 *   or any other copies thereof may not be provided or otherwise
     *
 *  made available to any other person.  No title to and ownership
of  *
 *   the software is hereby transferred.
     *
 *
     *
 *  The information in this software is subject to change without
    *
 *    notice and should not be construed as a commitment by RJS,
Inc.    *
 *
     *
 *   RJS assumes no responsibility for the user or reliability of
     *
 *   its software on equipment that is not supplied by RJS.
     *
 *
     *
```

```
**************************************************************
*******
 *
 *  Abstract:
 *
 *  Author:     Donald R. Palmer, 19-NOV-92, Version X0.00
 *
 *  Modification History
 *
 *  WHEN      WHO      VERSION        WHAT
 *   ----     ---      -------
------------------------------------
 * 19-NOV-92   DRP      X0.00          Original Writing
```

```
****************************************************************
*******/


/***************************************************************
********
 Include Files

****************************************************************
*******/

#include "system.h"
#include "io6811.h"
#include "int6811.h"
#include <stdio.h>
#include "lc.h"
#include "cf.h"
#include "gn.h"
#include "sn.h"

#pragma codeseg(SN)

/***************************************************************
*******
 * local variables

****************************************************************
******/

#pragma memory = default
static UBYTE sn_signal;
static UBYTE sn_status;


/***************************************************************
*******
 * Function:          sn_RESET
 * Description:           reset Sync Signal handler
 * Arguments:         none
 * Returns:               none

****************************************************************
******/

void sn_RESET(void)
     {
     TCTL2 |= (edg3a + edg3b);                 /* IC3 capture on any
edge       */
     sn_signal = sn_status = FALSE;
//   printf("sn_RESET:\r");
//   ld_SYNCOFF();
     sn_OFF();
     }
```

```
/*****************************************************************
*******
 * Function:        sn_SETSIGNAL
 * Description:         set Sync Signal flag
 * Arguments:       none
 * Returns:              none

******************************************************************
******/

void sn_SETSIGNAL(void)
     {
     sn_signal = TRUE;
     }


/*****************************************************************
*******
 * Function:        sn_ON
 * Description:         reset Sync Signal handler
 * Arguments:       none
 * Returns:              none

******************************************************************
******/

void sn_ON(void)
     {
     TMSK1 |= ic3f;
     sn_signal = FALSE;
     }

/*****************************************************************
*******
 * Function:        sn_STATUS
 * Description:         obtain current Sync Signal status
 * Arguments:       UBYTE - Sync signal status
 * Returns:              none

******************************************************************
******/

UBYTE sn_STATUS(void)
     {
     UBYTE sn_temp;

     sn_temp = sn_status;
     sn_status = FALSE;
     return(sn_temp);
     }

/*****************************************************************
*******
 * Function:        sn_OFF
```

```
 * Description:        reset Sync Signal handler
 * Arguments:      none
 * Returns:             none

*****************************************************************
******/

void sn_OFF(void)
     {
     TMSK1 &= ~ic3f;
     }

/****************************************************************
*******
 * Function:       TIC3_interrupt
 * Description:        Sync Signal interrupt handler
 * Arguments:      none
 * Returns:             none

*****************************************************************
******/

/* NOTE: sync led uses negative logic */

void sn_interrupt(void)
     {

     TFLG1 = ic3f;
     enable_interrupt();
     if (PORTA & a0)                                   /*    sync
signal high         */
          {
          if (CF.syncpol)
               {
//             printf("TIC3_interrupt:if PORTA:if CF.syncpol\r");
               ld_SYNCOFF();                          /* high = true
               */
               gn_MARKNEXT();                         /* mark next gun
scan       */
               sn_status = TRUE;
               }
          else
               {
//             printf("TIC3_interrupt:if PORTA:else CF.syncpol\r");
               ld_SYNCON();                           /*    high    =
false                */
               sn_signal = sn_status = FALSE;
               }
          }
     else
          {
          if (CF.syncpol)
               {
//             printf("TIC3_interrupt:else PORTA:if CF.syncpol\r");
```

```
                ld_SYNCON();                        /* low = false
                */
                sn_signal = sn_status = FALSE;
                }
          else
                {
//              printf("TIC3_interrupt:else   PORTA:else
CF.syncpol\r");
                ld_SYNCOFF();                       /* low = true
                */
                gn_MARKNEXT();                      /* mark next gun
scan      */
                sn_status = TRUE;
                }
          }
     }
```

```
/*****************************************************************
*******
 *  Title:  SN.H - Laser Inspector SYNC Controller Header File
        *
 *  Ident:  Rev. A
                   *

******************************************************************
******
 *   Copyright (c) 1993     All rights reserved.
        *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.    *
 *
    *
 *   RJS assumes no responsibility for the user or reliability of
    *
 *   its software on equipment that is not supplied by RJS.
    *
 *
    *

******************************************************************
******
 *
 *  Abstract:
 *
 *  Author:        Donald R. Palmer, 08-SEP-89, Version X0.00
 *
 *  Modification History
 *
 *  Date           Who     Version       Why
 *    ----------          -------        ---------
----------------------------------

******************************************************************
```

```
******/

/****************************************************************
*******
 * global contants

****************************************************************
******/

/****************************************************************
********
 Function Prototypes

****************************************************************
******/

void sn_RESET(void);
void sn_ON(void);
void sn_OFF(void);
UBYTE sn_STATUS(void);
void sn_SETSIGNAL(void);
```

```
/****************************************************************
********
 *  Title:  SP - Store/Print Buffer Control Module
                *
 *  Ident:  X0.00
                     *

*****************************************************************
*******
 *   Copyright (c) 1989, 1990, 1991, 1992    All rights reserved.
    *
 *
     *
 *   This software is furnished under a license and may be used and
   *
 *    copied only in accordance with the terms of such license and
     *
 *     with the inclusion of the above copyright notice.   This
software   *
 *    or any other copies thereof may not be provided or otherwise
     *
 *   made available to any other person.  No title to and ownership
of  *
 *    the software is hereby transferred.
     *
 *
     *
 *   The information in this software is subject to change without
    *
 *    notice and should not be construed as a commitment by RJS,
Inc.     *
 *
     *
 *    RJS assumes no responsibility for the user or reliability of
     *
 *    its software on equipment that is not supplied by RJS.
     *
 *
     *

*****************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---      -------
------------------------------------
 * 19-NOV-92   DRP       X0.00          Original Writing
```

```
*******************************************************************
*******/

/******************************************************************
********
 Include Files

*******************************************************************
*******/

#include "system.h"
#include "io6811.h"
#include "stdlib.h"
#include "stdio.h"
#include "string.h"

#include "mm.h"
#include "wb.h"
#include "dz.h"
#include "an.h"
#include "pa.h"
#include "sp.h"

/******************************************************************
*******
 * Local Variables

*******************************************************************
******/


#pragma memory = no_init

static UBYTE   sp_init;

static an_struct stp[sp_size];          /* storage buffer
         */

static WB_BUF  sp_freebuf;
static WB_BUF  sp_usedbuf;

static UBYTE   sp_freearea[sp_size];
static UBYTE   sp_usedarea[sp_size];

#pragma memory = default


/******************************************************************
*******
 * Function:         sp_RESET
 * Description:           Initialize system for processing
 * Arguments:        none
 * Returns:               none
```

```
*****************************************************************
******/

void sp_RESET(void)
     {
     if (sp_init != 0xA5)                    /*  system  already
initialized    */
          {
          sp_CLEAR();
          sp_init = 0xA5;                         /* show system
initialized         */
          }
     }

/****************************************************************
*******
 * Function:          sp_CLEAR
 * Description:            Initialize system for processing
 * Arguments:         none
 * Returns:                none

*****************************************************************
******/

void sp_CLEAR(void)
     {
     UBYTE idx;

     memclr(stp, sizeof(an_struct) * sp_size);
     WBInit(&sp_freebuf,  sp_freearea,  sp_size);  /*  init  free
buffers   */
     WBInit(&sp_usedbuf,  sp_usedarea,  sp_size);  /*  init  used
buffers */
     for (idx = 0;idx < sp_size; idx++)
          {
          WBPut(&sp_freebuf, idx); /* fill up free buffer queue  */
          }
     }


/****************************************************************
*******
 * Function:          sp_WRITE
 * Description:            Update existing scan history buffer
 * Arguments:         an_struct * - pointer to scan analysis
 * Returns:                NONE

*****************************************************************
******/

void sp_WRITE(an_struct *an)
     {
     UBYTE sp_idx, err;
```

```
     err = 0;
     sp_idx = WBGet(&sp_freebuf, &err); /* obtain free buffer
          */
     if (err)                                    /* any free buffers
left ?          */
          {
          sp_idx = WBGet(&sp_usedbuf, &err); /* free up a used
buffer          */
          }
     memcopy(&stp[sp_idx], an, sizeof(an_struct)); /* copy in
analysis  */
     WBPut(&sp_usedbuf, sp_idx);                 /* place buffer on
used queue      */
     }


/******************************************************************
*******
 * Function:          sp_READ
 * Description:            Obtain existing scan history buffer
 * Arguments:         none
 * Returns:                an_struct * - valid buffer pointer (NULL
when not)

******************************************************************
******/

an_struct *sp_READ(void)
     {
     UBYTE sp_idx, err;
     an_struct *sp;

     err = 0;
     sp_idx = WBGet(&sp_usedbuf, &err);  /* get a used buffer
index           */
     if (!err)
          {
          WBPut(&sp_freebuf, sp_idx);            /* place back on free
buffer que*/
          sp = &stp[sp_idx];                     /* pointer to be
returned        */
          }
     else
          {
          sp = (an_struct *)NULL;
          }

     return (sp);
     }

/******************************************************************
*******
 * Function:          sp_LAST
```

```
 * Description:         Obtain last existing storage buffer
 * Arguments:       NONE
 * Returns:             an_struct * - valid buffer pointer (NULL
when not)

*****************************************************************
******/

an_struct *sp_LAST(void)
     {
     UBYTE err, idx;

     idx = WBLast(&sp_usedbuf, &err);
     if (!err)
          {
          printf("sp_LAST: %d\r",idx);
          return ((an_struct *)&stp[idx]);
          }
     else   return (NULL);
     }

/****************************************************************
*******
 * Function:        sp_PREV
 * Description:         Obtain existing scan storage buffer
 * Arguments:       NONE
 * Returns:             sp_struct * - valid buffer pointer (NULL
when not)

*****************************************************************
******/

an_struct *sp_PREV(void)
     {
     UBYTE err, idx;

     idx = WBPrev(&sp_usedbuf, &err);
     printf("sp_PREV: %d\r",idx);
     return ((an_struct *)&stp[idx]);
     }

/****************************************************************
*******
 * Function:        sp_FIRST
 * Description:         Obtain first existing storage buffer
 * Arguments:       NONE
 * Returns:             an_struct * - valid buffer pointer (NULL
when not)

*****************************************************************
******/
```

```
an_struct *sp_FIRST(void)
     {
     UBYTE err, idx;

     idx = WBFirst(&sp_usedbuf, &err);
     if (!err)
          {
          printf("sp_FIRST: %d\r",idx);
          return ((an_struct *)&stp[idx]);
          }
     else   return (NULL);
     }


/**************************************************************
*******
 * Function:          sp_NEXT
 * Description:            Obtain next existing scan storage buffer
 * Arguments:         NONE
 * Returns:                sp_struct * - valid buffer pointer (NULL
when not)

***************************************************************
******/

an_struct *sp_NEXT(void)
     {
     UBYTE err, idx;

     idx = WBNext(&sp_usedbuf, &err);
     printf("sp_NEXT: %d\r",idx);
     return ((an_struct *)&stp[idx]);
     }


/**************************************************************
*******
 * Function:          sp_STATUS
 * Description:            Obtain number of existing scan storage
buffers
 * Arguments:         NONE
 * Returns:                UWORD - number of buffers

***************************************************************
******/

UWORD sp_STATUS(void)
     {
     return (WBStatus(&sp_usedbuf));
     }
```

```
/*****************************************************************
*******
 *  Title:  SP - Store/Print Buffer Header File
                 *
 *  Ident:  Rev. A
                      *

******************************************************************
******
 *   Copyright (c) 1993     All rights reserved.
         *
 *
     *
 *   This software is furnished under a license and may be used and
  *
 *   copied only in accordance with the terms of such license and
     *
 *    with the inclusion of the above copyright notice.   This
software  *
 *   or any other copies thereof may not be provided or otherwise
     *
 *   made available to any other person.  No title to and ownership
of *
 *   the software is hereby transferred.
     *
 *
     *
 *   The information in this software is subject to change without
    *
 *    notice and should not be construed as a commitment by RJS,
Inc.   *
 *
     *
 *   RJS assumes no responsibility for the user or reliability of
     *
 *   its software on equipment that is not supplied by RJS.
     *
 *
     *

******************************************************************
******
 *
 *  Abstract:
 *
 *  Author:      Donald Palmer, 15-JAN-93, Version X0.00
 *
 *  Modification History
 *
 *  Date         Who     Version      Why
 *    ----------         -------         ---------
-----------------------------------
 * 05-MAR-93   DRP       X0.10          Integration to ASII system
```

```
*****************************************************************
******/

#define sp_size 20

/****************************************************************
*******
 * Function Prototypes

*****************************************************************
******/

void sp_RESET(void);                              /* initialize buffer
controller     */
void sp_CLEAR(void);
void sp_WRITE(an_struct *);
an_struct *sp_READ(void);
an_struct *sp_LAST(void);
an_struct *sp_PREV(void);
an_struct *sp_FIRST(void);
an_struct *sp_NEXT(void);
UWORD sp_STATUS(void);
```

```
/*              - STDIO.H -

   Subset of ANSI standard I/O function declarations.

   Version: 3.20 [ICLM]

*/

#ifndef _STDIO_INCLUDED
#define _STDIO_INCLUDED

#ifndef NULL
#define   NULL (void *) 0
#endif

#ifndef EOF
#define   EOF  (-1)
#endif

#ifndef size_t
#if  sizeof((char*)0 - (char*)0) == sizeof(int)
#define   size_t    unsigned int
#else
#define   size_t    unsigned long
#endif
#endif

/* #pragma function=non_banked */

int  puts(const char *);
int  putchar(int);
int  getchar(void);
int  sprintf(char *,const char *,...);
int  printf(const char *,...);
int  scanf(const char *,...);
int  sscanf(const char *, const char *,...);
char *gets(char *);

/* #pragma function=default */

#endif
```

```
/*              - STDLIB.H -

   The ANSI-defined 'standard' functions.

   Version: 3.20 [ICLM]

*/

#ifndef _STDLIB_INCLUDED
#define _STDLIB_INCLUDED

#ifndef size_t
#if sizeof((char *)0 - (char *)0) == sizeof(int)
#define size_t      unsigned int
#else
#define size_t      unsigned long
#endif
#endif

#ifndef NULL
#define   NULL (void*) 0
#endif

typedef   struct
     {
       int     quot;
       int     rem;
     } div_t;

typedef   struct
     {
       long int     quot;
       long int     rem;
     } ldiv_t;


#define RAND_MAX    32768

#define EXIT_SUCCESS     0
#define EXIT_FAILURE     1


/* #pragma function=non_banked */

void *malloc(size_t size);

void free(void *ptr);

void exit(int status);

void *calloc(unsigned int nelem, size_t elsize);

void *realloc(void *ptr, size_t size);
```

```
int atoi (const char *nptr);

long atol (const char *nptr);

double atof (const char *nptr);

double strtod(const char *nptr, char **endptr);

long int strtol(const char *nptr, char **endptr, int base);

unsigned long int strtoul(const char *nptr, char **endptr, int
base);

int rand(void);

void srand(unsigned int seed);

void abort(void);

int abs(int j);

div_t div(int numer, int denom);

long int labs(long int j);

ldiv_t ldiv(long int numer, long int denom);

/* #pragma function=default */

#endif
```

```
/*                - STRING.H -

   The ANSI 'string' function declarations.

   Version: 3.20 [ICLM]

*/

#ifndef _STRING_INCLUDED
#define _STRING_INCLUDED

#ifndef   NULL
#define NULL   (char*)0
#endif

#ifndef size_t
#if sizeof((char *)0 - (char *)0) == sizeof(int)
#define size_t      unsigned int
#else
#define size_t      unsigned long
#endif
#endif

/* #pragma function=non_banked */

void *memcpy(void *s1, const void *s2, size_t n);

void *memmove(void *s1, const void *s2, size_t n);

void *memchr(const void *s, int c, size_t n);

void *memset(void *s, int c, size_t n);

int memcmp(const void *s1, const void *s2, size_t n);

char *strchr(const char *s, int c);

int strcmp(const char *s1, const char *s2);

int strncmp(const char *s1, const char *s2, size_t n);

int strcoll(const char *s1, const char *s2);

size_t strlen(const char *s);

size_t strcspn(const char *s1, const char *s2);

size_t strspn(const char *s1, const char *s2);

char *strpbrk(const char *s1, const char *s2);

char *strrchr(const char *s, int c);

char *strstr(const char *s1, const char *s2);
```

```
char *strcat(char *s1, const char *s2);
char *strncat(char *s1, const char *s2, size_t n);
char *strcpy(char *s1, const char *s2);
char *strncpy(char *s1, const char *s2, size_t n);
/* #pragma function=default */
#endif
```

```
/******************************************************************
*******
 *  Title:  SW.C - Laser Inspector Switch Controller
        *
 *  Ident:  Rev. A
                  *

*******************************************************************
******
 *   Copyright (c) 1993     All rights reserved.
        *
 *
     *
 *   This software is furnished under a license and may be used and
  *
 *   copied only in accordance with the terms of such license and
     *
 *    with the inclusion of the above copyright notice.   This
software  *
 *   or any other copies thereof may not be provided or otherwise
     *
 *   made available to any other person.  No title to and ownership
of *
 *   the software is hereby transferred.
     *
 *
     *
 *   The information in this software is subject to change without
   *
 *    notice and should not be consTRUEd as a commitment by RJS,
Inc.    *
 *
     *
 *   RJS assumes no responsibility for the user or reliability of
     *
 *   its software on equipment that is not supplied by RJS.
     *
 *
     *

*******************************************************************
******
 *
 *  Abstract:
 *
 *  Author:       Donald R. Palmer, 08-SEP-89, Version X0.00
 *
 *  Modification History
 *
 *  Date          Who      Version       Why
 *    ----------           -------         ---------
---------------------------------

*******************************************************************
```

```
******/

/****************************************************************
*******
 * Include Files

****************************************************************
******/

#include "system.h"
#include "io6811.h"
#include "int6811.h"

#include "gn.h"
#include "rs.h"
#include "dz.h"
#include "an.h"
#include "ol.h"
#include "sw.h"

#pragma codeseg(SW)

/****************************************************************
*******
 * local prototypes

****************************************************************
*******/
non_banked void reset(void);                         /* system wide
reset          */
static void sw_ACTION(void);

/****************************************************************
********
 * Local Variables

****************************************************************
******/

#pragma memory = zpage
static UBYTE sw_val;                                 /* switch port
byte            */
static UBYTE sw_action;                              /* Switch action
byte      */
static UBYTE sw_1h, sw_2h, sw_3h, sw_4h;      /*   switch   holding
actions   */
static UBYTE sw_bounce;                              /* switch bounce
counter   */
static UBYTE sw_status;                              /* switch status
byte      */
static UBYTE sw_new;
#pragma memory = default

SWITCHES sw_area;                                    /* global switch
```

```
area      */
SWITCHES *sw;

/*****************************************************************
*******
 * Function:        sw_RESET
 * Description:          Initialize switch processing
 * Arguments:       none
 * Returns:              none

*****************************************************************
******/

void sw_RESET(void)
     {
     sw_action = sw_new = 0;
     sw_1h = sw_2h = sw_3h = sw_4h = 0;      /*   reset   switch
holding        */
     sw_status = FALSE;                              /*  clear  out
status byte    */
     sw_val = sw_mask;                               /* reset switch
actions        */
     sw_bounce = sw_bmax;                            /* reset bounce
counter        */
     sw_ACTION();
     sw_ON();                                        /* start switch
processing     */
     }

/*****************************************************************
*******
 * Function:        sw_OFF
 * Description:          Suspend switch processing
 * Arguments:       none
 * Returns:              none

*****************************************************************
******/

void sw_OFF(void)
     {
     TFLG2 =  tof;
     TMSK2 &= ~toi;                                  /* turn off timer
overflow  */
     }

/*****************************************************************
*******
 * Function:        sw_ON
 * Description:          resume switch processing
 * Arguments:       none
 * Returns:              none

*****************************************************************
```

```
******/

void sw_ON(void)
     {
     TFLG2 =  tof;
     TMSK2 |= toi;                                    /* turn on timer
overflow  */
     }

/****************************************************************
*******
 * Function:        sw_ACTION
 * Description:          Obtain active switch status
 * Arguments:       none
 * Returns:              none

*****************************************************************
******/

static void sw_ACTION(void)
     {
     sw = &sw_area;
     sw->sw_STATUS = sw_action;                       /*   move   into
callers area   */
     sw->sw_SW1TIME = sw_1h;
     sw->sw_SW2TIME = sw_2h;
     sw->sw_SW3TIME = sw_3h;
     sw->sw_SW4TIME = sw_4h;

     }

/****************************************************************
*******
 * Function:        sw_WAIT
 * Description:          Wait for switch
 * Arguments:       none
 * Returns:              none

*****************************************************************
******/

void sw_WAIT(void)
     {
     while (!sw_new) wait_for_interrupt();
     sw_ACTION();                                     /* update switch
structure */
     sw_new = 0;
     }

/****************************************************************
*******
 * Function:        sw_read
 * Description:          Read switches and process
```

```
 * Arguments:        none
 * Returns:                   none

******************************************************************
******/

static void sw_read(void)
     {
     sw_val = (PORTE & sw_mask);                      /*  get  switch
status         */
     if (sw_val == sw_mask)                           /* any switches
pressed        */
          {
          sw_1h = sw_2h = sw_3h = sw_4h = 0 ;         /* reset switch
holding        */
          sw_bounce = sw_bmax;                        /* reset bounce
counter        */
          sw_action = 0;
          sw_status = FALSE;
          }
     else
          {
          if  (sw_action  !=  (sw_val  ^  sw_mask))/*  same  keys
pressed        */
               {
               sw_action = sw_val ^ sw_mask; /*  action  contains
positive  */
               sw_new = sw_action;
               }

          if (sw_action & sw_print)                   /*  switch  one
held down      */
               sw_1h++;                                    /* increment
down timer          */
          else
               sw_1h = 0;

          if (sw_action & sw_enter)                   /*  switch  two
held down      */
               sw_2h++;                                    /* increment
down timer          */
          else
               sw_2h = 0;

          if (sw_action & sw_select)                  /* switch 3 held
down      */
               sw_3h++;                                    /* increment
down timer          */
          else
               sw_3h = 0;

          if (sw_action & sw_data)          /*  switch  3  held
down      */
               sw_4h++;                                    /* increment
```

```
down timer          */
          else
               sw_4h = 0;


          }
     if (sw_2h > 0 && sw_3h > 0)                      /* switch 2 and
switch 3  */
          {                                                /* held down
for a while ?  */
          disable_interrupt();                         /* disable all
interrupts     */
          reset();                                     /*  will  never
return !!!     */
          }

     if (sw_1h > 0 && sw_4h > 0)                      /* switch 1 and
switch 4  */
          {                                                /* held down
for a while ?  */
          disable_interrupt();
          gn_POWEROFF();                               /* disable all
interrupts     */
          gn_CLEAR();
          enable_interrupt();
          rs_OPEN();
          reset();                                     /*  will  never
return !!!     */
          }

     if (sw_2h > 0 && sw_1h > 0)
          {
          disable_interrupt();
          ol_CLEAR();                                       /* clear out
output ports   */
          reset();
          }


     }
/*****************************************************************
*******
 * Function:        TO_interrupt
 * Description:          Switch debounce from timer overflow flag
 * Arguments:       none
 * Returns:              none

******************************************************************
******/

void sw_interrupt(void)
     {
```

```
     TFLG2 = tof;                           /* clear interrupt
flag         */
     enable_interrupt();
     if (!sw_status)                        /* waiting for change
??          */
          {
          if (sw_val != (PORTE & sw_mask))/* switch change has
occured*/
               {
               sw_bounce = sw_bmax;      /* reset the bounce
counter        */
               sw_val = (PORTE & sw_mask);    /* update the switch
value      */
               sw_status = TRUE;         /* show waiting for
steady         */
               }
          }
     else
          {
          if (sw_val == (PORTE & sw_mask))/* switches still
bouncing   */
               {
               sw_bounce--;              /* no - use the bounce
counter    */
               if (!sw_bounce)                /* reach bottom of
bounce         */
                    {
                    sw_read();                /* update switch
status              */
                    sw_bounce = sw_bmax;/* reset the bounce
counter        */
                    sw_status = FALSE;  /* will wait for a
change         */
                    }
               }
          else
               {
               sw_val = (PORTE & sw_mask);    /* reset switch
value          */
               sw_bounce = sw_bmax;      /* reset the bounce
counter        */
               sw_status = TRUE;
               }
          }
     }
```

```
/****************************************************************
*******
 *  Title:  SW.C - Laser Inspector Switch Controller Header File
 *
 *  Ident:  Rev. A
                  *

*****************************************************************
******
 *   Copyright (c) 1993     All rights reserved.
        *
 *
    *
 *  This software is furnished under a license and may be used and
  *
 *   copied only in accordance with the terms of such license and
    *
 *    with the inclusion of the above copyright notice.  This
software  *
 *   or any other copies thereof may not be provided or otherwise
    *
 *  made available to any other person.  No title to and ownership
of *
 *   the software is hereby transferred.
    *
 *
    *
 *   The information in this software is subject to change without
   *
 *    notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version       Why
 *    ----------        -------         ---------
----------------------------------

*****************************************************************
```

```
******/

/****************************************************************
********
 Structure Definitions

*****************************************************************
******/

typedef struct
     {
     UBYTE sw_STATUS;                                   /* current switch
status    */
     UBYTE sw_SW1TIME;                                  /*  switch  one
held time       */
     UBYTE sw_SW2TIME;                                  /*  switch  two
held time       */
     UBYTE sw_SW3TIME;                                  /* switch three
held time */
     UBYTE sw_SW4TIME;
     } SWITCHES ;

/****************************************************************
********
 Global Variables

*****************************************************************
******/

extern SWITCHES sw_area;
extern SWITCHES *sw;

/****************************************************************
********
 Global Constants

*****************************************************************
******/
#define sw_print    e7                             /*  print  (F1)  key
value          */
#define sw_select   e4                             /* select key value
         */
#define sw_enter    e6                             /* enter key value
         */
#define sw_data          e2                                  /* data (F2)
key value      */
#define sw_switch   0xFF
#define sw_mask     (e7 + e4 + e6 + e2)            /* 0xD4    all 4 switch
mask */
#define sw_bmax     0x04                                     /*  switch
bounce counter */
```

```
#define sw_SELECT() (sw->sw_STATUS & sw_select)
#define sw_ENTER()  (sw->sw_STATUS & sw_enter)
#define sw_PRINT()  (sw->sw_STATUS & sw_print)
#define sw_DATA()   (sw->sw_STATUS & sw_data)

/*****************************************************************
********
 Function Prototypes

*****************************************************************
******/

void sw_RESET(void);
void sw_OFF(void);                                   /* suspend switch
processing*/
void sw_ON(void);
void sw_WAIT(void);
```

```
/*****************************************************************
*******
 *  Title:  SYSTEM.H - Laser Inspector system wide header file
      *
 *  Ident:  Rev. A
                  *

*****************************************************************
******
 *   Copyright (c) 1993     All rights reserved.
      *
 *
    *
 *  This software is furnished under a license and may be used and
  *
 *   copied only in accordance with the terms of such license and
    *
 *    with the inclusion of the above copyright notice.  This
software  *
 *   or any other copies thereof may not be provided or otherwise
    *
 *  made available to any other person.  No title to and ownership
of *
 *   the software is hereby transferred.
    *
 *
    *
 *  The information in this software is subject to change without
   *
 *   notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:      Donald R. Palmer, 08-SEP-89, Version X0.00
 *
 *  Modification History
 *
 *  Date         Who     Version       Why
 *    ----------         -------          ---------
----------------------------------

*****************************************************************
```

```
******/

/*****************************************************************
*******
 * System wide constants

******************************************************************
******/

#define UBYTE  unsigned char
#define BYTE   signed char
#define BOOLEAN     unsigned char
#define UWORD  unsigned short
#define WORD   signed short
#define LONG   signed long
#define ULONG   unsigned long
#define STRING const char *

#define TRUE   -1
#define FALSE  0

#ifndef NULL
#define   NULL (void*) 0
#endif


#define min(a,b)  (a < b ? a : b)
#define max(a,b)  (a > b ? a : b)


extern UBYTE sys_debug;
```

```
/*****************************************************************
*******
 *  Title:  UE.H - UPC/EAN Decoder Header File
             *
 *  Ident:  Rev. A
                  *

*****************************************************************
******
 *   Copyright (c) 1993     All rights reserved.
         *
 *
    *
 *   This software is furnished under a license and may be used and
  *
 *   copied only in accordance with the terms of such license and
    *
 *    with the inclusion of the above copyright notice.   This
software  *
 *   or any other copies thereof may not be provided or otherwise
    *
 *   made available to any other person.  No title to and ownership
of *
 *   the software is hereby transferred.
    *
 *
    *
 *   The information in this software is subject to change without
   *
 *    notice and should not be construed as a commitment by RJS,
Inc.   *
 *
    *
 *   RJS assumes no responsibility for the user or reliability of
    *
 *   its software on equipment that is not supplied by RJS.
    *
 *
    *

*****************************************************************
******
 *
 *  Abstract:
 *
 *  Author:       Dale Garison, 15-JAN-93, Version X0.00
 *
 *  Modification History
 *
 *  Date          Who      Version       Why
 *    ----------          -------        ---------
-----------------------------------
 * 15-JAN-93   DG         X0.00          Original Writing
 * 05-MAR-93   DRP        X0.10          Integration to ASII system
```

```
*****************************************************************
******/

/****************************************************************
*******
 * Function Prototypes

*****************************************************************
******/

BOOLEAN code_upc(void);
```

```
/*******************************************************************
********
 *  Title:  WB - Wrap Buffer Control Module
                 *
 *  Ident:  X0.00
                          *

********************************************************************
*******
 *   Copyright (c) 1989, 1990, 1991, 1992     All rights reserved.
    *
 *
     *
 *   This software is furnished under a license and may be used and
   *
 *    copied only in accordance with the terms of such license and
     *
 *     with the inclusion of the above copyright notice.   This
software    *
 *    or any other copies thereof may not be provided or otherwise
     *
 *   made available to any other person.  No title to and ownership
of   *
 *    the software is hereby transferred.
     *
 *
     *
 *   The information in this software is subject to change without
    *
 *    notice and should not be construed as a commitment by RJS,
Inc.     *
 *
     *
 *    RJS assumes no responsibility for the user or reliability of
     *
 *    its software on equipment that is not supplied by RJS.
     *
 *
     *

********************************************************************
*******
 *
 *  Abstract:
 *
 *  Author:      Donald R. Palmer, 19-NOV-92, Version X0.00
 *
 *  Modification History
 *
 *  WHEN       WHO       VERSION        WHAT
 *   ----      ---       -------
-------------------------------------
 * 19-NOV-92   DRP       X0.00          Original Writing
```

```
*****************************************************************
*******/

/****************************************************************
********
 Include Files

*****************************************************************
*******/

#include "system.h"
#include "io6811.h"
#include "stdlib.h"
#include "stdio.h"
#include "string.h"

#include "wb.h"

#pragma codeseg(WB)

/****************************************************************
*******
 * Function:        WBInit
 * Description:          Initialize a Wrap Buffer
 * Arguments:       WB_BUF  - pointer to wrap buffer control block
 *                       UBYTE * - pointer to wrap buffer body
 *                       UWORD   - wrap buffer size (in bytes)
 * Returns:              none

*****************************************************************
******/

void WBInit(WB_BUF *pq, UBYTE *start, UWORD size)
     {
    pq->WBStart   = start;
    pq->WBEnd     = &start[size];
    pq->WBIn      = start;
    pq->WBOut     = start;
    pq->WBSize    = size;
     pq->WBEntries = 0;
     }


/****************************************************************
*******
 * Function:        WBGet
 * Description:          Get item from wrap buffer
 * Arguments:       WB_BUF  - pointer to wrap buffer control block
 *                       UBYTE * - pointer to error flag
 * Returns:              UBYTE   - item from wrap buffer

*****************************************************************
******/
```

```
UBYTE WBGet(WB_BUF *pq, UBYTE *err)
     {
    UBYTE  msg;

    if (pq->WBEntries != 0)
          {
          disable_interrupt();
          msg = *pq->WBOut++;
        pq->WBEntries--;
        if (pq->WBOut == pq->WBEnd)
               {
            pq->WBOut = pq->WBStart;
              }
          enable_interrupt();
        *err = W_BUF_NOERR;
          }
     else
          {
          *err = W_BUF_EMPTY;
          }
    return (msg);
     }

/*****************************************************************
*******
 * Function:        WBPut
 * Description:          Place item into wrap buffer
 * Arguments:       WB_BUF * - pointer to wrap buffer control block
 *                       UBYTE    - item to be added to buffer
 * Returns:              UBYTE    - error return code

*****************************************************************
******/

UBYTE WBPut(WB_BUF *pq, UBYTE msg)
     {

    if (pq->WBEntries >= pq->WBSize) return (W_BUF_FULL);
     disable_interrupt();
    *pq->WBIn++ = msg;
     pq->WBEntries++;

    if (pq->WBIn == pq->WBEnd)
          {
        pq->WBIn = pq->WBStart;
         }
     enable_interrupt();
    return (W_BUF_NOERR);
     }

/*****************************************************************
*******
 * Function:        WBGetD
```

```
 * Description:          Get item from wrap buffer;
 * Arguments:        WB_BUF  - pointer to wrap buffer control block
 *                       UBYTE * - pointer to error flag
 * Returns:              UBYTE   - item from wrap buffer

*****************************************************************
******/

 UBYTE WBGetD(WB_BUF *pq, UBYTE *err)
     {
    UBYTE  msg;


    if (pq->WBEntries != 0)
          {
//        disable_interrupt();
          msg = *pq->WBOut++;
        pq->WBEntries--;
        if (pq->WBOut == pq->WBEnd)
              {
           pq->WBOut = pq->WBStart;
             }
//        enable_interrupt();
        *err = W_BUF_NOERR;
          }
     else
          {
          *err = W_BUF_EMPTY;
          }
    return (msg);
     }

/****************************************************************
*******
 * Function:         WBPutD
 * Description:          Place item into wrap buffer
 * Arguments:        WB_BUF * - pointer to wrap buffer control block
 *                       UBYTE    - item to be added to buffer
 * Returns:              UBYTE    - error return code

*****************************************************************
******/

UBYTE WBPutD(WB_BUF *pq, UBYTE msg)
     {

    if (pq->WBEntries >= pq->WBSize) return (W_BUF_FULL);
//   disable_interrupt();
    *pq->WBIn++ = msg;
     pq->WBEntries++;

    if (pq->WBIn == pq->WBEnd)
          {
        pq->WBIn = pq->WBStart;
```

```
        }
//   enable_interrupt();
    return (W_BUF_NOERR);
     }


/*****************************************************************
*******
 * Function:        WBLast
 * Description:          Set traverse pointer to last in buffer and
get
 *                       item at that location
 * Arguments:       WB_BUF * - pointer to wrap buffer control block
 *                       UBYTE *  - pointer to error flag
 * Returns:              UBYTE    - item from wrap buffer

*****************************************************************
******/

UBYTE WBLast(WB_BUF *pq, UBYTE *err)
     {
     UBYTE msg;

     if (pq->WBEntries != 0)
          {
          pq->WBTraverse = pq->WBIn;
          pq->WBTraverse--;
          if (pq->WBTraverse == pq->WBStart-1) pq->WBTraverse =
(pq->WBEnd - 1);
          msg = *pq->WBTraverse;
          *err = W_BUF_NOERR;
          }
     else
          {
          *err = W_BUF_EMPTY;
          msg = 0;
          }
     return(msg);
     }

/*****************************************************************
*******
 * Function:        WBFirst
 * Description:          Set traverse pointer to first in buffer
and get
 *                       item at that location
 * Arguments:       WB_BUF * - pointer to wrap buffer control block
 *                       UBYTE *  - pointer to error flag
 * Returns:              UBYTE    - item from wrap buffer

*****************************************************************
******/

UBYTE WBFirst(WB_BUF *pq, UBYTE *err)
```

```
     {
     UBYTE msg;

     if (pq->WBEntries != 0)
          {
          pq->WBTraverse = pq->WBOut;
          msg = *pq->WBTraverse++;
          if (pq->WBTraverse == pq->WBEnd)
               {
               pq->WBTraverse = pq->WBStart;
               }
          *err = W_BUF_NOERR;
          }
     else
          {
          *err = W_BUF_EMPTY;
          }
     return (msg);
     }

/*****************************************************************
*******
 * Function:        WBPrev
 * Description:          Usng traverse pointer obtain the previous
item in
 *                       the wrap buffer
 * Arguments:       WB_BUF * - pointer to wrap buffer control block
 *                       UBYTE *  - pointer to error flag
 * Returns:              UBYTE    - item from wrap buffer

*****************************************************************
******/

UBYTE WBPrev(WB_BUF *pq, UBYTE *err)
     {
     UBYTE msg;

     if (pq->WBEntries != 0)
          {
          pq->WBTraverse--;
          if (pq->WBTraverse == pq->WBStart-1)
               {
               pq->WBTraverse = (pq->WBEnd - 1);
               }
          msg = *pq->WBTraverse;
          *err = W_BUF_NOERR;
          }
     else
          {
          *err = W_BUF_EMPTY;
          }
     return (msg);
     }
```

```
/****************************************************************
*******
 * Function:        WBNext
 * Description:          Usng traverse pointer obtain the next item
in
 *                       the wrap buffer
 * Arguments:       WB_BUF * - pointer to wrap buffer control block
 *                       UBYTE *   - pointer to error flag
 * Returns:              UBYTE     - item from wrap buffer

****************************************************************
******/

UBYTE WBNext(WB_BUF *pq, UBYTE *err)
     {
     UBYTE msg;

     if (pq->WBEntries != 0)
          {
          msg = *pq->WBTraverse++;
          if (pq->WBTraverse == pq->WBEnd)
               {
               pq->WBTraverse = pq->WBStart;
               }
          *err = W_BUF_NOERR;
          }
     else
          {
          *err = W_BUF_EMPTY;
          }
     return (msg);
     }

/****************************************************************
*******
 * Function:        WBStatus
 * Description:          Obtain number of items in a wrap buffer
 *                       the wrap buffer
 * Arguments:       WB_BUF * - pointer to wrap buffer control block
 * Returns:              UWORD     - number of item in wrap buffer

****************************************************************
******/

UWORD WBStatus(WB_BUF *pq)
     {
     return(pq->WBEntries);
     }
```

```
/*****************************************************************
********
 *  Title:  WB.H - Wrap around buffer control Module Header File
        *
 *  .Ident:  X0.00
                         *

*****************************************************************
*******
 *   Copyright (c) 1989, 1990, 1991, 1992     All rights reserved.
      *
 *
        *
 *   This software is furnished under a license and may be used and
    *
 *    copied only in accordance with the terms of such license and
        *
 *     with the inclusion of the above copyright notice.   This
software    *
 *   or any other copies thereof may not be provided or otherwise
        *
 *   made available to any other person.  No title to and ownership
of   *
 *   the software is hereby transferred.
        *
 *
        *
 *   The information in this software is subject to change without
      *
 *    notice and should not be construed as a commitment by RJS,
Inc.     *
 *
        *
 *   RJS assumes no responsibility for the user or reliability of
        *
 *   its software on equipment that is not supplied by RJS.
        *
 *
        *

*****************************************************************
*******
 *
 *  Modification History
 *
 *  WHEN       WHO       VERSION       WHAT
 *   ----      ---       -------
-------------------------------------
 * 19-NOV-92   DRP       X0.00         Original Writing

*****************************************************************
*******/
```

```
/*****************************************************************
********
 * constant definition

*****************************************************************
*******/

#define   W_BUF_NOERR 0x00
#define W_BUF_EMPTY 0x01
#define W_BUF_FULL  0x02

/*****************************************************************
********
 *             Wrap around buffer data structure

*****************************************************************
*******/


/*** 8 bit structure ***/

typedef struct wb_buf
     {
    UBYTE *WBStart;                               /*  starting  buffer
address        */
    UBYTE *WBEnd;                                 /*   ending   buffer
address        */
    UBYTE *WBIn;                                  /*   buffer   input
pointer             */
    UBYTE *WBOut;                                 /*   buffer   output
pointer        */
    UWORD  WBSize;                                /* buffer entry size
(bytes)    */
    UWORD  WBEntries;                             /*   buffer    entry
count               */
     UBYTE *WBTraverse;
     } WB_BUF;

/*****************************************************************
********
 * function prototypes

*****************************************************************
*******/

void  WBInit(WB_BUF *, UBYTE *, UWORD); /*  initialize  a  wrap
buffer         */
UBYTE WBPut(WB_BUF *, UBYTE);           /* post to a wrap buffer
     */
UBYTE WBGet(WB_BUF *, UBYTE *);              /*  get  entry  from
buffer         */
UBYTE WBPutD(WB_BUF *, UBYTE);               /*  post  to  a  wrap
```

```
UWORD WBStatus(WB_BUF *);                        /* obtain Wrap buffer
status    */
UBYTE WBLast(WB_BUF *, UBYTE *);
UBYTE WBFirst(WB_BUF *, UBYTE *);
UBYTE WBPrev(WB_BUF *, UBYTE *);
UBYTE WBNext(WB_BUF *, UBYTE *);
```

Having now described the invention as required by the patent statutes, those skilled in the art will recognize modifications and substitutions for the elements and steps of the invention required for specific applications. Such modifications and revisions are within the scope and intent of the present invention as defined in the following claims.

What is claimed is:

1. An on-line bar code verification system comprising:

a single scanner having a control input for initiating a scan and a data output for multiple bar codes within a single scan line;

a controller providing the control input to the scanner and having a means for sensing an external synchronization signal;

a means for inputting a selection of a predetermined verification requirement for multiple bar codes within a single scan line;

a means for directing output of a signal to the control input of the scanner;

a means for receiving scanned data from said multiple bar codes within a single scan line, said receiving means connected to said scanner data output;

a comparison means connected to the receiving means and responsive to said selection for comparing said scanned data for each of said multiple bar codes to said predetermined verification requirement;

said directing means, receiving means and comparison means operable in a first mode responsive to said sensing means for synchronized scanning and in a second mode for continuous scanning; and, at least one signal output means responsive to said comparison means for generating a control signal output upon failure of a verification from any of said multiple bar codes.

2. An on-line bar code verification system as defined in claim 1, wherein said controller further comprises a communication interface, said interface connected to transmit information to a host processor from said comparison means.

3. An on-line bar code verification system as defined in claim 2, wherein said communications interface is bidirectional and said controller further comprises means for receiving verification information from the host processor for input of said predetermined verification requirement.

4. An on-line bar code verification system as defined in claim 1, wherein said comparison means identifies a "NO READ" condition in said first mode when said scanner data output does not contain bar code data for each of said multiple bar codes in defined for a single scan line.

5. An on-line bar code verification system as defined in claim 4, wherein said at least one signal output means is responsive to identification of a "NO READ" by said comparison means.

6. An on-line bar code verification system as defined in claim 1, further comprising a timer adjustable through said input means and wherein said comparison means identifies a "NO READ" condition in said second mode upon expiration of said timer if said scanned data does not correspond to a bar code for each of said multiple bar codes at the expiration of the timer.

7. An on-line bar code verification system as defined in claim 5, wherein said at least one signal output means is responsive to identification of a "NO READ" by said comparison means.

8. An on-line bar code verification system as defined in claim 1, wherein said comparison means includes means for identifying a predetermined number of scans.

9. An on-line bar code verification system as defined in claim 8, wherein said predetermined verification requirement incorporates a plurality of bar codes for comparison, said plurality of bar codes distributed over a pattern covering multiple scan lines and having multiple bar codes on at least one of said scan lines.

10. An on-line bar code verification system as defined in claim 9, wherein comparing said scanned data to said plurality of bar codes by said comparison means is responsive to said predetermined number of scans.

11. An on-line bar code verification system as defined in claim 1, wherein said scanner is mounted proximate a process inspection point to scan bar codes in a process having a "picket fence" orientation.

12. An on-line bar code verification system as defined in claim 1, wherein said scanner is mounted proximate a process inspection point to scan bar codes in a process having a "ladder" orientation.

* * * * *